US005706411A

United States Patent [19]
McCormick et al.

[11] Patent Number: 5,706,411
[45] Date of Patent: Jan. 6, 1998

[54] PRINTER STATUS USER INTERFACE AND METHODS RELATING THERETO

[75] Inventors: William B. McCormick, Bellevue; James O. Robarts; Sean C. McDowell, both of Redmond; Steven J. Fluegel, Bellevue, all of Wash.

[73] Assignee: Microsoft Corporation, Redmond, Wash.

[21] Appl. No.: 973,389

[22] Filed: Nov. 9, 1992

[51] Int. Cl.$^6$ .................................................. G06K 15/00
[52] U.S. Cl. .................... 395/113; 395/114; 395/851; 370/85.8
[58] Field of Search ................. 395/100, 101, 395/113, 114, 152, 155, 156, 157, 159, 107, 851, 823; 358/406, 504; 355/204–209, 108; 364/930, 935.3, 235, 235.7, 260.1, 265.1, DIG. 1; 370/85.8; 340/825.22

[56] References Cited

U.S. PATENT DOCUMENTS

| | | | |
|---|---|---|---|
| 4,631,577 | 12/1986 | Yamanishi | 358/503 |
| 4,829,468 | 5/1989 | Nanaka et al. | 395/116 |
| 4,930,087 | 5/1990 | Egawa et al. | 395/113 |
| 4,991,114 | 2/1991 | Kawamura et al. | 395/114 |
| 5,123,089 | 6/1992 | Beilinski et al. | 395/200.01 |
| 5,469,533 | 11/1995 | Dennis | 395/114 |
| 5,507,003 | 4/1996 | Pipkins | 395/851 |

FOREIGN PATENT DOCUMENTS

| | | | |
|---|---|---|---|
| 0 094 496 A2 | 11/1983 | European Pat. Off. | G06F 15/20 |
| 444251 | 9/1991 | European Pat. Off. | |
| 479494 | 4/1992 | European Pat. Off. | |

OTHER PUBLICATIONS

Microsoft Windows for the Windows Graphical Environment User's Guide Version 3.0; Microsoft Corp.; 1990; Chapter 5 pp. 160–168 Chapter 6 pp. 197–204.

Mastering Windows 3.1 Special Edition; Cowart, Robert; 1993 Chapter 6 and Chapter 7 p. 219.

"An Overview of the Parallel Centronics Interface", Current parallel port usage, NPA meeting Phoenix, Arizona, Feb. 18, 1992.

"Microsoft® Windows™ Software Development Kit, Reference vol. 1, Version 3.0", Microsoft Corporation, pp. 4–161, 4–162, 4–462, 1990.

"Common Dialog Bases", *The Windows Interface: An Application Design Guide*, pp. iii–viii and 140–163, 1992.

*Primary Examiner*—Joseph Mancuso
*Assistant Examiner*—Tracy M. Legree
*Attorney, Agent, or Firm*—Seed and Berry LLP

[57] ABSTRACT

A computer system having a visual display indicating the status of an attached printer is disclosed. The visual display allows the user to determine various status states of the attached printer without physical examination of the printer itself. Printer states requiring user intervention, and printer states not requiring user intervention, are disclosed. In a preferred embodiment, the computer system displays a Printer Status window which both graphically and textually indicates the printer state. When printing, a graphical representation of the attached printer is displayed within a portion of the Printer Status window, and is animated to represent the actual printing of a page. If an error occurs while printing, the Printer Status window preferably indicates the nature of the error, and the steps which must be performed (if any) to continue printing. When not printing, the user may determine the present status of the attached printer, and such information is preferably presented to the user in graphical form. The Printer Status window may be iconized by the user, and the corresponding icon also displays to the user the state of the attached printer.

42 Claims, 43 Drawing Sheets

Series II Add Paper Bitmap

Series II Close Cover Bitmap

Series II Start Manual Duplex Bitmap

Series II Manual Duplex Bitmap

Series II Duplex Position 1 Bitmap

Series II Duplex Position 2 Bitmap

Series II Duplex Position 3 Bitmap

Series II Paper Jam

Series II Wrong Tray Bitmap

Series II Manual Feed Bitmap

Series II Printing Position 1 Bitmap

Series II Printing Position 2 Bitmap

Series II Printing Position 3 Bitmap

IID Add Paper to Upper Tray Bitmap

IID Add Paper to Lower Tray Bitmap

IID Close Cover Bitmap

IID Paper Jam Bitmap

IID Start Manual Duplexing Bitmap

IID Manual Duplex Upper Bitmap

IID Manual Duplex Lower Tray Bitmap

IID Manual Duplex Position 1 Upper Tray Bitmap

IID Manual Duplex Position 1 Lower Tray Bitmap

IID Manual Duplex Position 2 Upper Tray Bitmap

IID Manual Duplex Position 2 Lower Tray Bitmap

IID Manual Duplex Position 3 Bitmap

IID Load Upper Tray Bitmap

IID Load Lower Tray Bitmap

IID Manual Feed Bitmap

IID Printing Position 1 Upper Tray Bitmap

IID Printing Position 1 Lower Tray Bitmap

IID Printing Position 2 Upper Tray Bitmap

IID Printing Position 2 Lower Tray Bitmap

IID Printing Position 3 Bitmap

III Add Paper to Tray Bitmap

III Close Cover Bitmap

III Paper Jam Bitmap

III Start Manual Duplex Bitmap

III Manual Duplex Bitmap

III Manual Duplex Position 1 Bitmap

III Manual Duplex Position 2 Bitmap

III Manual Duplex Position 3 Bitmap

III Load Paper Tray Bitmap

III Manual Feed Bitmap

III Printing Position 1 Bitmap

III Printing Position 2 Bitmap

III Printing Position 3 Bitmap

IIID Add Paper Upper Tray Bitmap

IIID Add Paper Lower Tray Bitmap

IIID Close Cover Bitmap

IIID Paper Jam Bitmap

IIID Start Manual Duplex Bitmap

IIID Manual Duplex Upper Tray Bitmap

IIID Manual Duplex Lower Tray Bitmap

IIID Manual Duplex Position 1 Upper Tray Bitmap

IIID Manual Duplex Position 1 Lower Tray Bitmap

IIID Manual Duplex Position 2 Upper Tray Bitmap

IIID Manual Duplex Position 2 Lower Tray Bitmap

IIID Manual Duplex Position 3 Bitmap

IIID Load Upper Tray Bitmap

IIID Load Lower Tray Bitmap

IIID Manual Feed Bitmap

IIID Printing Position 1 Upper Tray Bitmap

IIID Printing Position 1 Lower Tray Bitmap

IIID Printing Position 2 Upper Tray Bitmap

IIID Printing Position 2 Lower Tray Bitmap

IIID Printing Position 3 Bitmap

P Add Paper to MP Tray Bitmap

P Close Cover Bitmap

P Printing Position 3 Bitmap

P Manual Feed Bitmap

P Paper Jam Bitmap

P Start Manual Duplex Bitmap

P Manual Duplex Bitmap

P Printing Position 1 Bitmap

P Printing Position 2 Bitmap

P w/LC Add Paper to LC Tray Bitmap

P w/LC Add Paper to MP Tray Bitmap

P w/LC Close Cover Bitmap

P w/LC Paper Jam Bitmap

P w/LC Start Manual Duplex Bitmap

P w/LC Manual Duplex Bitmap

P w/LC Printing Position 1 From MP Tray Bitmap

P w/LC Printing Position 1 From LC Tray Bitmap

P w/LC Printing Position 2 From MP Tray Bitmap

P w/LC Printing Position 2 From LC Tray Bitmap

P w/LC Printing Position 3 Bitmap

P w/LC Load LC Tray Bitmap

P w/LC Manual Feed Bitmap

ń
5,706,411

PRINTER STATUS USER INTERFACE AND METHODS RELATING THERETO

TECHNICAL FIELD

This invention is generally directed to a user interface for a computer system, and more specifically, to a visual display indicating the status of a printer attached to the computer system.

BACKGROUND OF THE INVENTION

A computer system displays information to the user by a visual display. The ability of a user to access the information quickly and conveniently is, in large part, dependent upon the ease by which the user may interact with the computer through its visual display. While a vast amount of information is commonly displayed on the visual display of a computer system, the status of certain peripheral components of the computer system, including attached printers, are not accessible to the user through the visual display of the computer system. Rather, the user must examine the printer itself to determine its status. For example, if a printer lacks the correct size of paper or has a paper jam, this information can only be gleamed from an examination of the printer itself. When the printer is located at a location remote from the computer system, the user must travel to that location to determine the printer status.

Accordingly, there is a need in the art for a computer system having a visual display which provides the user information as to the status of an attached printer, without requiring that the user physically examine the printer itself.

SUMMARY OF THE INVENTION

It is an object of the present invention to provide a computer system having a visual display which informs the user as to the status of an attached printer. The present invention fulfills this objective, and provides further related advantages.

In one embodiment, the present invention discloses a method in a computer system having a visual display device for displaying a state of an attached printer. The information displayed on the display device includes, but is not limited to, the following User Intervention Required printing states: Cover Open, Paper Out, Wrong Paper Loaded, Paper Jam, Manual Feed, Manual Duplex, Communications Error and Engine Error. Similarly, User Intervention Not Required printer states includes, but is not limited to: Normal, Toner Low, Low on Printer Memory and Printer Changed. Preferably, the state of the attached printer is displayed in a Printer Status window.

In a further embodiment, there is disclosed a method in a computer system having a display device and an attached printer, wherein a graphical representation of the attached printer, and the state thereof, is displayed on the display device. Preferably, the graphical representation indicates the physical characteristics of the printer, including animation of the passage of paper through the attached printer when printing.

In still a further embodiment, a method in a computer system having a display device is disclosed wherein the user may selectably control the attributes of an attached printer by selection of an appropriate portion of a graphical representation of the printer displayed on the display device. The graphical representation of the attached printer is displayed on the display device such that the state of the printer corresponds, in real time, to its graphical representation upon the display device.

DETAILED DESCRIPTION OF THE INVENTION

The present invention discloses a user interface for a computer system which provides information to the user regarding the status of an attached printer. As used herein the term "attached printer" means that the computer system and the printer are connected by, for example, a parallel interface, a serial interface, or a network. The connection between the computer system and the printer must permit bi-directional I/O. Suitable system architecture for a host computer-printer system is disclosed in U.S. Ser. No. 07/911,767, filed Jul. 10, 1992, and incorporated herein by reference. A preferred embodiment of the present invention executes in conjunction with the Windows operating system, which is described in *Programming Windows* 3.1, by Charles Petzold, published by Microsoft Press, 1992, which is hereby incorporated by reference. Appendices A and B describe aspects of the present invention in further detail.

Prior to this invention, a user of a computer system would have to examine the printer itself to determine its status. For example, when the attached printer is a Hewlett Packard (hereinafter "HP") laser printer (such as a LaserJet Series II, Laser Jet IID, LaserJet IIP, LaserJet III, LaserJet IIID, LaserJet IIIP, LaserJet IIP+), printer error status (to a limited extent) are displayed on the control panel located on the face of the printer itself. The state of the printer is not, however, displayed on the visual display of the computer system. In this invention, the visual display presents information regarding the printer state to the user by displaying a Printer Status window which provides up-to-date printer status of the attached printer. Thus, the user need not physically inspect the printer to determine its status.

Figure 1:
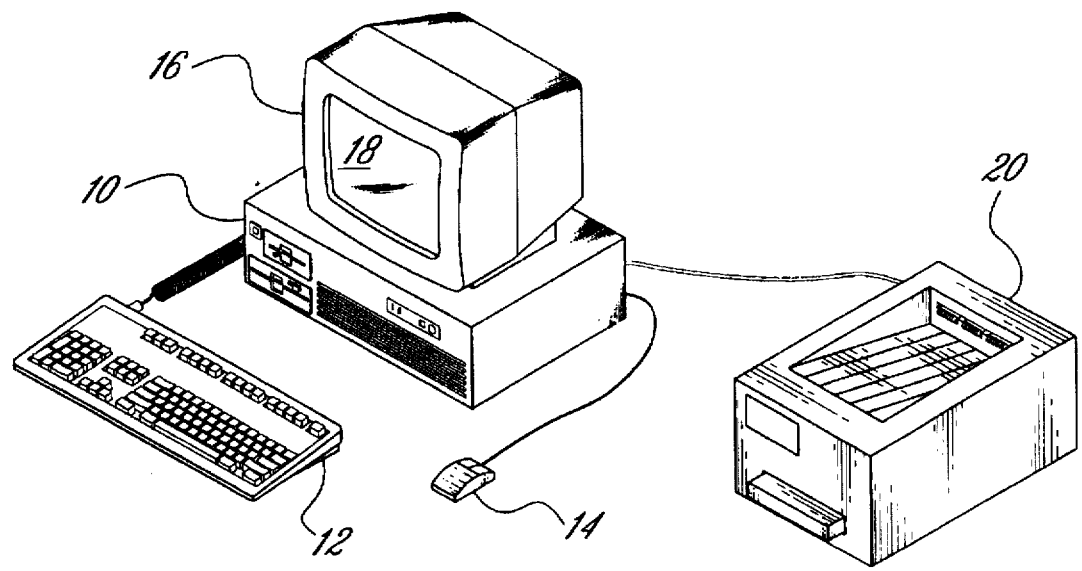
FIG. 1 illustrates a computer system of the present invention with a printer attached thereto.
Figure 2A:
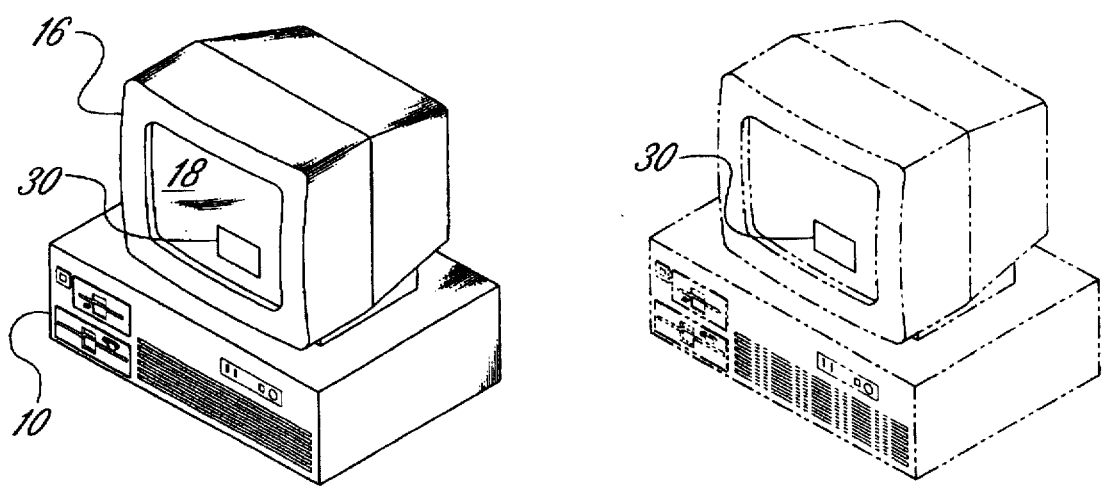
FIG. 2(a) illustrates a portion of the display screen of the computer system of FIG. 1.
Figure 2B:
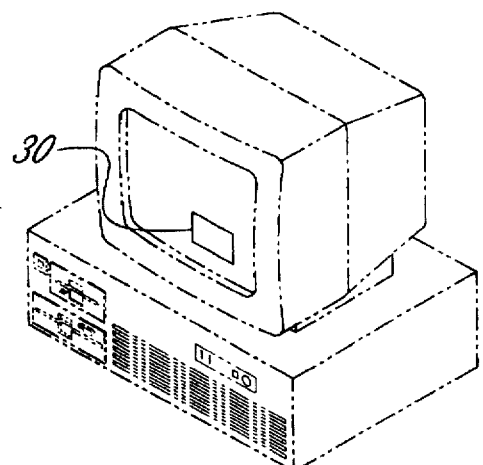
FIG. 2(b) depicts the same portion of the display screen as FIG. 2(a), but with the remainder of the computer system (i.e., the article of manufacture) illustrated with cross-hatched lines.

The Printer Status window is displayed to the user on the visual display of the computer system. Referring to FIG. 1, computer (10), keyboard (12), pointing device (14), visual display (16), visual display screen (18) and attached printer (20) are illustrated. In FIG. 2(a), computer (10), visual display (16) and visual display screen (18) are illustrated in combination with an area (30) of the visual display screen which contains information (not shown) relating to the status of the attached printer. FIG. 2(b) represents a cross-hatched representation of FIG. 2(a), and illustrates the area (30) as it appears on an article of manufacture.

The Printer Status window is displayed within the area (30) of FIGS. 2(a) and (b), or alternatively may be displayed full screen. The Printer Status window displays the current status of an active printer job. If an error occurs while printing or if user intervention is required, the Printer Status window is displayed on the visual display. When the error is corrected, the window preferably returns to its previous state. The Printer Status window is preferably not system modal, and the user should be able to switch to another application and continue working. As discussed in greater detail below, printer states which require user intervention (such as paper out or cover open) should have priority over merely informative messages (such as toner low).

In a preferred embodiment of this invention, the computer system employs a number of components to generate the user interface. In addition to the Printer Status window discussed above, additional components of this invention include a Printer Setup dialog box, a Printer Manager dialog box, and a Queue Processor.

Figure 3:
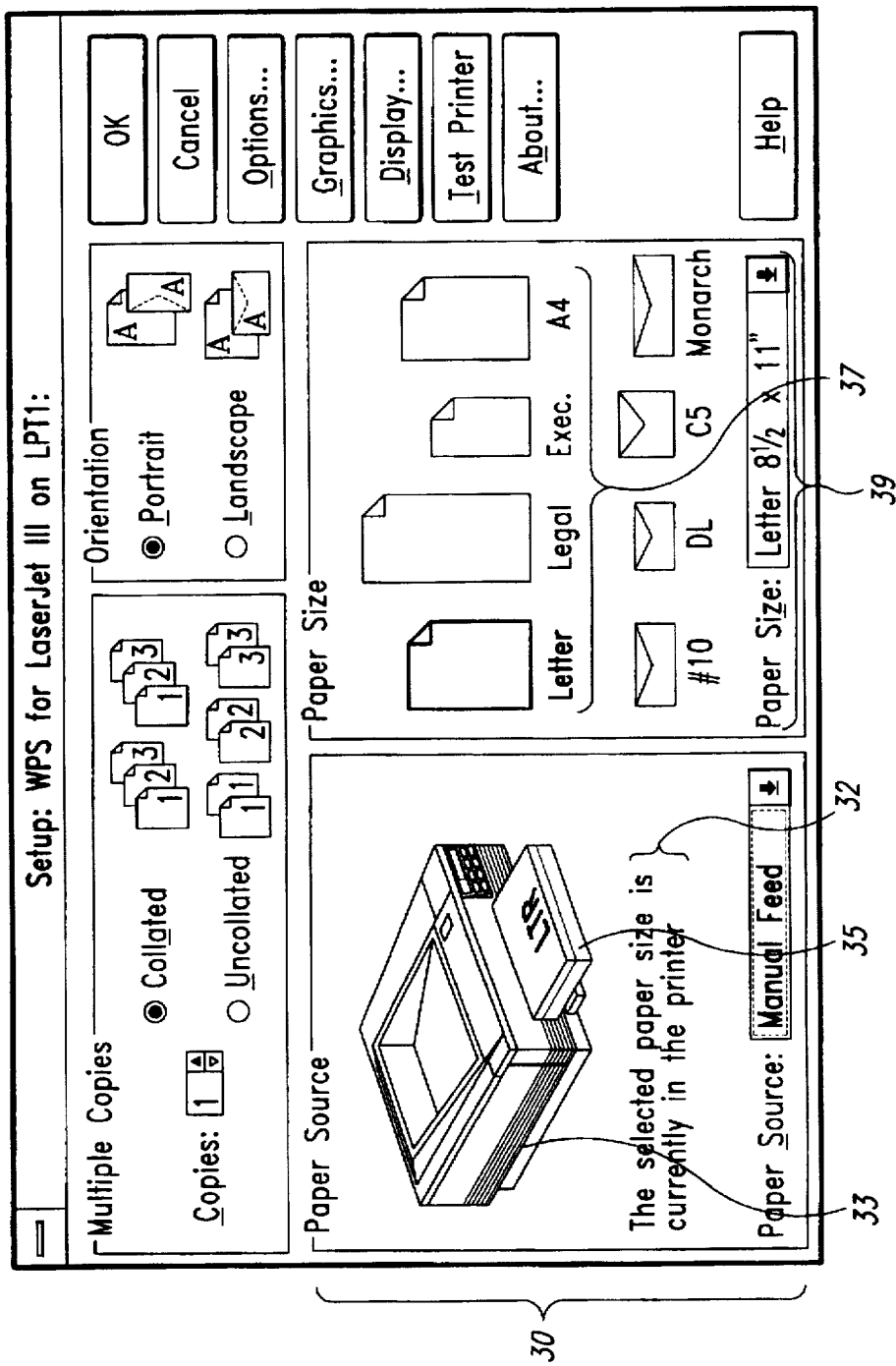
FIG. 3 illustrates a Printer Setup dialog box.

The Printer Setup dialog box configures the properties of the attached printer. Changes made in this dialog box affects the print job. FIG. 3 illustrates a preferred Printer Setup dialog box which appears on the screen of the visual display when the user chooses the appropriate command (such as "Printer Setup"). The current printer status is depicted within a portion (30) of the Printer Setup dialog box. In FIG. 3, the attached printer is depicted by a corresponding visual image of the printer (33) (also referred to herein as a printer "bitmap"), including a graphical representation of the paper source tray (35) currently in the printer. The user may select the paper size using either the paper size bitmaps (37), or the paper size combo box (39). The paper size bitmaps are selectable using the mouse pointer, and the combo box can selected with either the keyboard or mouse. The currently selected paper size is shown in the combo box and, if the selected paper size has an appropriate bitmap, that bitmap and the corresponding text are preferably emphasized. In the practice of the present invention, if the user selects or clicks the mouse anywhere in the paper source tray of the printer visual image (33), that tray is selected. For example, if the attached printer has two paper source trays, the graphical representation of the printer within the Printer Setup dialog box illustrates a printer having two paper trays, and selection of either tray with the pointer activates that the selected paper tray choice. Similarly, if the user clicks the mouse on the front of the visual image of the printer (33), manual feed is selected, and if the user clicks anywhere else on the visual image of the printer, "Any Source" is selected. In a preferred embodiment, when the user moves the cursor over the selectable printer bitmap, the standard arrow pointer changes to a pointer in the shape of a "hand-with-finger" pointer display. In short, the user may selectably control various printer setup options by appropriate selection with the portion (30) of the Printer Setup dialog box, thus permitting user control of printer functions by selection within the visual display of the printer image.

Additional features of the Printer Setup dialog box preferably include a textual portion (32) which notifies the user what selected paper size is currently in the printer. In other words, the printer status (in this case whether one or more paper source trays are loaded in the attached printer) is communicated to the user via the user interface, rather than the user physically inspecting the attached printer. In addition, the visual image of the printer (33) preferably changes according to the actual state of the printer in real time. For example, if the user removes the paper source tray from the printer while the Printer Setup dialog box is active, the visual display of the printer changes to reflect this new printer state (e.g., the printer bitmap displays a printer lacking a paper tray). Different visual displays of the printer may be displayed depending upon the attached printer. For example, available visual displays for a two tray printer may represent the following states: no tray (e.g., printer with all trays removed), tray 1 (e.g., printer with only the top tray), tray 2 (e.g., printer with only the bottom tray), both tray 1 and 2 (e.g., printer with both trays), manual feed (e.g., printer with paper being inserted) and not available (e.g., printer have a "grayed" appearance denoting the absence of an attached printer or absence of communication between the computer system and printer).

Figure 4:
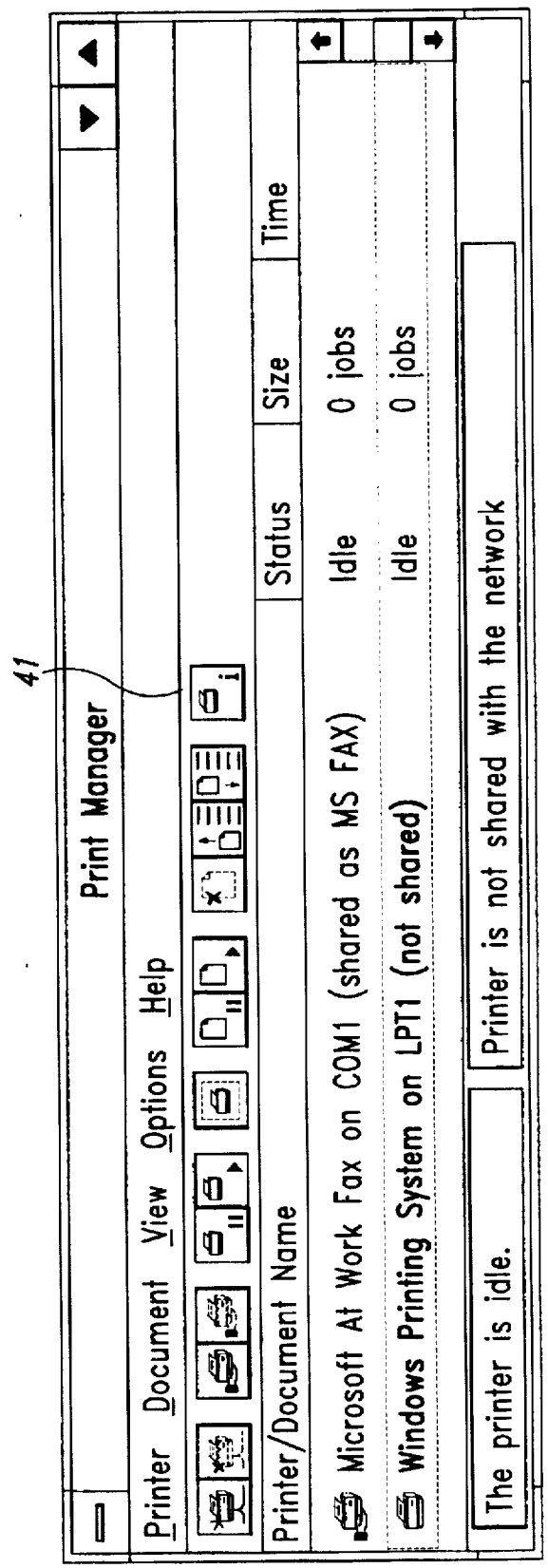
FIG. 4 illustrates a Print Manager dialog box.

In addition to the Printer Setup dialog box, the visual display of the present invention also displays a Print Manager dialog box to inform the user of the current status of an active printer and printing job. As illustrated in FIG. 4, a preferred embodiment of the Print Manager dialog box is depicted. The Print Manager dialog box contains a button (41), as well as an menu option command to this effect listed under the View command of the Print Manager menu bar, which activates the Printer Status window. The Printer Status window is available when there is bi-directional I/O between the computer system and printer. The Printer Status window appears on the visual display of the computer system when selected by the user as indicated above, or when the user has selected the Automatically Display Printer Status option and the user prints a document, an error occurs, or when user action is required. The Printer Status window preferably disappears (i.e., is not displayed on the visual display) when the user explicitly closes the window, when the print job ends if the user has selected the Automatically Display Printer Status option and the print job ends (and the user has not interacted with the window), the error state ends, or the manual action is performed by the user. The Printer Status window preferably appears as an icon when the user explicitly minimizes the window, the user starts the Printer Status window and the last state of the window was iconized, or the window appears because of the Automatically Display Printer Status option and the last position the user moved the window to was an icon. In addition, the Printer Status window preferably appears full-sized when the user explicitly restores the window, the user selects the Printer Status window and the last position the user placed the window was full size, an error occurs, or manual action is required.

As used herein, the term "printing" means that a printing job is being sent to the printer by the computer system, and there are no errors which prevent the job from completing. In the practice of the present invention, sub-states exist during printing which, when they occur, are displayed to the user by the visual display, but printing continues (i.e., these sub-states do not stop printing, and are referred to herein as User Intervention Not Required states). These sub-states are displayed with the following precedence (from most important to least important): Printer Memory Low, Printer Changed, Low Toner and Normal. For example, if the printer's memory is low and the toner is also low, the Printer Memory Low state is displayed. If one of these sub-states is entered when the Printer Status window is iconized, the icon preferably begins blinking. The icon stops blinking when the window is opened or the job completes. If a Printer Status window other than Normal is displayed, the user can click the window with the mouse or press the Enter key to display the Normal Printer Status window.

Figure 5:
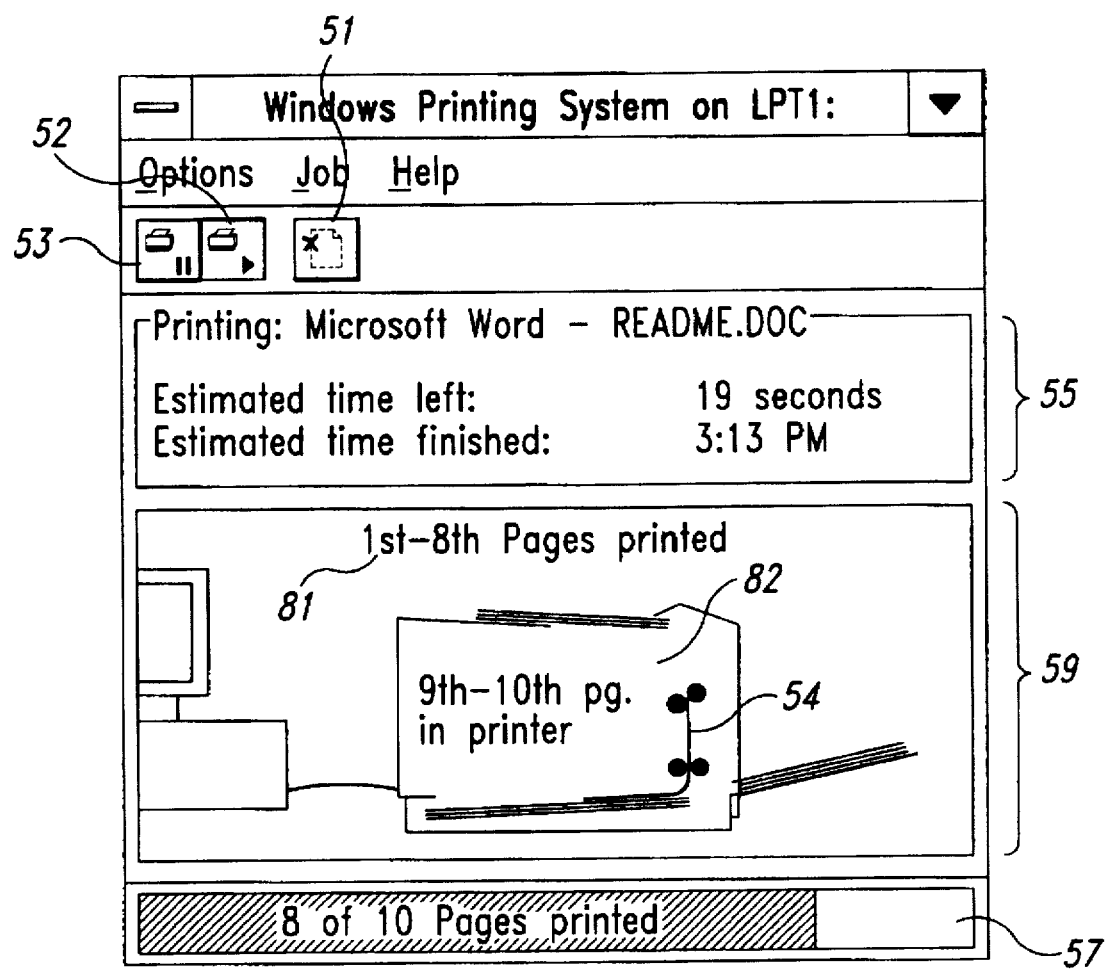
FIG. 5 illustrates a Printer Status window for the Normal printer state.
Figure 6:
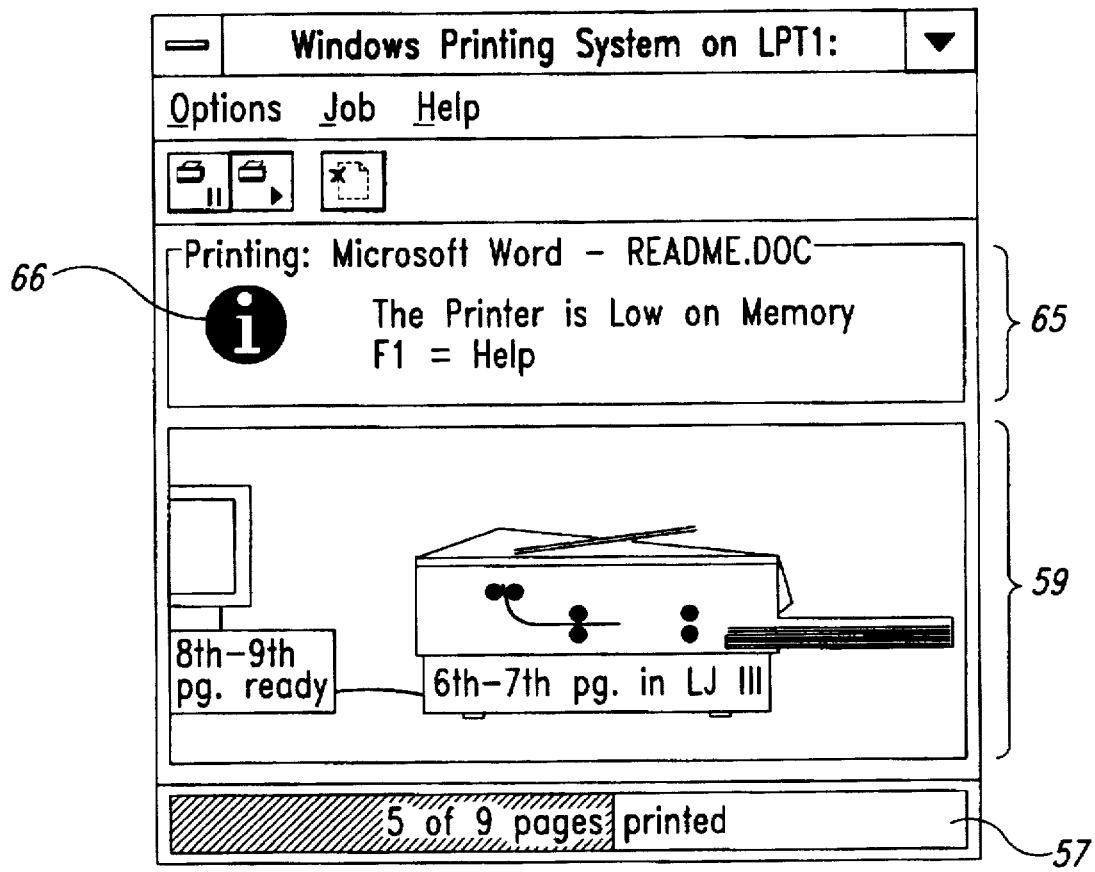
FIG. 6 illustrates a Printer Status window for the Low Memory printer state.

The visual display of the Printer Status window for the Normal printing state is illustrated in FIG. 5, and is displayed when printing is proceeding normally and none of the other printing sub-states apply. The Normal Printer Status window preferably displays a delete button (51), pause button (52) and a resume button (53). In addition, printing information may be displayed in the Job Information Group Box (55), and a Status Bar (57) illustrates job completion. This window also displays a visual image of the printer (59). If printing sub-states apply such as Low Toner, Low Memory, or Printer Changed, this information is displayed within the Job Information Group Box. For example, if the attached printer is low on memory (i.e., the print job requires additional memory to print without degradation), the Printer Status window illustrated in FIG. 6 is displayed, with the appropriate information text displayed in the Job Information Group Box (65), as well as an information icon (66). Similar Printer Status windows are displayed for the Toner Low and Printer Changed states.

As printing progresses, the status bar (57) of FIGS. 5 and 6 indicates the percentage of pages that have been printed for the printing job. The status bar initially is empty and is entirely filled when the last page of the job exits the attached printer. In addition, the visual image of the printer (59) of FIG. 5 and 6 is preferably animated to depict the progression of printing. For example, referring to FIG. 5, the sheet of paper within the printer is depicted as a cross-sectional view of a piece of paper (54). During printing, this piece of paper is shown to move through the printer from the paper tray source to the top of the printer for removal as a printed sheet. The Printer Status window may also display the number of printed pages (81), the pages being printed (82), and the pages ready to be sent to the printer (not shown) by the computer system.

In contrast to printer states discussed above which do not require user intervention, a User Intervention Required state necessitates user intervention. This state includes, but is not limited to, the following sub-states: Cover Open, Paper Out, Wrong Paper Loaded, Paper Jam (several types), Manual Feed, Manual Duplex, Communications Error and Engine Error. When user intervention is required, the User Intervention state is entered, and the user must perform some task to continue the printing job. As noted above, these states are typically printing errors, but may also include prompting for insertion of a page when manually duplexing.

When the User Intervention Required state is entered because of an error, an appropriate Printer Status window is display, the queue is paused, and the Pause and Resume buttons on the toolbar of the Printer Status window are disabled (the user should, however, be permitted to cancel the job at this time using the Stop button). When the error is fixed, the Printer Status window corresponding to the specific User Intervention Required state is replaced with an appropriate Printer Status window for a User Intervention Not Required state. No user interaction other than fixing the error is required to terminated this dialog except the manual operation(s). When the user Intervention Required state is entered due to manual operation (e.g., manual duplexing or manual feeding), the queue is paused and the Pause button is disabled. The user can cancel the job using the Stop button, or indicate that action has been taken by clicking on the Resume button or pressing the enter key. When the user continues the printing job, the appropriate Printer Status window for the User Intervention Not Required state is displayed.

Figure 7:
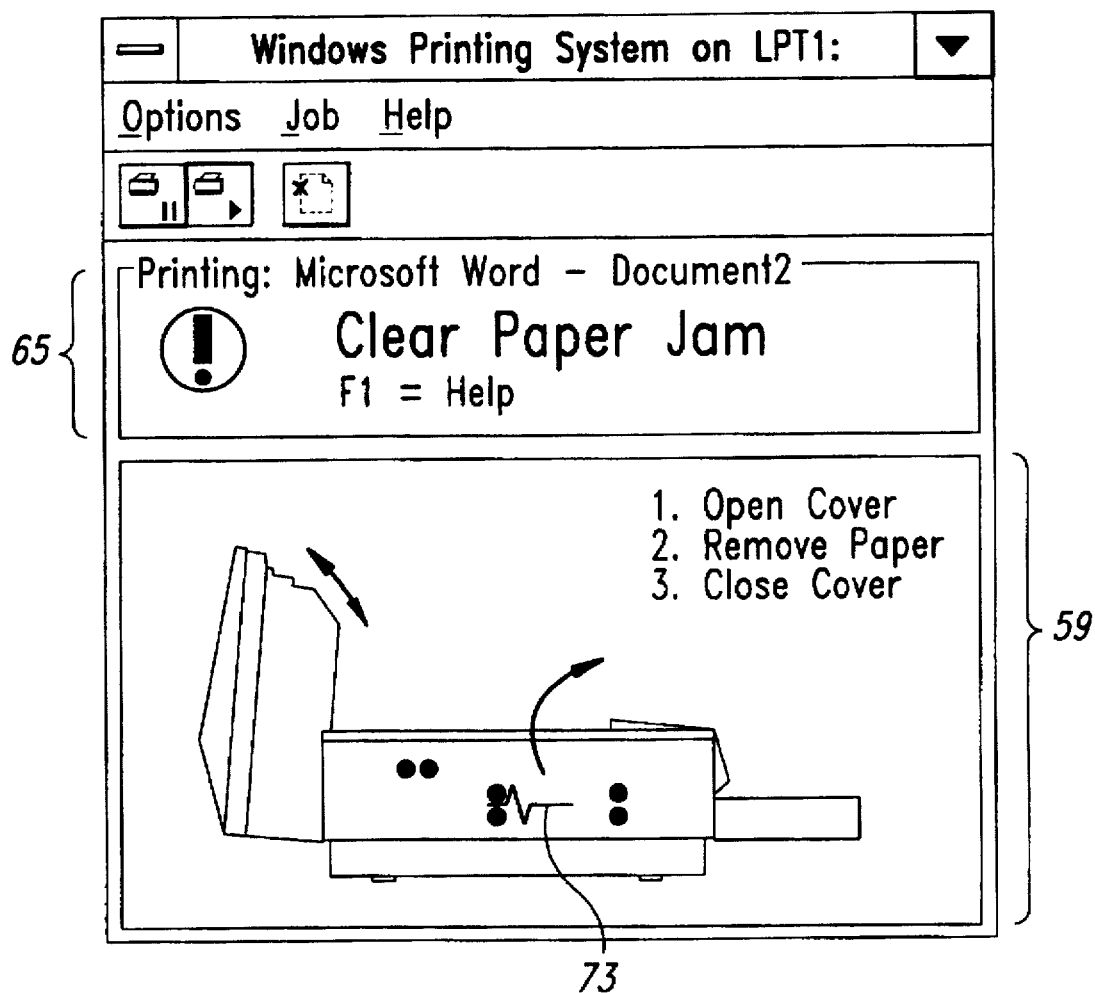
FIG. 7 illustrates a Printer Status window for a Paper Jam printer state.

For example, if there has been a paper jam in the attached printer, the Printer Status window of FIG. 7 is displayed. An error icon/message is displayed in the Job Information Group Box (65), as well as an appropriate visual image of the printer (59) indicating the nature of the error. The location of the paper jam (73) is indicated (preferably in red) within the bitmap of the attached printer which is displayed within the appropriate Printer Status window (in this case, the Paper Jam Printer Status window), and the solution to the error (74) (i.e., opening the printer cover, removing the jammed paper, and closing the cover) is indicated (preferably in green).

Alternatively, the Pause/Resume buttons may function as a toggle—that is, if the printer is not paused, the Pause button is up and the Resume button is down. The pause/resume state of the printer may be changed by the Print Manager's Pause/Resume buttons and menu items, the Printer Status window's Pause/Resume buttons and menu items, and the printer's front panel Online and Continue buttons. The pause/resume state is normally as last set by the user, and can be changed by the user at any time. If the printer goes into a state where the only possible user response is to resume printing, the system will automatically change to the paused state. Manual duplexing and manual feeding are examples where the user must tell the system to resume printing by the Resume button. In addition, there are cases where resuming printing is only one of the possible responses. For example, if the printer is currently loaded with legal paper, but the document being printed requires letter paper, the system will go into the paused state to allow the user to react. The user has two choices: the user may put letter paper into the printer, in which case the printer will automatically go back into the resumed state and continue printing; or the user may press the Resume button to tell the system that it should go ahead and print the document on the currently loaded paper (called "coercing" the paper size). Another example is when a print job was created specifying the upper tray of the printer which has since gone empty. The user may fill the upper tray or press Resume to coerce the Tray Search Range to allow the printer to print from the lower tray.

Figure 8A:
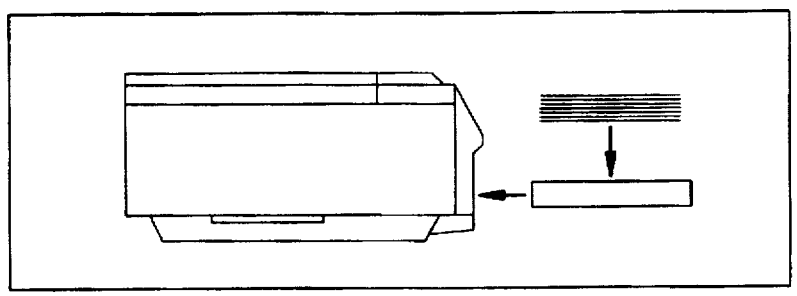
FIG. 8 illustrates bitmaps displayed within the Printer Status window for certain printer states.
Figure 8B:
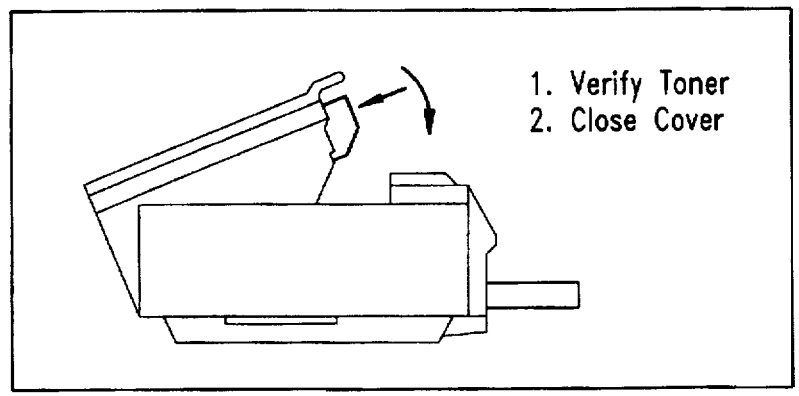
Figure 8C:
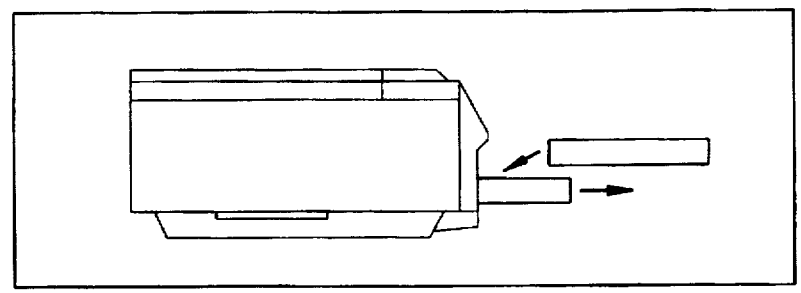
Figure 8D:
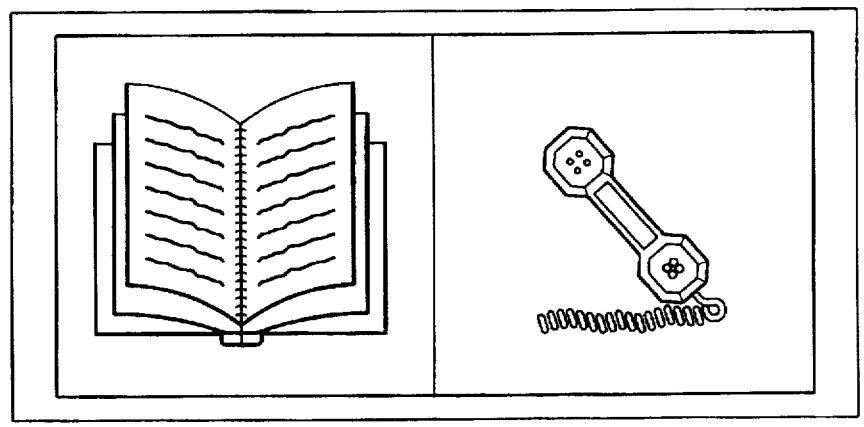
Figure 8E:
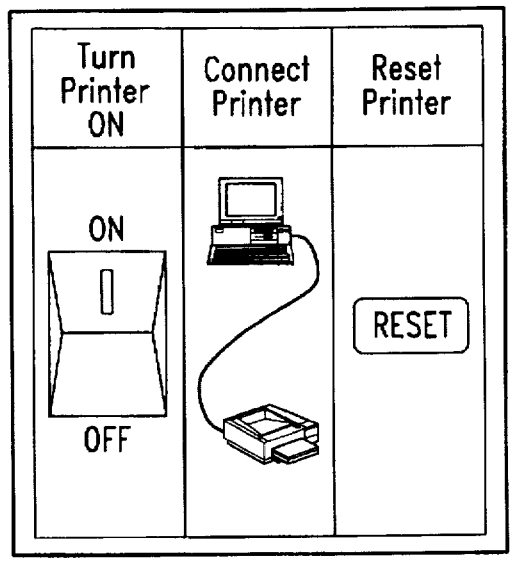

The various User Intervention Required sub-states are indicated to the user by displaying a different status picture and error/icon message within the Printer Status window for each of the sub-states. For example, if the printer is out of paper, the Paper Out Printer Status window depicts the visual image of the printer as illustrated in FIG. 8(a). Similarly, the Cover Open and Wrong Paper Loaded sub-states may be indicated to the user by displaying the bitmaps illustrated in FIGS. 8(b) and (c), respectively. If an Engine Error state is encountered, the visual display of the printer may be replaced with FIG. 8(d) to indicate the necessary action require by the user (e.g., consult the printer manual and/or call for printer service). Alternatively, if data cannot be sent to the attached printer due to a communication error, the Printer Status window may display the visual display of FIG. 8(e), which graphically represents the suggested corrective action.

Figure 9A:
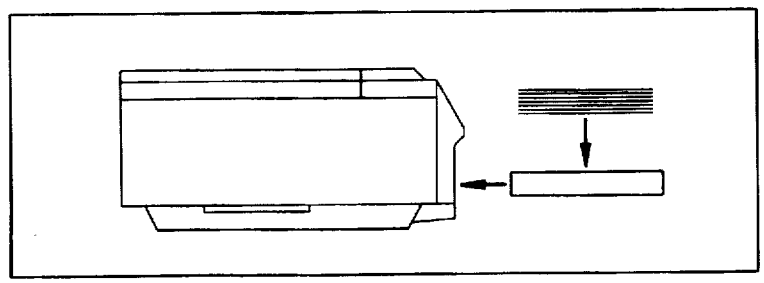
FIG. 9 illustrates bitmaps displayed within the Printer Status window for an HP LaserJet Series II printer.
Figure 9A:
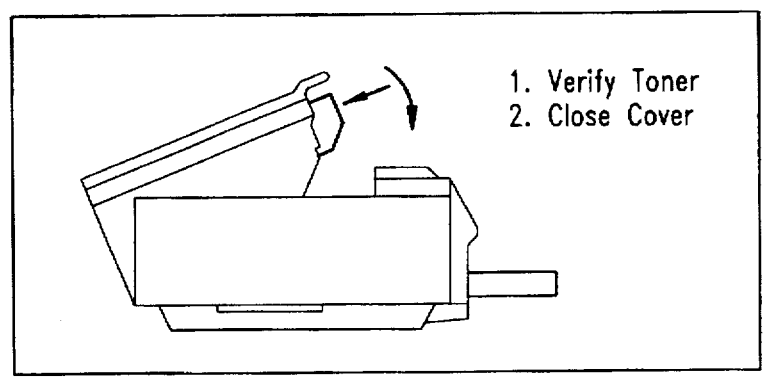
Figure 9A:
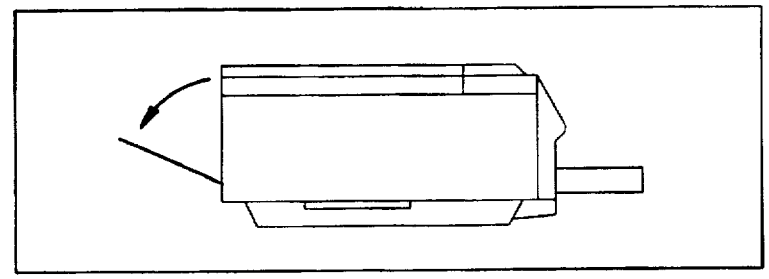
Figure 9A:
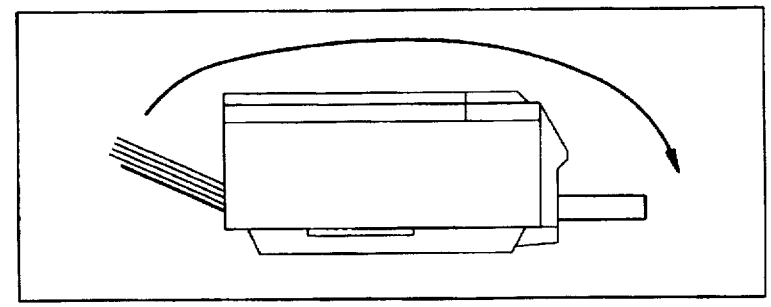
Figure 9B:
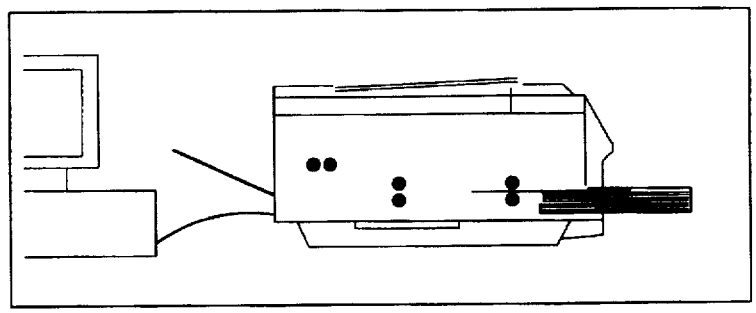
Figure 9B:
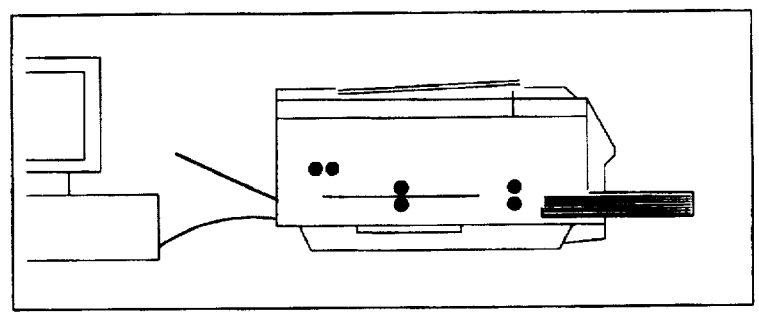
Figure 9B:
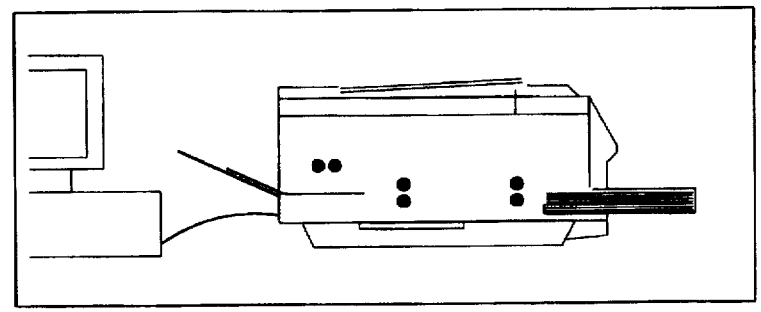
Figure 9B:
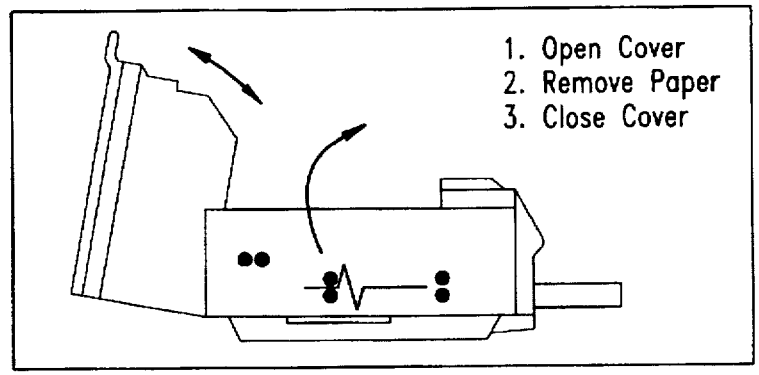
Figure 9C:
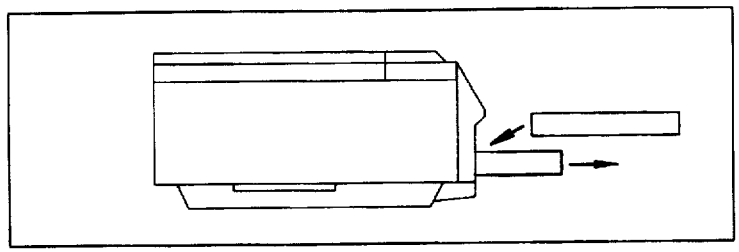
Figure 9C:
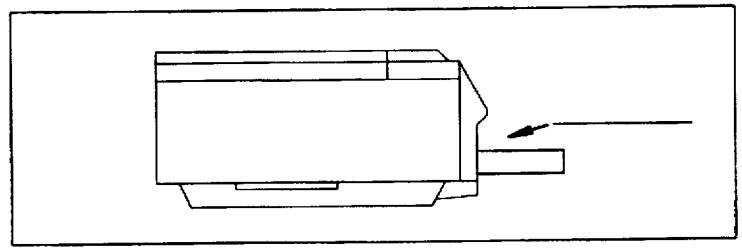
Figure 9C:
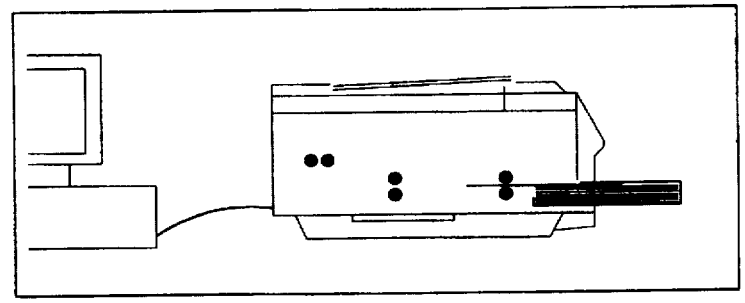
Figure 9C:
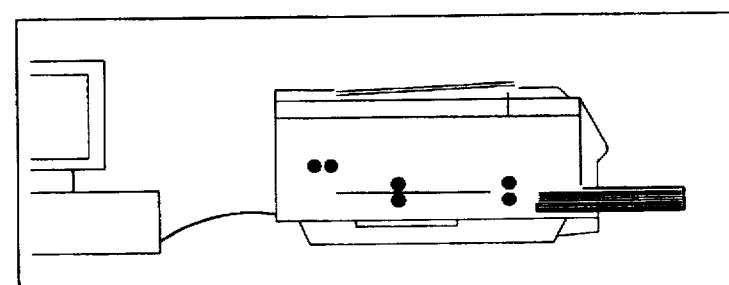
Figure 9C:
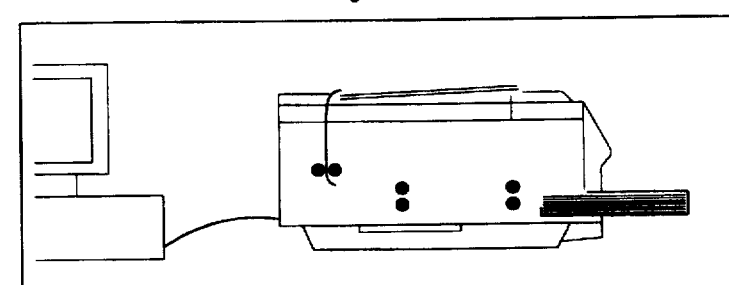
Figure 10A:
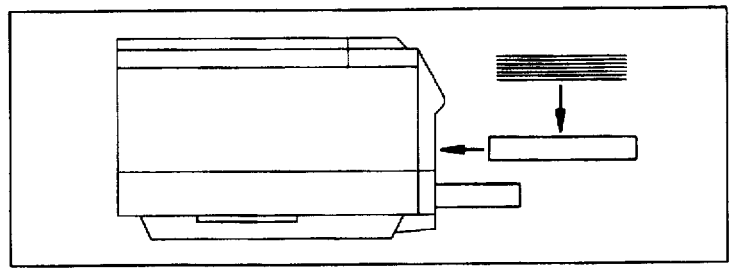
FIG. 10 illustrates bitmaps displayed within the Printer Status window for an HP LaserJet Series IID printer.
Figure 10A:
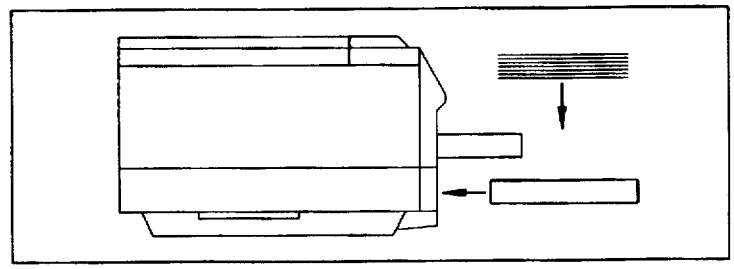
Figure 10A:
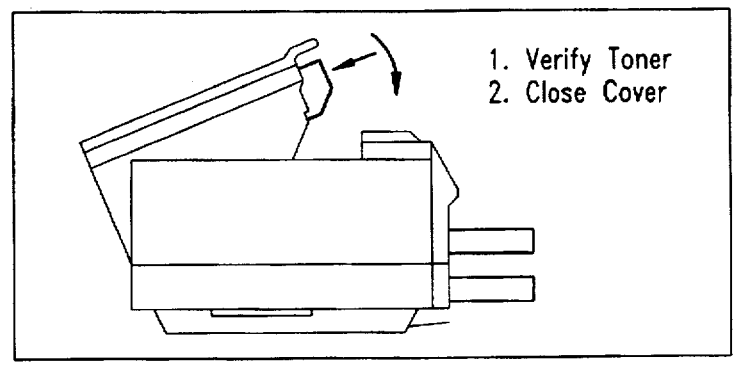
Figure 10A:
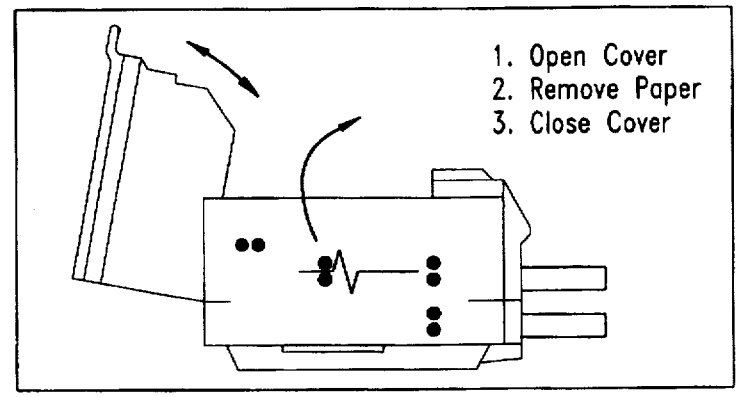
Figure 10B:
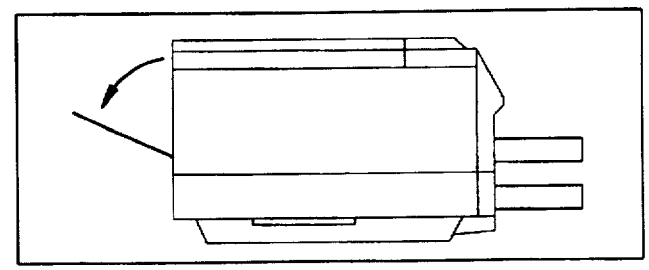
Figure 10B:
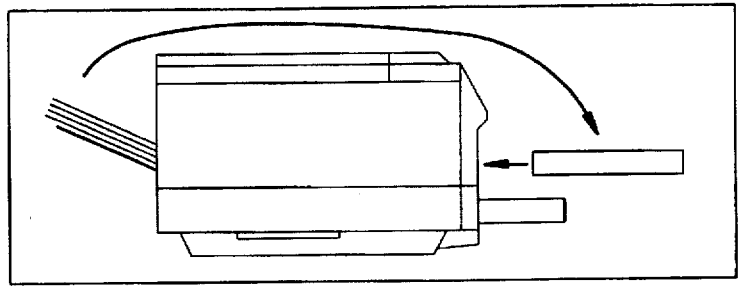
Figure 10B:
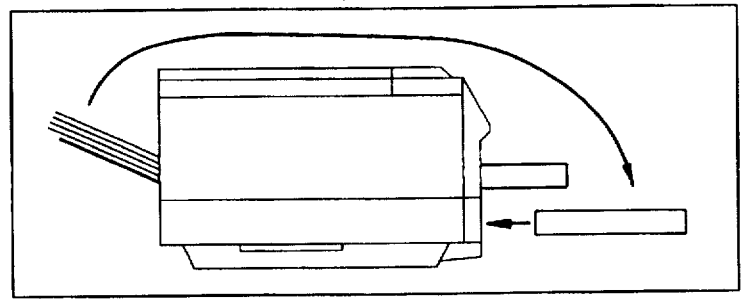
Figure 10B:
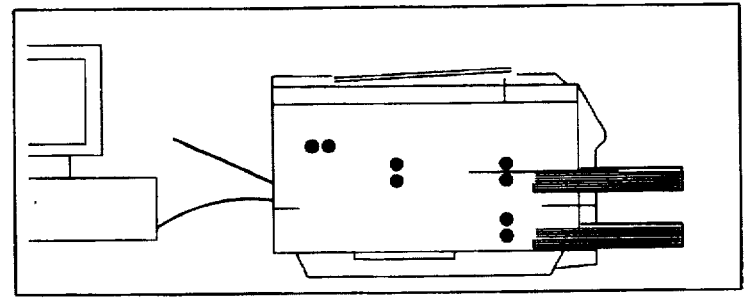
Figure 10B:
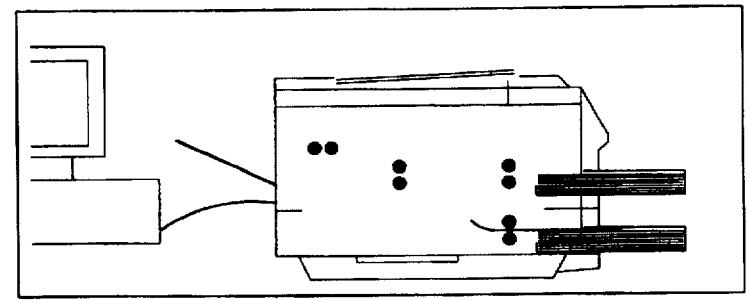
Figure 10C:
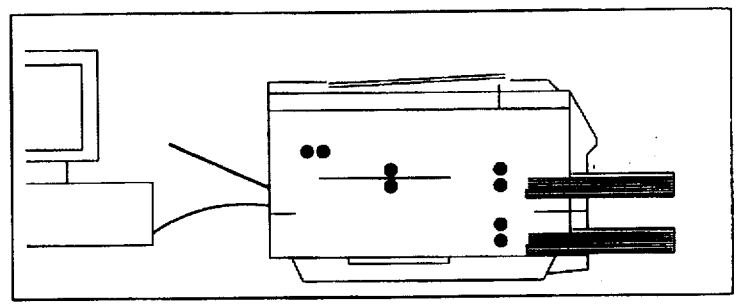
Figure 10C:
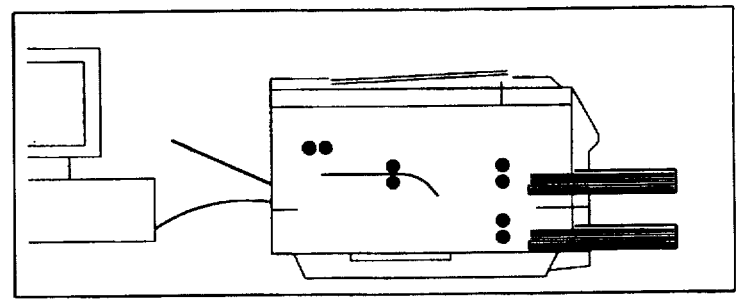
Figure 10C:
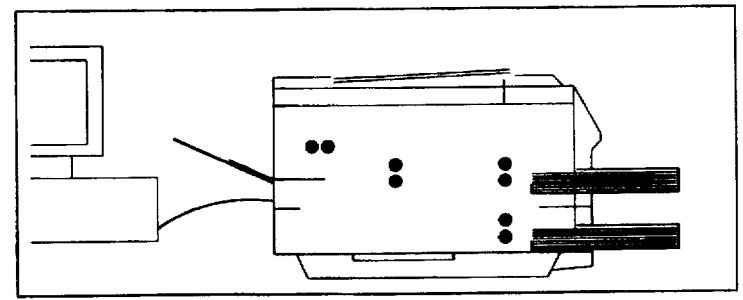
Figure 10C:
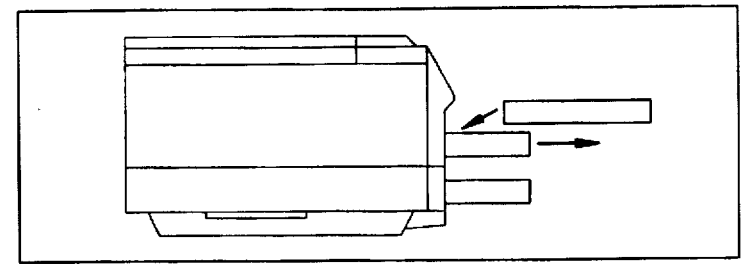
Figure 10C:
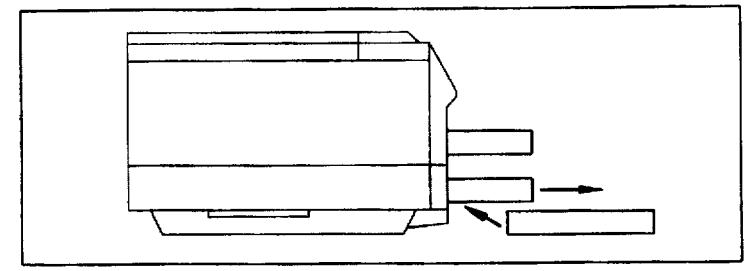
Figure 10D:
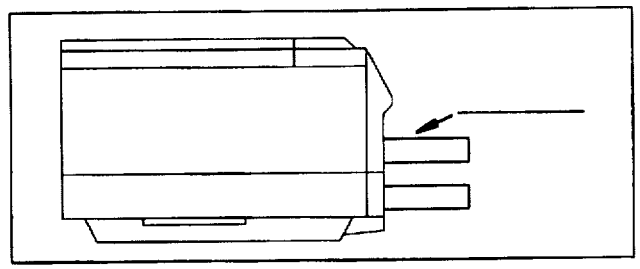
Figure 10D:
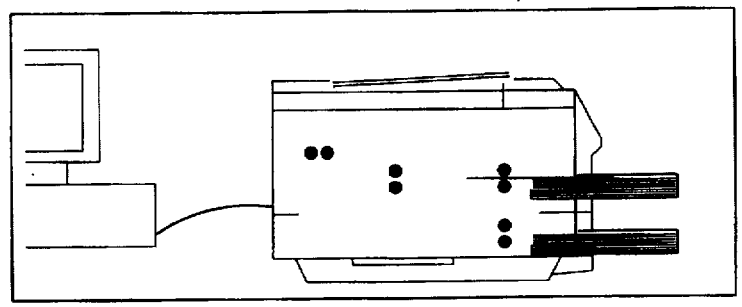
Figure 10D:
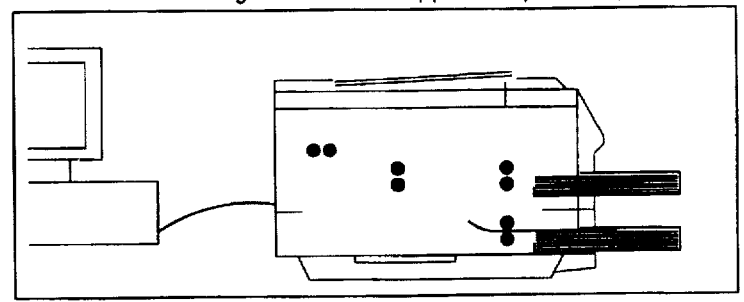
Figure 10D:
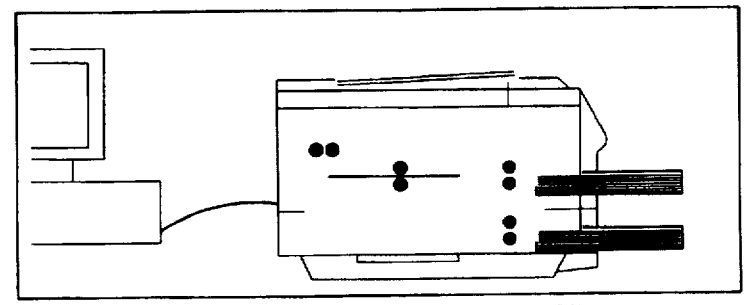
Figure 10D:
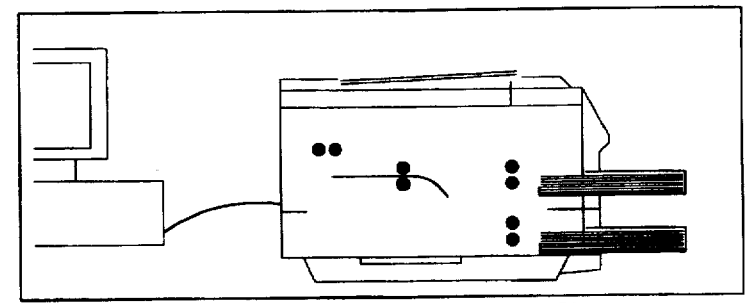
Figure 10E:
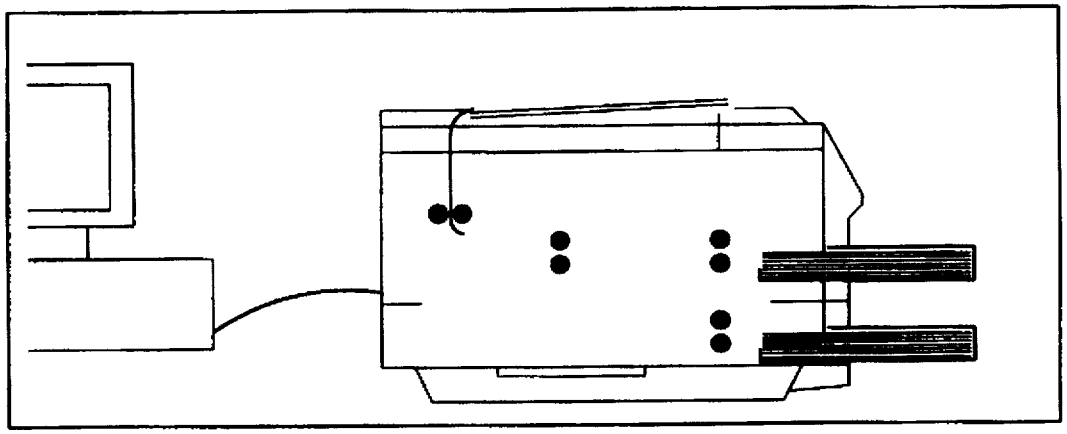
Figure 11A:
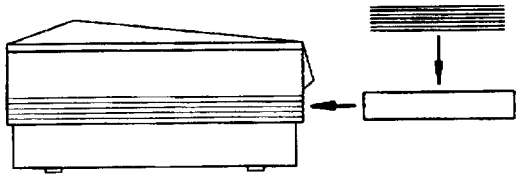
FIG. 11 illustrates bitmaps displayed within the Printer Status window for an HP LaserJet Series III printer.
Figure 11A:
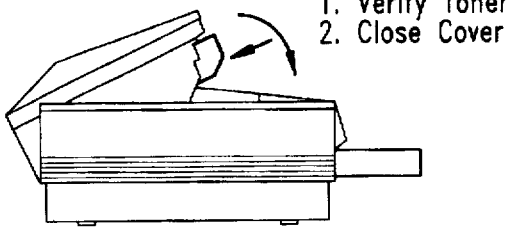
Figure 11A:
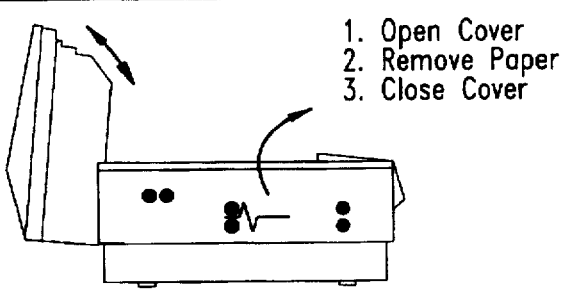
Figure 11A:
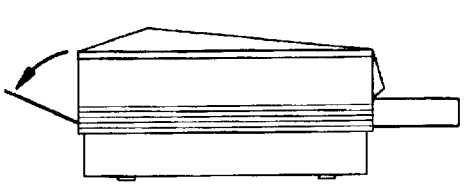
Figure 11B:
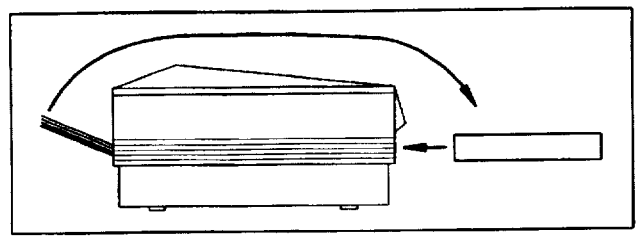
Figure 11B:
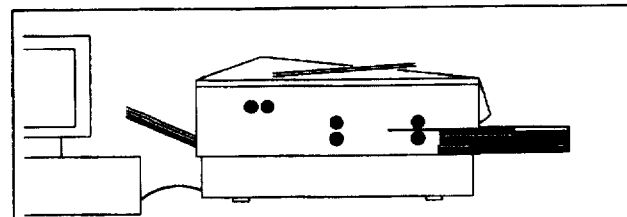
Figure 11B:
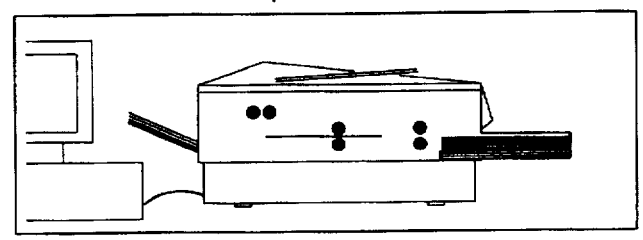
Figure 11B:
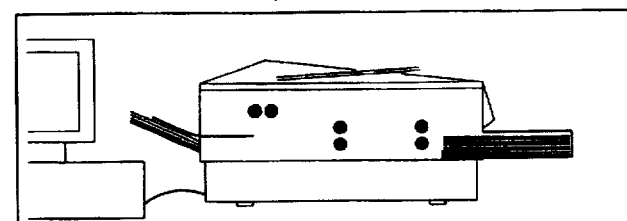
Figure 11B:
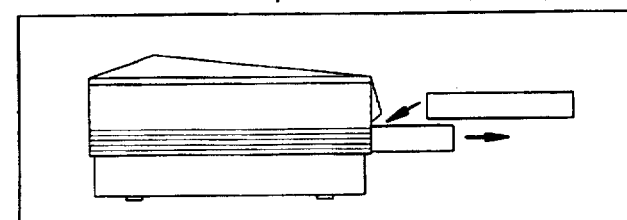
Figure 11B:
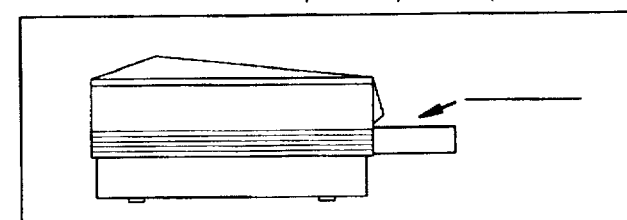
Figure 11C:
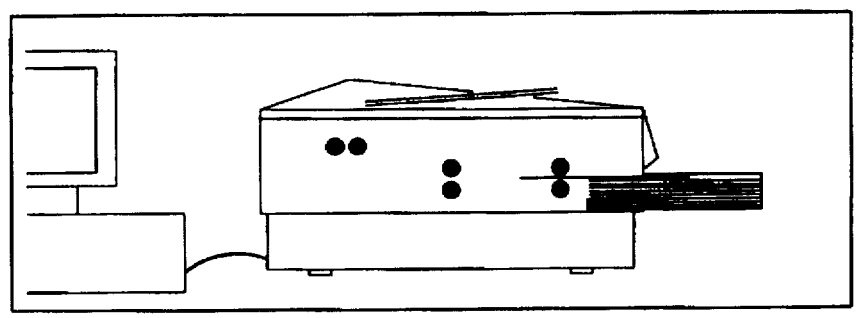
Figure 11C:
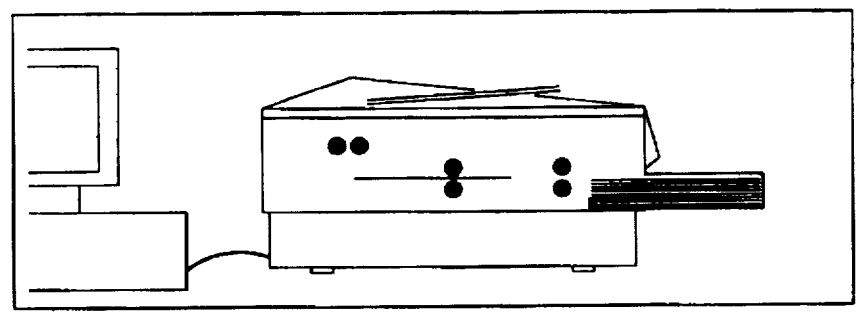
Figure 11C:
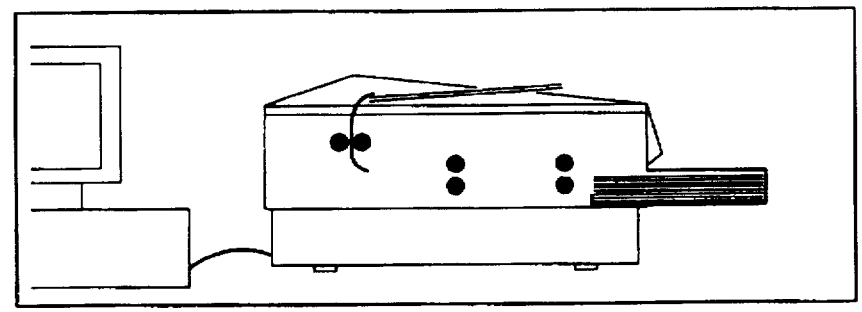
Figure 12A:
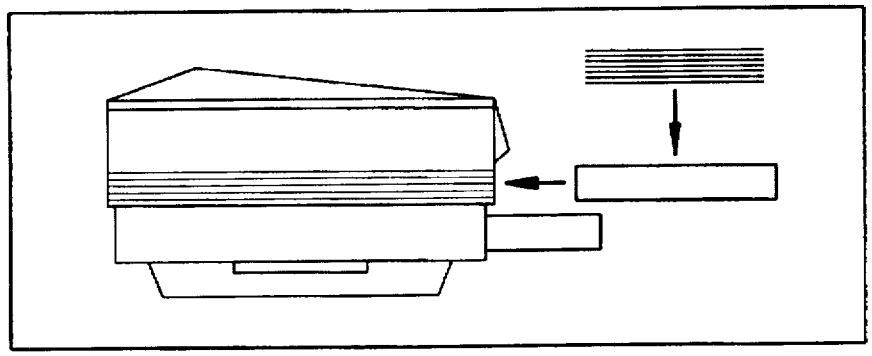
FIG. 12 illustrates bitmaps displayed within the Printer Status window for an HP LaserJet Series IIID printer.
Figure 12A:
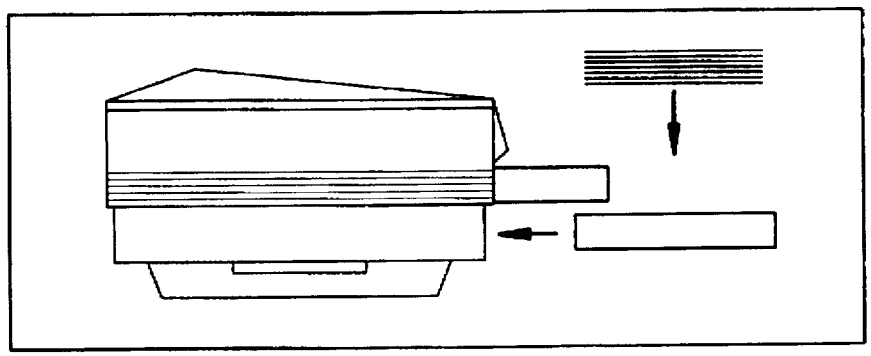
Figure 12B:
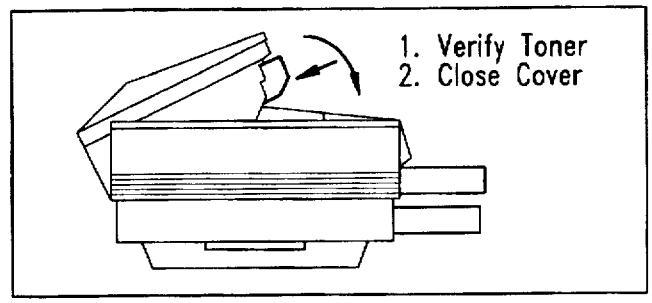
Figure 12B:
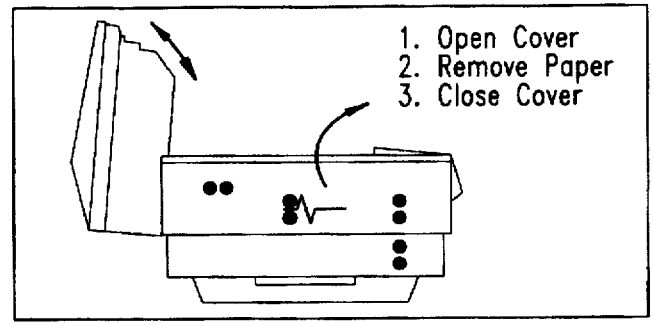
Figure 12B:
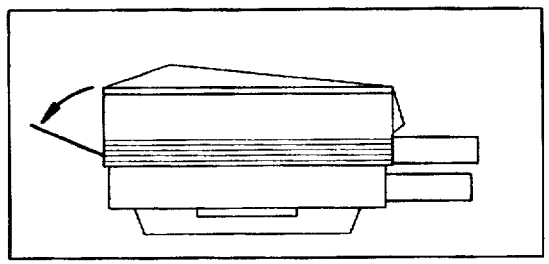
Figure 12B:
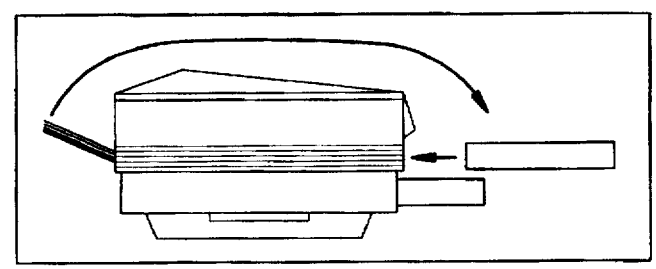
Figure 12B:
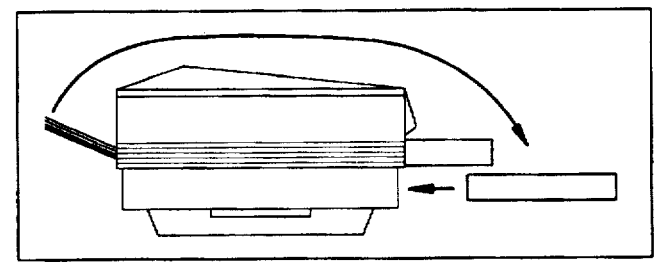
Figure 12C:
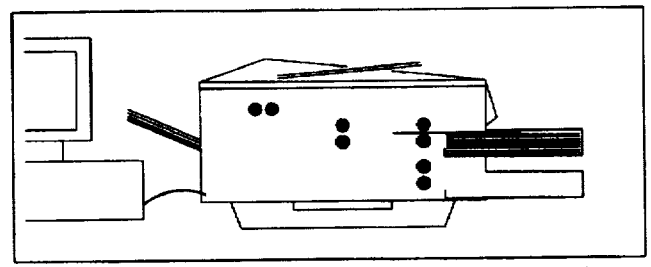
Figure 12C:
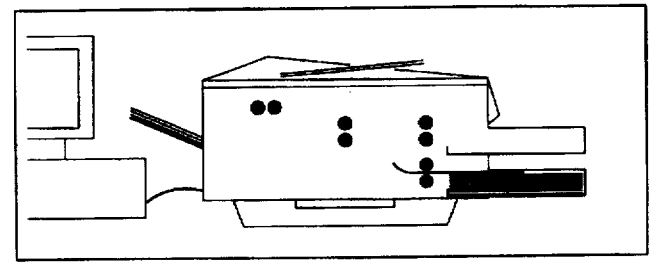
Figure 12C:
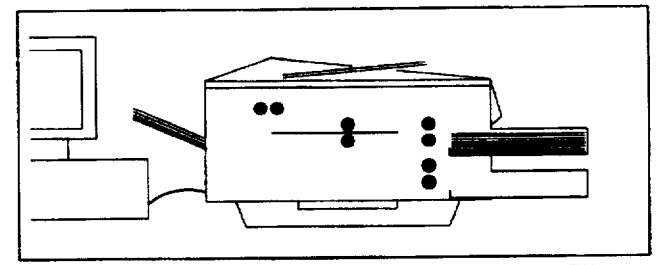
Figure 12C:
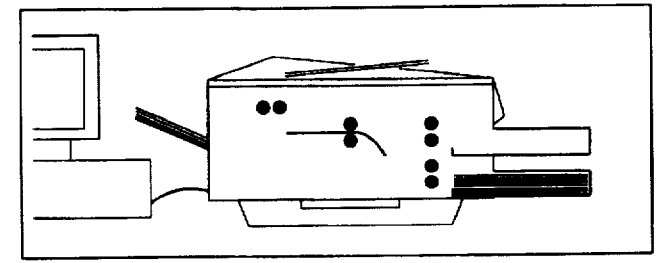
Figure 12C:
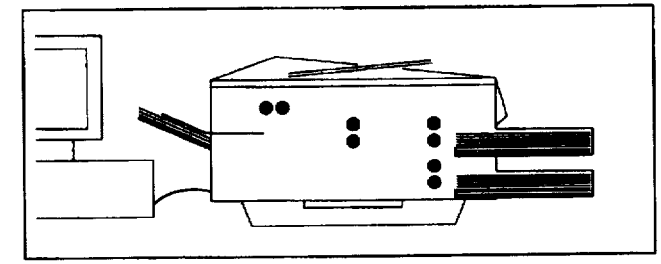
Figure 12D:
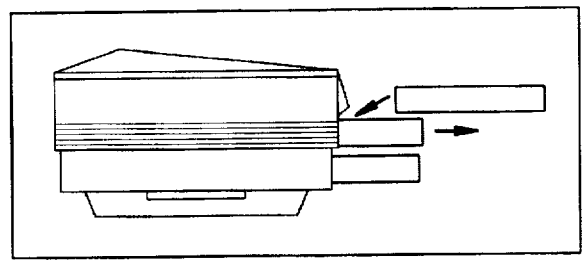
Figure 12D:
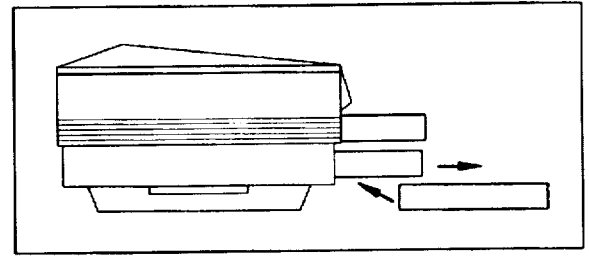
Figure 12D:
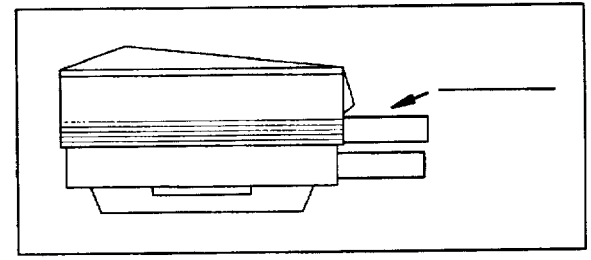
Figure 12D:
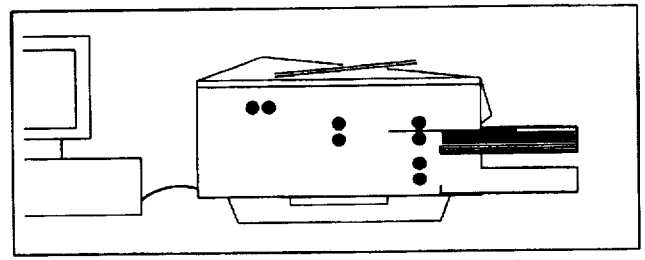
Figure 12D:
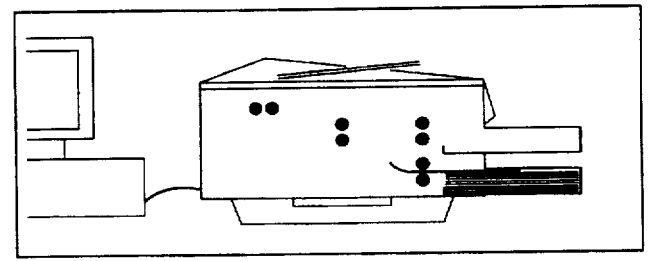
Figure 12E:
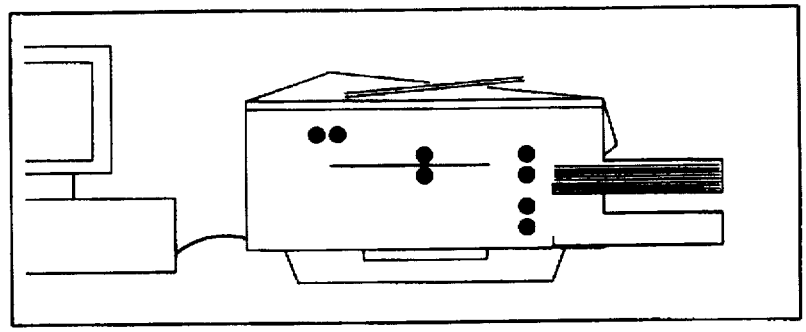
Figure 12E:
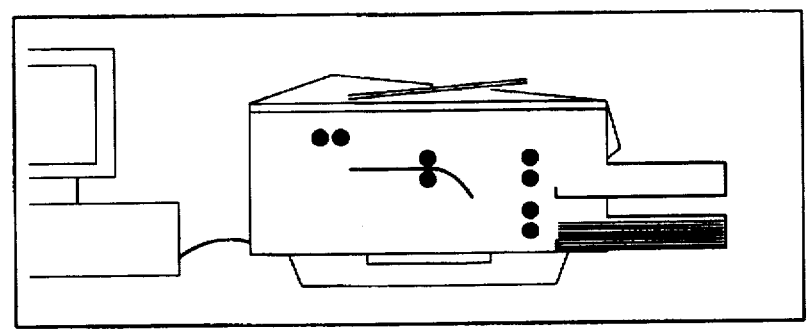
Figure 12E:
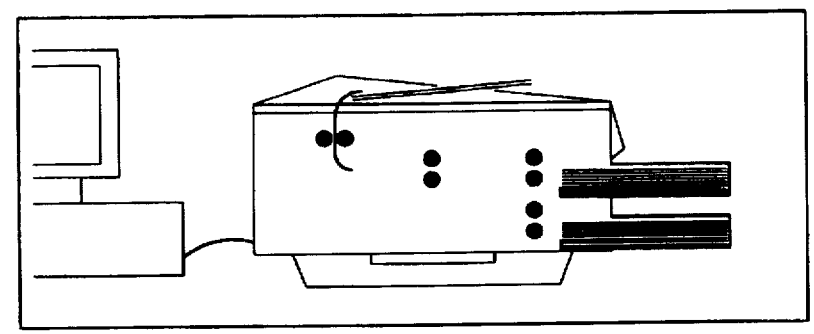
Figure 13A:
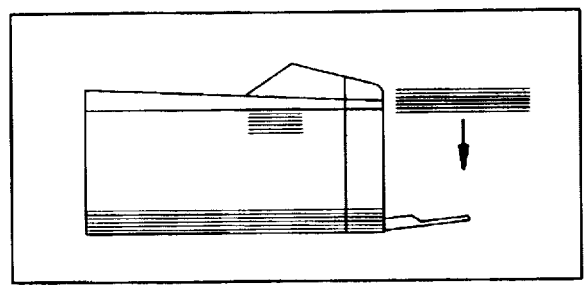
FIG. 13 illustrates bitmaps displayed within the Printer Status window for an HP LaserJet Series IIP, IIP+ and IIP without LC tray printers.
Figure 13A:
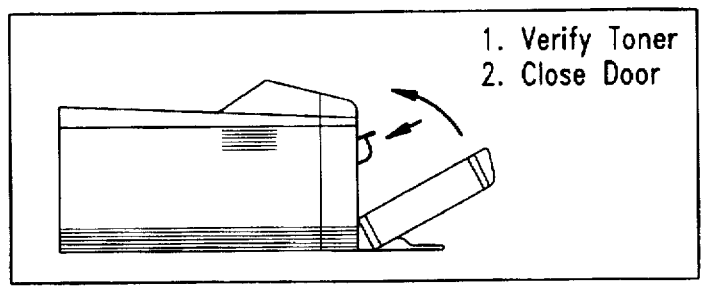
Figure 13A:
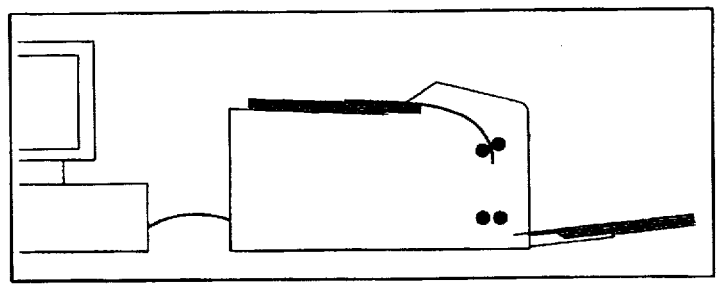
Figure 13A:
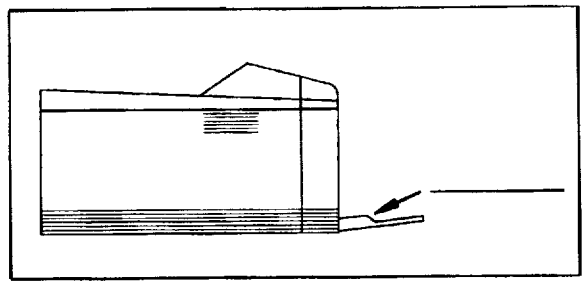
Figure 13B:
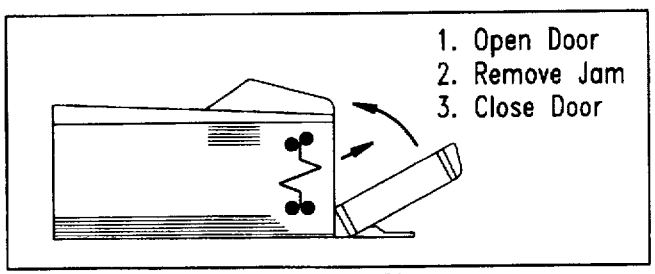
Figure 13B:
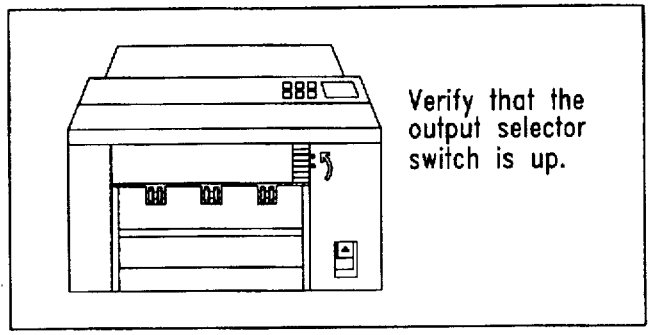
Figure 13B:
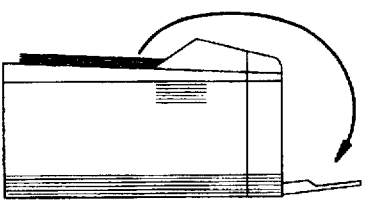
Figure 13B:
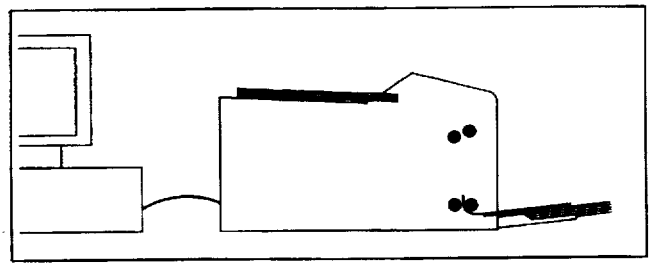
Figure 13B:
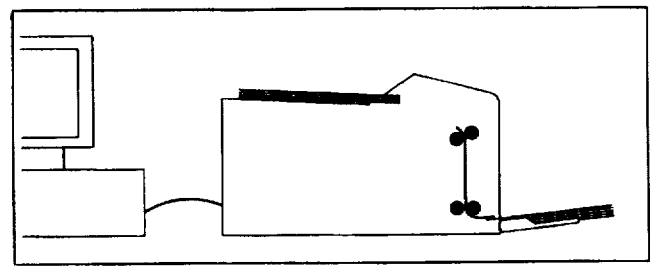
Figure 14A:
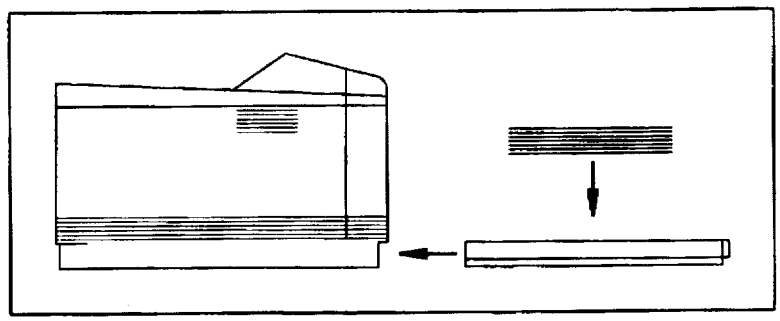
FIG. 14 illustrates bitmaps displayed within the Printer Status window for HP LaserJet Series IIP, IIP+ and IIP with LC tray printers.
Figure 14A:
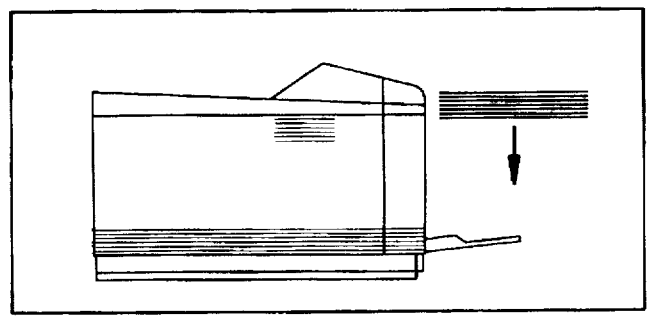
Figure 14A:
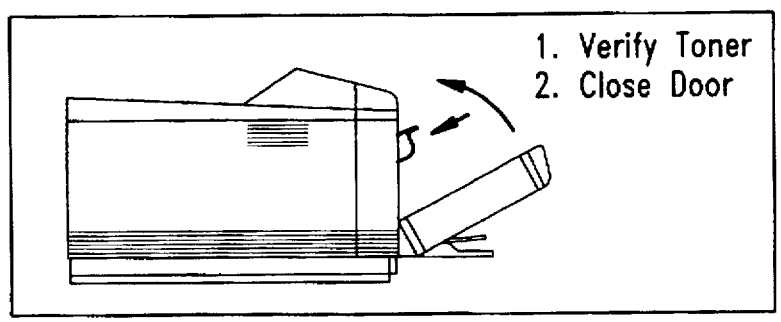
Figure 14B:
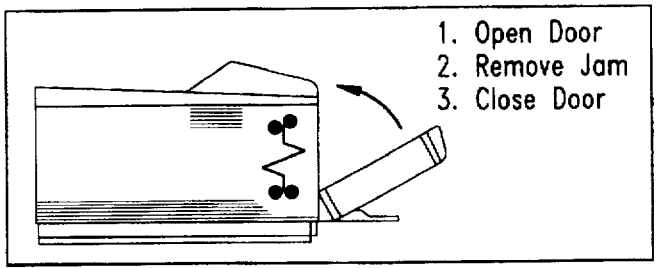
Figure 14B:
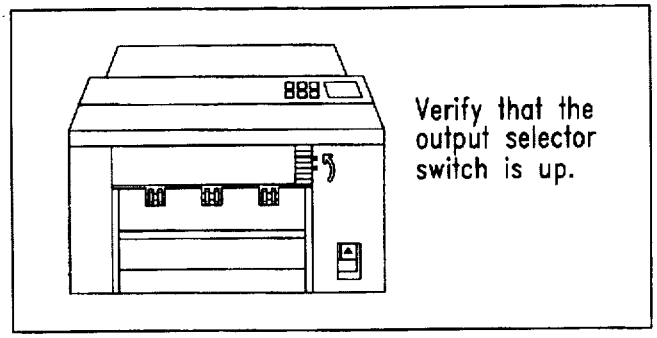
Figure 14B:
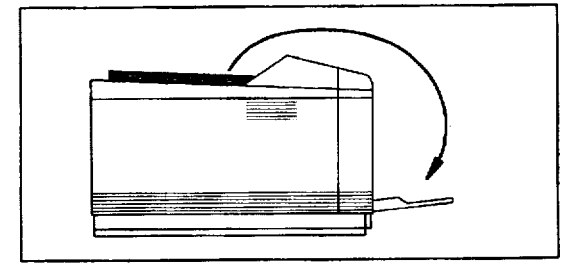
Figure 14B:
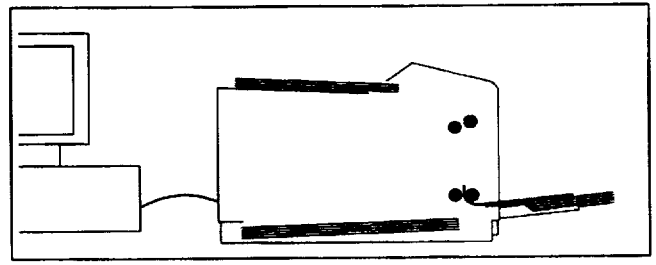
Figure 14B:
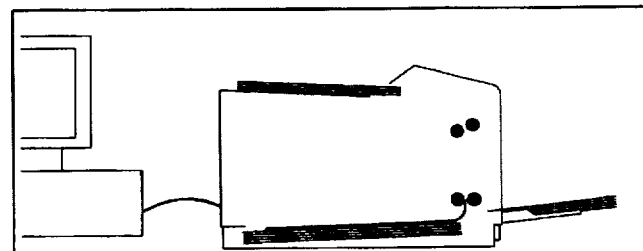
Figure 14C:
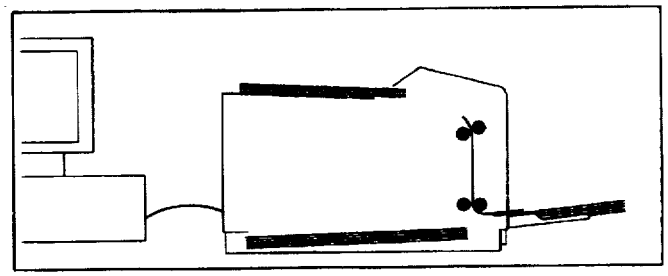
Figure 14C:
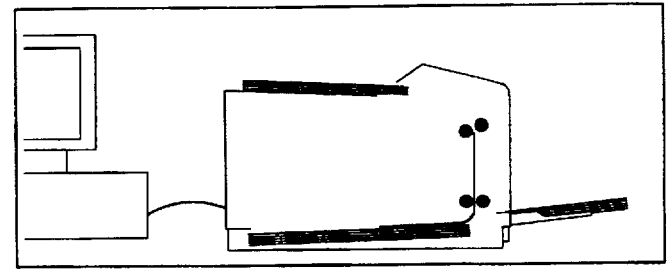
Figure 14C:
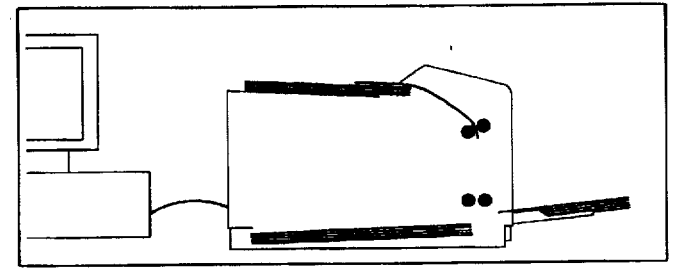
Figure 14C:
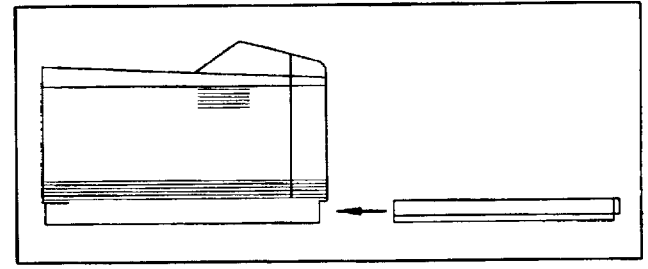
Figure 14C:
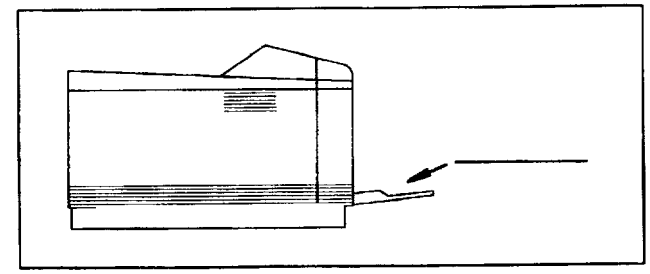
Figure 15A:
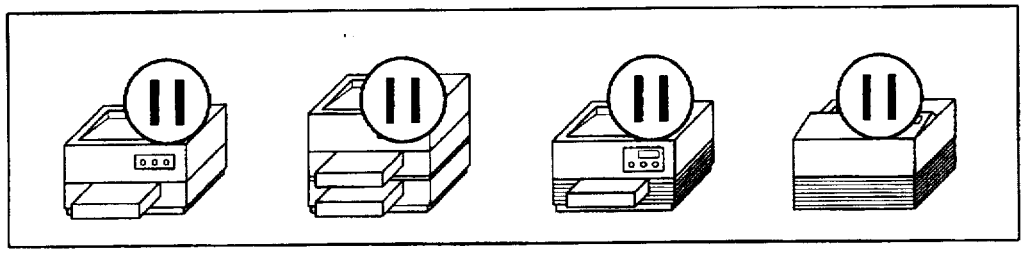
FIG. 15 illustrates icons of the Printer Status window.
Figure 15B:
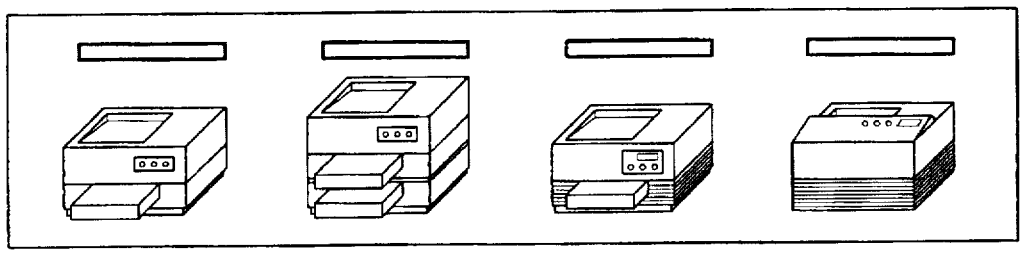
Figure 15C:
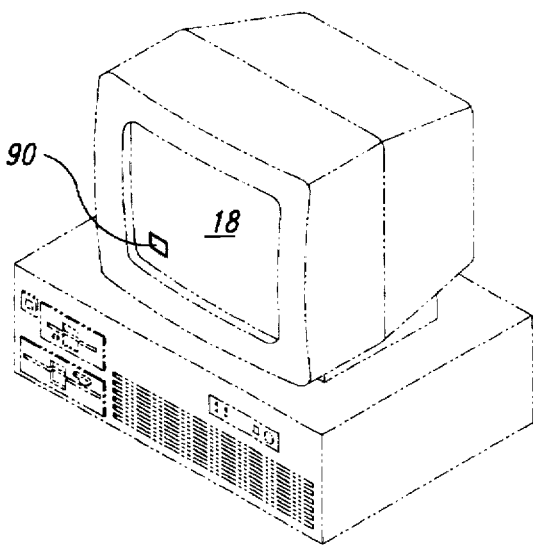
Figure 15D:
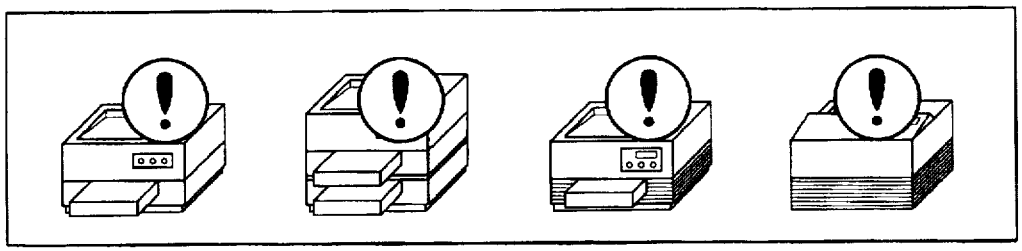
Figure 15E:
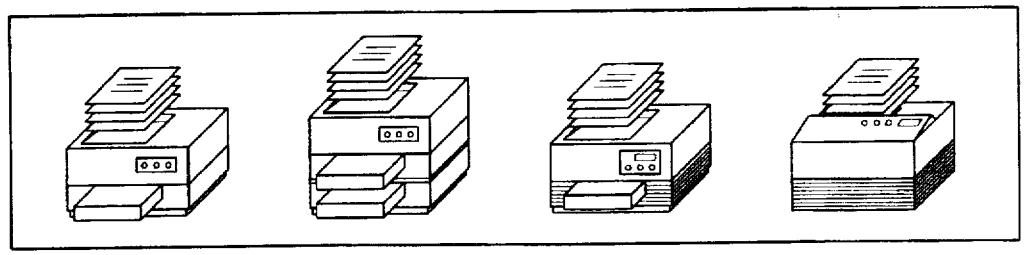
Figure 15F:
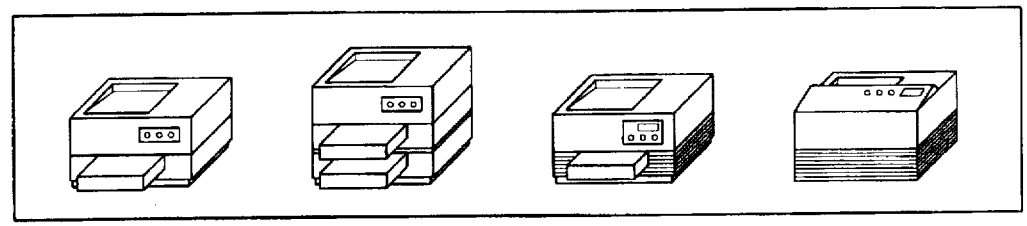
Figure 15G:
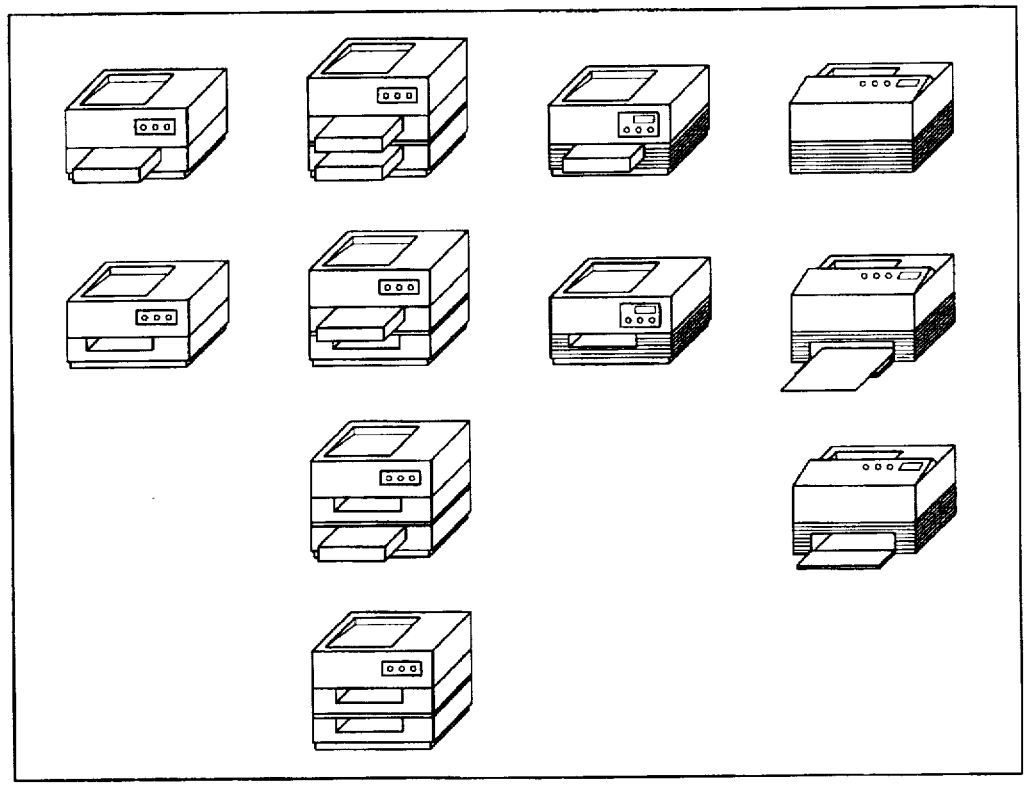

As mentioned above, the visual image or bitmap of the printer displayed within the Printer Status window will vary depending upon the attached printer. For example, the bitmap for an attached HP LaserJet Series II printer is different than the bitmap for a Series III printer. In the practice of the present invention, the bitmap will indicate to the user the type and model of attached printer, as well as status attributes thereof. Thus, if the attached printer has two paper source trays, the bitmap displayed within the Printer Status window will so indicate. Representative examples of bitmaps for various HP LaserJet Series printers are illustrated in FIGS. 9 through 14. Specifically, FIGS. 9A through 9C illustrate bitmaps displayed within the Printer Status window for an HP LaserJet Series II printer, FIGS. 10A through 10E illustrate bitmaps for an HP LaserJet Series IID printer, FIGS. 11A through 11E illustrate bitmaps for an HP LaserJet Series III printer, FIGS. 12A through 12E illustrate bitmaps for an HP LaserJet Series IIID printer, FIGS. 13A and 13B illustrate bitmaps for an HP LaserJet Series IIP, IIP+ and IIP without LC tray printers, and FIGS. 14A through 14C illustrate bitmaps displayed within the Printer Status window for HP LaserJet Series IIP, IIP+ and IIP with LC tray printers. Similarly, representative examples of bitmaps for various HP LaserJet Series printers, and displayed within the Printer Setup dialog box, are illustrated in Appendix A at pages 137–147.

In a preferred embodiment, the Printer Status window may be iconized by the user and, when iconized, depicts (in graphical form) the attached printer. Examples of such icons are presented in FIG. 15. Specifically, 15A illustrates icons which appear on the visual display when the printer is in the Paused state, and 15B illustrates suitable icons when in the Printing state. Preferably, the icons for the Printing state have a bar above the printer which fills from left to right as the job is printed. The percentage of the bar filled represents the percentage of pages that have actually finished printing, with the bar empty until the first page exists the printer, and the bar filled entirely when the last page exits the printer. It should also be understood that each of the icons depicted in FIG. 15 are displayed by the computer system in an area (90) of the visual screen (18) as indicated in 15C. Thus, each and every icon of FIG. 15 is separately represented within area (90) of 15C (with the remainder of the computer system depicted with cross-hatched lines). 15D illustrates User Intervention Required icons, 15E illustrates Printing Done icons, 15F illustrates Status Not Available icons, and 15G illustrates printer Idle icons.

User selectable sounds may also be associate with certain printer states. For example, if a paper jam occurs during printing, the computer system may indicate this condition with a suitable computer generated sound. Alternatively, a computer generated voice may tell the user the printer state.

Figure 16:
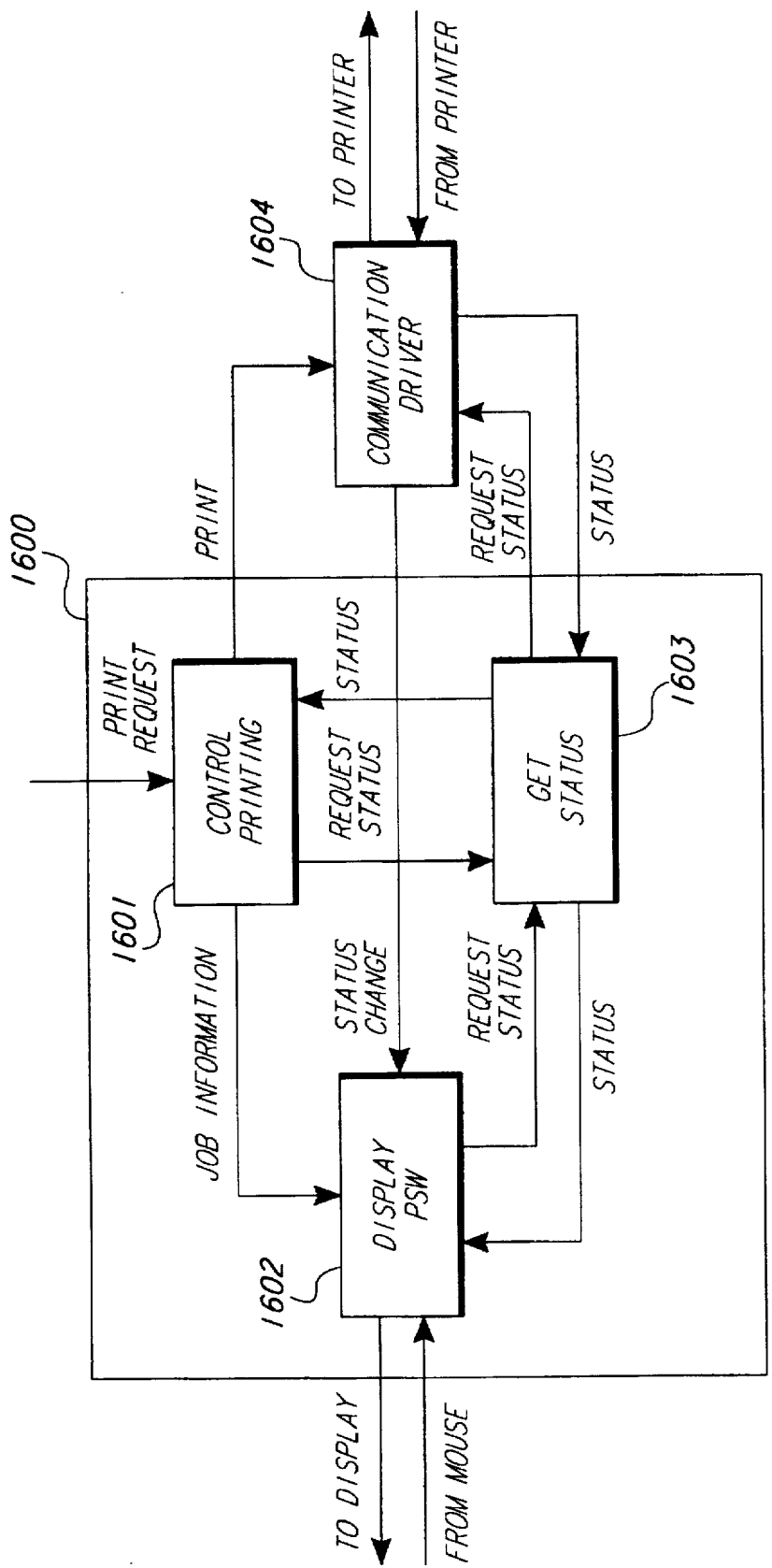
FIG. 16 is a block diagram illustrating a preferred Queue Processor and a printer driver.

In a preferred embodiment, a Queue Processor (QP) computer program checks the printer status, displays the Printer Status window (PSW) and dialog boxes, and controls the printing of data. The Queue Processor preferably executes in response to requests from the Windows Print Manager. FIG. 16 is a block diagram illustrating a preferred Queue Processor and a communications driver. The Queue Processor 1600 receives requests to print data, referred to as a "job," and controls the printing of the data and displaying of the Printer Status window. The Queue Processor sends the print data to the communications driver 1604 and receives status information from the communications driver. The communication driver interfaces with the printer through a communications port. The communications driver receives blocks of print data and status requests from the Queue Processor and sends them to the printer over the communications port. In response to these status requests, the communications driver also receives status information from the printer over the communications port and sends it to the Queue Processor. The communications driver also receives, from the printer, signals indicating that the printer's status has changed (the "Status Changed" message) or that the printer has started a page in motion (the "Kick Page" message) which are relayed to the Queue Processor via the Windows PostMessage mechanism.

The Queue Processor 1600 comprises a control printing module 1601, a display PSW module 1602, and a get status module 1603. The control printing module 1601 stores the print data in blocks in a format compatible with the communications driver and sends the blocks to the communications driver. The control printing module also stores status information (e.g. page number being printed) relating to the print job. The display PSW module 1602 controls the display of the Printer Status window. The display PSW module receives status information from the communications driver and the control printing module and controls the formatting and displaying of the status information. The get status module 1603 receives requests from the control printing module and the display PSW module to retrieve printer status information. The get status module requests the status from the communications driver and returns the status to the requesting module. In a preferred embodiment, the printer status information is stored in a data structure that is accessible by each module. Also, in a preferred embodiment, the Queue Processor is implemented as functions stored within a dynamic link library and executes under the Windows operating system. The Windows Print Manager invokes the control printing module to print data. The Print Manager also periodically invokes the control printing module to send data to the printer and to update the Printer Status window. The display PSW module is preferably implemented as a Windows window procedure. One skilled in the art would appreciate that the control printing module, the display PSW module, and get status module could be implemented as separate tasks when executing under a multitasking operating system. In the following, the display PSW module is described as implemented as a window procedure.

Figure 17:
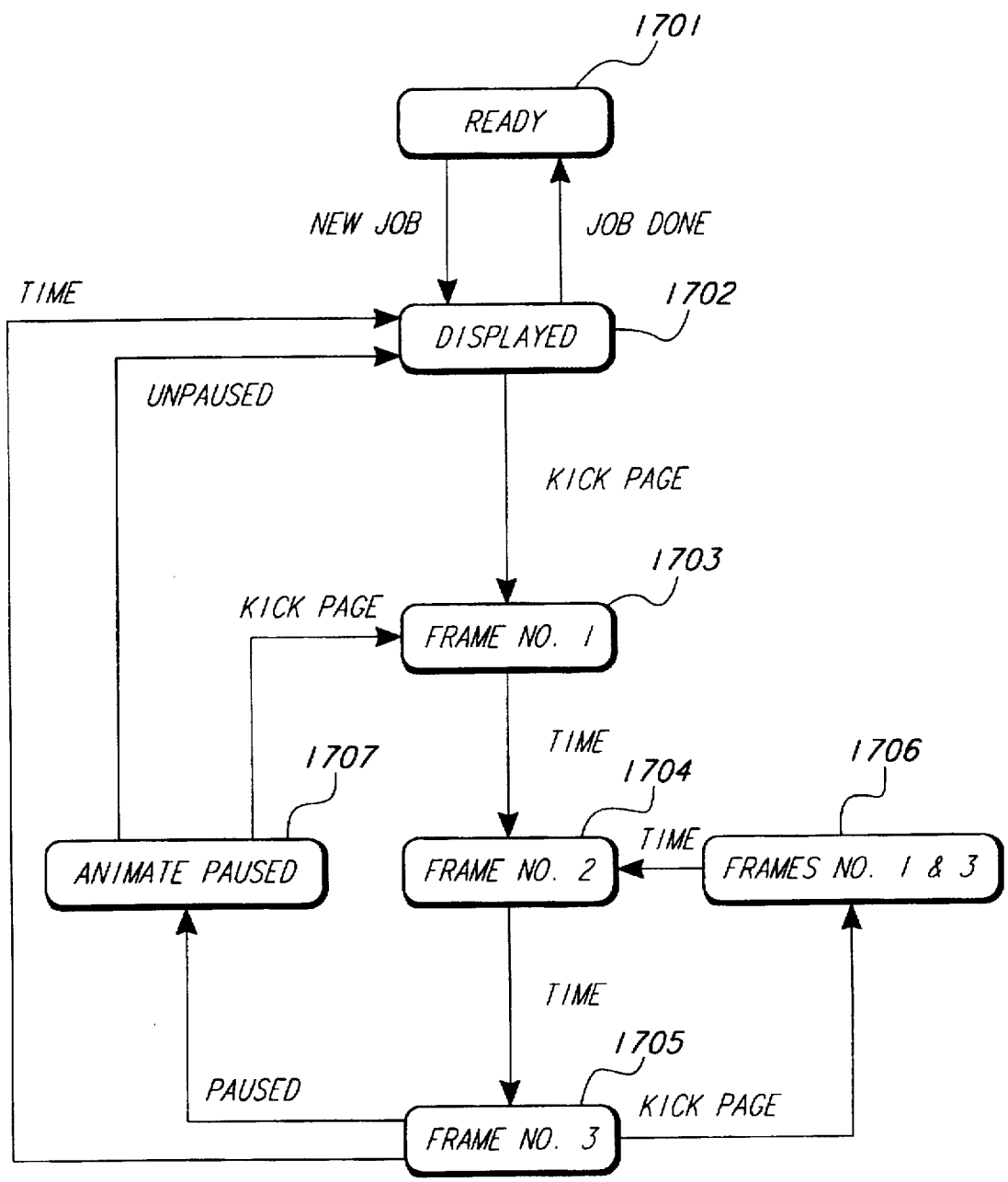
FIG. 17 is a state diagram illustrating the states of the display PSW module.

FIG. 17 is a state diagram illustrating the states of the display PSW module. The display PSW states track the progress of a print job so that the display PSW module can update the Printer Status window in an animated manner. The labeled lines between the states indicate events (messages) that trigger a state transition. The ready state 1701 indicates that no job is currently being printed. The displayed state 1702 indicates that a job is being printed. The frame1 1703, frame2 1704, frame3 1705, and frame1&3 1706 states track the location of the pages as they progress through the printer. The frame1, frame2, and frame3 states represent three different locations of a sheet of paper as it is travels through the printer. The frame1&3 state indicates that one sheet is at the first location and another sheet is at the third location. The display PSW module updates the Printer Status window as the state changes to effect an animated presentation. The display PSW module uses a timer to estimate the location of the sheet of paper as it moves through the printer. In an alternate embodiment, the printer provides information as to the location of the sheet as it moves through the printer. The display PSW module then displays the actual location, rather than an estimated location. The animate paused state 1707 indicates that the printer is currently paused. A printer pauses typically because the printer goes off-line (e.g., the user presses the "off-line" button of the printer) or because a user activates the Pause button in the Printer Status window. The display PSW module is initially in the ready state. When the display PSW module receives a new job message, it transitions to the displayed state. A kick page message (a signal from the printer indicating that the printer is starting to print a new page) causes the display PSW module to transition from the displayed state to the frame1 state. The displayed PSW module transition through the frame1, frame2, frame3, and frame1&3 states base on timing information and kick page messages. The animate paused state indicates that the printing has paused. The printing resumes when the resume button is activated or the printer is put on-line.

Figure 18:
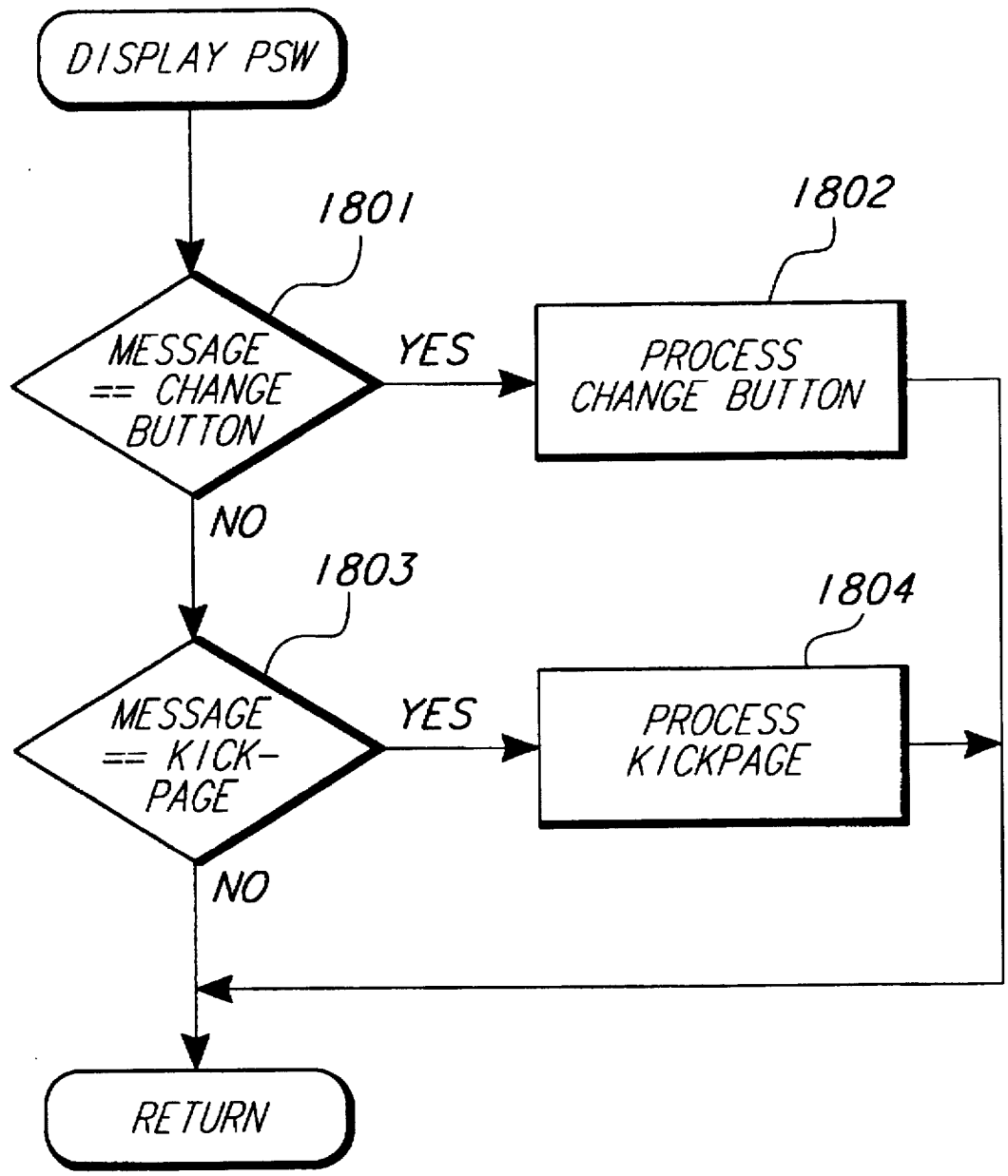
FIG. 18 is a flow diagram of a window procedure for the display PSW module.

FIG. 18 is a flow diagram of a window procedure for the display PSW module. The window procedure is invoked whenever a message is sent to the display PSW module. The overall structure of the display PSW module corresponds to well-known window procedure structures. As shown in step 1801 through 1804, the window procedure determines which message is received and performs functions corresponding to the message. The messages are sent by the control printing module, the get status module, and the communications driver. Messages sent from the communications driver correspond to changes in the printer status. The following table describes messages supported in a preferred embodiment.

| Message Name | Description |
| --- | --- |
| Change Button | This message indicates that the user has selected the pause or resume button or the printer has gone off line. |
| Display | This message indicates that the user |

-continued

| Message Name | Description |
| --- | --- |
| | has requested that the printer status window be displayed. |
| Error | This message indicates that either the Queue Processor has experienced a communications error or that the printer has indicated an error. |
| Feeder Change | This message indicates that either the number of printer feeders has changed or a configuration of the feeders has changed. |
| Information Update | This message indicates that the number of pages in the job has changed. |
| Job Done | This message indicates that the printer has finished printing the job. |
| New Job | This message indicates that the Queue Processor has started a new print job. |
| Printed | This message indicates that the printer has incremented the number of pages printed. |
| Restore | This message indicates that the printer status has changed and there is no error. |
| Sent | This message indicates that the Queue Processor has sent all the data for the page to the printer. |
| Status | This message indicates that the printer status has changed to being either valid or not available. |
| Warning | This message indicates that the printer status has changed and warning status was sent by the printer |

Figure 19:
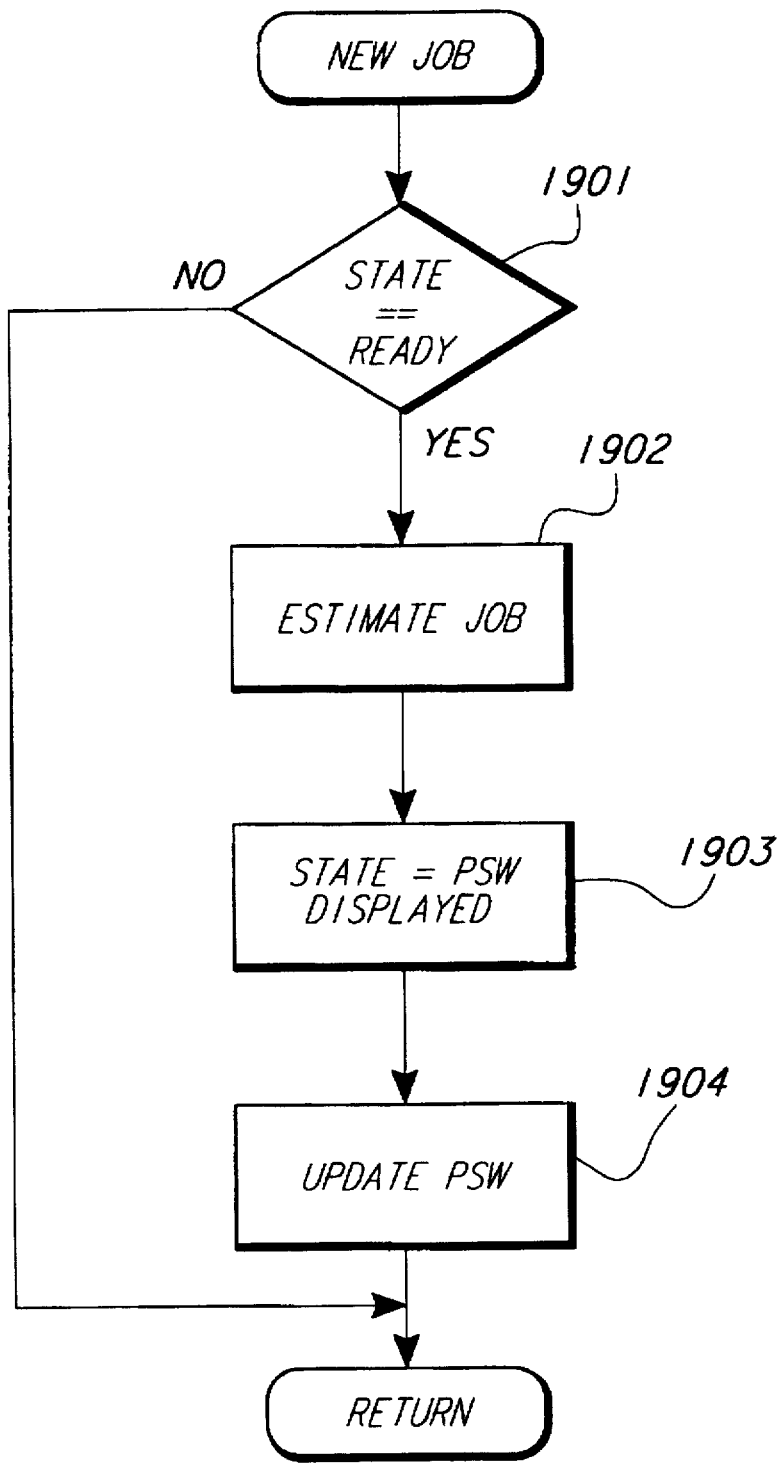
FIG. 19 is a flow diagram of the function that processes a new job message.

FIGS. 19 through 29 are flow diagrams of steps performed by the window procedure to process each message. The steps are illustrated as being implemented as functions that are invoked by the window procedure. FIG. 19 is a flow diagram of the function that processes a new job message. In step 1901, if the current state is ready, then the function continues as step 1902, else the function returns. In step 1902, the function estimates the time to completion of the print job (as disclosed in U.S. Ser. No. 07/912,098, filed Jul. 10, 1992, and incorporated by reference herein). In step 1903, the function changes the state to the displayed state. In step 1904, the function updates the Printer Status window and returns. This function may employ existing window management techniques, such as those provided by the Windows operating system. The information needed to update the display is gathered from printer status information, job status information, and user selections.

Figure 20:
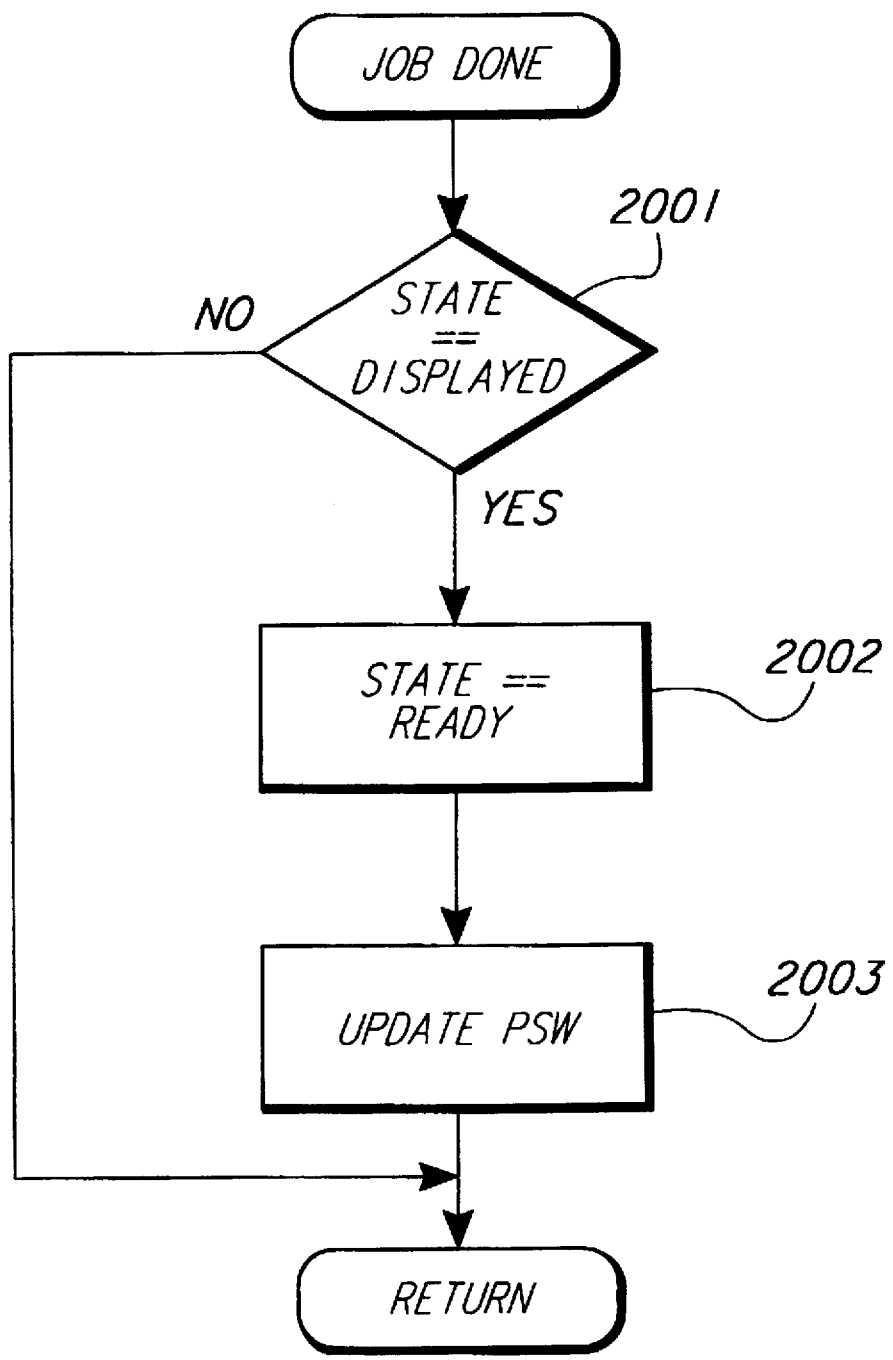
FIG. 20 is a flow diagram of the function that processes a job done message.

FIG. 20 is a flow diagram of the function that processes a job done message. In step 2001, if the current state is displayed, then the function continues at step 2002, else the function returns. In step 2002, the function changes the state to ready. In step 2003, the function updates the printer status window and returns.

Figure 21:
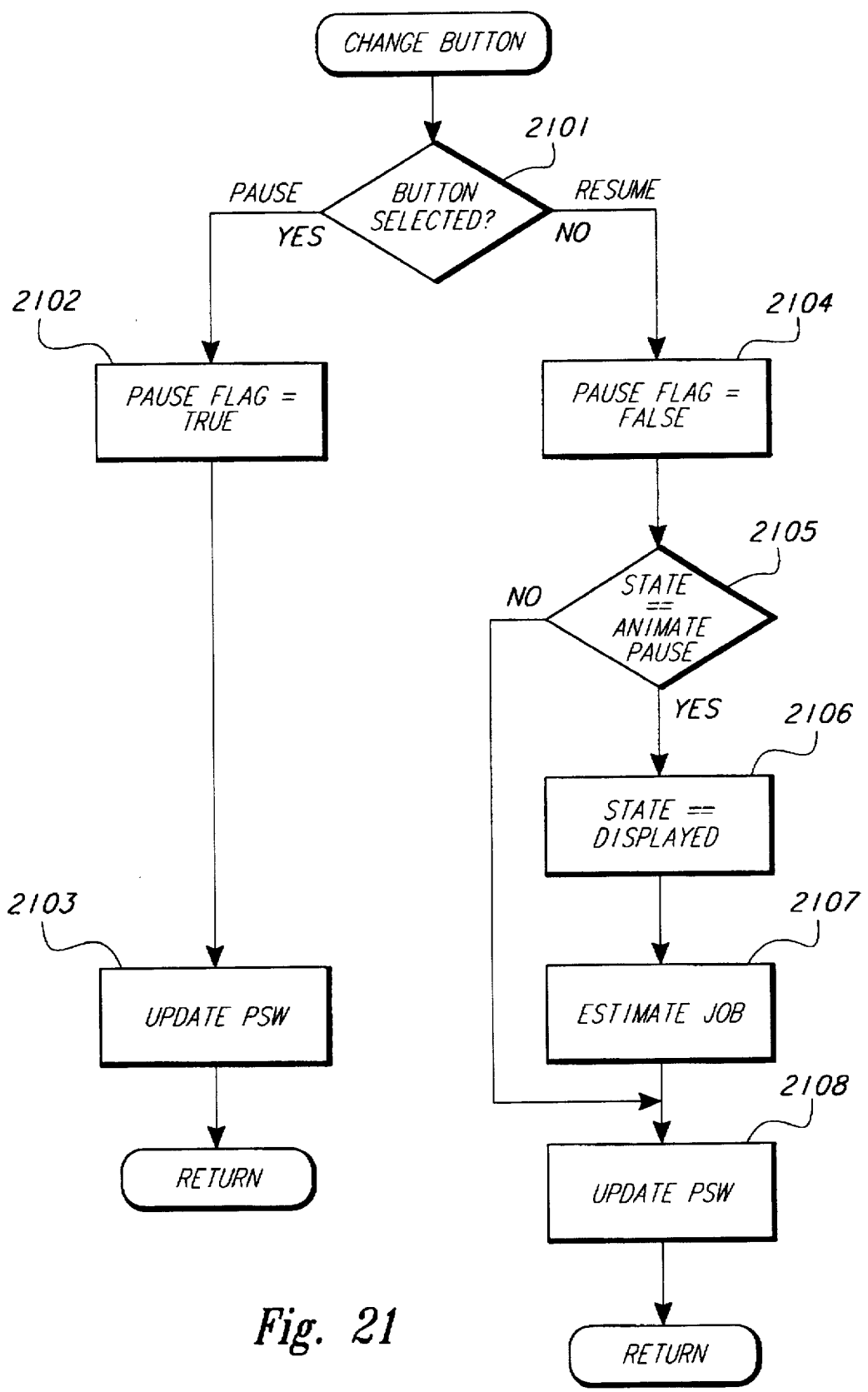
FIG. 21 is a flow diagram of the function that processes a change button message.

FIG. 21 is a flow diagram of the function that processes a change button message. In step 2101, if a pause is indicated (e.g., if pause button (53) of FIG. 5 is selected), then the function continues at step 2102, else the function continues at step 2104 (e.g., when the resume button (52) of FIG. 5 is selected). In step 2102, the function sets the pause flag to true. The pause flag indicates that the printer has paused. In step 2103, the function updates the printer status window and returns. In step 2104, the function sets the pause flag to false. In step 2105, if the current state is animate paused, then the function continues at 2106, else the function continues at step 2108. In step 2106, the function changes the state to displayed. In step 2107, the function estimates completion time for the job. In step 2108, the function updates the Printer Status window and returns.

Figure 22:
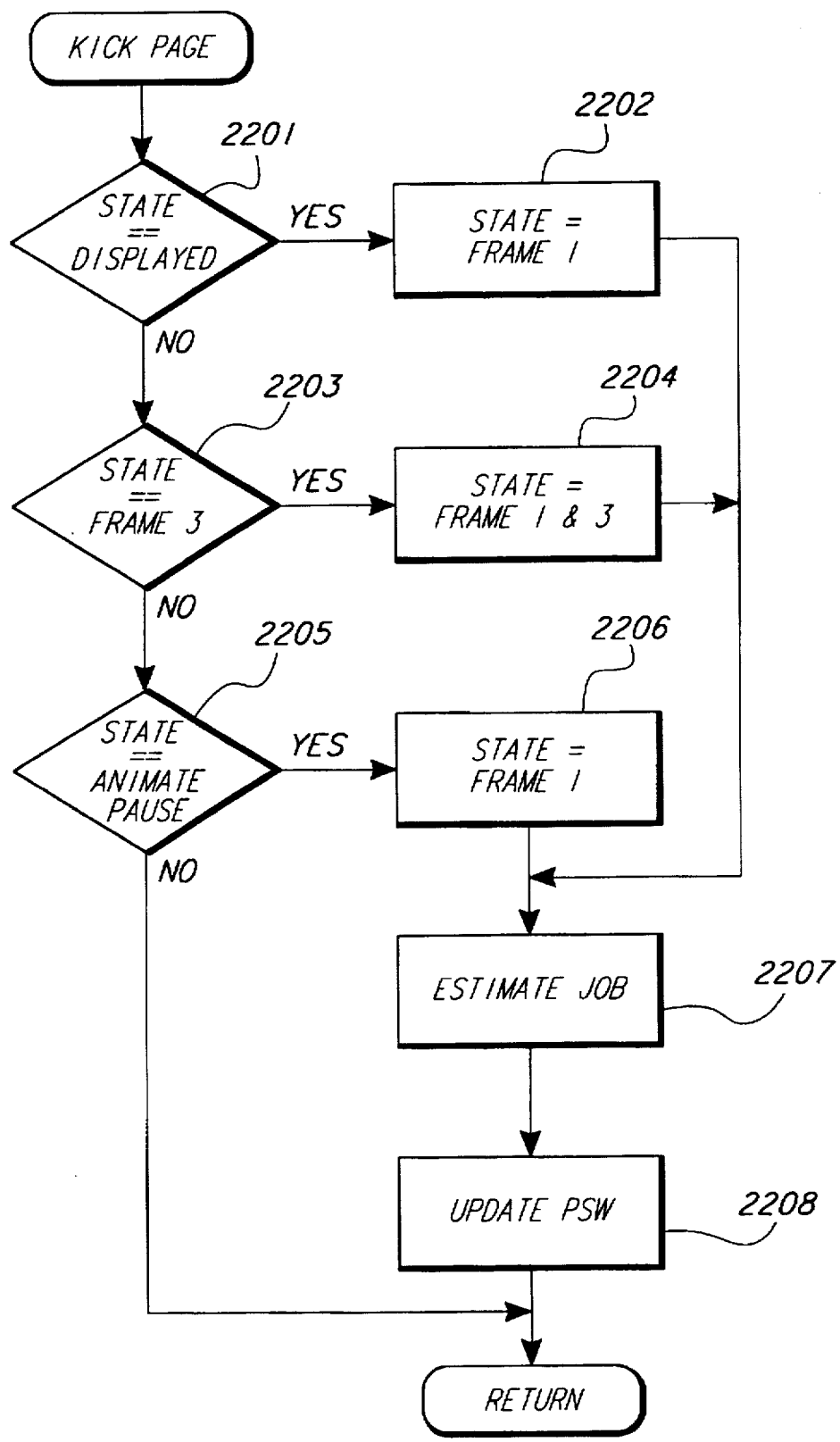
FIG. 22 is a flow diagram of the function that processes a kick page message.

FIG. 22 is a flow diagram of the function that processes a kick page message. In step 2201, if the current state is displayed, then the function changes the state to frame1 in step 2202 and continues at step 2207, else the function continues at step 2203. In step 2203, if the current state is frame 3, then the function changes the state to frame1&3 in step 2204 and continues at step 2208, else the function continues at step 2205. In step 2205, if the current state is animate paused, then the function changes the state to frame1 in step 2206 and continues at step 2207, else the function returns. In step 2207, the function estimates the time to completion of the print job. In step 2208, the function updates the printer status window and returns.

Figure 23:
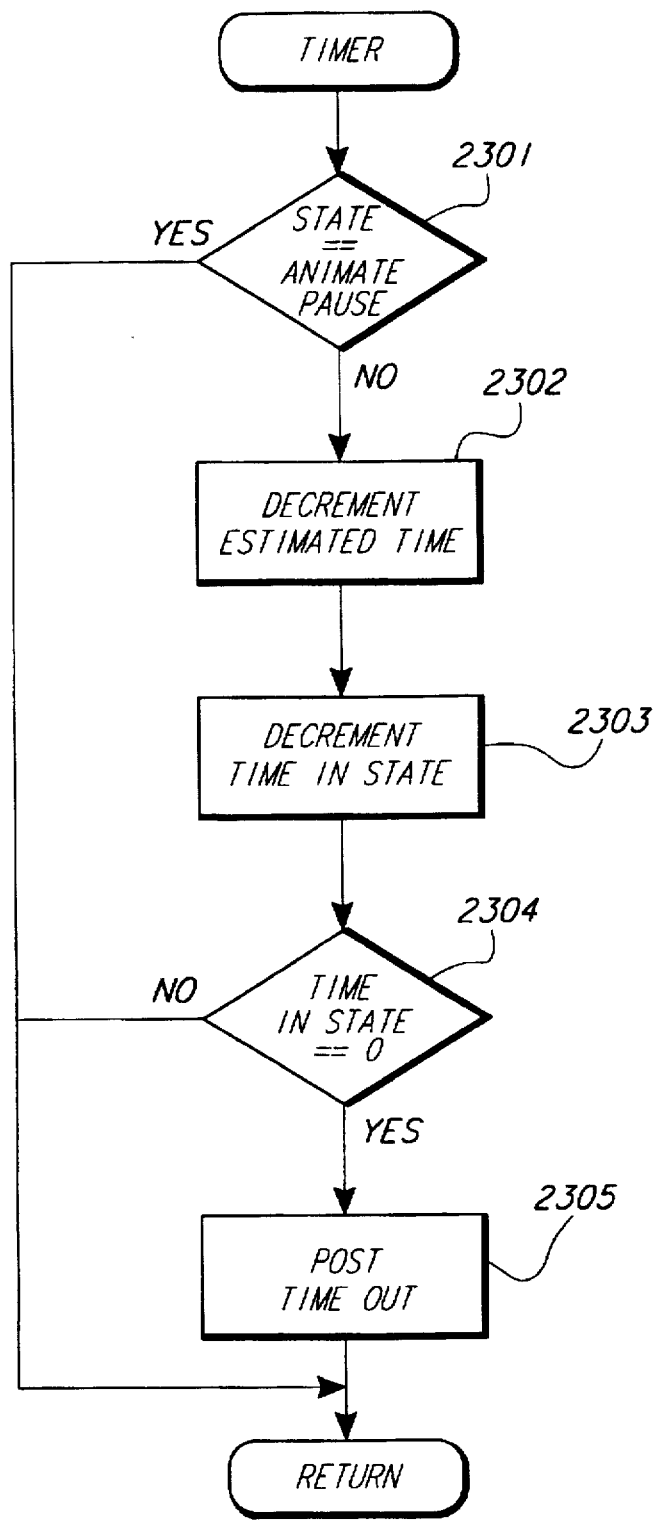
FIG. 23 is a flow diagram of the function that processes a timer message.

FIG. 23 is a flow diagram of the function that processes a timer message. A timer message is generated at a regular interval. The procedure uses this message to track the time in a state. When the display PSW module is in state for pre-defined length of time, then a timeout message is generated to effect a change in state. In step 2301, if the current state is animate paused, then the time values are not incremented and the function returns, else the function continues at step 2302. In step 2302, the function decrements the estimated time to completion of the job. In step 2303, the function decrements the time in the current state. When the state is changed the length of time for that state is set and this function decrements that length of time. In step 2304, if the time for the state has elapsed, then the function sends a timeout message to the window procedure in step 2305 and returns.

Figure 24:
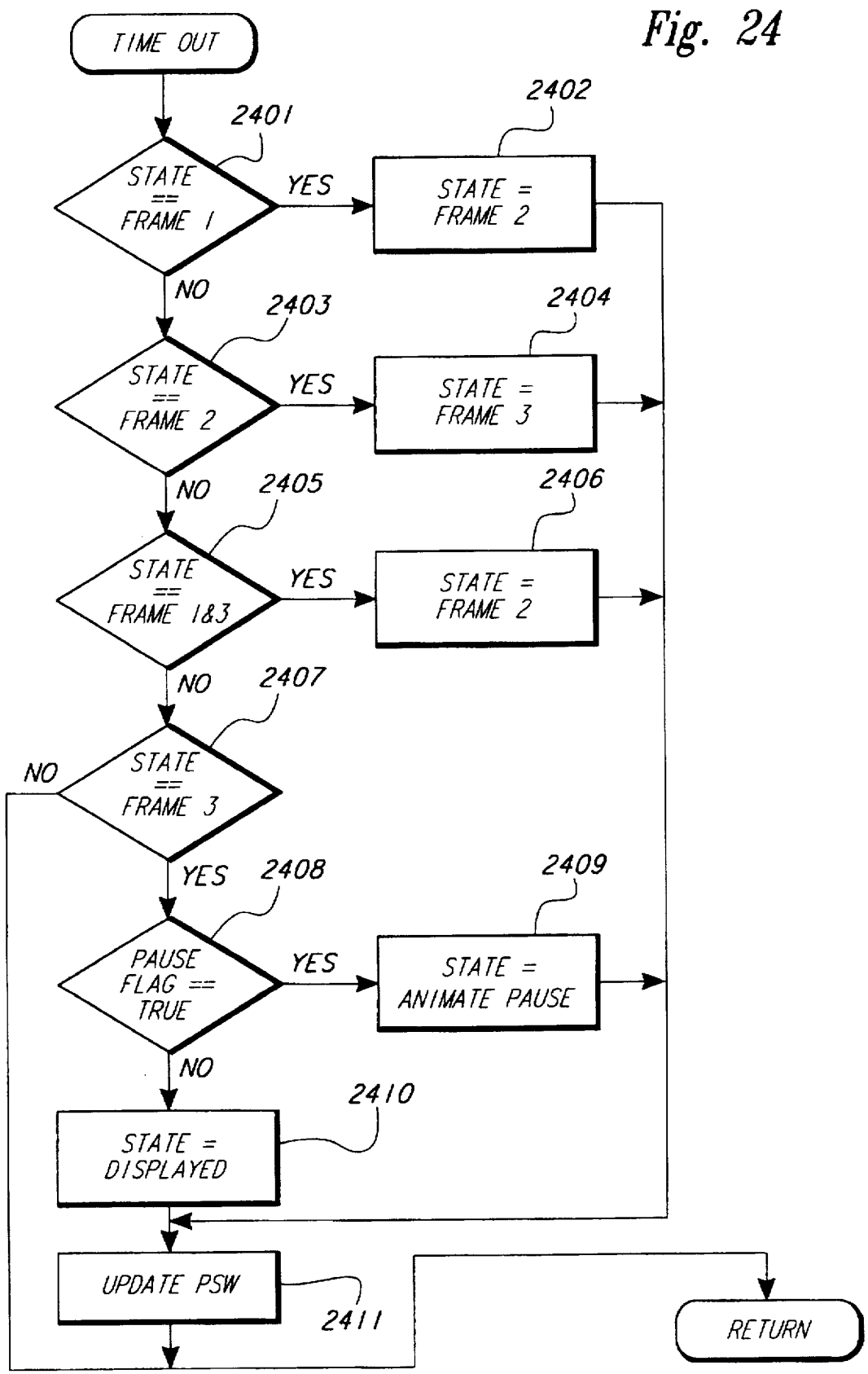
FIG. 24 is a flow diagram of the function that processes a timeout message.

FIG. 24 is a flow diagram of the function that processes a timeout message. In step 2401, if the current state is frame1, then the function changes the state to frame2 in step 2402 and continues at step 2411, else the function continues at step 2403. In step 2403, if the current state is frame2, then the function changes the state to frame3 in step 2404 and continues at step 2411, else the functions continues at step 2405. In step 2405, if the current state is frame1&3, then the function changes the state to frame2 in step 2406 and continues at step 2411, else the function continues at step 2407. In step 2407, if the current state is frame3, then the function continues at step 2408, else the function returns. In 2408, if the pause flag is true, then the function changes the state to animate paused in step 2409, else the function changes the state to displayed in step 2410. The function then continues at step 2411. In step 2411, the function updates the Printer Status window and returns.

Figure 25:
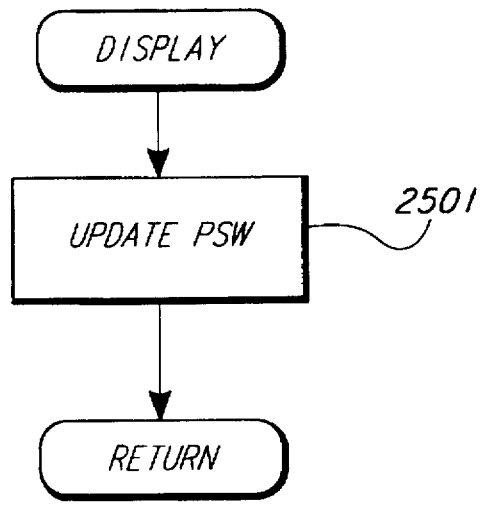
FIG. 25 is a flow diagram of the function that processes a display message.

FIG. 25 is a flow diagram of the function that processes a display message. In step 2501, the function updates the Printer Status window and returns.

Figure 26:
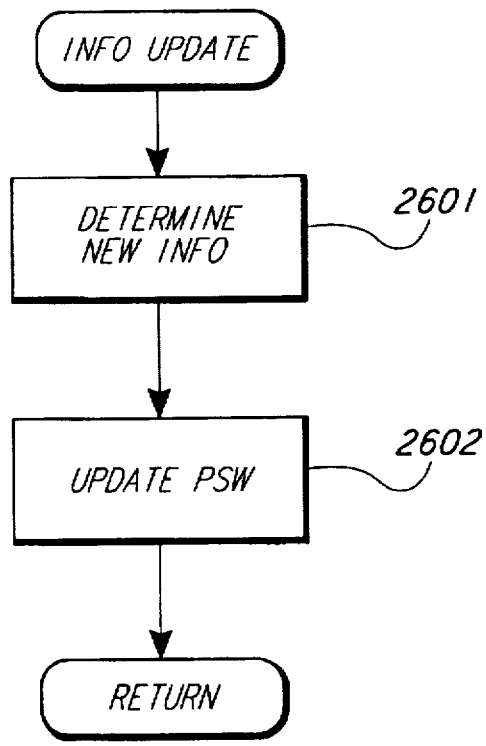
FIG. 26 is a flow diagram of the function that processes an information update message.

FIG. 26 is a flow diagram of the function that processes an information update message. In step 2601, the function determines what new information should be displayed. In step 2602, the function updates the Printer Status window and returns.

Figure 27:
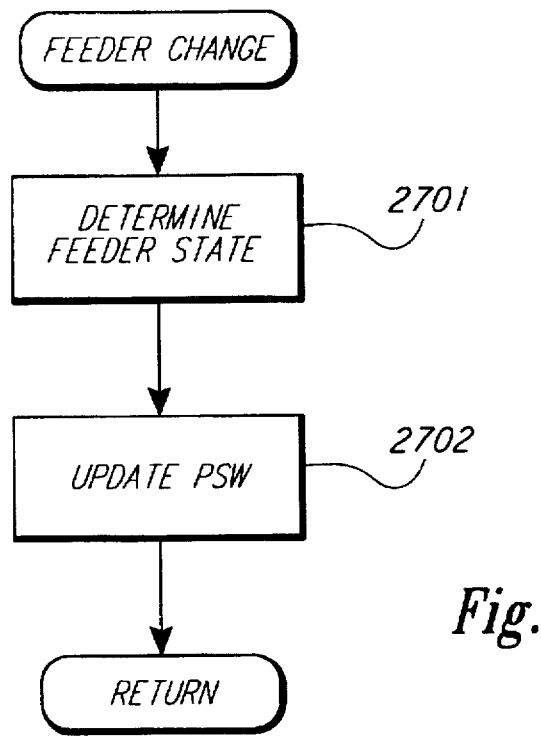
FIG. 27 is a flow diagram of the function that processes a feeder change message.

FIG. 27 is a flow diagram of the function that processes a feeder change message. In step 2701, the function determines the current feeder state. In step 2702, the function updates the Printer Status window and returns.

Figure 28:
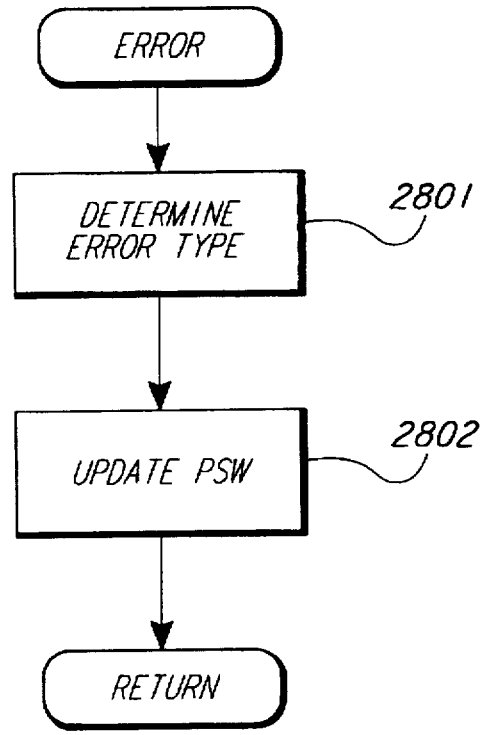
FIG. 28 is a flow diagram of the function that processes an error message.

FIG. 28 is a flow diagram of the function that processes an error message. In step 2801, the function determines the error type. In step 2802, the function updates the Printer Status window and returns.

Figure 29:
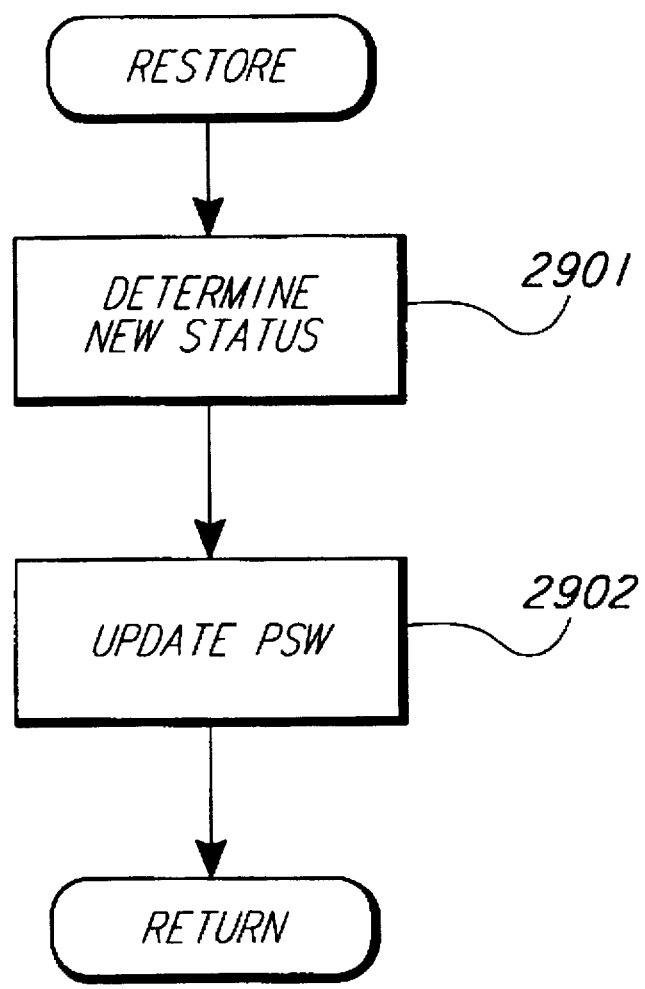
FIG. 29 is a flow diagram of the function that processes a restore message.

FIG. 29 is a flow diagram of the function that processes a restore message. In step 2901, the function determines the new status of the printer. In step 2902, the function updates the Printer Status window and returns.

While this invention has been shown and described with reference to certain preferred embodiments, it will be understood by those skilled in the art that various changes or modifications in form and detail may be made without departing from the spirit and scope of this invention.

APPENDIX A
PRINTER STATUS USER INTERFACE
AND METHODS RELATING THERETO

Table of Contents

Introduction ........................................................................................................... 1
   Product Overview ............................................................................................. 1
   This Document .................................................................................................. 1
      Scope of Functional Specification ............................................................. 1
      Specific Product Features ........................................................................... 1
      Modifications ............................................................................................... 1
      New In This Version ................................................................................... 1

Product Components ............................................................................................ 3
   Cartridge ............................................................................................................. 3
      Form Factor ................................................................................................. 3
      Circuit Board and Connection ................................................................... 4
   Diskettes ............................................................................................................. 4
      *Jumbo Supplied With Dual Media .......................................................... 4
      *Jumbo Available on 720K Diskettes ........................................................ 4
      *Driver Diskette Contains Multimedia Files ........................................... 4
      Disk Layout .................................................................................................. 5
   Documentation .................................................................................................. 6
      JumpStart Card ........................................................................................... 6
      Jumbo User Guide (JUG) ........................................................................... 6
      On-line Help ................................................................................................ 7

System Requirements .......................................................................................... 9
   PC ........................................................................................................................ 9
      *Jumbo Requires PC Running 3.10 ........................................................... 9
      *Jumbo Does Not Require a Mouse .......................................................... 9
      *Machine Must Be Connected To Printer ................................................ 9
   Printer ................................................................................................................. 9
      *Jumbo Can Be Used In Many Printer Models ....................................... 9
      *Additional Printer Memory Not Required ............................................ 9
   Connection ....................................................................................................... 10
      *Jumbo Supports Parallel Interface ........................................................ 10
      *Jumbo Supports Serial Interface ............................................................ 10
      *Jumbo Supports Network Connection ................................................ 11

General ................................................................................................................. 15
   Usability ........................................................................................................... 15
      *Jumbo Printer Functionality Entirely Controlled By Windows ........ 15
      *All Errors Reported on Both Printer and Dialog Box ......................... 15
      *Jumbo Provides Test/PSS Page ............................................................. 15
      *Jumbo Provides Printer Status Windows ............................................ 15
   Compatibility ................................................................................................... 16
      *LaserJet Compatibility Retained ........................................................... 16
      Printing From Jumbo Resets PCL ........................................................... 16
   Localization ..................................................................................................... 16
      *Driver Ready for Additional Languages .............................................. 16
      Cartridge Not Localizable ........................................................................ 16

Installation ........................................................................................................... 17
      Cartridge .................................................................................................... 17

| | |
|---|---|
| Driver | 17 |
|     *Driver is Automatically Installed | 17 |
|     *Printer Can Print Current Configuration Information | 17 |
|     Jumbo Cannot Be Installed Using the Windows Control Panel | 17 |
| Printing | 19 |
|   General | 19 |
|     *Resolution Enhancement Supported | 19 |
|     *Multiple Resolutions Supported | 19 |
|   Paper Handling | 19 |
|     *Paper Source Options Supported | 19 |
|     *Jumbo Supports Multiple Collated Copies | 20 |
|     *Jumbo Provides Manual Duplexing | 20 |
|     Jumbo Does Not Support Automatic Duplexing | 20 |
|     *Jumbo Provides Optional Header and Trailer Pages | 20 |
|     *Jumbo Pre-feeds Paper | 21 |
|   Fonts | 21 |
|     *TrueType Fonts are Supported | 21 |
|     *ATM Fonts are Supported | 21 |
|     Device and Cartridge Fonts Not Available | 21 |
|   Quality | 22 |
|     *User Can Select Three Halftoning Methods | 22 |
|   Stability | 23 |
|     *All Pages Print With Full Page of Memory | 23 |
|     *Jumbo Prints Any Page PCL or Postscript Prints | 23 |
|     *A Failed Job Cannot Affect Any Other Job | 23 |
| Host User Interface | 25 |
|   General | 25 |
|     Standards Followed | 25 |
|     *Every Dialog Box Has Help Available | 25 |
|     *All Printing Errors Have Optional Sound Support | 25 |
|     Supports Print to File | 25 |
|   Printer Setup | 26 |
|     Overview | 26 |
|     Device Setup | 26 |
|     Printing Test Dialog Box | 31 |
|     Options Dialog Box | 31 |
|     Graphics | 34 |
|     Low Printer Memory Dialog Box | 37 |
|     Cartridge Version Dialog Box | 38 |
|     Low PC Memory Dialog Box | 39 |
|     Start Manual Duplex Dialog Box | 39 |
|     Manual Duplex Dialog Box | 40 |
|   Print Manager | 41 |
|     Overview | 41 |
|     Print Manager Main Screen | 41 |
|     Not Enough Disk Space | 43 |
|     Setup In Use | 43 |
|     Bad Configuration | 44 |
|     Low Memory | 44 |
|   Printer Status Window | 45 |
|     Behavior | 45 |
|     Intervention Priorities | 49 |
|     Printing | 49 |

|  |  |
|---|---|
| Paused | 52 |
| Idle | 52 |
| Complete | 53 |
| Status Not Available | 53 |
| Intervention Required | 53 |
| Icon | 57 |
| Sounds | 59 |
| Mode Switching and Status Display | 60 |
| Printer Status Window Options | 61 |
| Image | 61 |
| WPS.INI | 61 |
| Printed Pages | 63 |
| Common Background | 63 |
| Common Background Sample | 64 |
| Header Page | 65 |
| Trailer Page | 66 |
| Configuration Page | 69 |
| Test Page | 70 |
| Configuration Changed Page | 72 |
| Manual Printer Configuration Page | 73 |
| No Jumbo Page | 74 |
| Notes | 75 |
| Printer User Interface | 79 |
| Overview | 79 |
| State Diagram | 79 |
| Operation | 80 |
| General | 80 |
| Controls | 80 |
| PCL Mode | 80 |
| Jumbo Idle | 80 |
| Jumbo Printing | 81 |
| Jumbo Paused | 82 |
| Jumbo Offline | 82 |
| Jumbo Error | 82 |
| Loading | 86 |
| Front Panel Commands | 86 |
| ON LINE | 86 |
| RESET | 87 |
| New Features | 89 |
| Complete Printer Diagnostics Page | 89 |
| All Graphics Use Selected Halftone Method | 89 |
| Halftoning Options Disabled for Certain Applications | 89 |
| Jumbo Works with Application to Provide Graphics | 90 |
| Current Printer & Driver Info Available | 90 |
| Removed Features | 91 |
| Removed Unilaterally By Program Management | 91 |
| Huge Print Jobs Can Use Print Manager | 91 |
| *Update Common Print Setup Dialog Box | 91 |
| *Utility Included Which Improves PCL Performance When Using DOS Applications | 91 |
| *Print-Scrn Key Supported | 92 |

Removed Because Really Hard to Do ........................................................................ 92
    *Non-Jumbo/Non-PCL Jobs Are Detected ............................................. 92
Removed Because of Schedule ................................................................................... 93
    *User Selects Where Jumbo Is Installed ................................................. 93
    *Separator Page Between Collated Jobs Available ................................. 93
    *Serial I/O Settings Automatically Determined ..................................... 93
    Jumbo Provides Font Test Page ............................................................... 93
    *Front Panel Command For Self-Test ..................................................... 93
    *Duplexing Supported With All Connections ........................................ 93
    *Cartridge Not Language Specific ........................................................... 94
    *Cartridge Not Language Specific ........................................................... 94
    *Jumbo Automatically Selects the Correct Interface ............................. 94
    *Jumbo Supports Multiple Connections ................................................. 94
    *OEM Interface Supported ....................................................................... 94
    *Full User Interface Supported With Windows for Workgroups ......... 95
    *Full User Interface Supported With Novell .......................................... 95
    *Full User Interface Supported With LAN Manager ............................. 95
    *Built-in PCL-4 Fonts are Supported ...................................................... 95
    *Built-In Scalable PCL-5 Fonts are Supported ....................................... 96
    *Cartridge Fonts are Supported ............................................................... 96
    *Virtual Driver Included Which Improves DOS Box Printing
    Performance ................................................................................................. 96
    *User-Defined Paper Handling Options ................................................. 97
    Paper Handling Dialog Box ...................................................................... 97
    *Jumbo Never Prints an Incorrect Page .................................................. 97
    *Jumbo Supports HP Envelope Feeder .................................................. 98
Removed Because Unwanted by Marketing ............................................................ 98
    *Jumbo Includes TrueType fonts ............................................................ 98
    *Jumbo Technical Specification Available .............................................. 98
    LaserJet 2000 Support ............................................................................... 98
    *Front Panel Applet Supports Front Panel Functionality ..................... 99
    *Jumbo Applet Provides Interactive Self-Test ....................................... 99
    *Driver Supplied With Multiple Languages ........................................... 99
    *Jumbo Supports Third Party Sheet Feeder .......................................... 99
Cool Idea Too Late ..................................................................................................... 100
    *Printer Named with User Defined Name During Installation ........... 100
    *Jumbo Maintains Network Redirection Information ......................... 100
    *Front Panel Operation Unchanged By Jumbo ..................................... 100

Table of Figures

View of Cartridge ..................................................................................... 1

Cartridge Connector ................................................................................. 2

Driver Diskette Layout ............................................................................. 3

Serial Cable Requirements ....................................................................... 3

Low Memory Dialog Box ......................................................................... 7

Black/White Halftoning Example ............................................................ 6

Ordered Dither Halftoning Example ........................................................ 7

Error Diffusion Halftoning Example ........................................................ 7

Printer Setup Flowchart ............................................................................ 2

Device Setup Dialog Box ......................................................................... 3

Printer Bitmaps on Setup Dialog Box ...................................................... 4

Supported Paper Sizes .............................................................................. 5

Printing Test Dialog Box .......................................................................... 7

Options Dialog Box .................................................................................. 7

Duplex Instruction Page Orientation for II and III Printers ..................... 8

Duplex Instruction Page Orientation for P Printers ................................. 8

50% Scaling .............................................................................................. 9

200% Scaling ............................................................................................ 9

Graphics Dialog Box .............................................................................. 10

Unadjusted Graphics Conversion ........................................................... 11

Brightness Conversion Equation ............................................................ 12

Brightness 60 Conversion ...................................................................... 12

Contrast Conversion Equation ............................................................... 13

Contrast 70 Conversion ......................................................................... 13

Low on Printer Memory Dialog Box ................................................ 14

Need Newer Driver Dialog Box ................................................................... 14
Start Manual Duplex Dialog Box .................................................................. 15
Manual Duplex Dialog Box .......................................................................... 16
Print Manager Flowchart ............................................................................. 16
Windows for WorkgroupsWinBall UI Dialog Box ......................................... 18
Closing Print Manager While Printer Still Active Dialog Box ....................... 18
Not Enough Duplexing Space Dialog Box ................................................... 19
Not Enough Collating Space Dialog Box ..................................................... 19
Setup In Use Dialog Box .............................................................................. 19
Bad Configuration Dialog Box ..................................................................... 20
Low Memory Dialog Box ............................................................................. 20
Printer Status Window State Diagram ........................................................ 23
Printer Status Window - Normal ................................................................. 27
Estimated Time Left Equation ..................................................................... 29
Printer Status Window - Intervention Required ......................................... 32
Printer Status Window - Intervention Required ......................................... 34
Printer Status Window - Engine Error ........................................................ 34
Pause Icons .................................................................................................. 36
Printing Icons ............................................................................................... 36
Intervention Required Icons ....................................................................... 36
Printing Done Icons ..................................................................................... 36
Status Not Available Icons .......................................................................... 37
Idle Icons ..................................................................................................... 37
Non-error Sounds ........................................................................................ 38
Error Sounds ................................................................................................ 38
Mode Switching Details ............................................................................... 39
Printer Status Window Display Options Dialog Box ................................... 39

Front Panel State Diagram ........................................................................................................... 53
Printer Information Window ......................................................................................................... 63
Paper Handling Dialog Box .......................................................................................................... 70

Introduction                                                     10/01/92

Introduction

Product Overview

Jumbo is a cartridge for HP LaserJet printers. It provides performance, usability, functionality and print quality enhancement to existing printers when used with Windows 3.10.

This Document

This document defines the Jumbo product. It is produced by program management as a synthesis of engineering and marketing input. It is the source of both the engineering design specification and the user documentation.

This document will be complete when it defines the function of the Jumbo product fully and unambiguously enough for engineering to create a design specification and schedule; for marketing to make intelligent decisions on product functionality, and design collateral and packaging; for testing to develop a system test plan; and for user education to create documentation and help text.

Scope of Functional Specification

This document defines the product as seen by the user. It specifies the operation, function and external appearance, but specifically makes no attempt to describe the internal operation of the product or the philosophy behind the inclusion or exclusion of features.

Specific Product Features

Specific product features are marked with an asterisk (*) in the heading and in the table of contents.

Modifications

Changes from the previous version of this document are marked like this.

New In This Version

- Executive paper size in Figure 12 Dialog Box Text updated.
- Jumbo-specific pages print correctly on a LaserJet Series II with 512K of memory.
- "ANY" added to the list of paper sizes for "Paper Out", "Wrong Tray", and "Manual Feed (Normal)". "ANY" also added to the "Common Background" description.
- Information on Test Page updated.

| Introduction | 10/01/92 |
|---|---|

- Status Window - Communication Error bitmap updated.
- Delete button, when pressed, is not re-enabled until terminated print job actually ends.
- Manual Printer Configuration page added to Printed Pages section.

Product Components                                                      10/01/92

Product Components

The Jumbo product is shipped with three major components: a cartridge, a driver diskette, and user documentation.

Cartridge

Form Factor

The cartridge itself is the size and form of a standard font or Postscript cartridge, approximately 3.5" X 6.25" X .75". It is made of injection molded plastic with recesses on the top and bottom for labels. The top label is printed with the Microsoft logo and the product name; the bottom with product use information and a serial number.

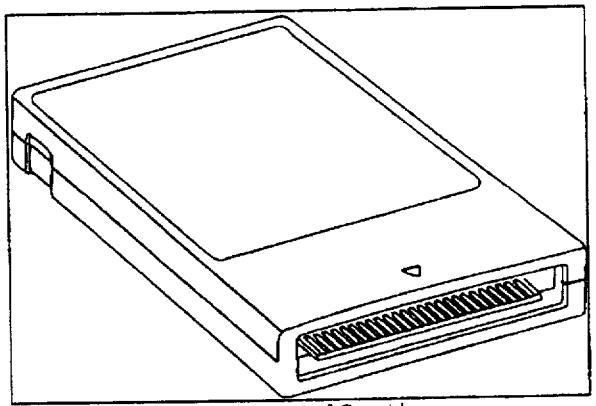
Figure 1: View of Cartridge

Product Components          10/01/92

Circuit Board and Connection

The Jumbo cartridge uses the standard LaserJet connector as required for the leftmost slot. The circuit board contains the ROM's and necessary circuitry for operation.

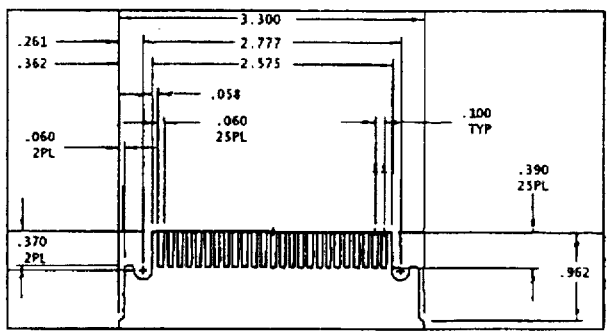

Figure 2: Cartridge Connector

Diskettes

*Jumbo Supplied With Dual Media

The Jumbo product includes four diskettes. Two high-capacity 3½" (1.44 megabyte) diskettes and three high-capacity 5¼" (1.2 megabyte) diskettes.

*Jumbo Available on 720K Diskettes

While Jumbo ships with high-capacity diskettes, low-density (720K) diskettes are available.

*Driver Diskette Contains Multimedia Files

The driver diskette contains wave form files for each of the sound events used by Jumbo. These sounds are described in "Sounds" on page 59.

Product Components  10/01/92

Disk Layout

High Density (3½" and 5¼")

High capacity 3½" and 5¼" diskettes share the same layout.

| Cluster Size | 512 | Cluster Count | | 2,371 | Total Size | 1,213,952 |
|---|---|---|---|---|---|---|

Disk 1 — Used 2326, Clusters Available 45, KBytes Available 23040

| Compressed Name | Size in Bytes | Size in Clusters |
|---|---|---|
| MSSETUP EX_ | 7,543 | 15 |
| MSTEST EX_ | 55,370 | 109 |
| COMMAND PI_ | 211 | 1 |
| COMMCTRL DL_ | 33,869 | 67 |
| CONFIG JF_ | 12,380 | 25 |
| DIALOGS IN_ | 17,867 | 35 |
| FONTNAME DL_ | 2,623 | 6 |
| MSCOMSTF DL_ | 41,796 | 82 |
| MSCPYDIS DL_ | 7,773 | 16 |
| MSCUISTF DL_ | 140,678 | 275 |
| MSDETSTF DL_ | 15,542 | 31 |
| MSINSSTF DL_ | 41,097 | 81 |
| MSSHLSTF DL_ | 8,807 | 18 |
| MSUILSTF DL_ | 4,156 | 9 |
| PRINTMAN EX_ | 41,495 | 82 |
| PRINTMAN HL_ | 45,860 | 90 |
| SETUP EXE | 25,168 | 50 |
| SETUP IN_ | 10,547 | 21 |
| SETUP INI | 149 | 1 |
| SETUP LST | 1,079 | 3 |
| SETUP MS_ | 9,124 | 18 |
| SETUPAPI IN_ | 13,713 | 27 |
| SPEAKER DR_ | 11,372 | 23 |
| TESTPAGE LS_ | 343 | 1 |
| TESTPAGE MS_ | 5,323 | 11 |
| VER DL_ | 6,307 | 13 |
| WPSHRE DL_ | 18,855 | 37 |
| WPSLJ DR_ | 162,388 | 318 |
| WPSLJ HL_ | 198,838 | 389 |
| WPSLJCOM DL_ | 8,563 | 17 |
| WPSLJQP DL_ | 209,190 | 409 |
| WPSLJVPD 38_ | 2,807 | 6 |
| WPSQPD EX_ | 20,000 | 40 |

Disk 2 — Used 2371, Clusters Available 0, KBytes Available 0

| Compressed Name | Size in Bytes | Size in Clusters |
|---|---|---|
| ANTQUA TT_ | 50,796 | 100 |
| ANTQUAB TT_ | 50,436 | 99 |
| ANTQUABI TT_ | 48,640 | 95 |
| ANTQUAI TT_ | 47,885 | 94 |
| ARIALN TT_ | 46,783 | 92 |
| ARIALNB TT_ | 46,403 | 91 |
| ARIALNBI TT_ | 48,246 | 95 |
| BOOKOS TT_ | 53,401 | 105 |
| BOOKOSB TT_ | 50,477 | 99 |
| BOOKOSBI TT_ | 55,651 | 109 |
| BOOKOSI TT_ | 52,756 | 104 |
| GOTHIC TT_ | 43,125 | 85 |
| GOTHICBI TT_ | 40,236 | 79 |
| GOTHICI TT_ | 43,869 | 86 |
| LBLACK TT_ | 45,267 | 89 |
| LBRITE TT_ | 47,815 | 94 |
| LBRITED TT_ | 44,182 | 87 |
| LBRITEDI TT_ | 48,197 | 95 |
| LBRITEI TT_ | 47,724 | 94 |
| MTSORTS TT_ | 63,689 | 125 |
| PDONE WA_ | 15,148 | 30 |
| PERROR WA_ | 12,239 | 24 |
| PEXPLODE WA_ | 20,422 | 40 |
| PFEED WA_ | 12,023 | 24 |
| PFIRE WA_ | 23,226 | 46 |
| PJAM WA_ | 10,409 | 21 |
| PREADY WA_ | 13,093 | 26 |
| PSTOPPED WA_ | 16,380 | 32 |
| SCHLBK TT_ | 53,820 | 106 |
| SCHLBKBI TT_ | 53,548 | 105 |

Disk 3 — Used 2077, Clusters Available 294, KBytes Available 150528

| Compressed Name | Size in Bytes | Size in Clusters |
|---|---|---|
| ARIALNI TT_ | 47,187 | 93 |
| GOTHICB TT_ | 38,151 | 75 |
| LCALLIG TT_ | 38,332 | 75 |
| LFAX TT_ | 40,375 | 79 |
| LFAXD TT_ | 41,139 | 81 |
| LFAXDI TT_ | 47,565 | 93 |
| LFAXI TT_ | 45,042 | 88 |
| LHANDW TT_ | 42,495 | 83 |
| LMATH1 TT_ | 33,104 | 65 |
| LMATH2 TT_ | 23,236 | 46 |
| LMATH3 TT_ | 41,420 | 81 |
| LSANS TT_ | 42,563 | 84 |
| LSANSD TT_ | 38,557 | 76 |
| LSANSDI TT_ | 43,571 | 86 |
| LSANSI TT_ | 42,877 | 84 |
| LTYPE TT_ | 37,377 | 74 |
| LTYPEB TT_ | 34,472 | 68 |
| LTYPEBO TT_ | 35,079 | 69 |
| LTYPEO TT_ | 39,412 | 77 |
| MTCORSVA TT_ | 51,097 | 100 |
| PADDPAP WA_ | 16,675 | 33 |
| PCOMMERR WA_ | 18,414 | 36 |
| PCOVER WA_ | 18,826 | 37 |
| PHANDUP WA_ | 23,160 | 46 |
| PPAUSED WA_ | 16,649 | 33 |
| PRESUME WA_ | 17,507 | 35 |
| PSTARTED WA_ | 15,951 | 32 |
| PTRAY WA_ | 17,166 | 34 |
| SCHLBKB TT_ | 55,654 | 109 |
| SCHLBKI TT_ | 53,585 | 105 |

Figure 3: Driver Diskette Layout

Product Components                                               10/01/92

Documentation

JumpStart Card

The JumpStart card is a four-panel quick reference card containing all the information necessary to install and use the product.

| | |
|---|---|
| Page 1 | Equipment setup, Installation, Printing the test page. |
| Page 2 | Printer Status window |
| Page 3 | Print Options |
| Page 4 | TrueType Fonts |

Jumbo User Guide (JUG)

The user guide details critical concepts and product functionality. It assumes the reader is familiar with the *Windows User Guide*, and is therefore a proficient Windows user. Like the *TrueType User's Guide* (which has most of its material included in this guide), the JUG will try to add value by also including supplementary conceptual material. Currently planned is an overall description of the Windows Printing System.

Outline

1. Legal
2. Table of Contents
3. Welcome (2 pages)
4. Introduction
    a) WPS Overview
    b) Features
    c) Local vs. Network
    d) Application vs. Driver
5. Status
    a) What
    b) How
6. Print Options
    a) Setup
    b) Options
    c) Graphics
7. Fonts
    a) How to Use
    b) History
    c) Examples
8. Questions & Answers
    a) Installation
    b) Troubleshooting Product Components                                                                 10/01/92

On-line Help

The usual treatment of all functionality. Note: every WPS dialog box has a help button. If time and disk space permits, graphics may be added to help.

System Requirements 10/01/92

System Requirements

PC

*Jumbo Requires PC Running 3.10

Jumbo requires a PC running Windows 3.10 (or later) in either standard or enhanced mode. The PC can have any display supported by Windows, any processor supported by Windows (286+) and any version of DOS supported by Windows.

*Jumbo Does Not Require a Mouse

All the functionality of Jumbo is available using the keyboard. Users can operate Jumbo with or without a mouse.

*Machine Must Be Connected To Printer

The PC must be connected to the printer using a parallel interface, a serial interface, or be connected to the printer using a network. The user may be able to use a switch box between the PC and the printer when using a serial or parallel cable, but it is not officially supported by Windows.

Printer

*Jumbo Can Be Used In Many Printer Models

The Jumbo cartridge can be used in any of the following HP printers:

LaserJet Series II, LaserJet IId, LaserJet IIp, LaserJet III, LaserJet IIId, LaserJet IIIp, LaserJet IIP+. Support for the LaserJet III includes support for all of the III controllers; specifically both 10 MHz and 16 MHz processors are supported.

The original LaserJet, LaserJet+ and the LaserJet IIIsi are specifically not included.

*Additional Printer Memory Not Required

Jumbo will operate with minimum printer memory shipped in any of the supported models. With only the minimum memory installed, Jumbo may fail to print extremely complex pages at full 300 dpi resolution. Additional memory (at least 1.5 MB) will prevent this for letter-sized paper. At least 2.0 MB will prevent this for all pages, as well as improve performance.

Additional printer memory will improve performance.

System Requirements 10/01/92

Engineering Impacts

This implies that we support banding. Banding gives us some performance benefits and allows us to operate in a low-memory printer.

Banding also has the side-effect of exposing the user to possible "Not Enough Memory" errors and requires that Jumbo automatically switch to a lower resolution when necessary. This "Not Enough Memory" error will never occur on a page that PCL would print correctly (see "Jumbo Prints Any Page PCL or Postscript Prints" on page 23).

Connection

*Jumbo Supports Parallel Interface

The PC can be connected to the printer using a parallel interface. The cable must be usable without the Jumbo cartridge installed (i.e., PCL must print correctly). There are no other special requirements.

The user is strongly encouraged to use a parallel interface in order to take full advantage of the performance enhancements Jumbo provides.

Some switch boxes lack certain control lines and do not allow for bi-directional I/O. The user is notified of this problem during the installation procedure. It is important to note that switch boxes are not officially supported by Windows at all.

*Jumbo Supports Serial Interface

The PC can be connected to the printer using an RS-232C serial interface. The user is strongly encouraged to use a parallel interface if possible. Except for the increased performance of a parallel cable, using a serial interface has no effect on Jumbo operation.

The serial cable requirements for Jumbo are exactly the same as those for the LaserJet printer. The cable must have pins 2 (TxD), and 7 (Signal Ground) connected, and at least one of 3 (RxD) or 20 (DTR) in order to work at all.

Both RxD and DTR are required for bi-directional communications.

An acceptable cable would be:

| Pin # | Description | Connection |
|---|---|---|
| 1 | CG - Chassis Ground | ✓ |
| 2 | TD - Transmit Data | ✓ |
| 3 | RD - Receive Data | ✓ |
| 7 | SG - Signal Ground | ✓ |
| 9 | SDA - Send Data | |
| 10 | SDB - Not Send Data | |
| 18 | RDB - Not Received Data | |
| 20 | DTR - Data Terminal Ready | ✓ |

Figure 4: Serial Cable Requirements

System Requirements

*Jumbo Supports Network Connection

The cartridge can be used on a network printer, but since no bi-directional I/O is available, the user will not see the enhanced user interface that a direct connection provides.

In order to have Jumbo operate on a network, the network driver *must not* change the data transmitted from the PC to the printer.

The list of supported networks includes (but is not limited to):

- Microsoft LAN Manager
- Novell NetWare
- Banyan Vines
- Artisoft LANtastic
- Microsoft Windows for Workgroups

LAN Manager

A side effect of using an OS/2 Lan Manager server is that a form feed is appended to the end of every job. This causes an extra blank page to be printed for each job.

Novell NetWare

Novell support includes NetWare 3.11, NetWare 2.2, and NetWare Light 1.1. NetWare Light 1.0 has Windows compatibility problems.

There are two configurations for NetWare 3.11 — the most common and most straightforward is when the printer is attached directly to the server. The other configurations have the printer attached to a workstation. Users still print to the print queue on the server, but the data is then sent to the specific workstation with the printer attached. Jumbo supports both printing configurations, subject to normal Novell compatibility issues.

Both PC-based & dedicated servers. When using Novell, the user must configure the server to not change the data. This is accomplished by using *Print Job Config* menu and selecting *File Contents*. The printer should be set to *Byte Stream*, with *Suppress FF, No Banner*, and *Enable Time-out: No*.

There are four NetWare options that must be set in order for Jumbo to operate with NetWare:

- "Number of copies" should be set to the default value of 1.
- "File contents" should be set to the default setting of "byte stream".
- "Print banner" should be changed from the default of "Yes" to "No".
- "Suppress form feed" should be changed from the default of "No" to "Yes".

For version 3.11 of NetWare, the user must install a Novell-supplied patch 1.22R. This is not specifically required for Jumbo, but fixes generic printing problems with large documents. Novell also has patches for all versions which fix serial flow-control problems.

System Requirements                                              10/01/92

Banyan Vines

Jumbo supports version 5.00 and 4.11, subject to Banyan's compatibility issues.

Just like NetWare, there are two configurations for printers, server-attached and workstation-attached. Jumbo supports both.

The user may have to set the *Set Print* command to modify the job profile to *No Banner*.

Artisoft LANtastic

Jumbo supports version 4.1 with the Windows Support Package.

The user must change the *Chars/Second* value of the server machine from the default of 0 to a Banyan-recommended 9600. Higher or lower numbers can be used to tune performance. The best number to use is determined by the performance of the server.

Microsoft Windows for Workgroups

Jumbo is compatible with WinBall. It uses the same Print Manger (see the Print Manager section for more information). It behaves the same as other drivers excepted as described following.

Sharing

A WPS printer can be shared with WinBall.

The local user can print to a WPS printer using the WPS driver. This user would receive full bidi status.

The remote user cannot use the host's WPS queue. That is, only the PCL driver can be shared. The remote user can print with either a PCL or WPS job. Only one-way status is available to the remote user.

Banner Pages

Jumbo does not support WinBall banner pages. The controls for this are ignored when a Windows Printing System Queue is selected.

Separator Pages

Jumbo does not support Winball's separator pages. The controls are ignored when a WPS queue is selected.

General                                                                10/01/92

General

Usability

*Jumbo Printer Functionality Entirely Controlled By Windows

The Jumbo cartridge makes printing much more straightforward for the user. For instance, the user does not need to use the printer front panel at all with Jumbo. All functions related to Jumbo are performed using the printer setup dialog box.

When Jumbo is printing, the front panel provides a minimal interface. The user can pause, resume, and delete the currently printing job. When manual intervention is required, the user can continue the job using the printer front panel. The front panel interface is described in "Printer User Interface" on page 79.

The normal LaserJet front panel operation is retained, but with the exception of serial communication options, these settings do not affect Jumbo. If the printer is in Jumbo mode, the user must reset the printer via the front panel RESET command in order to access the PCL settings. This is described in "Printer User Interface" on page 80.

*All Errors Reported on Both Printer and Dialog Box

All errors requiring user intervention are reported to the user using both the front panel of the printer and a pop-up dialog box. In no case does the user have to check the printer to see the status of the job.

The only exception to this is when Jumbo is used with a unidirectional connection (as in network connections or when using an incomplete serial cable). In this case, messages display only on the printer itself and do not display in a dialog box on the user's screen.

*Jumbo Provides Test/PSS Page

The driver setup dialog box has a button which prints a test/PSS page on the Jumbo printer. This test page provides information like the Windows version, the communications port used, the printer model, and the amount of printer memory.

*Jumbo Provides Printer Status Windows

Jumbo has an application for the PC which provides the user with up-to-date printer status such as "BUSY," "IDLE," "PAPER JAMMED," and "PRINTING PAGE 14."

This feature is described in more detail in "Printer Status Window" on page 45.

General　　　　　　　　　　　　　　　　　　　　　　　　　　　　　　10/01/92

Compatibility

*LaserJet Compatibility Retained

Unlike other enhancement options, Jumbo does not affect compatibility[1]. All applications (both Windows and non-Windows) can still print to the printer using the existing LaserJet drivers, though they may not show a performance increase.

With the Jumbo cartridge installed, the printer automatically switches between Jumbo mode and PCL mode as necessary. No user interaction is required.

The details of mode switching and the user interface impact are described in "Mode Switching and Status Display" on page 60.

Printing From Jumbo Resets PCL

When the user prints a Jumbo job or the system asks for the printer status (e.g., in printer setup to get the current paper tray), all PCL state information is lost. This is primarily an issue for downloaded fonts.

When the user uses Jumbo, *permanent* downloaded PCL fonts are no longer available. The user must configure any PCL applications to download fonts for each job. This is an issue for both Windows and non-Windows applications which use permanently downloaded fonts.

Localization

*Driver Ready for Additional Languages

The driver is written to be localized to other languages.

Engineering Impacts

It also means we follow the IPG standards for localization — all strings and messages have to come from resources, etc.

Cartridge Not Localizable

The Jumbo cartridge is not a localizable. The cartridge has no support for multiple language display on the printer nor on the pages printed directly by the printer.

---

[1] Unless a font cartridge had to be removed to make room for the Jumbo cartridge.

Installation                                                                                                    10/01/92

Installation

Cartridge

Cartridge installation is straightforward. The user turns the printer off, places the Jumbo cartridge in the leftmost slot, then turns the printer on.

Driver

*Driver is Automatically Installed

Driver installation is automated as much as possible and is initiated by running the Jumbo installation program supplied on the driver disk.

If the printer is connected directly to the PC using a complete serial or complete parallel interface (as opposed to a network connection or a serial connection with an incomplete cable) the printer will automatically supply the installation program with all the information needed to install the driver. This includes the printer model, printer memory size and installed options.

If the printer is not directly connected to the PC, the user will have to supply this information.

The installation process is described in the *Jumbo Installation Functional Specification* document.

*Printer Can Print Current Configuration Information

If the printer is not directly connected to the PC, the user will have to specify the printer configuration when installing the Jumbo driver. To assist the user in providing this information, the installation program has a command which prints a configuration page. This page has all of the information (model, memory) that the user must enter in the driver setup dialog box.

This page is in the same format as the driver setup dialog box described in the *Jumbo Install Functional Spec*. In particular, this printer setup page exactly matches the dialog box, with the exception of having all of the fields filled with the appropriate values.

Jumbo Cannot Be Installed Using the Windows Control Panel

Unlike other printer drivers, Jumbo cannot be installed using the Windows Control Panel application. The user must use the Jumbo Installation Program (described in the *Jumbo Install Functional Spec*).

Printing                                                    10/01/92

Printing

General

*Resolution Enhancement Supported

Resolution enhancement is used when Jumbo is installed in printers with the appropriate hardware (i.e. LaserJet III, LaserJet IIId and LaserJet IIIp). This resolution enhancement is selectable by the user on the "Options Dialog Box" on page 31.

The settings for resolution enhancement are: *Off, Light, Medium,* and *Dark.*

*Multiple Resolutions Supported

Jumbo allows the user to print in either 300 dpi or 150 dpi.

Resolution is determined by the setting the user makes in the printer setup graphics dialog box and affects both graphics and text.

The resolution will also be changed automatically if a page cannot be printed at the current resolution. This occurs when the printer does not have enough memory to hold the entire page at full resolution.

Paper Handling

*Paper Source Options Supported

All of the paper source and handling options available with PCL are available with Jumbo with the exception of automatic duplexing and envelope feeders. This includes supporting all of the paper trays and sizes as well as manual feed.

The paper sources supported are:

- Letter Tray
- A4 Tray
- Legal Tray
- Executive Tray
- Envelope Tray
- B5 Tray
- Manual Feed

*Jumbo Supports Multiple Collated Copies

The printer setup dialog box gives the user the option of collating pages when more than one copy is selected.

Jumbo does not provide a separator page between the multiple copies.

*Jumbo Provides Manual Duplexing

Jumbo provides the ability to print on both sides of paper when using a printer which does not specifically provide duplexing capability. This is accomplished by printing the pages on one side and then having the user place the printed pages in the paper tray in the correct orientation for the other pages to print.

When manual duplexing is enabled, the user can enable an "indicator" page which is printed at the beginning of every job. This page has a large arrow and directions on how to re-insert the pages in order to print the other side.

Jumbo Does Not Support Automatic Duplexing

Jumbo does not support the automatic duplexer on the IId and IIId printers. However, manual duplexing is available on all models, including these.

The user can still perform automatic duplexing when using the PCL driver.

*Jumbo Provides Optional Header and Trailer Pages

The user has the option of including a header page and/or a trailer page in every job. These pages are described in "Printed Pages" on page 63.

Printing                                                            10/01/92

*Jumbo Pre-feeds Paper

A Jumbo printer can begin feeding the paper into the printer before the printer is actually ready to print the page. This increases performance for the first page. This pre-feed can cause problems because when the page is held in the partially fed position it increases wear and heats the page.

By default, Jumbo only pre-feeds the paper when directly connected using a parallel interface. This can be overridden by an undocumented WPS.INI setting PREFEED. If the line:

PREFEED=1 is in the WPS.INI file, pre-feed is enabled for that printer regardless of the current connection. If the line:

PREFEED=0 is in the WPS.INI file, pre-feed is disabled for that printer regardless of the current connection.

Fonts

*TrueType Fonts are Supported

TrueType fonts are supported automatically by the printer and driver. No user interaction is required to use TrueType fonts.

TrueType fonts are supported in any orientation and are printed at the current user-selected resolution.

*ATM Fonts are Supported

If Windows has ATM installed, Jumbo will work properly and use the Adobe fonts. No user interaction is necessary to enable this feature.

Engineering Impacts

There may be none. This may just work. In any case, the idea is to make sure we don't do anything which prevents ATM from working, not that we expend effort to ensure it works.

Device and Cartridge Fonts Not Available

Device fonts and PCL cartridge fonts are not available with the Jumbo driver. These fonts will not appear in font selection lists when the Jumbo driver is selected.

These fonts are still available if the PCL driver is used.

Printing 10/01/92

Quality

*User Can Select Three Halftoning Methods

The user has the option of using one of three halftoning methods. Note that these settings only affect printed bitmaps.

1. No halftoning (BLACK AND WHITE) for highest speed, lowest quality images. In this mode, all colors are mapped to either black or white.

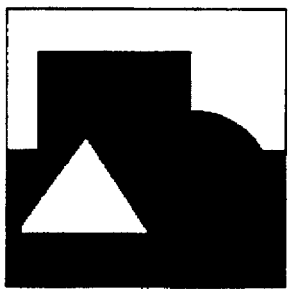

Figure 6: Black/White Halftoning Example

2. Better halftoning for medium speed, medium quality images. This is the normal Windows halftoning, an 8x8 ordered dither, the only option available when using non-Postscript drivers. This is also the default Jumbo halftoning method. This method will provide results which are subjectively as good as Postscript halftoning.

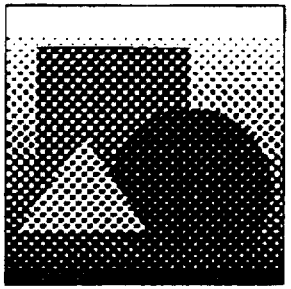

Figure 7: Ordered Dither Halftoning Example

| Printing | 10/01/92 |
|---|---|

3.     Great halftoning for lower speed, high quality images. This is Floyd-Steinberg error diffusion with randomization. This option takes significantly longer than other halftone methods, but produces the fewest halftoning artifacts.

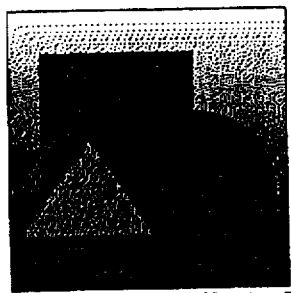

Figure 8: Error Diffusion Halftoning Example

Stability

*All Pages Print With Full Page of Memory

When the printer has a full page of memory (at least 1.5 megabytes), all possible pages will be correctly printed. Adding additional memory may increase performance, but is not necessary for any image.

*Jumbo Prints Any Page PCL or Postscript Prints

It is possible that some complex pages may not print at full 300 dpi resolution with less than 1.5 megabytes of memory in the printer. If the printer status window is running, the user is notified and is advised to add additional memory to the printer (see "Low Printer Memory Dialog Box" on page 37).

The information on automatic reducing of resolution is available even if there is no bi-directional communication between the printer and PC.

Jumbo will always print at full resolution any page that PCL or Postscript can print at full resolution.

*A Failed Job Cannot Affect Any Other Job

While it may be possible (though not likely) for one job to fail, this failure will never affect any other job. Printing errors are localized and future jobs sent to the printer will never be affected.

Engineering Impacts

A job is defined as a user's "File Print" session or more specifically, an OpenDC()/CloseDC() pair.

Host User Interface								10/01/92

Host User Interface

This section describes the Jumbo user interface, including the Queue Processor, the Device Setup and Printer Manager. The Jumbo installation program is described in the *Jumbo Install Functional Spec*.

General

Standards Followed

The Jumbo user interface follows the *Microsoft Windows User Interface Guidelines* and the Microsoft User Interface Task Force guidelines as much as possible.

All "times" shown by Jumbo use the international settings set by the user in the control panel.

*Every Dialog Box Has Help Available

Every dialog box in Jumbo has help available. Help can be accessed anywhere by pressing the *Help* button or pressing *F1*.

*All Printing Errors Have Optional Sound Support

Every error message which appears can have an associated sound when bi-directional I/O is available. The actual sounds used are configured using both the control panel and the printer setup dialog box.

These sounds are described in "Sounds" on page 59.

Supports Print to File

If an application supports printing to a file, Jumbo will support this. Jumbo operates just like other printer drivers, providing no special file extension (though the .JFY extension is suggested).

The device characteristics of the last print job is used when creating the file.

Printer Setup

Overview

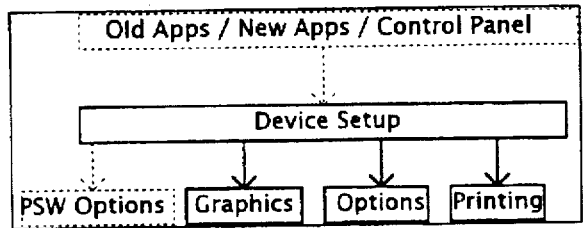

Figure 9: Printer Setup Flowchart

Values set in the Device Setup dialogs are returned to the application calling the driver. The retained values work exactly as any other driver, usually retained for a given document.

The device setup dialogs appear centered on the currently running application.

Device Setup

This is the dialog box which configures "printer properties." Changes made in this dialog box affect all print jobs. This is the dialog box that applications show when the user chooses "Printer Setup."

Host User Interface                                              10/01/92

Image

If the current printer status is available, the printer picture shows the paper currently loaded in the printer.

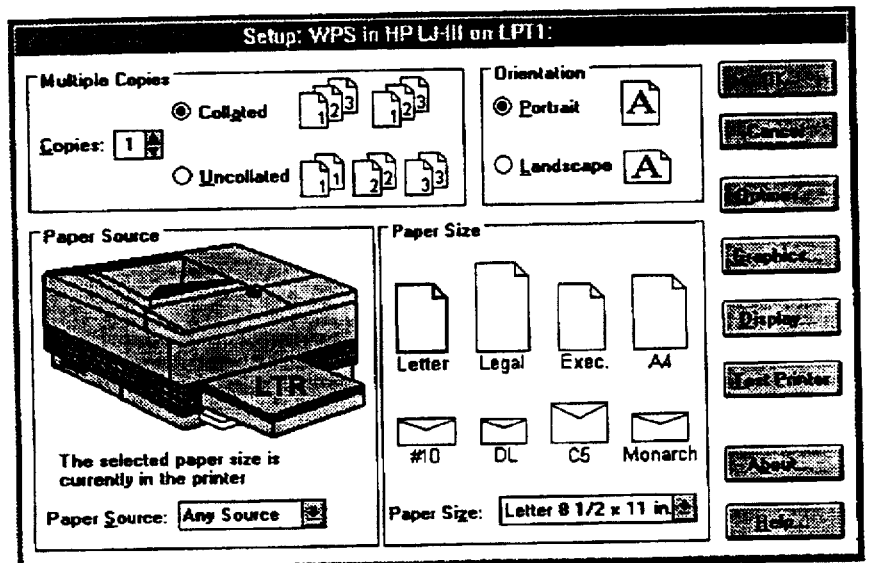

Figure 10: Device Setup Dialog Box

The user selects the paper size using either the paper size bitmaps or the paper size combo box. The paper size bitmaps are selectable using the mouse. The combo box can be used by either the keyboard or a mouse. The currently selected paper size is shown in the combo box and, if the selected paper size has an bitmap, that bitmap and the corresponding text are emphasized.

The user selects the paper source by using either the paper source bitmap or the paper source combo box. The paper source bitmap is selectable using the mouse. The combo box can be used by either the keyboard or the mouse. The currently selected paper source is shown in the combo box and in the bitmap.

When the user uses the bitmap to select the paper source, operation is straightforward. If the user clicks the mouse anywhere in a tray, that tray is selected. If the user clicks the mouse anywhere on the front of the printer above the tray, manual feed is selected. If the user clicks anywhere else on the printer, "Any Source" is selected.

When the user selects a paper source with the mouse, the part of the printer representing that selection is "flashed." That is, when the user clicks on the upper tray, the upper tray flashes and is selected as the paper source.

When the mouse cursor is over a part of the printer bitmap which can be selected, the mouse pointer changes to the standard Windows "hand" pointer to emphasize that a selection is available.

Host User Interface

For printers with only one source (like a IIP with no optional lower paper tray or a Series II), this mouse "Any Source" selection is translated to select the only paper source, turning off manual feed.

If the currently selected paper size matches the paper actually in the printer's selected paper source, the text underneath the printer bitmap is, "The selected paper size is currently in the printer."

If the currently selected paper size does not match what is actually in the printer, the text is displayed in red and reads, "The selected paper size is not currently in the printer." If the user has selected red as the background window color, the text is displayed as white instead.

If the user has selected manual feed or the MP tray, the text is displayed with normal emphasis and reads, "Load *papersize* when printing." *Papersize* is replaced by the name of the paper size selected by the user.

If bi-directional I/O is not available, the text is displayed as inactive (*grayed*) and reads, "Current printer status is not available."

In all cases, the message shown is only advisory. The behavior of the dialog box does not change. The user can accept a non-matching paper source. Note that when the job prints, the non-matching tray should be detected by the Printer Status Window and an error message will be displayed.

The printer bitmap changes according to the actual state of the printer in real time. If the user pulls the paper tray out while this dialog is shown, the printer bitmap changes to reflect this. It displays the following different status bitmaps:

| Bitmap | P's | P's w/tray | Series II | III | II D | III D |
|---|---|---|---|---|---|---|
| No Tray | ✓ | ✓ | ✓ | ✓ | ✓ | ✓ |
| Tray 1 | | ✓ | ✓ | ✓ | ✓ | ✓ |
| Tray 2 | | | | | ✓ | ✓ |
| Both 1 & 2 | | ✓ | | | ✓ | ✓ |
| Manual Feed | ✓ | ✓ | ✓ | ✓ | ✓ | ✓ |
| No Status | ✓ | ✓ | ✓ | ✓ | ✓ | ✓ |

Figure 11: Printer Bitmaps on Setup Dialog Box

Host User Interface                                                           10/01/92

The bitmaps described in figure 12 have the following appearance:

No Tray    This bitmap shows a printer with all trays removed.

Tray 1     This shows a printer with only the top tray. This is also used to describe a
           printer with only one tray — or the P-series with the bottom tray filled and
           the MP tray empty.

Tray 2     This shows a printer with only the bottom tray. This is only used for
           printers with two trays.

Both 1 and 2  This shows a printer with both trays. This is for printers with two trays and
           the P-series when both the bottom tray and the MP tray are filled.

Manual Feed  This shows a printer indicating "Manual Feed," probably with paper being
           inserted. This also is how the MP-tray is described in the P-series printers.

No Status  This shows a "grayed" printer, denoting that bi-directional communication is
           not available between the printer and the PC. This would be the case on a
           network or if the printer is currently printing a PCL job.

When BIDI is available, the label on each tray always reflects the type of tray currently loaded.
Note that this does not include the MP tray, because there is no way to automatically determine the
paper size loaded.

Paper Sizes Supported

Jumbo supports the following paper sizes:

| Name | Size | Has Bitmap? | Tray | Dialog Box Text |
|---|---|---|---|---|
| Letter (default) | 8½" x 11" | ✓ | LTR | Letter 8½ x 11" |
| Legal | 8½" x 14" | ✓ | LGL | Legal 8½ x 14" |
| Executive | 7¼" x 10½" | ✓ | EXEC | Executive 7¼ x 10½" |
| A4 | 210 mm x 297 mm | ✓ | A4 | A4 210 x 297 mm |
| B5 | 182 mm x 257 mm |  | B5 | B5 182 x 257 mm |
| Envelope #10 | 4⅛" x 9½" | ✓ | ENV | Env:#10 4 1/8 x 9½" |
| Envelope #11 | 4½" x 10⅜" |  | ENV | Env:#11 4½ x 10 3/8" |
| Envelope #12 | 4¾" x 11" |  | ENV | Env:#12 4 3/4 x 11" |
| Envelope #14 | 5 x 11½" |  | ENV | Env:#14 5 x 11½" |
| Envelope DL | 110 mm x 220 mm | ✓ | ENV | Env:DL 110 x 220 mm |
| Envelope C5 | 162 mm x 229 mm | ✓ | ENV | Env:C5 162 x 229 mm |
| Envelope Monarch | 3⅞" x 7½" | ✓ | ENV | Env:Monarch |

Figure 12: Supported Paper Sizes

The *Tray* column describes the tray that must be loaded in the printer to avoid the, "The selected
paper size is not currently in the printer" message.

Paper Sources Supported

The selectable paper sources vary according to which printer model is being used.

Host User Interface                                                                10/01/92

The Series II and III printers support two paper sources:

Tray          The paper tray (default)

Manual Feed   Manual feed

The IID and IIID printers support four paper sources:

Lower Tray    The lower tray (default)

Upper Tray    The upper tray

Manual Feed   Manual feed. This feeds paper from the uppermost tray which has paper in the manual feed slot.

Any Source    From the source which contains the correct paper size. The top tray is examined first, followed by the bottom tray.

The IIP, IIP+ and IIIP printers (without tray) support two paper sources:

MP Tray       The multi-purpose tray (default)

Manual Feed   Manual feed with pause. With P-series printers the printer is paused between pages. The user must press ONLINE or the resume button in the printer status window to resume.

The IIP, IIP+ and IIIP printers (with tray) support four paper sources:

Lower Tray    The lower paper tray (default)

MP Tray       The multi-purpose tray

Manual Feed   Manual feed with pause. With P-series printers the printer is paused between pages. The user must press ONLINE or the resume button in the printer status window to resume.

Any Source    Either the bottom or MP tray. The MP tray is assumed to have the correct paper size. The MP tray is examined first, followed by the lower (LC) tray.

The MP tray works exactly like the manual feed slot on non-P printers, never requiring the user to press continue and not displaying the manual feed status window if a page is already inserted.

Manual feed on the P printers requires that the user press "Continue" for each page.

Copies

The "Copies" field has a range of 1-99. The default value is 1.

The copies control acts as a spin button, with the up and down arrow keys incrementing and decrementing the number of copies.

Collation

The collation setting defaults to Collated.

Host User Interface                                          10/01/92

The collating options are both available even in the number of copies is set to 1. That is, the collating radio buttons are never disabled.

Orientation

The default orientation is Portrait.

Printing Test Dialog Box

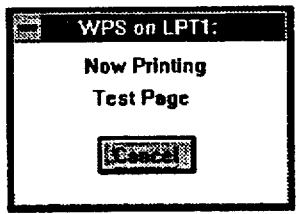

Figure 13: Printing Test Dialog Box

This dialog box is displayed while the test page is being printed. Note that only one copy of the test page is printed, regardless of the current user settings.

If the Setup Window was invoked from the Print Manager, the test page will not begin printing until the user exits the Setup Window.

Options Dialog Box

This dialog box is where the user sets document-specific options.

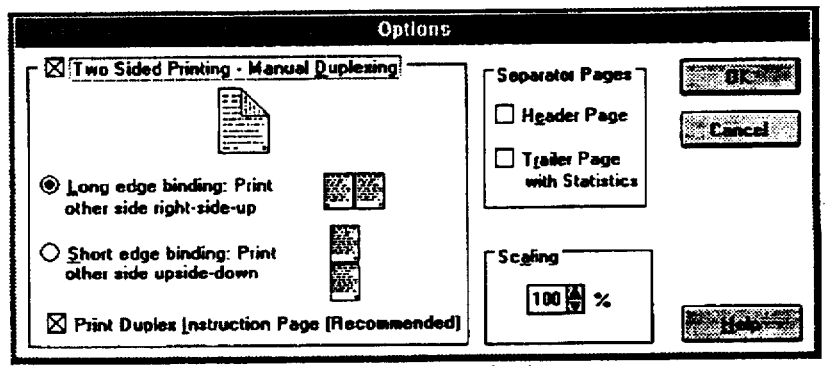

Figure 14: Options Dialog Box

Two Sided Printing - Manual Duplexing

This option allow the user to print on both sides of the page by manually refeeding the paper after the first side has printed. Note that the user's selection of "Long Edge" vs. "Short Edge" is maintained if this feature is disabled.

31

Host User Interface                                       10/01/92

The user selects the binding option by choosing the appropriate radio button, clicking the mouse anywhere within both lines of text, or selecting the bitmap.

The default value of duplexing is disabled, long-edge, with instruction page enabled.

The way manual duplexing operates varies according to the model of printer being used.

The Series II, III, IID, and IIID all operate similarly.

When the first side is printed, the user must open the back of the printer, providing a straight-through paper path. When the first half is complete, the user must reinsert the pages into the paper tray as the duplex instruction page describes. The instruction page is printed last in portrait mode. It shows whether the top or the bottom of the page should be towards the printer.

The paper is ejected into the straight-through paper tray face-up.

|  | Portrait | Landscape |
|---|---|---|
| Long-edge | Top toward printer face-down | Bottom toward printer face-down |
| Short-edge | Bottom toward printer face-down | Top toward printer face-down |

Figure 15: Duplex Instruction Page Orientation for II and II Printers

The IIP, IIP+ and IIP all operate similarly. The user prints the first half of the job, feeding from any paper source. The user must have the paper path set to route to the top of the printer, not to the front tray. When the first half is complete, the user must reinsert the pages into the MP tray, regardless of the original paper source. The duplex instruction page is printed first in portrait mode. It shows whether the top or the bottom of the page should be towards the printer with the same combinations as shown above.

The paper is ejected into the upper tray face-down.

|  | Portrait | Landscape |
|---|---|---|
| Long-edge | Top toward printer face-up | Bottom toward printer face-up |
| Short-edge | Bottom toward printer face-up | Top toward printer face-up |

Figure 16: Duplex Instruction Page Orientation for P Printers

If a paper jam occurs during the second half of a manually duplexed job, there is no way to recover. This should be fixed in a future version of the product.

Separator Pages

These options allow the user to print a page at the beginning of the job and/or a page at the end of the job. These pages are described in "Header Page" on page 65 and "Trailer Page" on page 66.

The separator pages default to off.

Host User Interface                                      10/01/92

Scaling

This option allows the user to shrink or grow every page of the entire job. Scaling works by changing the size of the paper as it is presented to the application. The possible range of scaling is from 10% to 400%. Scaling defaults to 100%.

The image is always scaled around the upper left hand corner, so an image scaled at 50% would look like:

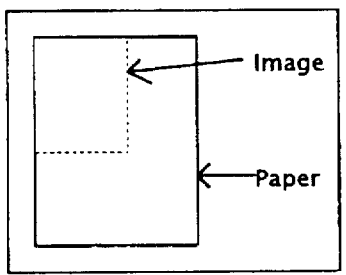

Figure 17: 50% Scaling

An image scaled at 200% would look like:

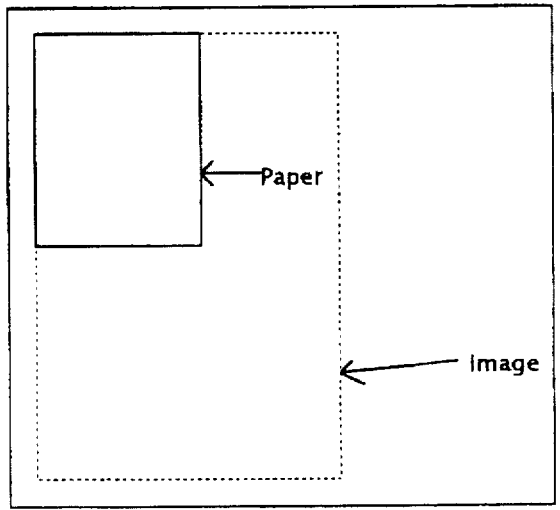

Figure 18: 200% Scaling

When the scale factor is set higher than 100%, the image is clipped to the printable area of the paper.

Graphics

This is where the user selects graphics/halftoning options.

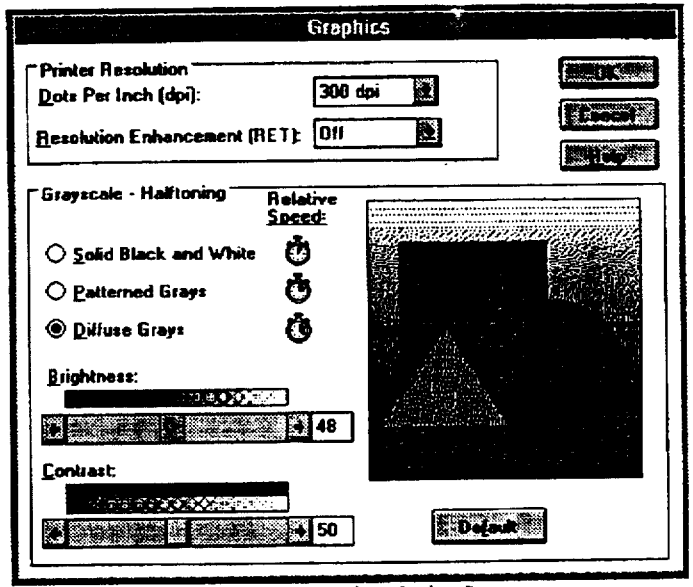

Figure 19: Graphics Dialog Box

When Jumbo is used with a printer model that does not have resolution enhancement, the "Resolution Enhancement" control is removed and the DPI control is moved down to be centered in the "Printer Resolution" group box.

The default for resolution is 300 and the default for RET is "Off".

The graphics method chosen affects only bitmap printing (DIB's). The brightness and contrast settings affect all graphics.

Some applications, notably desktop publishing and high-end graphics programs, will handle their own halftoning and these settings will not apply.

Because the halftoning process is not instantaneous, the slider bars for brightness and contrast are not fully tracked as they are changed. The picture is only updated when the user releases the thumb. While the halftoning process is in progress, the mouse pointer changes to the hourglass.

The "Default" button restores the halftone method, brightness, and contrast to the defaults: Ordered, 50, 50.

Brightness and Contrast

The brightness and contrast adjustments vary the conversion from gray level input to the Jumbo driver to gray level output on the page.

A normal, unadjusted conversion (brightness 50, contrast 50) looks like this:
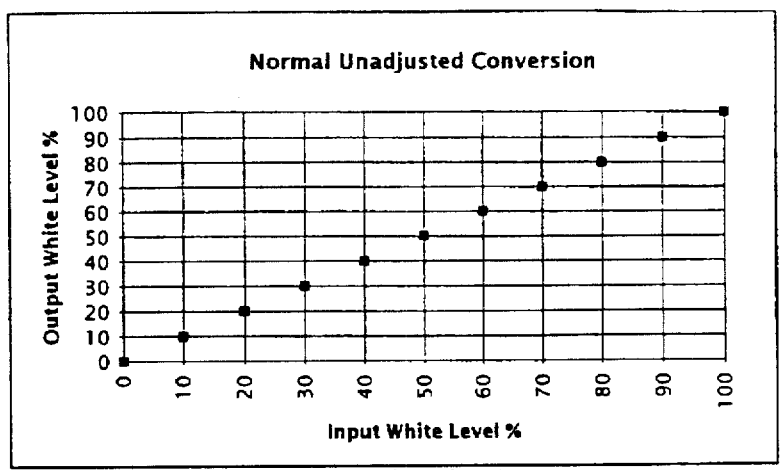
Figure 20: Unadjusted Graphics Conversion Host User Interface                                                              10/01/92

Brightness adjusts the position of the conversion line vertically. The formula is:

$$i_{out} = i_{in} + 2b - 100$$
where
$i_{out}$ = White level output (forced to 0...100)
$i_{in}$ = White level input
$b$ = Brightness setting Figure 21: Brightness Conversion Equation Adjusting the brightness of the image moves the conversion line up and down. For instance, increasing the brightness to 60 moves the line up 20% (i.e. 2*60 - 100 = 20):

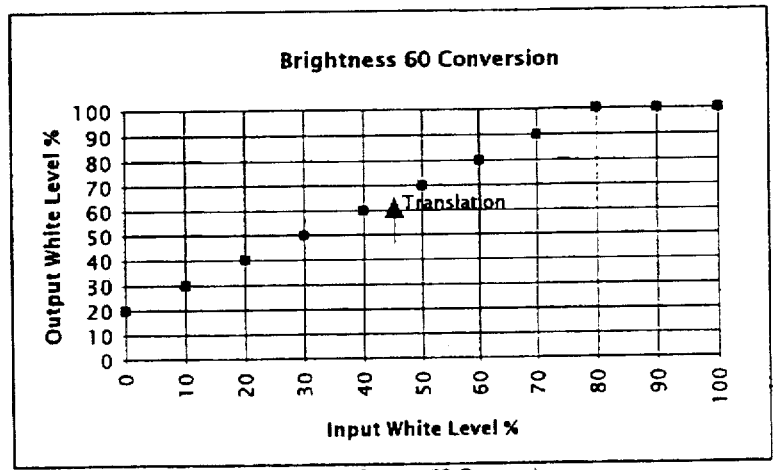

Figure 22: Brightness 60 Conversion

Contrast, on the other hand, is slightly more complex. Instead of translating the line up and down, it changes the rotation of the line about the mid-point. The formula is:

$$\text{if } c \leq 50$$
$$i_{out} = \frac{c(i_{in} - 50)}{50} + 50$$
$$\text{else if } c < 100$$
$$i_{out} = \frac{50(i_{in} - 50)}{100 - c} + 50$$

Figure 23: Contrast Conversion Equation

A contrast of 0 gives no contrast at all. The line is completely horizontal, giving 50% gray for every input. A contrast of 100 gives absolute contrast. The line is completely vertical, giving either black (0% white level) or white (100% white level) for every input. When this happens, the method is changed to *Solid Black and White* and the brightness setting adjusts the threshold.

As an example, a contrast of 70 rotates the line counter-clockwise, putting the *x-intercept* at:

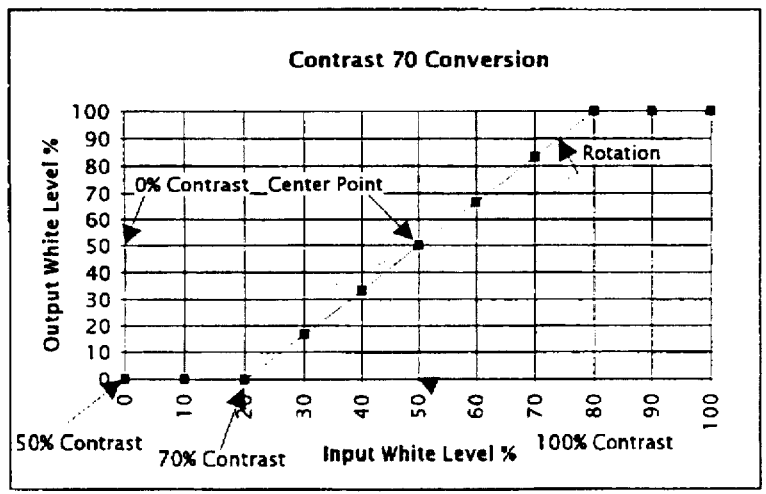

Figure 24: Contrast 70 Conversion

When "Black & White" halftoning method is selected, the contrast scroll bar and entry field are disabled. This is because the contrast control has no effect on black & white halftoning.

Low Printer Memory Dialog Box

When the printer has less than a full page of memory some complex pages will not be able to be printed at full 300 dpi resolution. When the user attempts to print a page that will not fit in the Host User Interface                                                                10/01/92 printer's memory, the resolution of the page is automatically reduced to 300x150 dpi. If it still won't fit the resolution is reduced again to 150x150 dpi, which is guaranteed to fit.

When a page in a print job has to be automatically reduced in resolution, the user is informed by the following dialog box. This dialog is displayed just before the printing process completes and the user is returned to the application. It displays whether or not bidi is available.

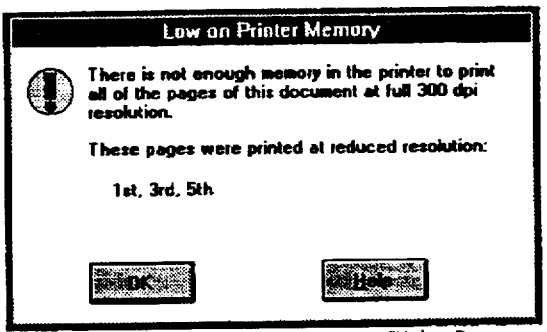

Figure 25: Low on Printer Memory Dialog Box

The page sequence numbers of the first 10 pages in the document that had to be automatically reduced are shown in the dialog. If more than 10 pages had to be printed at a lower resolution, only the first 10 page sequence numbers are displayed, followed by an ellipsis.

Cartridge Version Dialog Box

If bi-directional I/O is available, the driver will detect when the version number of the cartridge has changed. If the new cartridge will work with the current driver, the system is updated invisibly. If the cartridge will not work with the current driver, the following dialog box is displayed:

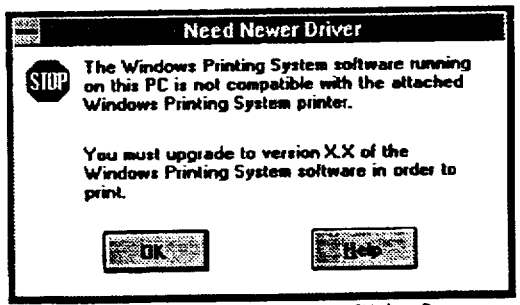

Figure 26: Need Newer Driver Dialog Box

This dialog box is displayed only once, as soon as the incompatible cartridge is detected. It will not appear again unless the cartridge is changed once again for a different version number.

If bi-directional I/O is not available, this dialog will not appear. Instead the "Configuration Changed" page will be printed whenever the user attempts to print a document.

Low PC Memory Dialog Box

This is actually a message box which says, "There is not enough memory available in the PC to perform this action." along with the stop sign icon. There is only the OK button.

Start Manual Duplex Dialog Box

When the user prints a two-sided document to a printer without bi-directional I/O and the "Print Duplex Instruction Page" checkbox is enabled, the "Start Manual Duplex" modal dialog box is displayed. This dialog is displayed before the job begins printing.

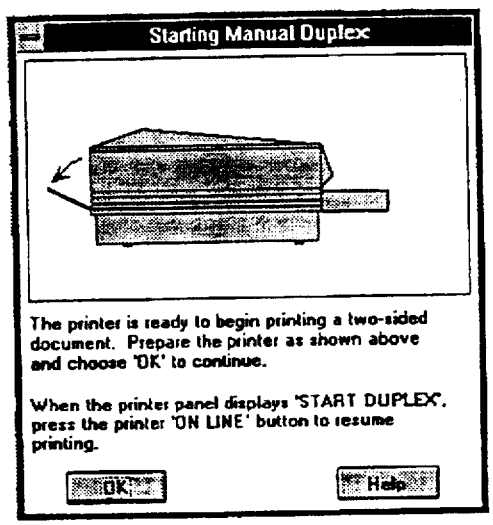

Figure 27: Start Manual Duplex Dialog Box

Host User Interface

The bitmap is the same as would be shown in the printer status window.

The printing process continues when the user selects OK.

Manual Duplex Dialog Box

When the first side of a two-sided job is completed in one-way mode and the "Print Duplex Instruction Page" checkbox is enabled, the job is paused and the "Manual Duplex" modal dialog box is displayed.

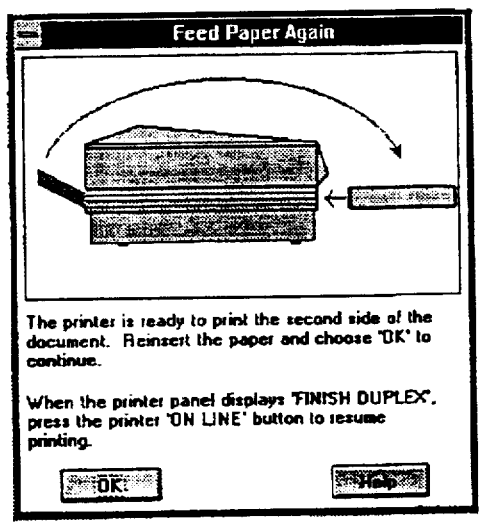

Host-User Interface 10/01/92

Figure 28: Manual Duplex Dialog Box

The bitmap is the same as would be shown in the printer status window.

The printing process continues when the user selects OK.

Print Manager

Overview

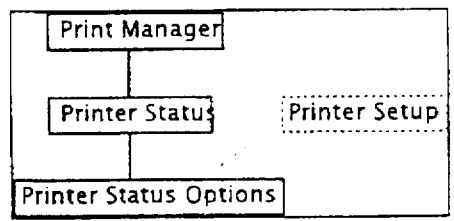

Figure 29: Print Manager Flowchart

Print Manager Main Screen

The Jumbo Print Manager is the Windows for Workgroups print manager, with the addition of an extra button which activates the Printer Status Window for those printers with a status window. If a WPS queue is shown in the Print Manager (a Jumbo printer or any other printer which uses a queue processor has been installed), the Status Window button appears. If no WPS queues are available, no button appears. If a WPS queue is selected, the button is enabled. If a non-WPS queue is selected, the button is disabled.

Note that Jumbo will not function with any current third-party print manager.

The Options menu in Print Manager contains setting for Separator Pages. Although the user can select this option, this setting will have no effect on Jumbo. Instead of printing these separator pages, Jumbo offers the user header and trailer pages. (see "Header Page" on page 65, and "Trailer Page" on page 66).

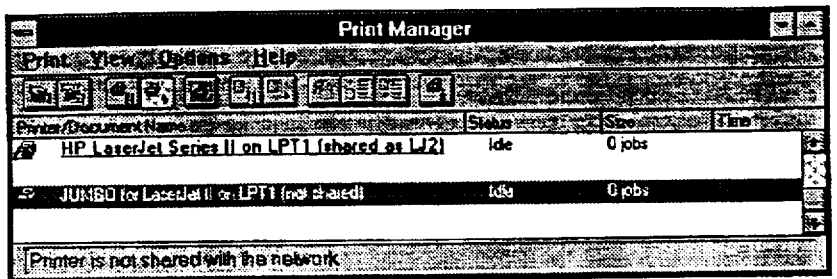

Figure 30: Windows for Workgroups UI Dialog Box

This dialog shows the "Net Connect Printer" and "Net Disconnect Printer" toolbar buttons. Depending on the existence and type of network these may not appear or only the "Net Connect Printer" button will appear.

If the user attempts to exit the print manager and there are no jobs listed in the print manager's list, but a job is still printing on the printer, the message box is displayed:

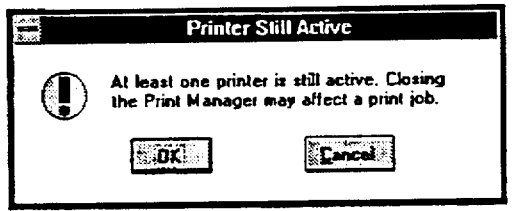

Figure 31: Closing Print Manager While Printer Still Active Dialog Box

Our Changes

Added "Printer Status Window" bitmap button and "Printer Status Window" menu option (under View).

The "Printer Status Window" command at the bottom of the Print Manager "View" menu will be enabled and disabled exactly the same as the associated button (i.e. active for WPS queues; inactive for non-WPS queues.)

The only other change to the behavior of the print manager with Jumbo installed is that deleting a Jumbo job when BIDI is available is much faster than normal. When the job is deleted in the print manager at most one more page will print from the attached Jumbo printer.

Host User Interface                                                  10/01/92

Not Enough Disk Space

When a manually duplexed and/or multiple-copies are printed collated, the entire job must fit on the user's temporary drive.

If there is not enough space when duplexing, the job cannot print and the following dialog appears:

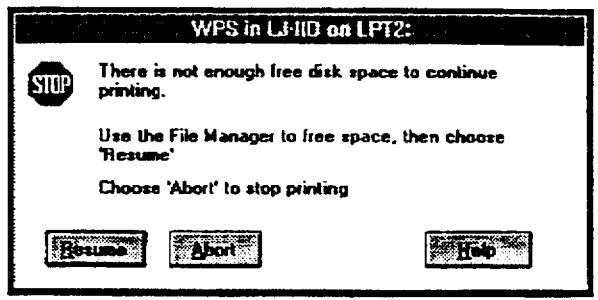

Figure 32: Not Enough Space Duplexing Dialog Box

If there is not enough space when printing multiple copies, it is possible to continue printing with a single copy. When this occurs, the following dialog is displayed:

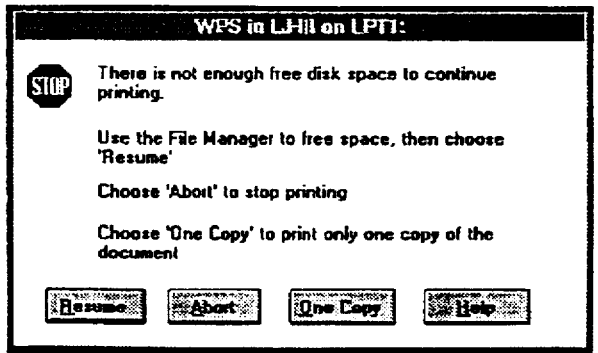

Figure 33: Not Enough Space Collating Dialog Box

Setup In Use

This dialog box is displayed if the user tries to open a second instance of the printer setup dialog.

Host User Interface

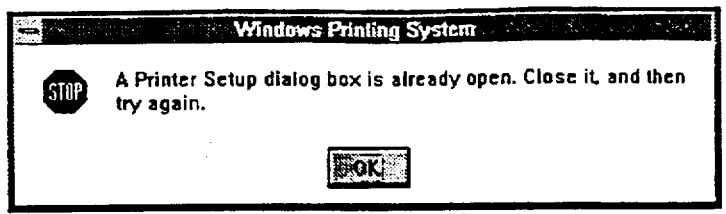

Figure 34: Setup In Use Dialog Box

Bad Configuration

When the data in the WPS.INI file is invalid, the user must run the Jumbo install program in order to use the printer. This dialog is displayed when the WPS.INI file information is invalid.

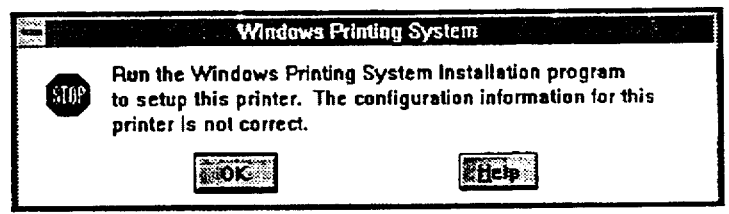

Figure 35: Bad Configuration Dialog Box

Low Memory

The following message box is displayed when there is not enough memory for the Windows Printing System to operate. The current operation ends.

Figure 36: Low Memory Dialog Box

Host User Interface                                                                 10/01/92

Printer Status Window

The Printer Status Window is a Jumbo-specific applet which displays the current status of an active Jumbo printer and job.

The status window is only available when bi-directional I/O between the PC and printer is available. If the user is printing over a network or using a strange switch box, the *Status Not Available* dialog box will display..

Behavior

General

1. The Printer Status Window never moves unless the user moves it. Once the user moves the window, it always appears in that place. There is one position for the non-iconized status window, that's where the user last put it.

2. If an error occurs or user intervention is required, the status window always appears full-size and displays the error information. When the error is fixed, the window returns to its previous state unless the user "touched" the window. Touching the window means interacting with it in any way. This includes moving, accessing a menu, clicking the mouse in the window, minimizing, and maximizing. The window can only be "touched" by user action directly on the printer status window.

3. The Printer Status Window is never system modal. The user can always switch to another application and continue working (subject to the normal compatibility limitations.)

4. States that require user intervention (like paper out, or cover open) always have priority over informative messages (like toner low).

5. Whenever the status window appears full-sized it is placed on top and is given the focus.

6. In all other respects the status window behaves as a standard Windows application. For instance, whenever the status window is selected using the task list it will appears full-sized.

7. In addition to the standard menu items on the system menu (displayed when the close button in the upper left hand corner is clicked once), the option of "Always on Top" is presented at the bottom, in its own group (see Clock). This option is selected as the default behavior of the window and the icon.

8. The Status Window Title bar should read "Windows Printing System on <port name>".

9. The Status Window job information group box will display "Printer Ready" rather than "Windows Printing System" during the Idle state.

10. The Pause and Resume buttons in the Status Window continue to be active even when status is not available.

Host User Interface                                                    10/01/92

11. The "Status not Available" Status Window displays if a WPS queue that is one-way is selected when the button is pressed.

12. Whether or not the Status Window button is enabled, the Print Manager message bar displays the text "Shows the Printer Status Window".

13. The Status Window should not include any text describing how many pages have printed until the first page has left the printer. It should then say "1st page printed." When the nth page of a multiple page print job has been printed, the text should read "1st - nth page printed."

14. The Status Window doesn't display when printing to a file.

Errors

When an error occurs or user intervention is required, the Printer Status Window always displays full-size, on top, with the focus. When the error is fixed, the window automatically returns to it's previous state (appearing, iconized, full-size) and the previously active window regains the focus.

Printing Direct

When the user has explicitly disabled the Print Manager, and therefore spooling, the Printer Status Window is only available if the user set the "Automatically Show Status Window" option in the Printer Status Window Options dialog box.

There is one exception to this. If an error occurs and the user manipulates the Window, it does not return to its previous state — and so it remains available for the user.

When printing in direct mode, the Status Window behaves in two modes:

1. Before the application has finished with the last page of the print job.

- The text box displays "Printing" (no time estimates are available until we know how many pages are in the job).

- The animation does not include any text describing how many pages are in the PC (because we do not know how many are in the job, nor do we spool any pages.)

- The status bar does not show any graphical changes (we don't know how big the job is.)

- The status bar text shows the same text as the pages printed text in the animation box. Blank until first page printed, "1st page printed", "1st - nth pages printed".

2. After the application has finished with the last page.

- The Status Window behaves exactly the same as when printing in spooled mode.

Host User Interface                                                  10/01/92
State Diagram
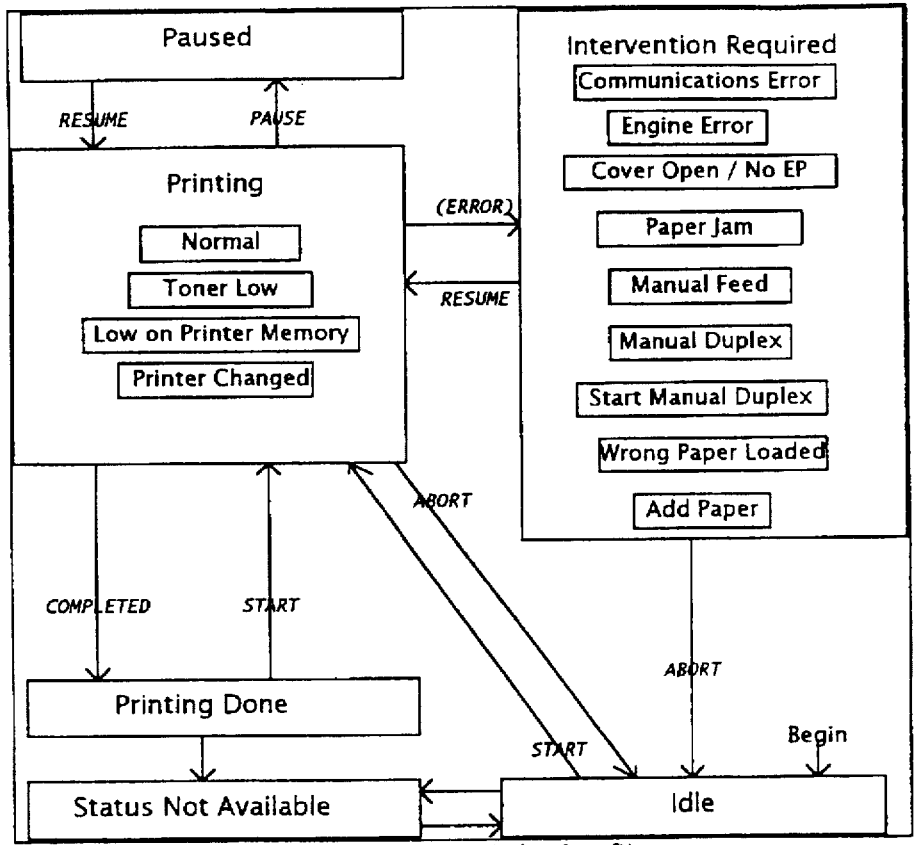
Figure 37: Printer Status Window State Diagram
The Printer Status Window Appears When
- ... the user presses the "Examine Printer" button in the Print Manager
- ... the user has selected the "Automatically Display Printer Status" option and the user prints a document
- ... an error occurs or user action is required Host User Interface                                                                       10/01/92

The Printer Status Window Disappears When

- ... the user explicitly closes the window

- ... the print job ends if the window appeared because of the "Automatically Display Printer Status" option *and* the user didn't touch the window. Job ending is defined as the point when the last physical page of the job exits the printer.

- ... the error state ends or the manual action is performed, if the user didn't touch the window

The Printer Status Window Appears As an Icon When

- ... the user explicitly minimizes the window

- ... the user starts the printer status window if the last state of the window was iconized

- ... the window implicitly appears because of the "Automatically Display Printer Status" option and the last position the user moved the window to was an icon

The Printer Status Window Appears Full-sized When

- ... the user "restores" the window explicitly

- ... the user starts the printer status window and the last position the user placed the window in was full-size or there is no previous position available (like after the initial installation)

- ... an error occurs or a manual action is required

Host User Interface                                                      10/01/92

The Difference Between Spooled and Direct Printing Is That

- ... when printing direct, the printer status window only appears if there is an error or the user selected the "Automatically Display Printer Status" option.

- ... the user cannot start the Printer Status Window manually when printing direct.

- ... when the job is done, the Printer Status Window *always* disappears if printing direct.

Intervention Priorities

When multiple errors occur at the same time, the printer status window displays the most important. When the most important problem is fixed, the next in line is shown, etc. The errors are (in order, most important to least important):

- Communications Error
- Engine Error
- Paper Jam
- Cover Open / No EP
- Manual Feed
- Manual Duplex
- Start Manual Duplex
- Wrong Paper Loaded
- Add Paper

Printing

The *printing* state occurs when a job is actually being sent to the printer and there are no errors which prevent the job from completing.

In the printing state, there are various combinations of Pages Ready text, Pages Printing text, and Pages Printed text depending upon the state of completion of the print job.

There are sub-states when printing. When sub-states are displayed, the printing continues. These sub-states are displayed with the following precedence (from most important to least important):

- Printer Changed
- Low Toner
- Normal

When one of these sub-states is entered when the status window is iconized, the icon begins blinking. The icon stops blinking when the window is opened or the job completes.

Host User Interface     10/01/92

That is, if the printer's memory is low and the toner is also low, the *Printer Memory Low* dialog box is displayed.

If a sub-state box other than *Normal* is displayed, the user can click in the job information group box or press the *Enter* key to display the *Normal* dialog box. This does not apply to the icon.

Normal

The normal status window is displayed when printing is proceeding normally and none of the other *Printing* sub-states apply (i.e., Low Toner, etc.)

Figure 38: Printer Status Window - *Normal*

Menu

The menu is organized:

Options
    Display...    Opens display options window
Job
    Pause    Same as Pause button
    Resume    Same as Resume button
    Delete    Same as Stop/Cancel button
Help
    <standard help dialog>

Pause Button

The *Pause* button puts this queue into the *Paused* state and no more pages will emerge from the printer until the queue is resumed. This button is selected when the queue is paused.

Note that either the Pause or the Resume button is selected at all times job is printing. The selected button shows whether the job is printing or paused. If the job is printing, the Resume button is pressed. If the job is paused, the Pause button is pressed.

When bi-directional I/O is available between the PC and the printer, the pause functionality is duplicated on the printer front panel using the ONLINE button. See "Printer User Interface" on page 79.

This button functions the same as the pause button on the Print Manager. Because of this equivalency, the pause button is always available.

Using the pause button in the *printer status window* has the side-effect of "touching" the window, which causes it remain after the job has completed. Using the printer front panel does not have the effect.

When the Pause button is pressed, the printer is paused. No print jobs will be printed until the printer is resumed. This is true whether the Print Manager's pause button or Status Window Pause is pressed.

The printing paused sound is played only once per button press.

Host User Interface                                                                  10/01/92

Resume Button

The *Resume* button resumes a queue which has been paused. This button is selected when the queue is not paused.

When bi-directional I/O is available between the PC and the printer, this functionality is duplicated on the printer front panel using the ONLINE button. See "Printer User Interface" on page 79.

This button functions the same as the resume button on the Print Manager. Because of this equivalency, the resume button is always available.

Using the resume button in the *printer status window* has the side-effect of "touching" the window, which causes it remain after the job has completed. Using the printer front panel does not have the effect.

Delete Button

-

Terminates the currently printing job. Once the delete button is pressed, it is not re-enabled until the terminated job actually ends. The next job queue begins printing or, if there is no job pending, the queue enters the *Idle* state.

This button is functionally identical to the delete job button in the print manager.

Job Info Group Box

The title of the group box is the string provided from the application as the Job title, prefixed with "Printing:". The estimated time left is determined by the driver and is quite accurate. The only variable is communication speed and. hence, estimates will be more accurate when using a parallel interface than when using a serial interface.

The time left is presented in the appropriate units. If the time left is greater than 2 hours, the time is presented as "xx hours." Otherwise if the time left is greater than 2 minutes, the time is presented as "xx minutes." Otherwise the time is presented as "xx seconds."

When the printer is paused, the estimated time finished is updated, increasing as needed.

Status Picture

The status picture shows the current status of the printer graphically.

When paper is in motion the printer status window accurately reflects the position of the paper in the printer. Except during manual feed paper is shown being fed from the appropriate tray then routed through the fuser and into the output bin. During manual feed the paper is shown being fed from the uppermost tray.

The status picture is special in that the background color for the image is always white and the text is always black. These colors are not selectable by the user.

Progress Bar

The progress bar shows how close to completion the current job is.

Host User Interface                                                                 10/01/92

The progress bar itself is blue against a white background. The text is printed "inverted blue." The text in the blue bar is printed white. The text in the white background is printed blue.

The progress bar operates on a page granularity, stepping at the end of every page. When page 5 of a 10 page document exits the printer the bar should move from 40% to 50% complete.

Printer Changed

If a job starts and the printer's configuration has changed since the last job printed (i.e., the user added memory, added the optional tray to a P-series printer, or changed the printer model), the user is informed. This involves replacing the information usually displayed in the job information group box with "Printer Changed."

As usual, the animation window will correctly show the model currently attached to the PC.

This has priority over both *Normal* and *Toner Low*, but is not displayed if *Add Printer Memory* is appropriate.

Note that if the printer changed between the time when the user began printing the job and when the job starts actually printing, the configuration page will be printed. If it is possible to print the job (see "Configuration Page" on page 73) the job will follow.

Toner Low

If the printer detects low toner, instead of the *Printing* state, the *toner low* state is displayed. Operation is exactly the same as the *printing* state.

Both the *Printer Changed* and *Add Printer Memory* sub-states have priority over the *Toner Low* sub-state.

The *Toner Low* state will only be entered once per job. As soon as the toner low status is detected, the message is displayed. If the user clicks on the window to remove the message it will not be displayed again in the currently printing job — though it will likely appear at the beginning of the next job.

Paused

The *Paused* state looks just like the *Printing* state except that the text reads "Paused: ..." instead of "Printing: ..."

Idle

The *Idle* state looks just like the *Printing* state except that the text reads "Ready" instead of "Printing: ..." The bitmap is *not* grayed like it is in the Status Not Available State.

During the idle state the trays shown in the printer are updated according to the actual state of the printer. When the user removes a tray it is automatically shown removed in the printer status window image. If the user reinserts the tray, it is automatically shown inserted.

The Pause and Resume buttons are available (though mutually exclusive). The Delete button is disabled.

Host User Interface                                                    10/01/92

When the Pause button is selected, the Job Information Group box title text displays "Paused:" and no application name or file name follows it.

If the printer cover is opened, the state changes to *Check EP / Close Cover*.

If the engine reports an error, the state changes to *Engine Error. (correct name?)*

In the Idle state, the various combinations of Pages Ready text, Pages Printing text, and Pages Printed text should not appear.

Complete

The *Complete* state looks just like the *Printing* state except that the text reads "." "Complete: ..." instead of "Printing:..." and there are no page numbers displayed. In addition, the "Pages Printed" text remains in the Status box, and the Progress bar text remains on the Progress bar.

The estimated time finished stops incrementing when the job is in the *Complete* State.

Status Not Available

This state is displayed when the current status is not available from the printer. This occurs when the printer is one-way or the printer is printing a PCL job or offline in PCL mode.

The printer shown is the correct model, but grayed. All of the controls are disabled — including the related *Job* menu choices. The user can still access the QP options dialog and help. Centered in the information text box is "Status Not Available".

There job information group box has no title in this state.

Note that when status is not available because the computer and the printer do not have bi-directional I/O, print errors are handled in the normal Windows manner.

Intervention Required

The *Intervention Required* state is entered if the user must do something in order to continue printing the job. Typically these are errors, but it also includes prompting for insertion on the next page when manual duplexing.

When in the *Intervention Required* state because of an error, the queue is paused and the *Pause* and *Resume* buttons on the toolbar are both disabled. The user can cancel the job using the *Stop* button. When the error is fixed, this dialog box is automatically replaced with the appropriate *Printing* dialog box. No user interaction other than fixing the error is required to terminate this dialog box except the manual operations.

When in the *Intervention Required* state because an expected manual operation is required (i.e. manual duplexing or manual feed on a P-series printer), the queue is paused and the *Pause* button is disabled. The user can cancel the job using the *Stop* button or indicate that the action has been taken by clicking the *Resume* button. The user can also indicate continue by pressing the *Enter* key. When the user continues, the appropriate *Printing* dialog box is displayed.

Host User Interface                                                                  10/01/92

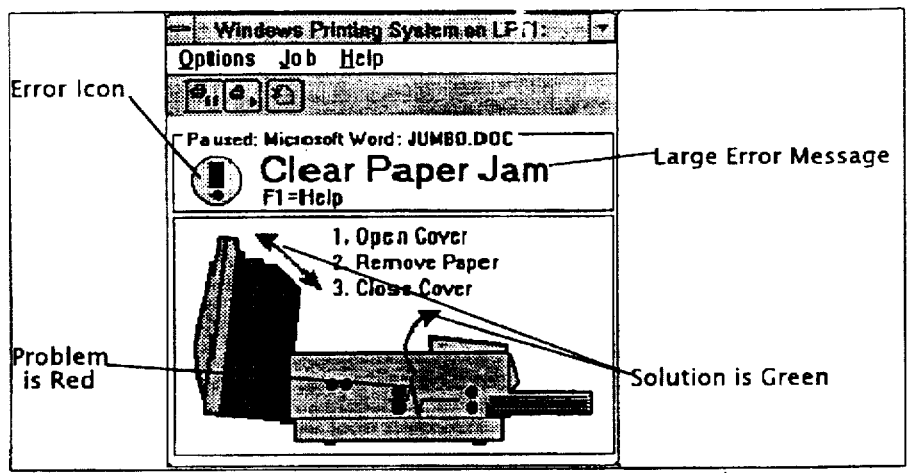

Figure 40: Printer Status Window - *Intervention Required*

This image illustrates the standard "intervention required" printer status window state. The job status information is replaced by the error icon and large text describing the solution for the problem. The title text in the Job Information Group Box changes to "Paused: doc text".

Paper Jam

The *Paper Jam* state occurs when the paper jams in the printer. The Printer Status Window is shown in the *Intervention Required* state and the bitmap is replaced by the appropriate paper jam bitmap for the current printer model.

The title text is "Clear Paper Jam".

Add Paper

The *Add Paper* state occurs when the correct paper tray is loaded in the printer, but it is out of paper. The Printer Status Window is shown in the *Intervention Required* state and the bitmap is replaced by the appropriate Add Paper bitmap for the current printer model and paper source.

The title text is "Add xxx Paper" where xxx is the paper size.

Wrong Paper Loaded

The *Wrong Paper Loaded* state occurs once any time the size of the paper desired by each print job from the application *changes* to conflict with the paper loaded. This includes the start of the job.

The Printer Status Window is shown in the *Intervention Required* state and the bitmap is replaced by the appropriate Load Tray bitmap for the current printer model and paper source.

When this state is displayed, the *Resume* button is enabled. If the user selects the *Resume* button, the job is printed on the currently loaded paper — even though it's the wrong size. No special processing is done, the page is just printed as if the correct size were loaded.

The user can also use the CONTINUE button on the printer front panel to print on the currently loaded paper. This has the side-effect of not touching the status window — which allows the window to resume its previous position and state. If the user presses the *Resume* button on the printer status window, this touches the window and makes it remain in the full-size state.

Communication Error (data lost)

If communication between the host and the printer is lost while a job was printing, or if the print data received by the printer is corrupt, the Communication Error state is displayed. The text in the text box is "Print Job Lost".

Figure 41: Printer Status Window - *Communication Error*

Communications Error (no data lost)

This dialog box is displayed when a printer does not accept data, but no actual data has been lost. The bitmap displayed is the same as the Communications Error (data lost). However the text box displays "Printer Not Communicating"

Host User Interface

Printer's Error Message

This dialog box is displayed if the printer detects any of the many engine errors. The display is the same as the *Paper Jam* dialog box except that the text is "Engine Error" and the picture is replaced by something that looks like:

(for more information, print w/o WPS,... manual

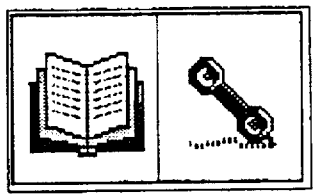

Figure 42: Printer Status Window - *Engine Error*

Start Manual Duplex

This dialog box is displayed when the user begins printing a manual duplex job and the user has selected "Print Instruction Page" for this job. The object of this dialog is to show the user what to do in order to print a manually duplexed job correctly. For non-P printers, this involves opening the straight-through paper path. For P-series printers, this involves making sure that paper is feed to the face-down tray on top of the printer.

The header text for this state is, "Prepare Printer".

Manual Duplex

This dialog box is displayed when the first half of a manual duplex job has been printed and the user must now reinsert the paper into the printer to print the second side. The display is the same as the *Paper Jam* dialog box except that the text is "Reinsert Pages" and the picture is replaced by the appropriate manual feed picture.

If bi-directional I/O is not available, the "Start Manual Duplex Dialog Box" (on page 39) and the "Manual Duplex Dialog Box" (on page 40) are shown instead.

Manual Feed

This dialog box is displayed before every page when the user has selected manual feed. The display is the same as the *Paper Jam* dialog box except that the text is "Insert xxx Page" (where xxx is the paper size), and the picture is replaced by the appropriate manual feed bitmap.

This dialog will not appear if the user has already inserted a page into a non-P-series printer manual feed slot.

Check EP / Close Cover

Some HP printers have a problem — they are not able to distinguish between the cover being open and the EP cartridge missing. Because of this, only one message is displayed for both of these errors.

Host User Interface

The text for this state reads, "Check Toner & Cover".

Icon

The icon for the printer status window shows the model of printer the user actually has connected. For each state there are different icons — one for each of the major classes of printers.

- LaserJet Series II
- LaserJet Series IID and IIID
- LaserJet III
- LaserJet IIP, IIP+ and LaserJet IIIP The appropriate icon is displayed for the model currently being used.

The behavior of the icon is identical to normal Windows application behavior, including moving the icon using the keyboard or mouse. The system menu for the icon is the standard Windows system menu.

Paused

Figure 43: Pause Icons

Printing

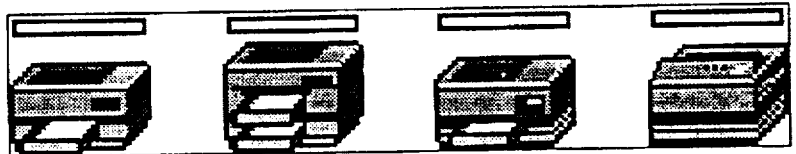
Figure 44: Printing Icons

The icons for the *Printing* state have a bar above the printer. This bar is filled in (from left to right) as the job is printed. The percentage of the bar filled represents the percentage of pages that have actually finished printing. The bar is empty until the first page exits the printer and would be filled completely when the last page exits the printer (where it is replaced by the *Printing Done* icon).

The progress bar is blue on a white background — a miniature version of the full progress bar.

Host User Interface
Intervention Required
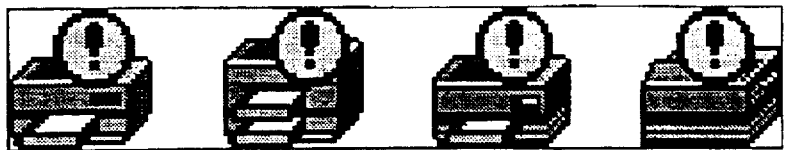
Figure 45: Intervention Required Icons
Printing Done
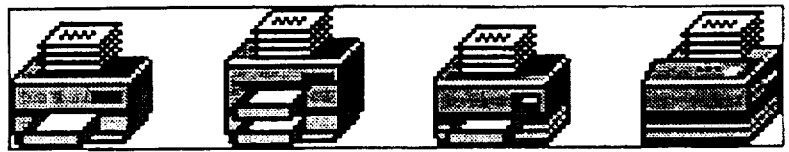
Figure 46: Printing Done Icons
Status Done Available
Figure 47: Status Not Available Icons Host User Interface

Idle

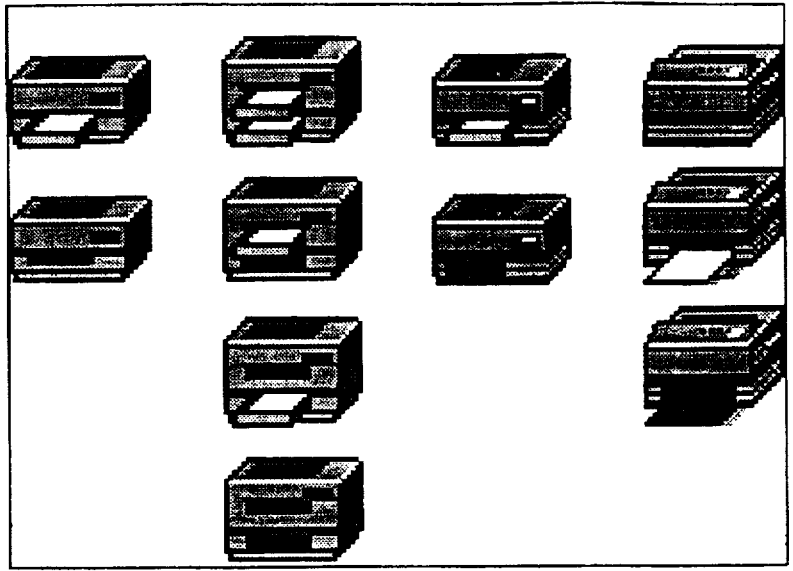

Figure 48: Idle Icons

Sounds

The printer status window provides sound support for the transitions state to state. These sounds are <u>only</u> produced during a print job, not when the printer is idle. They are also not produced for transitions between *Printing* sub-states (for instance, when toner becomes low). The sounds are:

| Sound Name | When Played | Voice says |
|---|---|---|
| Printing Stopped | When the user presses the *Stop* button | Printing stopped |
| Printing Complete | When the last page of a job leaves the printer | Printing complete |
| Printing Paused | When the user presses the *Pause* button | Printing paused |
| Printing Resumed | When the job resumes printing — either because the user corrected an error or because the user pressed the *Resume* button | Printing resumed |
| Printing Started | When the job begins printing — when the paper actually starts moving | Printing started |

Figure 49: Non-error Sounds

Host User Interface                                               10/01/92

Each error sub-state has its own sound:

| Sound Name | When Played | Voice says |
|---|---|---|
| Printer Paper Out | When the correct paper tray is loaded but no more paper is available. | Add paper to printer |
| Printer Comm Error | When the PC cannot communicate with the printer. | Printer not responding |
| Printer Cover Open | When the printer's cover is open | Cover open |
| Printer Error | When the printer's engine returns an error code | Printer error |
| Printer Duplex | When the printer is ready to print the second side of a 2-sided job | Feed paper again |
| Printer Feed | When the printer is ready for the next sheet | Feed paper |
| Printer Jam | When the paper jams | Paper jam |
| Printer Tray | When the wrong sized tray is loaded | Change tray |

Figure 50: Error Sounds

The sounds are installed in the WIN.INI file with the names specified in the "Sound Names" column as the user visible names. The unique id for each event is the user visible name with no spaces. The user can change the sounds attached to these events by using the Windows Control Panel.

Mode Switching and Status Display

The behavior of mode switching varies according to which interface is used and in what mode (standard or enhanced) Windows is running.

|  | Parallel | Serial |
|---|---|---|
| Enhanced | Printer status is displayed:<br>• when Print Manager is on and the status window is displayed in any form; or<br>• when Print Manager is on and an error occurs; or<br>• while printing, if requested. | Same as parallel. |
| Standard | Status is only displayed while printing. If an error occurs when not printing a Jumbo job, the "Communication Error" state is entered when a Jumbo job starts. The printer must switch from PCL to Jumbo mode at the beginning of every job, so there is a slight (around 5 seconds) delay. | Same as parallel |

Figure 51: Mode Switching Details

Host User Interface                                            10/01/92

Printer Status Window Options

Image

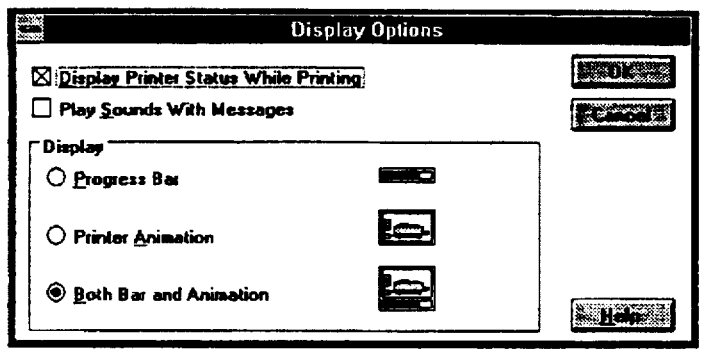

Figure 52: Printer Status Window *Display Options* Dialog Box

When sounds are disabled on the control panel or no wave driver is installed, the *Play Sounds With Messages* check-box is disabled (grayed) and unchecked.

The default values are set in the installation process. For a BIDI printer, the default is to have the *Display Printer Status While Printing* checkbox enabled. For a one-way printer, the default is disabled. The default for the Display options is *Both Bar and Animation*. The default for the *Display Window on Top* checkbox is checked.

Settings in this window define the behavior of the status window for all future jobs. These settings are retained in future invocations of the dialog box.

WPS.INI

Jumbo uses the WPS.INI file to hold various settings. Included in this file in comments is a description of each setting's purpose and usage.

Printed Pages                                                                 10/01/92

Printed Pages

The Jumbo product prints some Jumbo-specific pages. This section describes these pages.

Common Background

All these pages have the same general format. In particular, these will all fit on executive-sized (7¼" × 10½"), A4-sized, letter-sized (8½" × 11"), and legal-sized (8½" × 14") paper. If the paper size is other than executive, the information is centered horizontally and printed flush at the top of the printable area. Paper fed from the MP tray is not centered on non-executive paper. These pages will always be printed in portrait mode, regardless of the current user settings.

If there is no paper in the printer that is at least executive size, the printer displays the "Wrong Tray" message (see page 84) and prompts for any sized paper.

All pages print correctly on a LaserJet Series II with 512K of memory.

Printed Pages                                               10/01/92
Common Background Sample

Microsoft®
*Jumbo Beta 1*

Page Title

Printer Model on LPT1: (network name)

followed by the actual information. The title information and headers are printed in 18 pt Arial. The body text uses 12 pt Times New Roman. Text actually produced by the printer is in the HP LaserJet 12 pt Courier.

Header Page
Header Page
Windows Printing System on LPT1:
| Job | Microsoft Word: JUMBO.DOC |
|---|---|
| User | BILLMCC |
| Time Started | 12:02 am |
| Date Started | March 6, 1992 |

Trailer Page

Trailer Page

Windows Printing System on LPT1:

Printing Options

| | |
|---|---|
| Copies | 1 |
| Collated | Yes |
| Duplexing | Long edge |
| Duplex Instruction Page | Yes |
| Header Page | Yes |
| Trailer Page | No |
| Scaling | 100% |

Graphics Options

| | |
|---|---|
| Resolution (Dots Per Inch) | 300 |
| Resolution Enhancement (RET) | Off |
| Halftoning Method | Diffuse |
| Brightness | 50 |
| Contrast | 62 |

Fonts Used

| Typeface | Style | Size |
|---|---|---|
| Arial | Normal | 10 |
| Arial | Normal | 12 |
| Arial | Bold | 18 |
| Lucida Bright | Bold | 12 |
| Lucida Fax | Normal | 10 |
| Times New Roman | Normal | 10 |
| Times New Roman | Normal | 11 |
| Times New Roman | Normal | 12 |
| Times New Roman | Bold | 14 |
| Windows Logo | Bold | 64 |

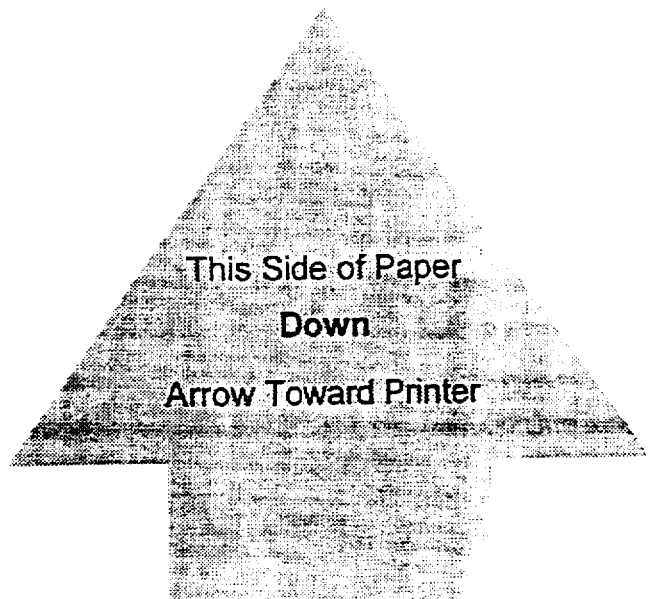

To finish printing this two-sided document:

1. Take all the pages of this document, including this one and any blanks.
2. Squarely stack the pages so the edges are smoothly aligned.
3. Flatten any curl in the paper by pulling the pages across the edge of a table.
4. Reinsert the pages into the paper tray, with this side down and the arrow toward the printer.
5. Press the ONLINE button on the printer, or the resume button in the printer status window.

Microsoft WINDOWS PRINTING SYSTEM

To finish printing this two-sided document:

1. Take all the pages of this document, including this one and any blanks.
2. Squarely stack the pages so the edges are smoothly aligned.
3. Flatten any curl in the paper by pulling the pages across the edge of a table.
4. Reinsert the pages into the paper tray, with this side down and the arrow toward the printer.
5. Press the ONLINE button on the printer, or the resume button in the printer status window.

↓ Arrow Toward Printer

Down

This Side of Paper

Test Page

Test Page

Windows Printing System on LPT1:

Printer Configuration

| Printer Model | LaserJet IIIp |
|---|---|
| Cartridge Conversion Code | 10106 |
| Total Printer Memory | 3.0 MB (3072K) |
| Available Printer Memory | 3072K |
| Printer Processor Speed | 16 Mhz |
| Cartridge ROM Version | 1.00.7.14 |
| Printer ROM Version | 19901209 |
| Printer Font Version | 19900713 |
| Upper Tray | n/a |
| MP/Manual Tray | Empty |
| Lower Tray | LTR ready |
| Pages printed | 6,570 |
| Active Interface | Parallel |
| Serial baud rate | n/a |
| Serial DTR polarity | n/a |
| Serial framing | n/a |
| Serial XON/XOFF | na |

PC Configuration

| Printer Mode | LaserJet III |
|---|---|
| Cartridge Version Code | 10106 |
| Total Printer Memory | 3072K (3.0 MB) |
| Printer Available Memory | 2933K |
| Printer Processor Speed | 16 MHz |
| Dynamic Communication | On |
| WPS Driver Version | 1.00.00 |
| WPS QP Version | 1.00.00 |
| WPS Comm Version | 1.00.00 |
| Play Sounds | On |
| Always On Top | Off |
| Status When Printing | On |
| Printer Status Window | Bar & Animation |
| Windows Version | 3.10.00 |
| Windows Mode | Enhanced |
| Network | Novell |
| Network Version | 3.11 |
| Processor | 486 |
| Coprocessor | Installed |
| Base OS Version | 5.00 |
| Base OS Location | High Memory |
| User Free % | 19% |
| GDI Free % | 67% |
| Mouse installed? | Yes |

70

Configuration Page

The Configuration Changed Page prints when a job starts and the printer's configuration changes (i.e., the user adds memory, adds the optional tray to a P-series printer, or changes the printer model) since the time when the user began printing the job and when the job actually starts printing. The Changed Configuration Page is printed with the LaserJet's internal Courier 12 pt. font.

The following table indicates whether the print job will resume printing after the *Configuration Changed* page prints.

|  |  | Printed On | | | | | | | | | | |
|---|---|---|---|---|---|---|---|---|---|---|---|---|
|  |  | II | IIP | IIP w/LC Tray | IID | II 16MHz | III 16MHz | IIIP | IIIP w/LC Tray | IIID 16MHz | IIID 16MHz | IIIP+ |
| Composed For | II | ✓ | ✓ | ✓ | ✓ | ✓ | ✓ | ✓ | ✓ | ✓ | ✓ | ✓ |
|  | IIP |  | ✓ | ✓ | ✓ | ✓ | ✓ | ✓ | ✓ | ✓ | ✓ | ✓ |
|  | IIP w/LC Tray |  | ✓ | ✓ | ✓ | ✓ | ✓ | ✓ | ✓ | ✓ | ✓ | ✓ |
|  | IID |  |  |  | ✓ | ✓ | ✓ |  |  | ✓ | ✓ |  |
|  | II 16MHz |  |  |  | ✓ | ✓ | ✓ |  |  | ✓ | ✓ |  |
|  | III 16MHz |  |  |  |  |  | ✓ |  |  |  | ✓ |  |
|  | IIIP |  |  |  |  |  | ✓ | ✓ | ✓ |  | ✓ | ✓ |
|  | IIIP w/LC Tray |  |  |  |  |  | ✓ | ✓ | ✓ |  | ✓ | ✓ |
|  | IIID 16MHz |  |  |  | ✓ | ✓ | ✓ |  |  | ✓ | ✓ |  |
|  | IIID 16MHz |  |  |  |  |  | ✓ |  |  |  | ✓ |  |
|  | IIIP+ |  |  |  |  |  | ✓ | ✓ | ✓ |  | ✓ | ✓ |

| Mouse port | COM1 |
|---|---|

| 1.4 | 71 |
|---|---|

Configuration Changed Page

The printer's configuration has changed.  The Windows Printing System
driver should be reinstalled on your system to guarantee correct operation
of this Windows Printing System printer.

Manual Printer Configuration Page
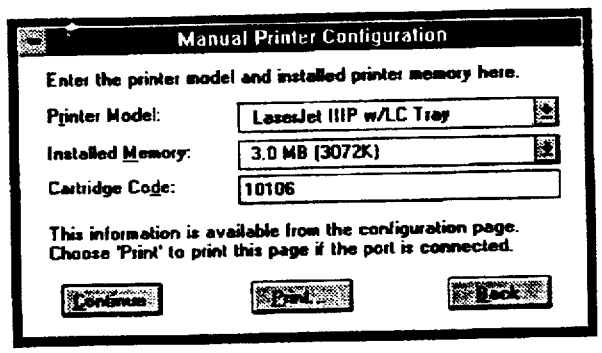

No Jumbo Page

```
Printing with the Windows Printing System requires the Windows Printing
System cartridge.  Please turn off the printer and insert the cartridge.
Then turn on the printer and print again.
```

Notes

Header Page

| | |
|---|---|
| JOB | Description of print job as passed from application. This information should always be available, but if not, the field shows "n/a". |
| USER | The user name from the installed network, or if this is not available, the volume label of the Windows drive. If there is no volume label, the field should have "Not Available" printed in italic. |
| TIME STARTED | This is the time the application initiated the STARTDOC for the print job. |
| DATE STARTED | This is the date the application initiated the ENDDOC for the print job. |

Trailer Page

| | |
|---|---|
| DUPLEXING | The duplexing setting for this job. The possible values are "Off," "Long edge," and "Short edge." |
| INSTRUCTION PAGE | Whether the user specified an instruction page for manual duplexing. The possible values are "Yes," "No," and "n/a." |
| HEADER PAGE | Whether the header page was selected. The possible values are "Yes," and "No." |
| TRAILER PAGE | Always "Yes." |
| RESOLUTION (DPI) | The currently set resolution: either 300 or 150. |
| RET | The current RET setting. Possible values are: "n/a," "Off," "Light," "Medium," and "Dark." |
| HALFTONING METHOD | Either "Solid B/W," "Patterned," or "Diffuse" |
| BRIGHTNESS | Current brightness setting (from 0-100) |
| CONTRAST | Current contrast setting (from 0-100) |
| TONER STATUS | Possible values are "OK" and "Low" |
| FONTS USED | This is a list of all of the fonts used in the document. If there are an extraordinary number of fonts and all of them cannot be listed, the title changes to "Fonts Used (Partial List)." |

Test Page

| | |
|---|---|
| PRINTER MODEL | Possible values are "Series II", "LaserJet IID", "LaserJet IIP", "LaserJet IIP+", "LaserJet III", "LaserJet IIID", "LaserJet IIIP". |
| INTERNAL ROM VERSION | 8 digit integer |
| INTERNAL FONT ROM VERSION | 8 digit integer |

| | |
|---|---|
| CARTRIDGE ROM VERSION | For the Jumbo beta, this is "1.00 B1". For the released product, this is "1.00". |
| PAPER SOURCES | This is the number of available paper sources. For the Series II, III, and P printers without trays, this is 2. For the D's and P's with trays, this is 3. |
| UPPER TRAY | This is the current state of the upper tray of D-series printers. For non-D printers this is "n/a". For D-style printers the possible values are "Empty", "*Tray* ready", and "*Tray* empty". The *tray* is replaced by the current tray code (i.e., LTR, LGL, A4, B5, ENV). |
| MP TRAY | This is the current state of the MP tray in P-series printers. For non-P printers this is "n/a". For P printers the possible values are "Empty" and "Ready". |
| LOWER TRAY | This is the current state of the lower tray of D-series printers, the optional lower tray of P-series printers, and the only tray of II and III printers. For P-series printers without trays, this is "n/a". Possible values are "Empty", "*Tray* ready", and "*Tray* empty". *Tray* is replaced by the current tray code (i.e. LTR, LGL, A4, B5, ENV). |
| TOTAL MEMORY | This shows how much RAM the printer has total. The possible values are "512K", "1 MB (1024K)", "1.5 MB (1536K)", "2 MB (2048K)", "2.5 MB (2560K)", "3.0 MB (3072K)", "3.5 MB (3584K)", and "4.0 MB (4096K)". |
| PROCESSOR SPEED | Possible values are "10 MHz" and "16 MHz". |
| PAGES PRINTED | This is the page count as recorded in the printer's NVRAM. The number is shown with commas (i.e. 23,232, not 23232). |
| ACTIVE INTERFACE | This displays the currently active I/O system. Possible values are "Serial" and "Parallel". |
| SERIAL BAUD RATE | This displays the current speed of the serial interface. If the serial interface is not active, this is "n/a" |
| SERIAL DTR POLARITY | If the serial interface is not active, this is "n/a". Possible values are "Low" and "High". |
| SERIAL FRAMING | This is the current byte format of the serial channel. If the serial interface is not active, this is "n/a". This is three characters. The first describes the number of bits transmitted; possible values are "7" and "8". The second describes the parity used; possible values are "N", "E", and "O". The third describes the number of stop bits; possible values are "1" and "2". |
| SERIAL XON/XOFF | This describes the current software flow control mode. Possible values are "Robust" and "Normal". |
| WINDOWS VERSION | This is the Windows version number of the system which initiated the test page. It will never be below 3.10. The last 3 digits are the subversion number. |
| VERSIONS: DRIVER, QUEUE PROCESSOR, COMM DRIVER, PRINT MANAGER | This is the version of the Jumbo system which initiated the test page. For the Jumbo beta this is "1.00 B1". For the released product, this is "1.00". The COMM driver version is for JCOMM, not the existing Windows driver. |
| WINDOWS MODE | Possible values are "Standard" and "Enhanced". |

| | |
|---|---|
| PRINT MANAGER | Possible values are "Enabled" and "Disabled". |
| NETWORK | The network currently active. Possible values are "n/a", "LAN Manager", "Novell", "Banyan", and "Lantastic". |
| NETWORK VERSION | The version number of the network. If there is no network or the information is not available, this is "n/a". |
| PROCESSOR | The processor type. Possible values are "286", "386", and "486" |
| COPROCESSOR | Possible values are "Emulated", "Installed", and "Internal". |
| BASE OS VERSION | This is the version of DOS currently running. |
| BASE OS LOCATION | Possible values are "Low memory", "High memory", and "ROM". |
| USER FREE % | The percentage of user memory free in Windows. |
| GDI FREE % | The percentage of memory free in GDI. |
| MOUSE INSTALLED | Possible values are "Yes" and "No". |
| MOUSE PORT | Possible values are "Bus", "COMx", "InPort", and "PS/2". |

Configuration Changed Page

This page is printed by the printer when a job is printed using a driver is installed for a printer with different settings. The font used is the LaserJet's internal Courier 12pt.

No Jumbo Page

This page is printed when a Jumbo job is printed, but there is no Jumbo cartridge in the printer. The font used is the LaserJet's internal Courier 12pt.

Printer User Interface
Overview
The printer has two major operating states: HP LaserJet mode and Jumbo mode. HP LaserJet mode presents the user with the same user interface that the printer supplied before the Jumbo cartridge was installed. Jumbo mode has no user options.
State Diagram
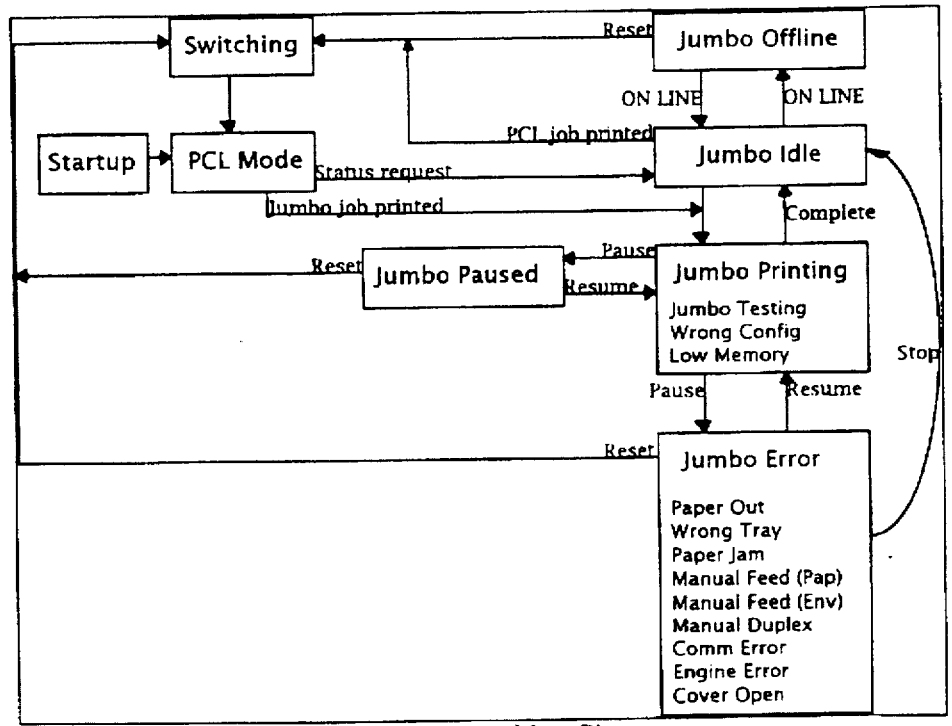
Figure 53: Front Panel State Diagram Printer User Interface                                                                 10/01/92

Operation

General

If the user presses a button on the front panel of the printer for which no action is defined, no action is taken. The button press is ignored.

When the printer is in Jumbo mode, the FORMFEED light on the printer's front panel indicates whether a job is currently printing.

The printer front panel always displays the current status of the printer when printing a Jumbo job, even if BIDI is not available.

The READY light works the same in Jumbo mode as in PCL mode. It is on when the printer has no errors and off if there is an error. This is independent of whether the printer is online or offline. For instance, if the tray is removed or the cover is opened, the READY light will turn off.

Controls

On the Series II printer, the RESET button is actually a press and hold of the *Continue/Reset* button. If the button is held less 3 seconds, it means CONTINUE.; if 3 or more seconds, RESET.

PCL Mode

Jumbo does not change the PCL front panel in any way. In PCL mode, the printer performs exactly as if no cartridge is installed. The front panel displays the same information and the buttons produce the same results.

The printer exits PCL mode to:

| | |
|---|---|
| Jumbo Idle | When a status request is received from the PC. Typically this is because the user has opened the *Setup Window* or the *Printer Status Window*, and the PC needs to receive the current status of the printer. |
| Jumbo Printing | When as Jumbo is sent to the printer |

Jumbo Idle

When the printer is in Jumbo mode, but no job is currently being printed, the following message is displayed:

| W | P | S |   | 1 | . | 0 | 0 |
|---|---|---|---|---|---|---|---|
| R | E | A | D | Y |   |   |   | or:

| W | P | S |   | 1 | . | 0 | 0 |   | R | E | A | D | Y |   |   |
|---|---|---|---|---|---|---|---|---|---|---|---|---|---|---|---| unless the toner is low. If the toner is low, the following message displays:

| W | P | S |   | L | O | W |   |
|---|---|---|---|---|---|---|---|
| T | O | N | E | R |   |   |   | or:

| W | P | S |   | L | O | W |   | T | O | N | E | R |   |   |   |

The printer exits Jumbo Idle mode to:

| Jumbo Offline | When the user presses the "ON LINE" button on the printer front panel. |
| Jumbo Printing | When a Jumbo job is sent to the printer. |
| PCL | When a PCL job is sent to the printer. |

The FORMFEED light is off. The ONLINE light is on.

Jumbo Printing

When the printer is in Jumbo mode, and a job is currently printing, the following message is displayed:

| W | P | S |   | 1 | . | 0 | 0 |
|---|---|---|---|---|---|---|---|
| P | R | I | N | T | I | N | G | or:

| W | P | S |   | 1 | . | 0 | 0 |   | P | R | I | N | T |   |   |

When a job is being printed that was destined for a printer configured differently than the current printer, the following message appears:

| R | U | N |   | W | P | S |   |
|---|---|---|---|---|---|---|---|
| I | N | S | T | A | L | L |   | or:

| R | U | N |   | W | P | S |   | I | N | S | T | A | L | L |   |

The printer exits Jumbo Printing mode to:

| Jumbo Paused | When the user presses the "ON LINE" button on the printer front panel or the "Pause" button in the *Printer Status Window* or the *Print Manager*. |
| Jumbo Error | When an error occurs. |
| Jumbo Idle | When the Jumbo job is completely printed. |

The FORMFEED light is on. The ONLINE light is on.

Printer User Interface                                                  10/01/92

Jumbo Paused

When this state is entered, the printer will stop printing pages. Any page that is currently in motion will continue — but no more will be started until this state is left.

When the printer is in Jumbo mode, and a the job is currently paused, the following message is displayed:

| W | P | S |   | 1 | . | 0 | 0 |
|---|---|---|---|---|---|---|---|
| P | A | U | S | E | D |   |   | or:

| W | P | S |   | 1 | . | 0 | 0 |   | P | A | U | S | E | D |   |

The printer exits Jumbo Paused mode to:

Jumbo Printing    When the user presses the "ON LINE" button on the printer front panel or the "Continue" button in the *Printer Status Window* or the *Print Manager*.

PCL    When the user presses the "RESET" button on the printer front panel.

The FORMFEED light is on. The ONLINE light is on until the current page completes printing, then it is off.

Jumbo Offline

When this state is entered, no more jobs will begin printing and the front panel displays:

| W | P | S |   | 1 | . | 0 | 0 |
|---|---|---|---|---|---|---|---|
| P | A | U | S | E | D |   |   | or:

| W | P | S |   | 1 | . | 0 | 0 |   | P | A | U | S | E | D |   |

The printer exits Jumbo Offline mode to:

Jumbo Idle    When the user presses the "ON LINE" button on the printer front panel or the "Continue" button in the *Printer Status Window* or the *Print Manager*.

PCL    When the user presses the "RESET" button on the printer front panel.

The FORMFEED light is off. The ONLINE light is off.

Jumbo Error

When a Jumbo job is printing and an error occurs or a user action is needed, one of the following messages is displayed.

Printer User Interface

The FORMFEED light is on. The ONLINE light is off.

Paper Out

When the correct paper tray is in the printer but it has no paper, the front panel displays:

| F | I | L | L |   |   |   |   |
|---|---|---|---|---|---|---|---|
| y | y | y |   | T | R | A | Y | or:

| F | I | L | L |   | y | y | y |   | T | R | A | Y |   |   |
|---|---|---|---|---|---|---|---|---|---|---|---|---|---|---| where "yyy" is replaced by the position of the tray (UPR, LWR, MP, ANY) or is removed when using a printer with only one tray.

Wrong Tray

When the correct paper tray is not in the printer, the front panel displays:

| A | D | D |   | x | x | x |   |
|---|---|---|---|---|---|---|---|
| y | y | y |   | T | R | A | Y | or:

| A | D | D |   | x | x | x |   | T | R | A | Y |   |   |   |
|---|---|---|---|---|---|---|---|---|---|---|---|---|---|---| where "xxx" is replaced by the name of the tray (LTR, LGL, A4, ANY, etc.) and "yyy" is replaced by the position of the tray (UPR, LWR, MP) or is removed when using a printer with only one tray or the user selected "Any Source.".

In this case, the user can also press the CONTINUE button on the printer's front panel in order to resume printing on the incorrect size.

Paper Jam

When a paper jam occurs, the front panel displays:

| C | L | E | A | R |   |   |
|---|---|---|---|---|---|---|
| J | A | M |   |   |   |   | or:

| C | L | E | A | R |   | J | A | M |   |   |   |   |
|---|---|---|---|---|---|---|---|---|---|---|---|---|

Printer User Interface                                              10/01/92

Manual Feed (Normal)

When the user needs to feed paper manually

| F | E | E | D |   |   |   |   |
|---|---|---|---|---|---|---|---|
| x | x | x | x | x | x | x | x | or:

| F | E | E | D |   | x | x | x | x | x | x | x | x |   |   |
|---|---|---|---|---|---|---|---|---|---|---|---|---|---|---| where "xxxxxxxx" is replaced by the name of the paper (LETTER, LEGAL, A4, ANY, etc.)

This message will not appear if the user has already put a page in the manual feeder of a non-P-series printer.

The MANUAL light is on if the printer has one.

Manual Feed (Envelope)

When the user needs to feed an envelope manually,

| F | E | E | D |   | E | N | V |
|---|---|---|---|---|---|---|---|
| x | x | x | x | x | x | x | x | or:

| F | E | E | D |   | E | N | V |   | x | x | x | x | x | x |
|---|---|---|---|---|---|---|---|---|---|---|---|---|---|---| where "xxxxxxxx" is replaced by the name of the envelope (MONARCH, COM 10, etc.)

This message will not appear if the user has already put a page in the manual feeder of a non-P-series printer.

The MANUAL light is on if the printer has one.

Start Manual Duplex

When a manual duplex job begins and the user must prepare the printer:

| S | T | A | R | T |   |   |   |
|---|---|---|---|---|---|---|---|
| D | U | P | L | E | X |   |   | or:

| S | T | A | R | T |   | D | U | P | L | E | X |   |   |   |
|---|---|---|---|---|---|---|---|---|---|---|---|---|---|---|

Printer User Interface                                                                10/01/92

Manual Duplex

When the user needs to feed paper manually to print on the second side:

| C | O | N | T | I | N | U | E |
|---|---|---|---|---|---|---|---|
| D | U | P | L | E | X |   |   | or:

| C | O | N | T | I | N | U | E |   | D | U | P | L | E | X |   |

The MANUAL light is on if the printer has one.

Communication Error

When a communication error occurs, the following message is displayed:

| C | H | E | C | K |   |   |
|---|---|---|---|---|---|---|
| C | A | B | L | E |   |   | or:

| C | H | E | C | K |   | C | A | B | L | E |   |   |   |   |

If the printer is idle, the message will stay until communications resumes or the printer is reset.

If the printer is currently printing and a job is lost because of the communication error, all pages correctly received will print, but as soon as the point where communications were lost is reached, the printer will go offline and display the CHECK CABLE message. The printer will not resume operation until the user presses the ONLINE key."

Engine Error

When an engine error occurs, the front panel displays a generic engine-failed message. The user should be directed in the documentation to follow HP's problem-determination procedures. Anything that causes Jumbo to display an engine error message will also cause PCL to display the appropriate message.

The following is displayed in Jumbo mode:

| N | E | E | D |   |   |   |
|---|---|---|---|---|---|---|
| S | E | R | V | I | C | E | or:

| N | E | E | D |   | S | E | R | V | I | C | E |   |   |   |

Printer User Interface                                           10/01/92

Cover Open or No EP

Some HP printers have a problem — they are not able to distinguish between the cover being open and the EP cartridge missing. Because of this, only one message is displayed for both of these errors:

| C | H | E | C | K |   |   |
|---|---|---|---|---|---|---|
| C | O | V | E | R | / | E | P | or:

| C | H | E | C | K |   | C | O | V | E | R |   | / |   | E | P |

Next State

The printer exits Jumbo Error mode to:

| Jumbo Printing | When the error is corrected (non *Manual* errors) or the ON LINE button is pressed (*Manual* errors). |
| PCL | When the RESET button is pressed. |
| Jumbo Idle | When the "Stop" button is pressed in the *Printer Status Window* or the *Print Manager*. |

Loading

When the printer is powered on, the following message is displayed for five seconds before the normal PCL "01 READY" message displays. This allows the user to verify that the cartridge is installed correctly and that the Windows Printing System is ready for operation.

| W | P | S |   | 1 | . | 0 | 0 |
|---|---|---|---|---|---|---|---|
| L | O | A | D | I | N | G |   | or:

| W | P | S |   | 1 | . | 0 | 0 |   | L | O | A | D | I | N | G |

Front Panel Commands

ON LINE

If the printer is in Jumbo mode and bidirectional I/O is available, the "ON LINE" button performs exactly the same function as the *Pause* button on the *Printer Status Window* and the *Print Manager Window*. This includes changing the printer status window to the *Paused* state.

If the printer is currently paused and bidirectional I/O is available, the "ON LINE" button performs exactly the same function as the *Resume* button on the printer status screen. This includes changing the printer status window to the *Printing* state.

Printer User Interface                                        10/01/92

Note that on-line and off-line have different meanings in Jumbo than in PCL. In PCL they represent whether data is being transferred to the printer. In Jumbo, they represent whether pages will be printed. When the user puts the printer off-line when printing a Jumbo job, any currently moving page will complete, but no more pages will begin printing.

RESET

Terminates the current job and communicates this to the system if possible. This can be used if a Jumbo job is interrupted abnormally.

All Printer Status Window Bitmaps
This section shows the bitmaps used in the printer status window for each state.
LaserJet Series II
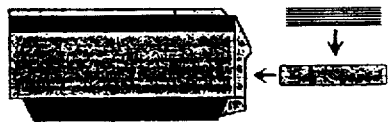
Figure 1: Series II Add Paper Bitmap
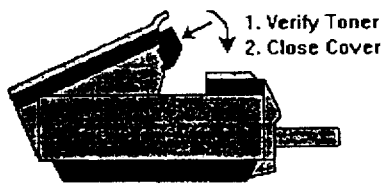
Figure 2: Series II Close Cover Bitmap
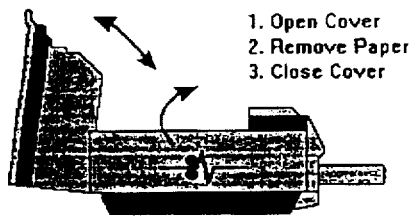
Figure 3: Series II Paper Jam Bitmap All Printer Status Window Bitmaps                              09/23/92
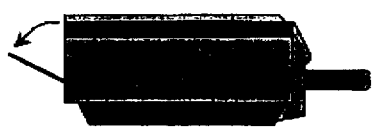
Figure 4: Series II Start Manual Duplex Bitmap
Figure 5: Series II Manual Duplex Bitmap
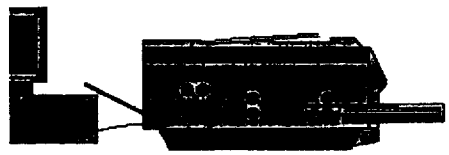
Figure 6: Series II Duplex Position 1 Bitmap All Printer Status Window Bitmaps                                         09/23/92
Figure 7: Series II Duplex Position 2 Bitmap
Figure 8: Series II Duplex Position 3 Bitmap
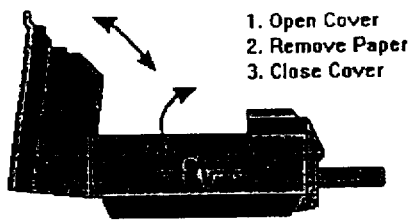
Figure 9: Series II Duplex Paper Jam All Printer Status Window Bitmaps 09/23/92
Figure 10: Series II Load Tray Bitmap
Figure 11: Series II Manual Feed Bitmap
Figure 12: Series II Printing Position 1 Bitmap All Printer Status Window Bitmaps                                    09/23/92
Figure 13: Series II Printing Position 2 Bitmap
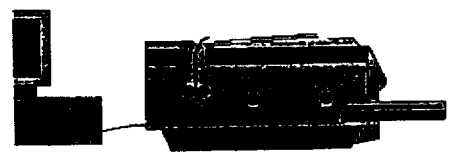
Figure 14: Series II Printing Position 3 Bitmap
Figure 15: Series II Idle Bitmap All Printer Status Window Bitmaps 09/23/92
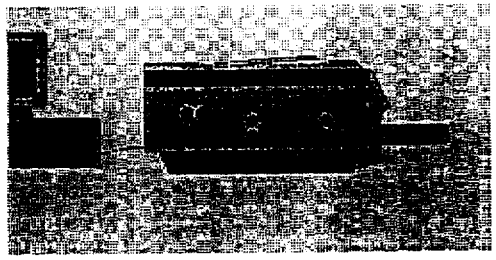
Figure 16: Series II Status Not Available Bitmap
LaserJet IID
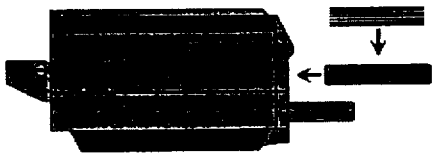
Figure 15: IID Add Paper to Upper Tray Bitmap
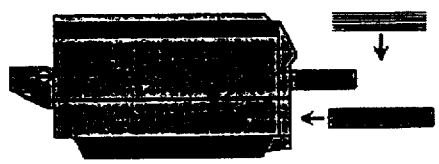
Figure 16: IID Add Paper to Lower Tray Bitmap All Printer Status Window Bitmaps
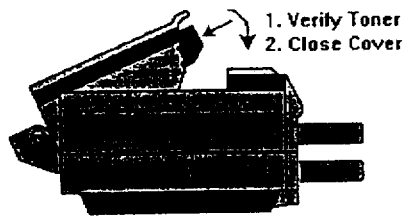
Figure 17: IID Close Cover Bitmap
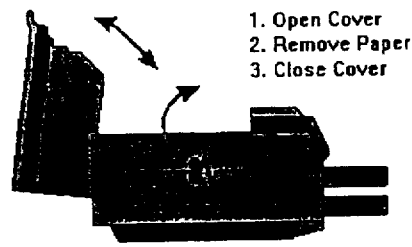
Figure 18: IID Paper Jam Bitmap
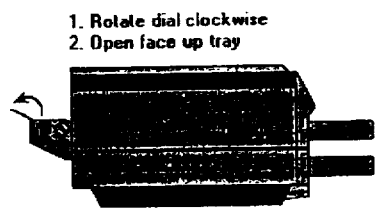
Figure 19: IID Start Manual Duplexing Bitmap

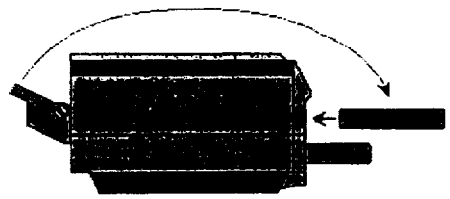
Figure 20: IID Manual Duplex Upper Tray Bitmap
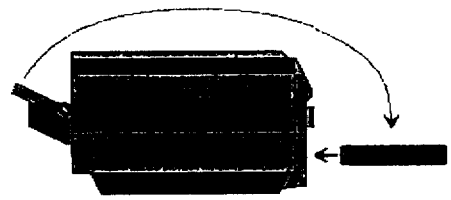
Figure 21: IID Manual Duplex Lower Tray Bitmap
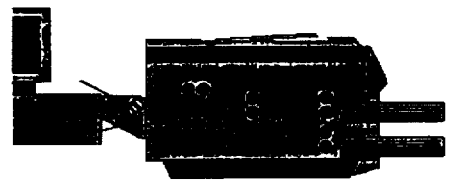
Figure 22: IID Manual Duplex Position 1 Upper Tray Bitmap All Printer Status Window Bitmaps 09/23/92
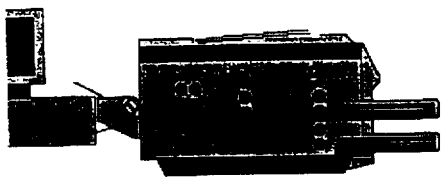
Figure 23: IID Manual Duplex Position 1 Lower Tray Bitmap
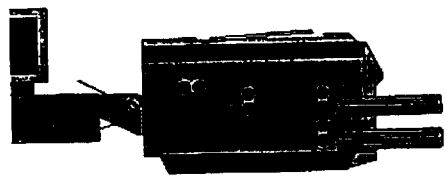
Figure 24: IID Manual Duplex Position 2 Upper Tray Bitmap
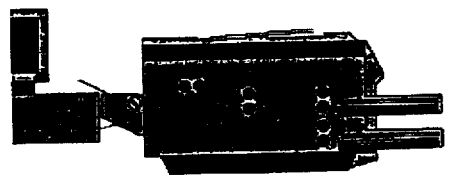
Figure 25: IID Manual Duplex Position 2 Lower Tray Bitmap All Printer Status Window Bitmaps 09/23/92
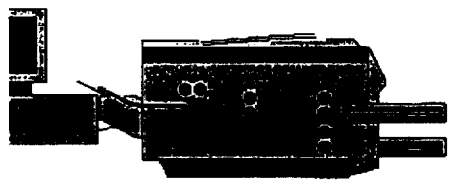
Figure 26: IID Manual Duplex Position 3 Bitmap
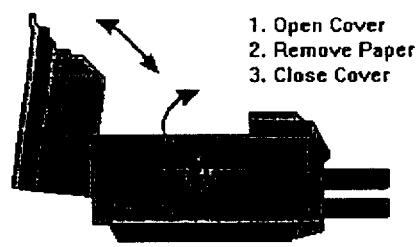
Figure 27: IID Manual Duplex Paper Jam
Figure 28: IID Load Upper Tray Bitmap All Printer Status Window Bitmaps                                    09/23/92
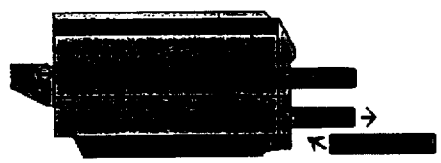
Figure 29: IID Load Lower Tray Bitmap
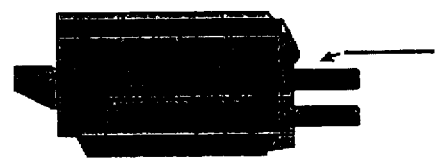
Figure 30: IID Manual Feed Upper Tray Bitmap
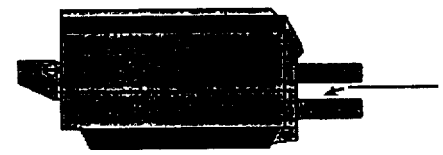
Figure 31: IID Manual Feed Lower Tray Bitmap

Figure 32: IID Printing Position 1 Upper Tray Bitmap
Figure 33: IID Printing Position 1 Lower Tray Bitmap
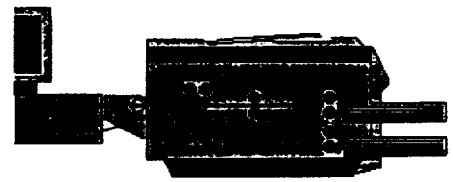
Figure 34: IID Printing Position 2 Upper Tray Bitmap All Printer Status Window Bitmaps 09/23/92
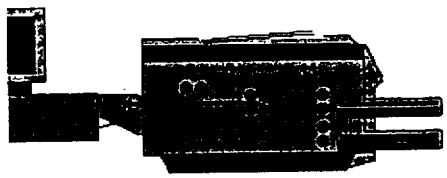
Figure 35: IID Printing Position 2 Lower Tray Bitmap
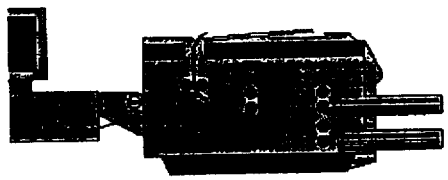
Figure 36: IID Printing Position 3 Bitmap
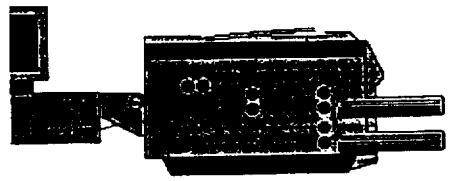
Figure 39: IID Idle Bitmap All Printer Status Window Bitmaps 09/23/92
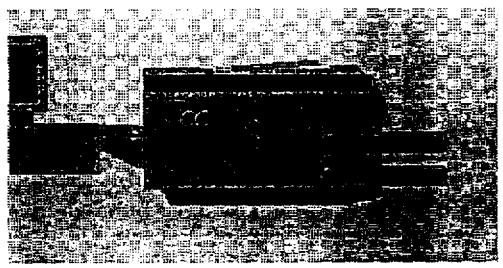
Figure 40: IID Status Not Available Bitmap
LaserJet III
Figure 37: III Add Paper to Tray Bitmap
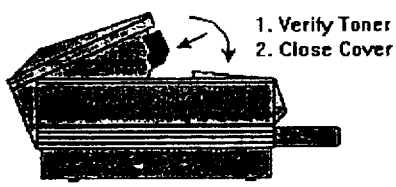
Figure 38: III Close Cover Bitmap All Printer Status Window Bitmaps
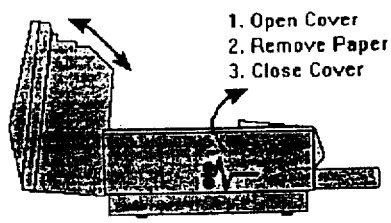
Figure 39: III Paper Jam Bitmap
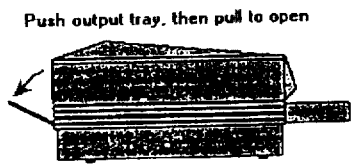
Figure 40: III Start Manual Duplex Bitmap
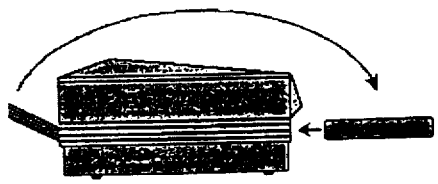
Figure 41: III Manual Duplex Bitmap
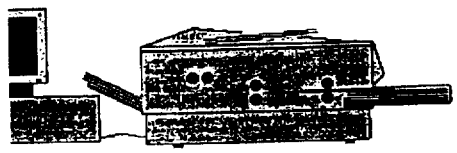
Figure 42: III Manual Duplex Position 1 Bitmap All Printer Status Window Bitmaps 09/23/92
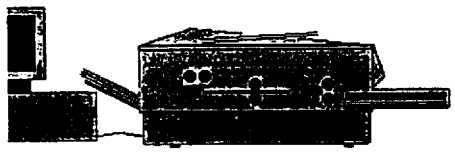
Figure 43: III Manual Duplex Position 2 Bitmap
Figure 44: III Manual Duplex Position 3 Bitmap
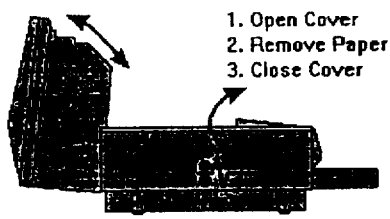
Figure 45: III Manual Duplex Paper Jam Bitmap

Figure 46: III Load Tray Bitmap
Figure 47: III Manual Feed Bitmap
Figure 48: III Printing Position 1 Bitmap
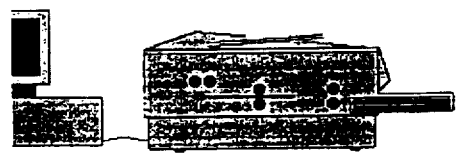
Figure 49: III Printing Position 2 Bitmap

Figure 50: III Printing Position 3 Bitmap
Figure 55: III Idle Bitmap
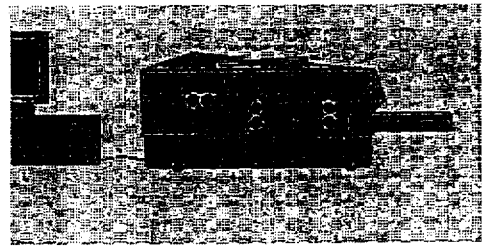
Figure 56: III Status Not Available Bitmap All Printer Status Window Bitmaps 09/23/92
LaserJet IIID
Figure 51: IIID Add Paper to Upper Tray Bitmap
Figure 52: IIID Add Paper to Lower Tray Bitmap
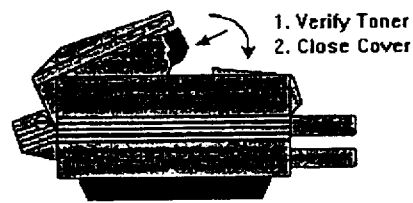
Figure53: IIID Close Cover Bitmap All Printer Status Window Bitmaps                                09/23/92
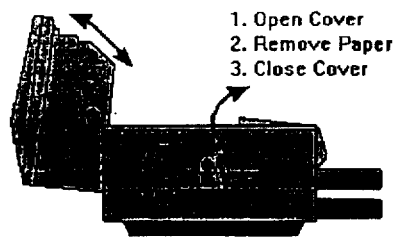
Figure 54: IIID Paper Jam Bitmap
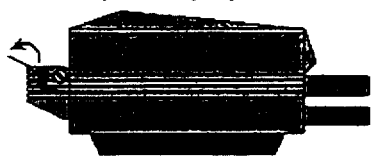
Figure 55: IIID Start Manual Duplex Bitmap
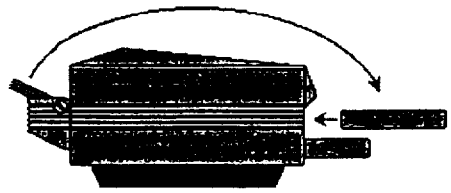
Figure 56: IIID Manual Duplex Upper Tray Bitmap All Printer Status Window Bitmaps 09/23/92
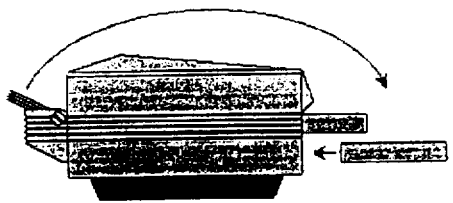
Figure 57: IIID Manual Duplex Lower Tray Bitmap
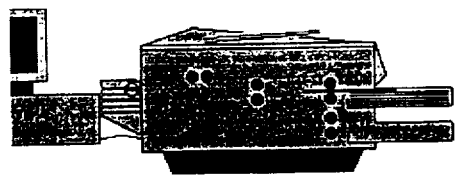
Figure 58: IIID Manual Duplex Position 1 Upper Tray Bitmap
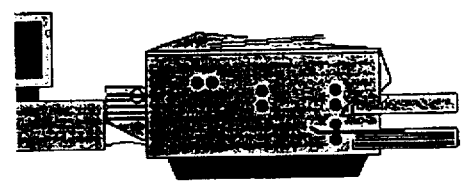
Figure 59: IIID Manual Duplex Position 1 Lower Tray Bitmap
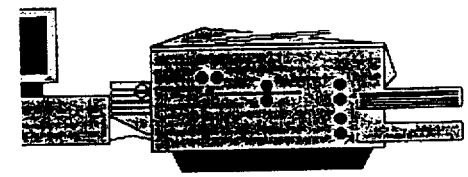
Figure 60: IIID Manual Duplex Position 2 Upper Tray Bitmap

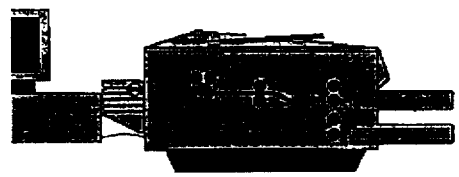
Figure 61: IIID Manual Duplex Position 2 Lower Tray Bitmap
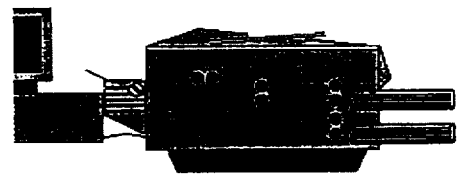
Figure 62: IIID Manual Duplex Position 3 Bitmap
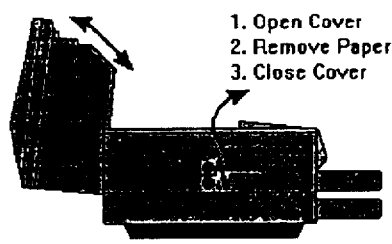
Figure 63: IIID Manual Duplex Paper Jam Bitmap All Printer Status Window Bitmaps 09/23/92
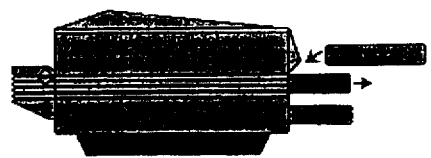
Figure 64: IIID Load Upper Tray Bitmap
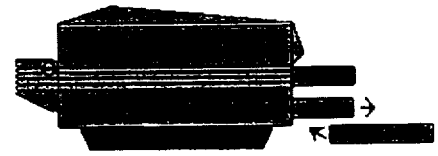
Figure 65: IIID Load Lower Tray Bitmap
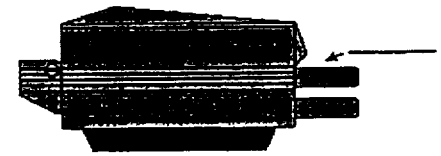
Figure 66: IIID Manual Feed Upper Tray Bitmap

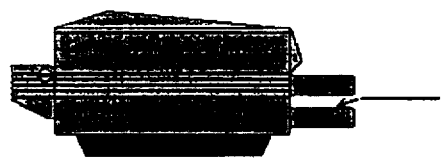
Figure 67: IIID Manual Feed Lower Tray Bitmap
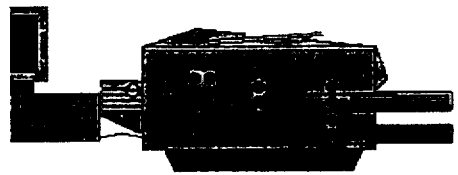
Figure 68: IIID Printing Position 1 Upper Tray Bitmap
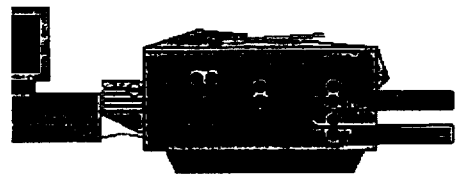
Figure 69: IIID Printing Position 1 Lower Tray Bitmap All Printer Status Window Bitmaps　　　　　　　　　　　　09/23/92
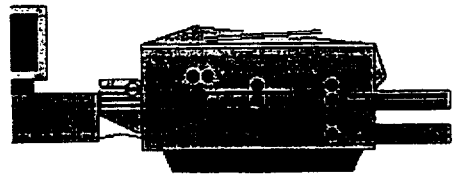
Figure 70: IIID Printing Position 2 Upper Tray Bitmap
Figure 71: IIID Printing Position 2 Lower Tray Bitmap
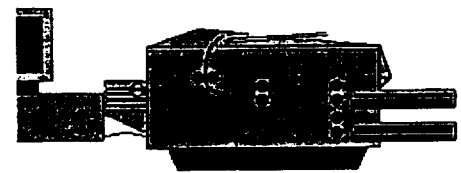
Figure 72: IIID Printing Position 3 Bitmap All Printer Status Window Bitmaps 09/23/92
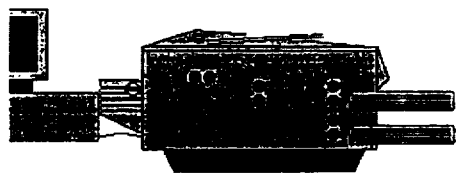
Figure 79: IIID Idle Bitmap
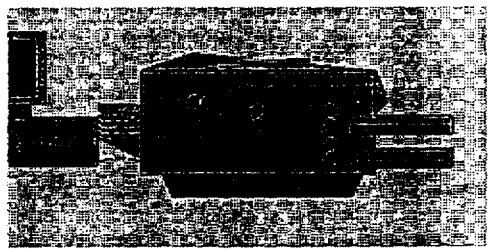
Figure 80: IIID Status Not Available Bitmap
LaserJet IIP, IIP+, IIP Without LC Tray
Figure 73: P Add Paper to MP Tray Bitmap

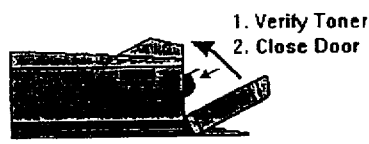
Figure 74: P Close Cover Bitmap
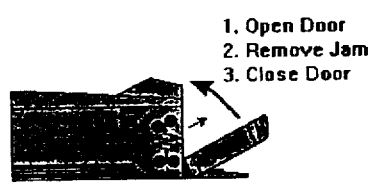
Figure 75: P Paper Jam Bitmap
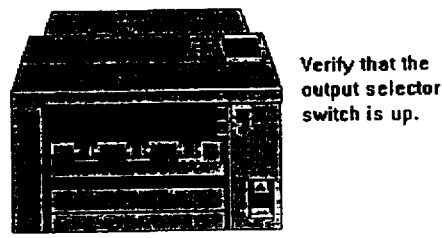
Figure 76: P Start Manual Duplex Bitmap All Printer Status Window Bitmaps
Figure 77: P Manual Duplex Bitmap
Figure 78: P Manual Duplex Printing Position 1 Bitmap
Figure 79: P Manual Duplex Printing Position 2 Bitmap All Printer Status Window Bitmaps 09/23/92
Figure 80: P Manual Duplex Printing Position 3 Bitmap
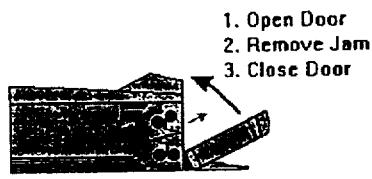
Figure 81: P Manual Duplex Paper Jam Bitmap
Figure 82: P Manual Feed Bitmap
Figure 83: P Printing Position 1 Bitmap

Figure 84: P Printing Position 2 Bitmap
Figure 85: P Printing Position 3 Bitmap
Figure 94: P Idle Bitmap All Printer Status Window Bitmaps 09/23/92
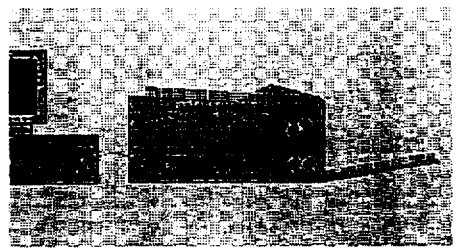
Figure 95: P Status Not Available Bitmap
LaserJet IIP, IIP+, IIIP With LC Tray
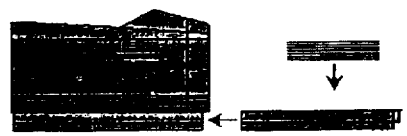
Figure 86: P w/LC Add Paper to LC Paper Tray Bitmap
Figure 87: P w/LC Add Paper to MP Tray Bitmap All Printer Status Window Bitmaps				09/23/92
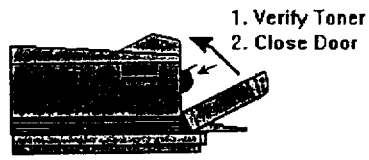
Figure 88: P w/LC Close Cover Bitmap
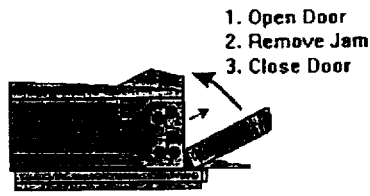
Figure 89: P w/LC Paper Jam Bitmap
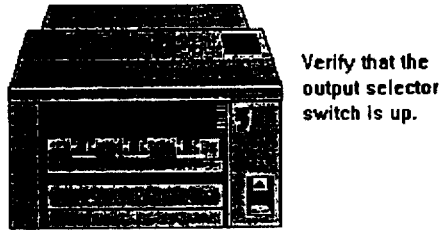
Figure 90: P w/LC Start Manual Duplex Bitmap All Printer Status Window Bitmaps 09/23/92
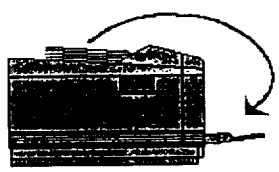
Figure 91: P w/LC Manual Duplex Bitmap
Figure 92: P w/LC Manual Duplex Printing Position 1 from MP Tray Bitmap
Figure 93: P w/LC Manual Duplex Printing Position 1 from LC Tray Bitmap All Printer Status Window Bitmaps 09/23/92
Figure 94: P w/LC Manual Duplex Printing Position 2 from MP Tray Bitmap
Figure 95: P w/LC Manual Duplex Printing Position 2 from LC Tray Bitmap
Figure 96: P w/LC Manual Duplex Printing Position 3 Bitmap

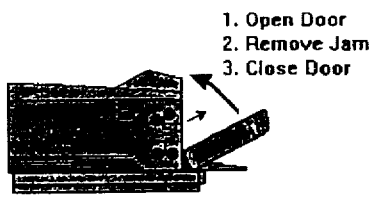
Figure 97: P w/LC Manual Duplex Paper Jam Bitmap
Figure 98: P w/LC Load LC Tray Bitmap
Figure 99: P w/LC Manual Feed Bitmap

Figure 100: P w/LC Printing Position 1 from MP Tray Bitmap
Figure 101: P w/LC Printing Position 1 from LC Tray Bitmap
Figure 102: P w/LC Printing Position 2 from MP Tray Bitmap All Printer Status Window Bitmaps                                09/23/92
Figure 103: P w/LC Printing Position 2 from LC Tray Bitmap
Figure 104: P w/LC Printing Position 3 Bitmap
Figure 115: P w/LC Idle Bitmap All Printer Status Window Bitmaps                                09/23/92
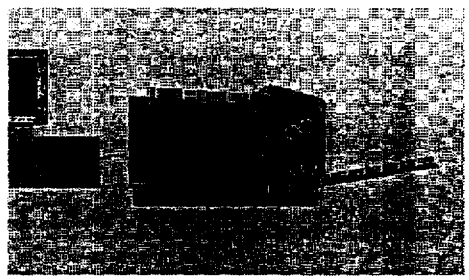
Figure 116: P w/LC Status Not Available Bitmap All Printer Setup Window Bitmaps 09/23/92
All Printer Setup Window Bitmaps
This section shows the bitmaps used in the printer setup window for each state.
LaserJet Series II
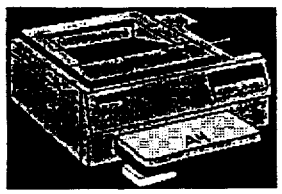
Figure 1: Series II w/A4 Tray Bitmap
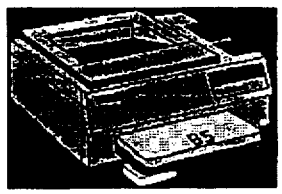
Figure 2: Series II w/B5 Tray Bitmap
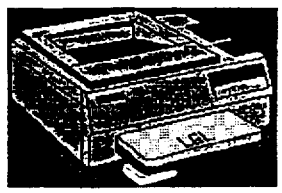
Figure 3: Series II w/Legal Tray Bitmap
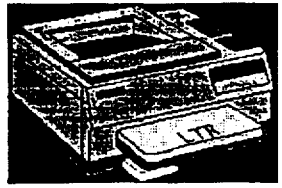
Figure 4: Series II w/Letter Tray Bitmap All Printer Setup Window Bitmaps                               09/23/92
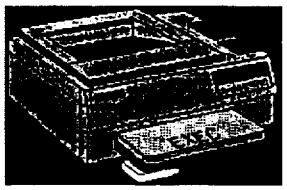
Figure 5: Series II w/Executive Tray Bitmap
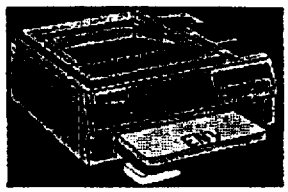
Figure 6: Series II w/Envelope Tray Bitmap
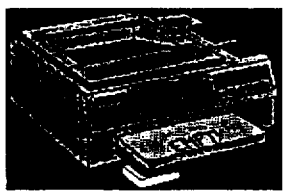
Figure 7: Series II Empty Tray Bitmap
LaserJet IID
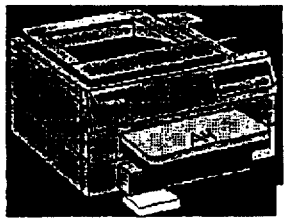
Figure 8: IID w/A4 Upper Tray and Empty Lower Tray Bitmap All Printer Setup Window Bitmaps 09/23/92
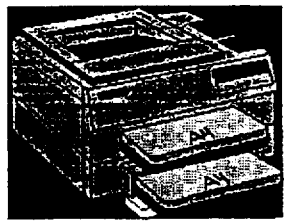
Figure 9: IID w/A4 Upper and Lower Tray Bitmap
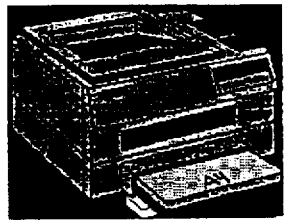
Figure 10: IID w/Empty Upper Tray and A4 Lower Tray Bitmap
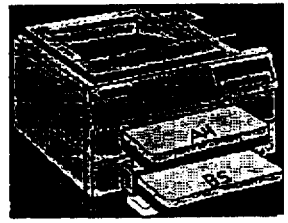
Figure 11: IID w/A4 Upper Tray and B5 Lower Tray Bitmap
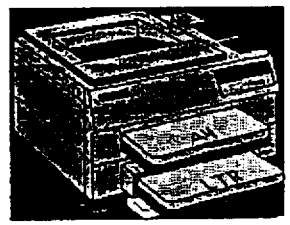
Figure 12: IID w/A4 Upper Tray and Letter Lower Tray Bitmap All Printer Setup Window Bitmaps 09/23/92
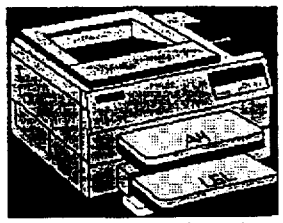
Figure 13: IID w/A4 Upper Tray and Legal Lower Tray Bitmap
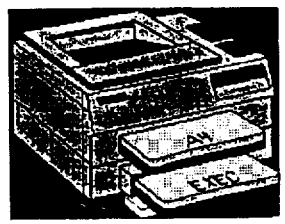
Figure 14: IID w/A4 Upper Tray and Executive Lower Tray Bitmap
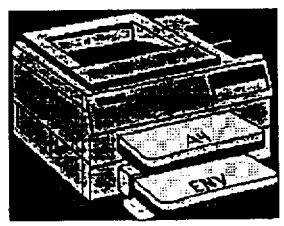
Figure 15: IID w/A4 Upper Tray and Envelope Lower Tray Bitmap
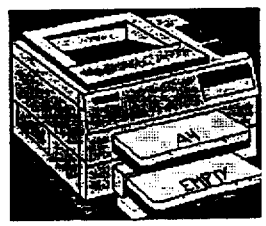
Figure 16: IID w/A4 Upper Tray and Empty Lower Tray Bitmap All Printer Setup Window Bitmaps 09/23/92
LaserJet III
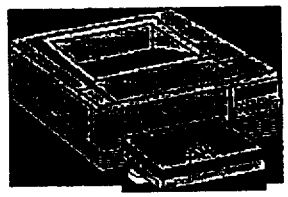
Figure 17: III w/A4 Tray Bitmap
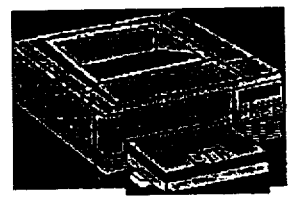
Figure 18: III w/Letter Tray Bitmap
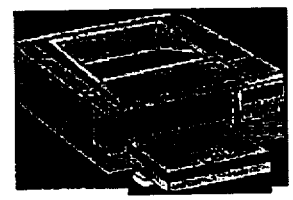
Figure 19: III w/Legal Tray Bitmap
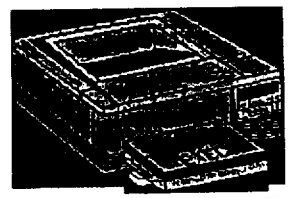
Figure 20: III w/Executive Tray Bitmap All Printer Setup Window Bitmaps                                    09/23/92
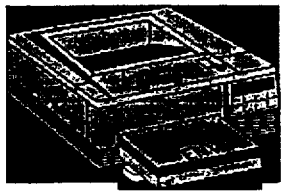
Figure 21: III w/Envelope Tray Bitmap
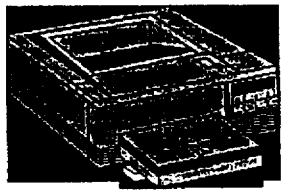
Figure 22: III w/B5 Tray Bitmap
LaserJet IIID
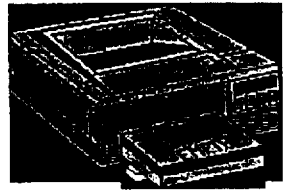
Figure 23: III w/Empty Tray Bitmap
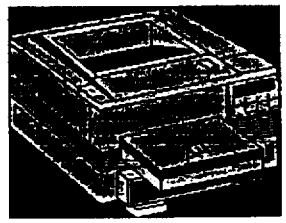
Figure 24: IIID w/A4 Upper Tray and No Lower Tray Bitmap

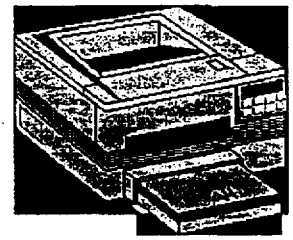
Figure 25: IIID w/No Upper Tray and A4 Lower Tray Bitmap
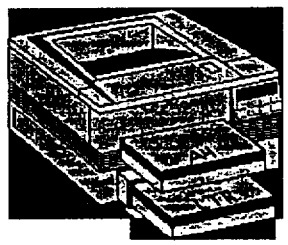
Figure 26: IIID w/A4 Upper Tray and Letter Tray Bitmap
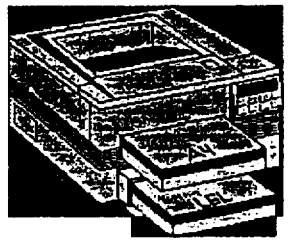
Figure 27: IIID w/A4 Upper Tray and Legal Lower Tray Bitmap
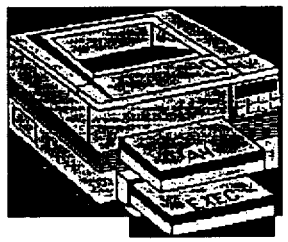
Figure 28: IIID w/A4 Upper Tray and Executive Lower Tray Bitmap All Printer Setup Window Bitmaps 09/23/92
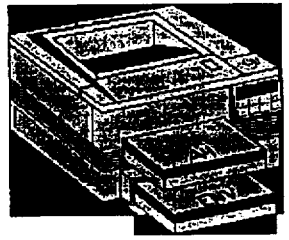
Figure 29: IIID w/A4 Upper Tray and Envelope Lower Tray Bitmap
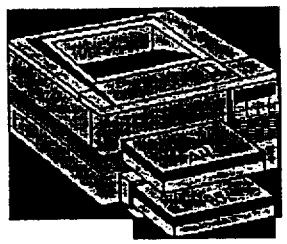
Figure 30: IIID w/A4 Upper Tray and B5 Lower Tray Bitmap
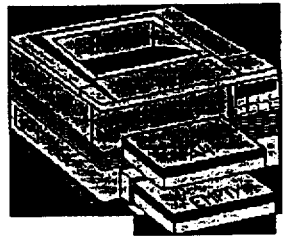
Figure 31: IIID w/A4 Upper Tray and Empty Lower Tray Bitmap
LaserJet IIP, IIP+, IIP
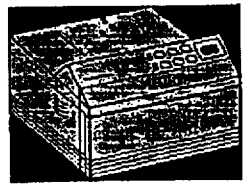
Figure 32: P Series w/No Paper or MP Tray Closed Bitmap All Printer Setup Window Bitmaps                                09/23/92
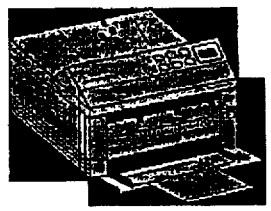
Figure 33: P Series w/MP Tray Bitmap
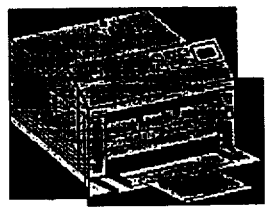
Figure 34: P Series w/LC Tray Bitmap
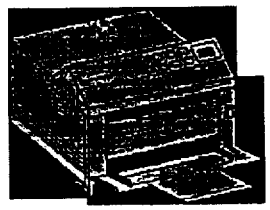
Figure 35: P Series w/MP Tray and No LC Tray Bitmap
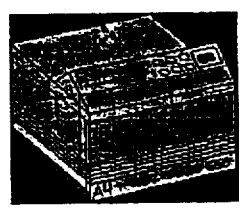
Figure 36: P Series w/A4 in LC Tray Bitmap All Printer Setup Window Bitmaps 09/23/92
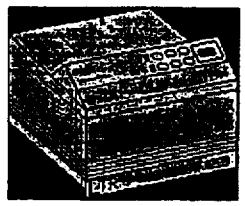
Figure 37: P Series w/Letter in LC Tray Bitmap
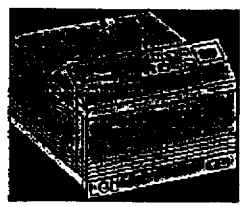
Figure 38: P Series w/Legal in LC Tray Bitmap
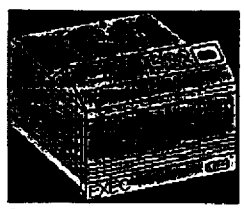
Figure 39: P Series w/Executive in LC Tray Bitmap
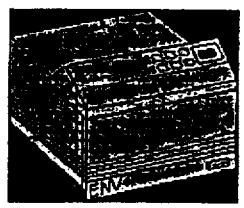
Figure 40: P Series w/Envelope in LC Tray Bitmap All Printer Setup Window Bitmaps 09/23/92
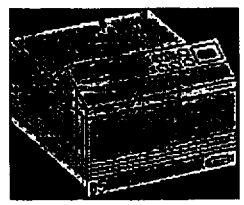
Figure 41: P Series w/B5 in LC Tray Bitmap
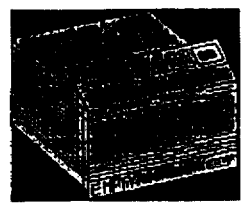
Figure 42: P Series w/Empty LC Tray Bitmap

APPENDIX B
PRINTER STATUS USER INTERFACE
AND METHODS RELATING THERETO

Queue Processor Module Spec (QP.DOC)

Table of Contents

Queue Processor Module Spec (QP.DOC) .................................................................. 1
   Introduction ................................................................................................................. 2
      Document Purpose ............................................................................................... 2
      Document History ................................................................................................ 2
      Other Documents ................................................................................................. 2
      Source Files .......................................................................................................... 4
      Vocabulary ............................................................................................................ 7
   Overview ..................................................................................................................... 8
      Module Purpose ................................................................................................... 8
      Module Cohesion ............................................................................................... 10
      Assumptions ....................................................................................................... 10
      Bugs/Limits/Ranges .......................................................................................... 10
      Pending Issues .................................................................................................... 10
      Futures ................................................................................................................ 10
   Behavior .................................................................................................................... 10
      Data Flow ........................................................................................................... 10
          Transforms ................................................................................................ 11
          Data Items ................................................................................................. 16
          Internal QP Data Structures ..................................................................... 21
          Spooling and Related Printing Through PM ........................................... 22
          Not Spooling and Related Non-PM Printing ......................................... 23
      Control Flow ...................................................................................................... 24
          QP States ................................................................................................... 24
          QP Status Checking and Reporting ........................................................ 27
          Status Checking and Reporting Control Items ...................................... 34
          The Status Window State Machine ......................................................... 38
          QPDRV Tasks ........................................................................................... 41
          QP Tasks ................................................................................................... 46
          QPDRV, QP Control Items ...................................................................... 52
   Structure ................................................................................................................... 56
      Functions ............................................................................................................ 64
   Sockets ...................................................................................................................... 72
      @QP_PM .............................................................................................................. 72
      @QP_DRV ........................................................................................................... 74
      @JCOMM ............................................................................................................ 74
      @GDI .................................................................................................................... 75
   Framer Functions ..................................................................................................... 75
   NOTES ....................................................................................................................... 75

Introduction

Document Purpose

This document describes the behavior, control aspects, and structure of the Jumbo Queue Processor (QP). The document analyzes the module's functions, and describes the subcomponents and their interfaces.

Document History

*Table 1. Document History*

| Date | Author(s) | Action |
|---|---|---|
| 5-1-92 | Ray Styles | wrote first draft of this document, from a conference with Steve Fluegel, Tim Miller, Brett Gerlach, Jim Robarts, and Ray Styles, 4-25-92. |
| 5-12-92 | Ray Styles | edited this document, incorporating comments from a conference with Steve Fluegel, Tim Miller, and Ray Styles, 5-5-92. |
| 5-15-92 | Ray Styles | added art and a place for "Collator" design info. |
| 5-27-92 | Steve Fluegel | added part on "internal QP data structures" |
| 5-28-92 | Ray Styles | edited Steve's new material, and made a few other changes. |
| 10-05-92 | Jan Breyer | Incorporated collator document, added DFD and Control |
| 10-16-92 | Jan Breyer | added NOTE to PortRead for bug 499, cleaned up function descriptions |
| 10-29-92 | Jan Breyer | updated figures |
| 11-9-92 | Jan Breyer | updated Figure 1, took out revision marks |
|  |  |  |

Other Documents

The reader should be familiar with the overall functionality and design of the Jumbo product line. This information can be found in the *Jumbo Functional Specification* and the most recent baseline version of the *Jumbo Architecture Document*.

For information about the Windows operating system and the interface between the QP and Graphic Device Interface (GDI), used for spooling and the display of the Printer Status Window (PSW), see the Windows Device Driver Kit.

This document covers the Queue Processor module (QP), which communicates with the Print Manager (PM), Host Printer Driver (Driver), the QP-Driver Interface module (QPDRV), the internal Framer (Framer), the Communications module (COMM or WPSLJCOM), and the Windows spooler. For information on how these other modules use data and control communicated by the QP, see their respective design documents.

Figure 1 shows the document tree for the Jumbo product line and highlights the functional areas that are described in this document. Table 2 describes the documents that are shown in Figure 1.

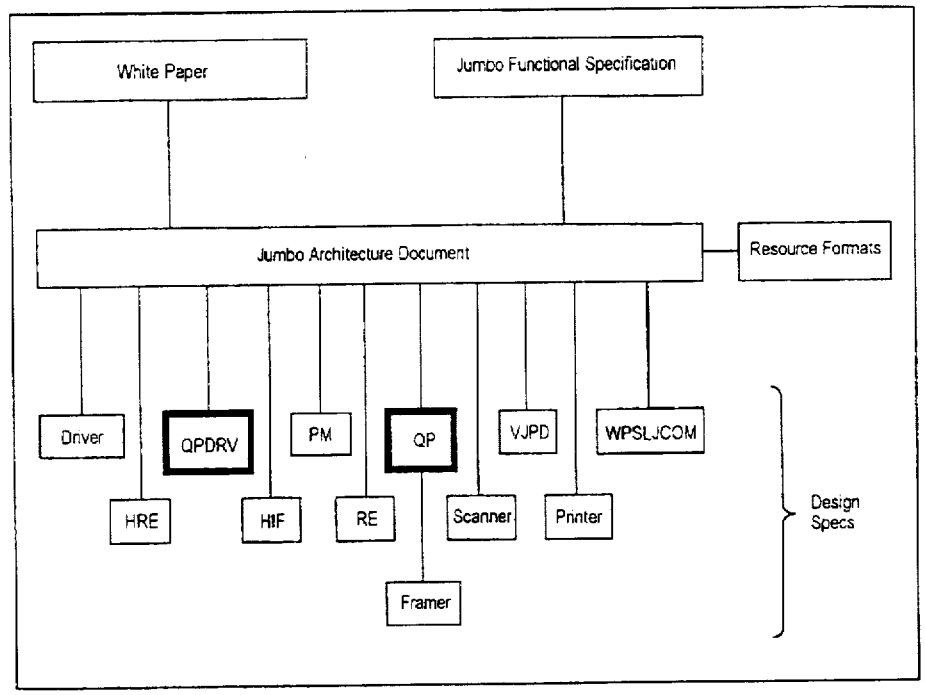
*Figure 1. Jumbo Document Tree*

Most source documents are in the path \\diamonds\jumbo\slm\src\ds. The remainder are in path \\diamonds\jumbo\slm\src\xxx, where the xxx is included with the file name.

*Table 2. Jumbo documents*

| abbreviation | file name | document name | purpose |
|---|---|---|---|
| | | white paper | |
| | \fs\funspec.doc | Jumbo functional spec | defines the Jumbo product |
| | | Jumbo architecture | describes architecture of Jumbo WPS product |
| | resfmts.doc | resource formats | describes all resources used in WPS |
| Driver | driver.doc | driver | document obsolete |
| HRE | | host resource executor | |
| QPDRV | qp.doc | queue processor | interface between driver and QP |
| QP | qp.doc | queue processor | frames and sends print job to printer |
| PM | pm.doc | print manager | manages print queues, despools print jobs |
| VJPD | \blue\vpd.doc | | changes to Windows 3.0 VPD for Jumbo |
| WPSLJCOM | commsys.doc | Jumbo Communications DLL | |
| HIF | hif.doc | Host interface | |
| RE | resexec.doc | resource executor | document obsolete |
| scanner | | scanner | |
| printer | printer.doc | | document obsolete |

Source Files

The QP files are located in three paths.

*Table 3. Files in Path \\diamonds\jumbo\slm\src\common\*

| File Name | Purpose |
|---|---|
| frame.h | FRAME structure format |
| qpdrv.h | Driver/QP interface |
| qpinfo.h | definition of the QPInfo structure |

*Table 4. Files in Path \\diamonds\jumbo\slm\src\qp\*

| File Name | Purpose |
|---|---|
| devblock.h | definitions for specific blocks which enable multiple emulation support in queue processors |
| qp.h | product specific routines called by the Print Manager and the Driver interfaces |
| qpdrv.c | Driver/QP interface (QPDRV code) |
| qpdrvi.h | QPDrv internal stuff |
| qppm.c | definition of QPAction calls |
| qppm.h | interface definitions for the Print Manager and the QP |
| qpsplmrk.h | spool marker definitions |
| qputils.c | utility functions |
| qputils.h | utility functions |
| winspool.h | Windows spooling functions |

Table 5. Files in Path \\diamonds\jumbo\slm\src\qp\jumbo\

| File Name | Purpose |
|---|---|
| asmutil2.asm | Some assembly helper functions |
| asmutil2.h | Some assembly helper function declarations |
| collator.c | code for all collator functions and duplexer functions shared with collator |
| collator.h | collator/duplex header definitions |
| display.dlg | WPS - Display Options |
| display.h | the constants for display option dialog |
| drvstate.c | code to supply printer status to driver |
| duplexer.c | code for duplexer-specific functions |
| dupspl.h | definitions for duplexing SPLs |
| framer.c | Framing routines |
| framer.h | Header file for framer routines |
| framerx.h | External header file for framer routines |
| init.c | initialization routines |
| libentry.asm | Windows dynamic link library entry routine |
| makefile | QP build script |
| product.h | product specific defines for shared qp code |
| printer.h | printer information |
| qp.rc | resource file |
| qp.rcv | version information specific to one file |
| qp2.c | First level helper functions |
| qp2.h | First level helper functions declarations |
| qp3.c | second level helper routines |
| qpdlg.c | Queue Processor status Dialog |
| qpdlg.h | global structure and define |
| qpdlg2.c | Queue Processor Status Dialog 2 |
| qpdlg2.h | status window utility function declarations |
| qpdlg3.c | Queue Processor Status Dialog 3 |
| qpdlg3.h | status window utility function declarations |
| qpdlgx.h | defines the messages to be displayed |
| qpglobal.h | definition of JobInfo structure |
| qpstate.c | QPAction processing |
| qpstate.h | definitions for QPAction processing |
| qpnonwps.h | definitions for handling non-WPS printers |
| rc.h | header file, resource constants |
| rcdlg.h | The constant for qpdlg related file |

Vocabulary

The following terms have been introduced in this document, or have a specific meaning in the context of the the Jumbo implementation of the WPS.

| | |
|---|---|
| Driver | The resource based printer driver which creates the resources and sends that information to the QP. |
| enhanced mode | Allows 386 and 486 PCs to fully utilize all capabilities of the PC. |
| kick page | The printer has started a new page moving and notifies the host so WPSLJCOM can post the "kick page" message to the "display PSW" task. |
| one-way mode | The PC can only send data to the printer; the printer channel does not support communications from the printer to the PC. |
| position 1, 2, 3 | These terms refer to the location of the paper within the printer during the printing of a page. Since printer manufactures have unique names for the various sensors, there is no consistent way to refer to a paper location. The *Jumbo Functional Specification* contains figures that show all three positions on all the printers. |
| PSW | Printer Status Window. In the context of this document, the PSW is the display the user sees on his CRT. |
| @QP_DRV | The interface between the Driver and the QPDRV. |
| QPDRV | The QP-Driver Interface module. The code that turns Driver calls into a spooled data stream. QPDRV writes the spool files (spooling enabled) or sends the data to the QP (direct mode). |
| pass | The sending of a single copy of a job to the printer. The QP uses multiple passes for collated and manually duplexed jobs. |
| standard mode | The less powerful mode used on all 286 PCs and may be used on 386s and 486s. |
| SW | Status Window. This is the code that produces the PSW and processes the user's input on the PSW and the printer status change messages. |
| two-way mode | The use of bi-directional communications between the PC and the printer that allow: (1) each to automatically detect the other; (2) both to negotiate towards aggreement on a communications protocol; and (3) data to pass in both directions. |
| WPSLJCOM | Previously known as JCOMM. The program responsible for communications between the host and the printer. |

Overview

Module Purpose

The Queue Processor (QP) handles the "back end" host functions. It takes print job data from the Driver (via the QPDRV) and the PM, frames it for communication to the printer, and delivers it to the host's communications modules connected to the ports.

The QP will send multiple passes for print jobs with manual duplexing, or multiple collated or sorted copies, or multiple collated copies with manual duplexing to the printer. For collated copies, it will send the entire print job to the printer once for each copy.

Here is a context overview diagram of the QP and the architectural levels of modules that interact with it:

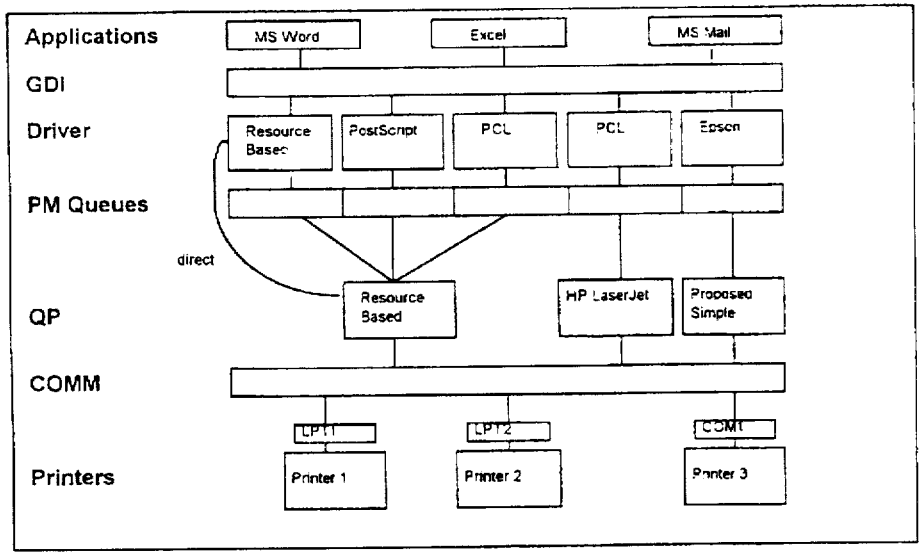

*Figure 2. Queue Processor Architecture/Context Diagram*

The Queue Processor (QP) is primarily one large state machine. It is a DLL (Dynamic Link Library), existing after it's called by the PM, the QPDRV, or by a Resource Based Printing (RBP) Driver, such as WPS.Drv, and terminating when they're done with it. It uses public and private interfaces: public to PM and, eventually, to Zippy Centronics/Windows COMM; and private to the RBP drivers and WPSLJCOM.

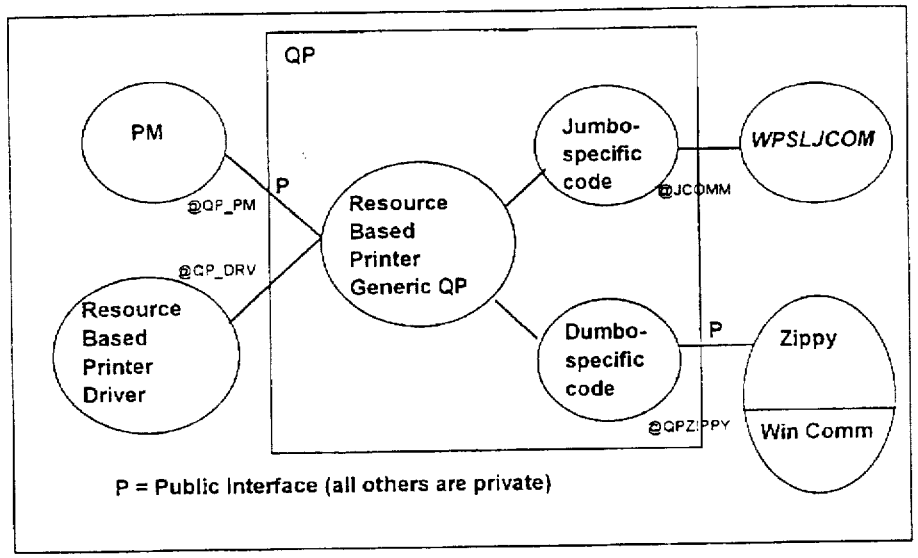

*Figure 3. Queue Processor Organization and Interfaces*

Currently, the QP itself consists of three parts: an RBP-generic part, and two RBP-specific parts or layers---one for Jumbo, and one for Dumbo. These last two are connected to the RBP-generic part by private interfaces.

The QP manages the use of the printer device. While the PM manages the printing of a job from an application, and the Driver issues the instructions for accomplishing that printing, the QP controls the activity between the PM, the QPDRV, and the printer as jobs print. To do these latter functions, it works through the Framer (which packages the data for each job and performs other overhead processing) and a communications module, such as WPSLJCOM (which handles the actual transfers of data and protocol work between host and computer).

At the front end, the QP receives its instructions from the PM, the QPDRV, and the Driver. At the back end, the QP moves data through the Framer to the communications modules; see the *Framer* and *Jumbo Communications DLL Design Specifications* for the interface information. This paper's discussion will concentrate on the QP and its front-end interfaces to the PM and Driver.

The QP outputs to a local printer, a DOS port, a network printer, or a spool file. Since the last three devices do not provide printer status, this document will focus on output to the local printer. The *Framer Design Specification* does address specifics associated with outputting to any device.

The output of data to a one-way, local printer is identical to the output to a two-way printer. The QP does not attempt to read status from a one-way printer, however.

Module Cohesion

No cohesion issues need to be discussed.

Assumptions

No assumptions need to be discussed.

Bugs/Limits/Ranges

No bugs/limits/ranges need to be discussed.

Pending Issues

No pending issues need to be discussed.

Futures

No future issues need to be discussed. This module does contain options, however, for future product enhancements, e.g. allowing for host-based page error recovery.

Behavior

Data Flow

The QP receives page control information, job information, and data to be printed from the WPS Driver; writes it to the spool file and receives it back from the PM if spooling; performs collating and duplexing when required; and frames and sends the data to the communications module. The QP displays the printer status when it encounters a printer status change and when requested by the user.

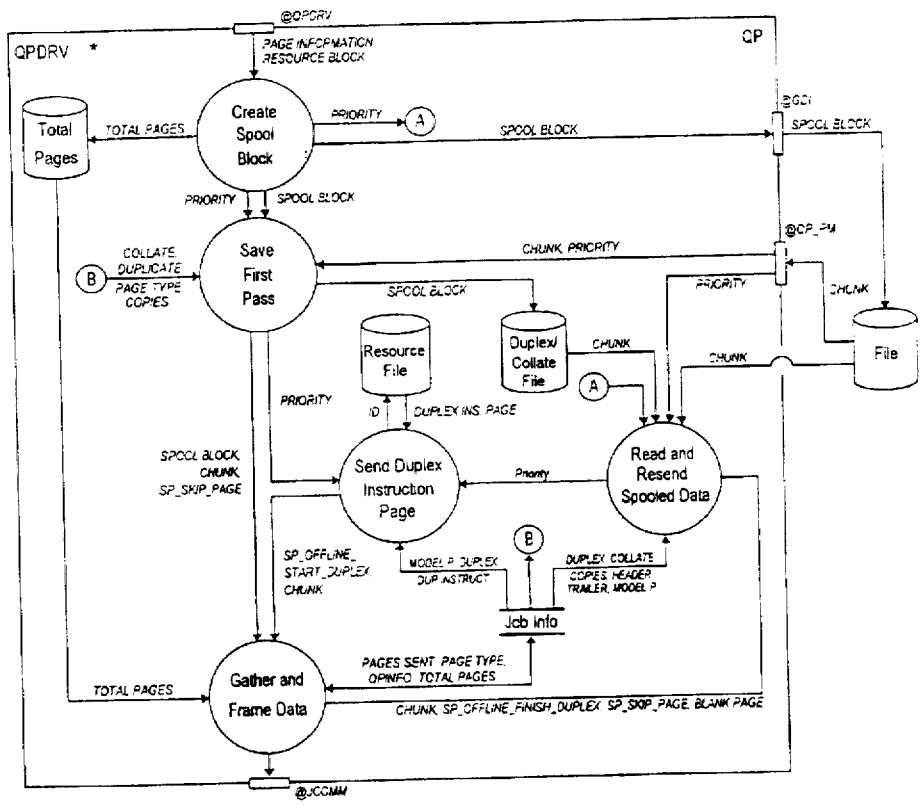

*Figure 4. QP data flow diagram*

Transforms

Create spool block

*Purpose*

This transform creates the spool markers and spool blocks that allow the "gather and frame data" transform to reconstruct the resource blocks and control information from the data stream. The spool markers identify the type of information in the spool block. The output of this transform is identical whether or not spooling is enabled.

For more information about spool markers and spool blocks, see the Spool Block description under Data Items.

The Driver calls this transform at the beginning of the job, at the beginning of the optional header and trailer pages, at the start of the job data, at the end of every page in the job, when the application sends a separate copy count, and for every resource block in the job.

At the beginning of the job, the Driver provides the QP with information about the job, such as number of copies, whether to use collating or duplexing, and whether to include a header, trailer, or duplex instruction page. This information is contained in the QPInfo structure and is appended to the spool marker.

The Driver may also provide the QP with a "number of copies" separate from the one contained in the QPInfo structure. The QP places this number in its own spool block.

The user may choose to include optional header and trailer pages. The header page includes such information as the printer identification, title of the document, and time and date of the print job. The trailer page includes a summary of the options and graphics settings, statistics about the job, and lists all fonts and sizes used in the document. These pages occur only at the beginning and end of the job, respectively, even if the job includes multiple copies.

The QP uses the beginning or header, job, and trailer information to create the corresponding spool blocks and to open and close the appropriate files in spooling mode.

The "end of page" indication allows the QP to count the number of pages in the document so it can display the total number of pages while printing in spooled mode or the current page number in direct mode. It writes the total pages to the temporary file at the end of a spooled job. This file is read by "gather and frame data."

The Driver also calls this transform for each resource block. When the input is a resource block, this transform appends it to the spool marker.

"Create spool block" then writes the spool block it has created to the spool file or calls the QPAction with a QP_WRITE request in direct mode.

*Timing*

The Driver calls this task for each resource block and for each piece of job and page control information.

*Constraints*

None.

Save first pass

*Purpose*

This transform obtains the next spool block (in direct mode) or the next chunk of data from PM (in spooled mode).

It calls "send duplex instruction page" at the beginning of a duplexed job.

If the job is duplexed, this transform sends the SP_SKIP_PAGE at the beginning of the job to skip the printing of even pages.

When printing direct, it will write the spool blocks for a duplexed and/or collated job to a disk file so they may be resent for the additional copies. Since the optional header gets printed as part of the main QP processing, this transform does not save it. It does not save the optional trailer page for an uncollated job because the main QP processing will print that page in the correct place. It writes the job data and the optional trailer page in separate files, in the same manner as spooled data.

After performing any duplexer/collator processing, it sends the data to the "gather and frame data" transform.

*Timing*

Input from PM comes at the rate PM reads it from the spool file. For direct print, the data arrives directly from the QPDRV.

*Constraints*

If this transform runs out of disk space while saving a duplexed and/or collated job, it reports the error back to the caller by using the GDI Message Box function. The saving of the data to disk is canceled, and the user may choose to print only the first copy of a collated job. Otherwise, he may retry the print or cancel the job. In the latter case, he may free up disk space and print the job again.

Background on duplexing. The QP sends manually duplexed jobs to the printer twice; the first time to print odd pages, the second time to print on the other side of the same pieces of paper after the user has correctly reloaded the paper. It sends all pages in case resources used by one page were defined on what would be the back side of another page that won't be printed in the current run. It sends the SP_SKIP_PAGE command to the printer from the "save first pass" and "read and resend spooled data" transforms to inform it to skip printing of odd or even pages. This allows the printer to accumulate the resources defined on the pages that won't be printed in the current pass. The QP counts only printed pages.

The SP to skip even or odd pages also contains the number of copies to skip when printing more than one copy of a duplexed, noncollated job. This is because the Driver specified the number of copies to print in the SP_PRINT command.

Send duplex instruction page

*Purpose*

This transform sends the SP_OFFLINE_START_DUPLEX command at the beginning of a duplexed job. In one-way mode, it sends a message to the user to notify him of the start of his duplexed job; this message is shown on the Status Checking and Reporting Control Diagram.

It determines if the user has requested the inclusion of the optional duplex instruction page and, if so, whether it belongs at the beginning or end of the job. It sends the duplex instruction page at the proper location.

The duplex instruction pages for all the possible combinations of printers and portrait/landscape orientation are stored in the Resource File. This transform selects the proper page from the file by specifying the Resource ID, reads it, and then sends the data to "gather and frame data." The SP_PRINT command is included as the last resource for each duplex instruction page in the Resource File.

*Timing*

This transform is called both at the beginning of a duplexed job and at the end of the last pass to print the front side(s). It will print the page once, in the proper location.

*Constraints*

None.

Read and resend spooled data

*Purpose*

When the QP has received the entire duplexed/collated print job and sent the first pass to the printer (which includes any non-collated copies of the first side of a manual duplexing job), this transform reads the stored data from the local file or the PM spool file, inserts duplexing SPs where required in the output stream, and sends the data to the "gather and frame data" transform. It must resend the entire job from the saved file once for each collated copy after the first copy, or a second time for manual duplexing one or more copies, or the additional times if both collating and manual duplexing are enabled. In the duplexing and collating case, the number of times resent = 2 * number copies -1.

The spool file that the PM writes consists of one, two, or three physical files. There is a separate file for each of the following types of job data: (1) the optional header page; (2) the print job itself; and (3) the optional trailer page.

For duplexed jobs that have multiple collated copies, this transform sends the SP_SKIP_PAGE command to skip even pages for subsequent passes of the front side. It will send the SP_SKIP_PAGES command to skip printing of odd pages before it sends each pass of the even (back side) pages.

At the end of all passes for the front side for a duplexed job, this transform calls "send duplex instruction page."

Before reading any data for the back side pass(es), this transform sends the SP_OFFLINE_FINISH_DUPLEX command to "gather and frame data" to pause the printer. In two-way mode, the QP displays the PSW, asking the user to turn the paper over in response to the change in the printer status. For a one-way job, this transform sends a message to the user to inform him that the printing of the back side of his duplexed job is beginning; this processing is shown on the Status Checking and Reporting Control Diagram.

It is the user's responsibility to put the printer back online when he has placed the paper in the proper location.

At the beginning of the first pass to print the back side of a duplexed job, this transform sends a SP_PRINT command to print a blank page on the back side of the duplex instruction page and/or the optional header page if either of these pages was printed at the beginning of the job. At the end of the last pass to print the back side, it sends the same SP_PRINT command(s) to print no data on the back side of the duplex instruction page and/or optional trailer page if these pages were printed at the end of the front side of the job.

This transform must handle of the optional header and trailer pages. For spooled data, it must skip the optional header page in the spool file. It skips the optional trailer page if not collating. It must read the optional trailer page after it has read all copies of a collated print job.

*Timing*

This transform reads and sends to "gather and frame data" all data for each pass of the job after the first pass. It executes when the first copy has been sent to the printer. In direct mode, it reads and sends data at the same rate as a high priority spooled job. In spooled mode, it reads one chunk before returning to PM.

*Constraints*

None.

Gather and frame data

*Purpose*

This transform produces the frames that the QP sends to the printer, via WPSLJCOM.

The input is either data for a print job, the optional duplex instruction page for a duplexed job, SPLs to turn the printer offline for paper loading and to print the duplex instruction page and/or blank pages for a duplexed job, or an Immediate Control Primitive (ICP) generated by the QP to control the printing of that job. The extra pages and SPLs for duplexed jobs are contained in spool blocks of type = Resource.

If the input is a chunk of data from the Resource File (the duplex instruction page), the spool file, or the local temporary file (duplex/collate in direct mode), this transform decomposes the chunk into the original spool block(s). Since the chunk may contain partial, multiple, or partial multiple spool blocks, more than one chunk may be required to construct a complete spool block.

The spool marker in the spool block describes the processing that the Framer must perform for the block.

The first spool block in the data stream is the QPInfo block. This transform uses the name of the temporary file for a spooled job, contained in the QPInfo block, to read job information and store it in the JobInfo structure. This transform computes page count information based upon parameters in QPInfo and copies the other information in the QPInfo block to the JobInfo structure. Since values in this spool block are not available to the QP until after this transform has processed the block, it immediately returns to the caller without processing any additional spool blocks that may have been included in the chunk.

This transform increments the page number if the Spool Marker is of type = Page Break.

This transform sets the "page type" appropriately when the Spool Marker indicates the beginning of a specific type of page, such as optional header, optional trailer, duplex instruction page, blank page, or start of data for the actual job.

A spool block whose type = Resource (this includes all QP-initiated SPs) contains the size of the resource, followed by the resource block. The "gather and frame data" transform puts the necessary framing information into the framing buffer, copies the resource to that framing buffer, and sends the frame to the printer.

If the input is an ICP, this transform places the ICP into the local ICP buffer and frames and sends it between the frames that contain resource blocks.

See the QP *Framer Design Specification* for more details.

*Timing*

The QP calls this transform for every spool block or chunk of data and for every QP-initiated ICP and SPL.

*Constraints*

The Framer will only process one ICP at a time. If it receives a second ICP before it has completed transmission of the first one, it will return an error indication to the caller.

Data Items

Blank page

*Purpose*

The "read and resend spooled data" transform inserts a blank page into the data stream for the back sides of the optional header, trailer, and duplex instruction pages in a duplexed job.

*Types*

The blank page is a spool block of type = Resource, containing the SP_PRINT command.

Chunk

*Purpose*

This item contains the next input from the spool file, from the local file that the QP created when collating and/or duplexing in direct mode, or from the Resource File for a duplex instruction page. It is a raw data stream of spool blocks. An individual chunk may contain parts of one or more spool blocks.

*Types*

The size of a chunk can be as little as 32 bytes to as much as 32 Kbytes. The PM determines the size it sends based upon the priority the user specifies. Currently, "read and resend spooled data" reads and resends both the spool file and the local file in 8 Kbyte chunks.

Collated

*Purpose*

This item indicates if the current job has collated copies.

*Types*

It is a boolean variable contained in the QPInfo structure for the job.

Copies

*Purpose*

This item specifies how many copies of each page are to be printed.

*Types*

It is a integer variable contained in the QPInfo structure for the job.

DupInstruct

*Purpose*

This item indicates if the duplex instruction page is to be printed for this duplexed job. If so, the QP prints it either at the beginning or end of the job, depending on the printer type.

*Types*

It is a boolean variable contained in the QPInfo structure for the job.

Duplex

*Purpose*

This item indicates if the current job is to be printed in duplex mode and whether the orientation for the print job is portrait or landscape.

*Types*

It is a integer variable contained in the QPInfo structure for the job.

Duplex instruction page

*Purpose*

The QP sends this page at either the beginning or end of the duplexed job when the user has requested it to be included.

*Types*

Each duplex instruction page is stored in the Resource File.

Frame

*Purpose*

The "gather and frame data" transform decomposes spool blocks and chunks into their original resource blocks. For those spool blocks of type = Resource, the transform creates the frame from the resource block, and sends each complete frame to WPSLJCOM. It also creates a frame for each ICP sent by the QP.

*Types*

For more information, see the QP *Framer Design Specification*.

Header

*Purpose*

This item indicates that the optional header page is included with this job.

*Types*

It is a boolean variable contained in the QPInfo structure for the job.

ID

*Purpose*

This item identifies the duplex instruction page to read from the Resource File.

*Types*

It is passed as a calling argument to "send duplex instruction page."

ModelP

*Purpose*

This item indicates if the printer is a model P type of printer or not. The QP determines the type based upon the printer model contained in the configuration file.

The printer type affects whether the optional duplex instruction page goes at the beginning or end of the front side of a duplexed job.

*Types*

It is a boolean variable in the JobInfo structure for the job.

Page information

*Purpose*

This item allows the QP to count pages and create spool blocks for Page Break, beginning of header, beginning of job, beginning of trailer page, and other control information from the QPDRV. In spooled mode, it also allows the QPDRV to allocate, open, and close files for the three types of pages (header, job, and trailer).

*Types*

The source file qpdrv.h defines the page information that the Driver uses when it calls QPDRV. In the context of this document, the data item "page information" refers to parameters passed to QPDRV for all calls except the QPDrvWrite and QPDrvWriteGather.

PagesSent

*Purpose*

The "gather and frame data" transform increments this item every time there is a Page Break spool block in the data stream.

The QP uses PagesSent to determine when the printer has finished printing all pages for the job so the QP can remove that job from its queue. The QP also uses this item to adjust page counts for subsequent jobs when it aborts the first job in the queue.

*Types*

This item is one of the fields in the JobInfo structure for the job.

Page type

*Purpose*

This item indicates whether the current page is one of the pages of the print job itself, the optional trailer page, or some other kind of page (such as the optional header page, duplex instruction page, or blank page).

*Types*

The page type information is contained in the JobInfo structure as boolean variables.

Priority

*Purpose*

For spooled jobs, this parameter specifies the PM's priority, as set by the user. The QP uses the priority to determine how much work it should attempt to do in one call from the PM.

In direct mode, it indicates that the print job is a direct print.

*Types*

The parameter is passed by the QPDRV and the PM.

QPInfo

*Purpose*

The Driver passes this structure to QPDRV on the QPDrvOpen call for this job. It contains information for the job. QPDrvOpen writes the QPInfo to the spool file or sends it to the QP in direct mode.

The QP copies the QPInfo to the JobInfo structure for the job when it receives the first data for the job.

*Types*

See the qpinfo.h source file for the definition of the fields of this structure.

Resource block

*Purpose*

This item is the basic unit of storage for resources. The WPS Driver creates all resource blocks, except for the SPLs and the duplex instruction page resources that the QP sends for duplexed and/or collated jobs.

Each resource block contains one, and only one, member of the following resource classes in each block: RPL, SPL, or data resources.

The QP frames and transmits each resource block to the printer without examining the contents.

*Types*

See the *Resource Formats* document for a description of resources, RPLs, and SPLs.

Spool block

*Purpose*

The QP processes data as spool blocks. The first four bytes of each spool block are the Spool Markers. The Framer uses Spool Markers to determine the boundaries of each of the spool blocks. Most of the spool blocks contain the WPS resources that the Framer puts into frames and sends to the printer via WPSLJCOM. Other Spool Markers cause the Framer to update information in the JobInfo structure.

*Types*

There are four types of Spool Markers: Flag, JobInfo, CopyCount, and Resource.

If the Spool Marker is of the Flag type, the second word indicates the type of flag. There are currently six types of flags: Page Break, Header Page, Trailer Page, Beginning of Job, Beginning of Duplex Instruction Page, and Blank Page. The Page Break Spool Marker may be found throughout the raw data stream. The Blank Page(s) occur at the beginning and end of the back side of a duplexed job to "kick out" the optional pages. The other four flag types occur only once.

If the Spool Marker is of the JobInfo type, the second word is the length of the QP-specific information, known as QPInfo, that immediately follows the marker. QPInfo includes such things as: the ID number of the temporary file used for spooled job information, whether to include the header and/or trailer page, whether duplexing and/or collating is required, and the number of copies. The ID number is converted to the file name using the Windows GetTempFileName function. Currently, the temporary file contains the total number of pages in the job.

The JobInfo spool block occurs at the beginning of the data stream.

The JobInfo spool block should not be confused with the JobInfo queue structure. The spool block contains the QPInfo data. The JobInfo queue structure contains all the information about the job, including the QPInfo data itself.

The CopyCount spool block contains the number of copies to be printed as bytes three and four of the Spool Marker. This value replaces the number of copies that was included in QPInfo. The total pages and any other values which were computed based upon the value in QPInfo are recomputed and the results stored in the fields within the JobInfo structure.

If the Spool Marker is of type = Resource, the second word is the length of the resource block that immediately follows the Spool Marker. This Spool Marker is found throughout the data stream.

SP_Offline_Start_Duplex, SP_Offline_Finish_Duplex, SP_Skip_Page, SP_Print

*Purpose*

These items contains an instruction to the printer that the Framer puts into the data stream to control a duplex job.

*Types*

The QP sends the SP_OFFLINE_START_DUPLEX and SP_OFFLINE_FINISH_DUPLEX commands at the beginning and end of the printing of the front side of the duplexed job to pause the printer to allow the user to load the paper.

The QP sends the SP_SKIP_PAGE at the beginning of each pass of a duplexed job to tell the printer to skip printing of either all odd or all even pages.

The QP uses the SP_PRINT to print a blank page on the back sides of the optional header, trailer, and duplex instruction page.

For more information about SPs, see the *Resource Formats* document.

TotalPages

*Purpose*

This item is the count of the total pages for a job. When spooling, the QP writes the total to a temporary file if created so it may read it back to put into the status display. The QP also uses this value to determine when it has printed the last page of a job.

*Types*

It is one of the variables in the JobInfo structure for the job.

Trailer

*Purpose*

This item indicates that the optional trailer page is included with this job.

*Types*

It is a boolean variable contained in the QPInfo structure for the job.

Internal QP Data Structures

Queue Structure

*Purpose*

The QP is a DLL. Because there may be multiple print queues (ie: multiple driver-port combination active at the same time, information about a particular queue cannot be stored locally in the QP's data segment. Therefore, the Queue Structure for a particular queue is allocated out of the QP's near heap.

The Queue Structure contains the entire context of a particular queue. It tracks the state of the queue. The various parts of the QP, including the Framer, the duplexer/collator, and the Status Window (SW), can use private parts of the Queue Structure for whatever purpose they desire as well as sharing parts of the Queue Structure with other parts of the QP.

*Types*

The Queue Structure is a near pointer to fixed memory in the local heap.

Job Info Structures

*Purpose*

A Queue Structure contains an array of up to four JobInfo structures. The JobInfo structures define all of the print jobs that the QP knows about. The structures contain a copy of the QPInfo for each job, including information such as the name of the job, whether the job is duplexed, how many copies of the job to print, etc. Each JobInfo structure also contain information concerning the current state of the QP, the printer status, the number of pages in the job, and buffer and framer counters and pointers.

*Types*

For more information about about the QPInfo structure, see the qpinfo.h source file. For a description of the complete JobInfo structure, see the qpglobal.h souce file.

ICP buffer

*Purpose*

ICPs can be initiated by the QP at any time, but can be sent out only between frames. ICPs must be stored until WPSLJCOM is between frames. But because reading and handling ICPs must be sychronized, only one ICP is accepted until it is sent.

*Types*

This is a simple buffer, allocated at Open, and hung on a long pointer stuffed into the Queue Structure.

Spooling and Related Printing Through PM

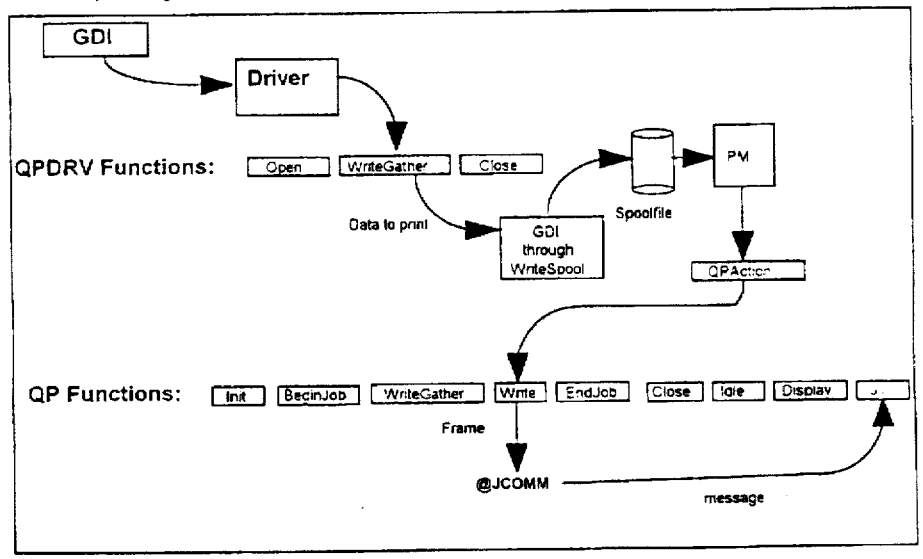

*Figure 5. Queue Processor Behavior Diagram: Spooling*

When the user wants to spool print jobs (either to a local port or through a network), he enables the Print Manager. Data to be printed is created by the Driver and transferred through the @QPDRV interface, using the WriteGather command. The WriteGather function opens a spool file and writes data to it using the GDI WriteSpool command. When the spool file has been written, GDI gives the PM the name of the spool file and the queue to which it belongs. The PM issues the QPACTION request with a QP_WRITE command across the @QPPM interface to the QP.

The QP then uses the Framer to package the data into frames. The Framer sends the data across the @JCOMM interface to the communications module, which sends it in turn to the printer across a port.

In two-way mode, with bi-directional communications, WPSLJCOM posts status change and paper movement messages to the status window. The QP User Interface (UI) processes these messages; this processing is described under the "display PSW" task in the Status Checking and Reporting Section.

Not Spooling and Related Non-PM Printing

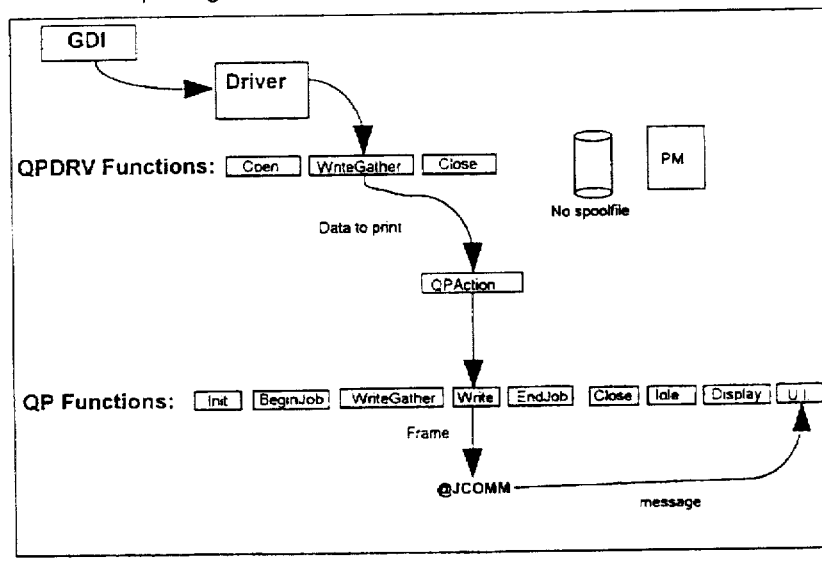

*Figure 6. Queue Processor Behavior Diagram: Not Spooling*

When the user wants to print without spooling (disabling the PM, sending the output to a file, or sending network output directly), the data flow changes slightly, but remains simple. Data to be printed is still created by the Driver and transferred through the @QPDRV interface, using the WriteGather command. The WriteGather function calls directly to the QPAction, using the QP_WRITE command. The Framer sends the data across the @JCOMM interface to the communications module, which sends it in turn to the printer when the output is directly to a WPS printer. In the cases of output to a spool file, network printer, or a DOS file, the Framer performs the appropriate opens, writes, and closes.

As in the spooled mode, when printing directly to a bi-directional WPS printer, status and paper movement messages are sent by WPSLJCOM to the UI.
Control Flow
QP States
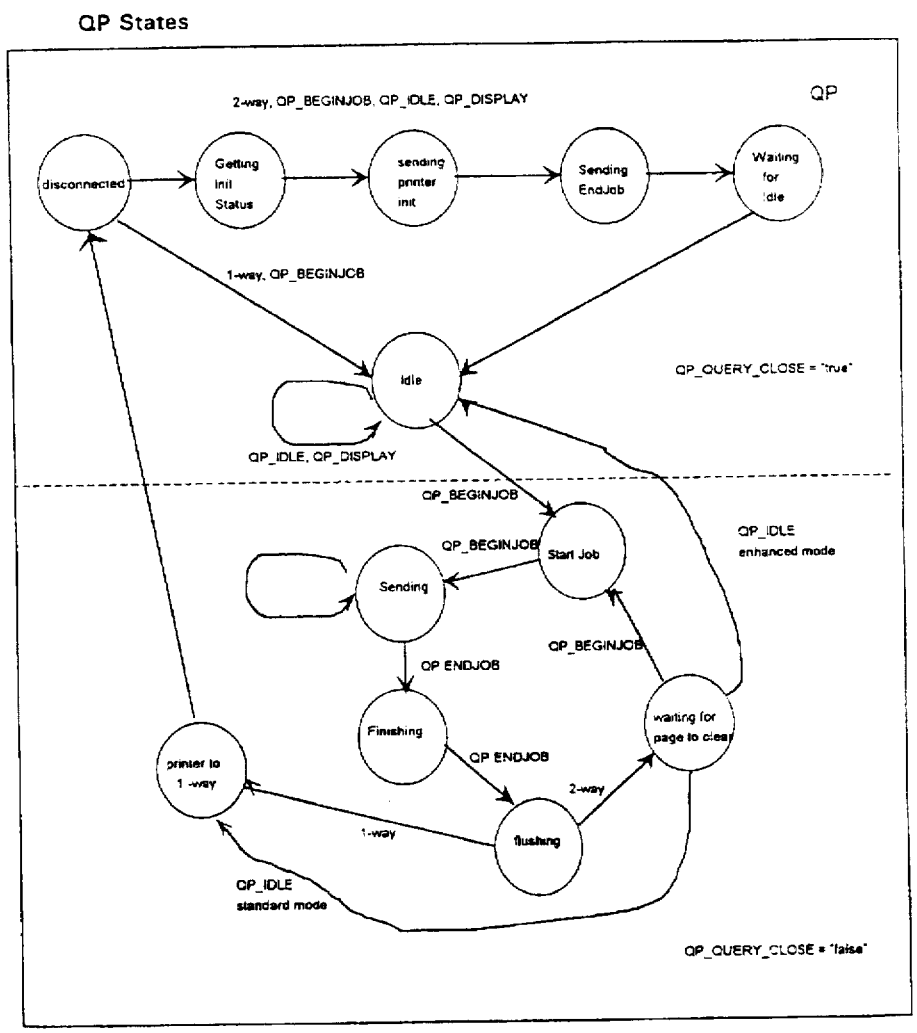
*Figure 7. Queue Processor State Diagram*

When the QP is loaded, it reads information about the printer and port from the configuration file. This allows the QP to determine the printer model, whether the PC is executing in enhanced or standard mode, whether the port is connected to a local printer, and, if so, whether the printer is capable of bi-directional communication. If the printer is capable of only one-way communications, the QP will not attempt to read status from it.

The QP states do not map one-to-one with the QP functions. In particular, one of several states could occur within most functions. Having said this, we can look at the possible states and how they occur and are treated by the QP.

When the QP is initialized, it is in the "Disconnected" state.

Communications errors with the printer, and certain error bits set in the printer's status word, causes the QP to go back to the "Disconnected" state from any of the subsequent states. To make the figure more understandable, error processing is not shown on the state diagram above.

The QP progresses to the other states depending on the caller's request for action, the current QP state, the printer's status, whether or not the printer supports bi-directional communications, and whether the PC is executing in standard or enhanced mode.

The QP will accept a QP_CLOSE request while it is in any of the initialization states, indicated by the QP_QUERY_CLOSE = "true" in the figure above. It will also accept a QP_CLOSE request in the "Printer to 1 Way" state after it sends the ICP_GO_TO_PCL command, and in the "Waiting for Page to Clear" state if the PC is executing in enhanced mode. The QP_CLOSE terminates the QP, so there is no new state after a QP_CLOSE gets processed.

The initiation and termination of a given print job may require several calls from the PM, the QPDRV, or the Driver to actually get the job started and to finish the termination. The initiation requires that the printer be opened and connected and the "get status" function return a "ready" status. The QP progresses from the "Disconnected" state through the "Getting Init Status", "Sending Printer Init", "Sending EndJob", and "Waiting for Idle" states to the "Idle" state when performing the initiation.

For termination, all pages of the print job must clear the jam indicator in the printer before the job can be removed from the print queue. For termination, the QP progresses from the "Sending" state when it receives the QP_ENDJOB, throught the "Finishing" and "Flushing" states before it will remove the job or add a new job.

When the QP is in the "Disconnected" state and it gets a QP_BEGINJOB request, or a QP_IDLE, or QP_DISPLAY request in two-way mode, it opens and connects the specified port for WPS communication. The connection process will fail and the state will remain "Disconnected" if the port is already in use or if there are errors in allocating memory or accessing the printer.

For a bi-directional printer, the QP will go into the "Getting Init Status" state. Since a one-way printer cannot respond with its status, the QP goes directly to the "Idle" state in this case.

In the "Getting Init Status" state, the QP sends a configuration status request to the printer and reads its response. It may require several calls from the PM, the QPDRV, or the Driver to the QP for this process to complete. (The calls from the PM may be QP_IDLE, QP_DISPLAY, and/or QP_BEGINJOB. The calls from the Driver will always be QP_IDLE. The calls from the QPDRV will always be QP_BEGINJOB.) A successful read of the printer's status, with no error bits set in the status word, places the QP in the "Sending Printer Init" state.

During the "Sending Printer Init" state, the QP will send a "printer initialize" command and go to the "Sending EndJob" state.

In the "Sending EndJob" state, the QP checks if the printer status, returned in the "getting init status" state, had the "busy" bit set. If so, the QP sends an "endjob" command to the printer to insure that there is no information will be left from atheprevious job. This would normally occur if the QP aborted the previous job.

The QP then enters the "Waiting for Idle" state and gets the printer's status.

As in the "Getting Init Status" state, the QP may require several calls from the PM, the Driver, or the QPDRV to complete the processing in each of the above states.

Once the printer is ready to receive data, or after the open of a one-way port, the QP goes to the "Idle" state. In this state, the QP may receive a QP_IDLE, QP_DISPLAY, QP_BEGINJOB, or QP_CLOSE request for action. The QP first reads the printer status if the time since the last read exceeds the caller's threshhold. The QP_IDLE and QP_DISPLAY requests will leave the QP in the "Idle" state. A QP_CLOSE request causes the QP to terminate, so no change to its state is required.

When the QP is in the "Idle" state and receives a QP_BEGINJOB command, it adds the job to its queue, sends the SP_START_JOB_GROUP command to the Framer, and enters the "Sending" state. QP_WRITEs always occur in the "Sending" state.

A QP_ENDJOB cause the QP to switch from the "Sending" state into the "Finishing" state. In this state, the QP sends any additional passes for duplexed and/or collated jobs. When it has finished giving all of the data to the Framer, it enters the "Flushing" state.

In the "Flushing" state, the QP calls the Framer to allow it to frame and send any remaining data. When the Framer completes the transmission, the QP will enter the "Waiting for Page to Clear" state for a bi-directional printer, or the "Printer to 1 Way" state for a one-way printer.

The QP can go from the "Waiting for Page to Clear" state back to the "Start Job" state via another QP_BEGINJOB without actually first getting a "true end of job." In other words, the QP can finish sending data to the printer and start waiting for the last page of the job to clear the jam indicator, but immediately get another job. In this case, the QP will immediately start sending that new job's data before the first job completely clears the printer. (The previous QP_ENDJOB must, however, be *issued* before any subsequent QP_BEGINJOB can succeed.)

If the QP receives a QP_CLOSE request before the last page of the job clears the jam indicator in the printer, it will return "failure" with the error set to "busy" unless the caller set the "must close" parameter.

If the QP receives a QP_IDLE request when in the "Waiting for Page to Clear" state, it uses the PC mode to determine its next state.

When the PC is executing in enhanced mode, the QP enters the "Idle" state and remains connected to the printer between jobs. The QP will "relax" ownership of the printer to allow a DOS job to "steal" the port for its own use while the PM is between jobs. If this occurs, the QP will discover that it does not have access to the port the next time it does a "get ownership" as part of the read of the printer status. It will notify the PM of the fact by returning "failure" with an error code of "busy."

When executing in standard mode, the QP will put the port into PCL mode, disconnect from the port, and enter the "Disconnected" state at the end of each spooled job when it receives the QP_IDLE.

The user may "pause" a job by selecting the PAUSE button on either the PM dialog box or the PSW or by depressing the PAUSE button on the printer. He may "resume" the job by selecting the RESUME button on the PM dialog box or the PSW or by depressing the RESUME on the printer. The use of the pause and resume does not change the QP state but merely stops and restarts the printing.

During these states and transitions, the QP keeps track of up to four jobs. The last job in the array of pointers to job structures is the sending job. So, the QP can work with one sending job and up to three jobs that have been sent, but that have not yet cleared the printer. There will never be any jobs (as far as the QP is concerned) in this array that have not yet been sent or are in the process of being sent. If this array fills and the PM sends another QP_BEGINJOB, the QP will return "failure" with an error code of "busy."

Therefore, the "true end of job" will always be from the oldest job---never from the job that the QP is currently sending. This means that the QP has to keep track of iterations of job states for each of the jobs.

QP Status Checking and Reporting

Status checking and the reporting of the current printer status via the PSW are key elements of the usefulness of two-way (bi-directional) communications. The QP only reads and checks the printer status for bi-directional printers.

There are two tasks that perform the status checking and reporting functions: (1) the "get status" task is responsible for reading the status and informing the caller whether it attempted to read the status and if said read was successful; and (2) the "display PSW" task handles all of the interaction with the user via the PSW.

Since the QP uses standard GDI calls for the interface with the dialog boxes, there is no task within QP to perform these functions.

Figure 8 shows the relationship of the tasks involved in status checking and reporting, and includes the use of dialog boxes and message boxes to communicate information to the user in one-way mode.

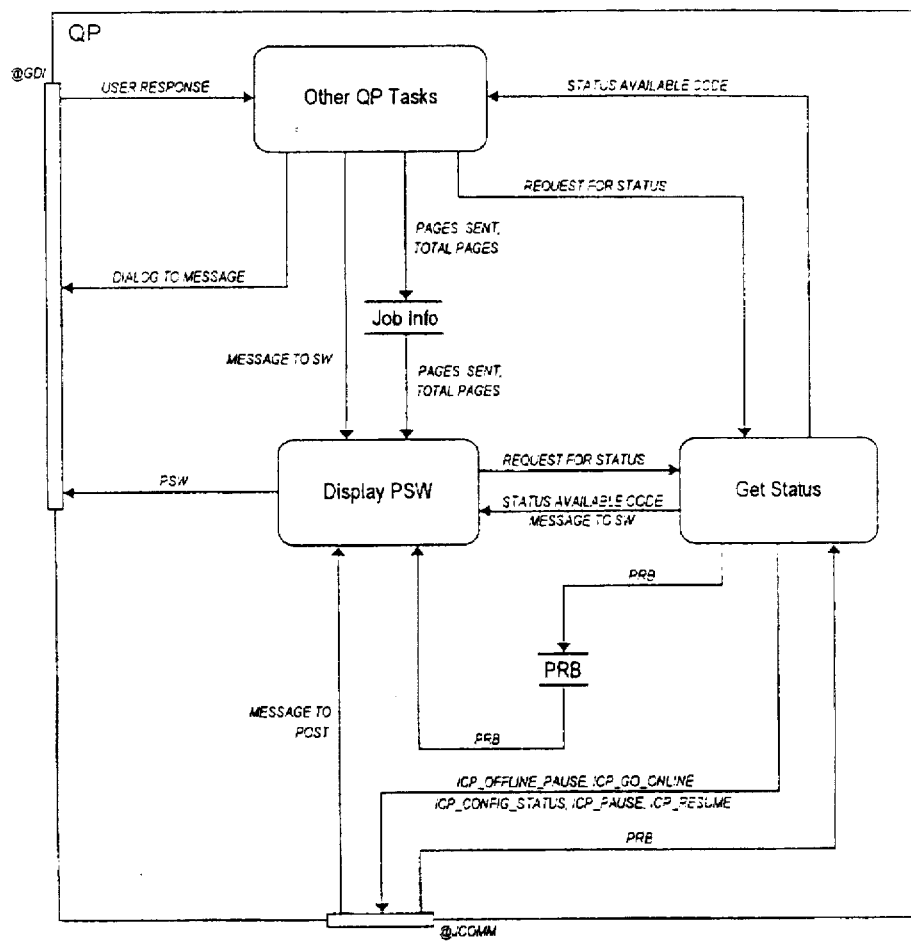
Figure 8. QP Status Reporting Control Flow Diagram

Get Status Task

Each time the PM or the QPDRV calls it or the WPSLJCOM posts a message to the "display SW" task, the QP must get the printer's status if it is time to do so.

The calls to the "get status" task can occur from several other tasks within the QP. The calling task determines what effect the status will have on the QP's processing, based upon the current QP state, the QPAction request, whether the printer is "ready," and the status.

Since only one ICP may be sent at the time, the "get status" task is responsible for sending ICPs other than just the ICP_CONFIG_STATUS. Specifically, it will send the ICP_OFFLINE_PAUSE or the ICP_GO_ONLINE when the user has selected the Pause or Resume button on either the PM dialog box or the PSW as the first thing it does when called.

The "get status" task next checks if it is time to read the printer status. If it is not yet time to read the status from the printer, based upon the threshold the caller provides, the "get status" function returns "ready" and leaves the status set to the value from the last read. This threshold has different values, depending upon the QP state and the reason for the call. These values are summarized in Table 6, at the end of the description of the "get status" task.

When it is time to read the status, the "get status" task sends the ICP_CONFIG_STATUS and issues the read request. If the ICP_CONFIG_STATUS is not sent immediately because the "gather and frame data" transform has not finished building the current frame, the "get status" task will return a "busy" indication. "Get status" will also return a "busy" indication if the printer was busy with other processing and could not immediately return its status. The "get status" task keeps track of where it was in the read sequence when it returns "busy" so it may execute the next step when it is called again, and returns to the calling task. Table 6, at the end of the "get status" task description, summarizes the action each caller takes on the "busy" return.

When the status is available, the "get status" task compares the previous status with the current status, and replaces the previous status with this new status. If there is a change in status, the "get status" task sends a PRINTED, ERROR, RESTORE, FEEDERCHANGE, or WARNING message to the "display PSW" task, depending on the actual change. It will also send a NEWJOB and JOBDONE message to the "display PSW" task at the beginning and completion of each job, respectively.

If the QP is unable to perform any of the I/O to complete the status read, including timing out on an I/O request, the "get status" task returns "error" to the caller.

The read of the printer's status also occurs when the printer toggles a status line after its status changes. This causes WPSLJCOM to post a message to the status window. This posting, in turn, causes a status read to begin immediately. The immediate read occurs because the caller sets the threshold to wait until issuing a read to zero.

The most common reason for a status change is that a page has been fed, at which point the printer will post a "kick page" event to the "display SW" task.

Other common causes are: out of paper, printer offline for manual duplexing, paper jam, or the user has turned the printer offline or online. If the user has turned the printer online or offline, the QP sends a message to the "display PSW" task and posts a message to the PM so each one may update the PAUSE and RESUME buttons in their respective displays By checking status this way, the QP can reduce the frequency at which it does automatic status checking. Reducing the status checking frequency reduces overhead and allows for very prompt printer handling. Without this means to check status, a user would see an "out of paper" display up to 14 seconds after the event happens; with it, the user can usually learn about the "out of paper" condition in one second.

If an error occurs, the QP stays in the state it was in prior to the "get status" call in order to resolve the error. Its evaluation process occurs while in that prior state, can involve user input, and can result in either an abort or a continuation of processing. In fact, each status check can be "exploded" like this:

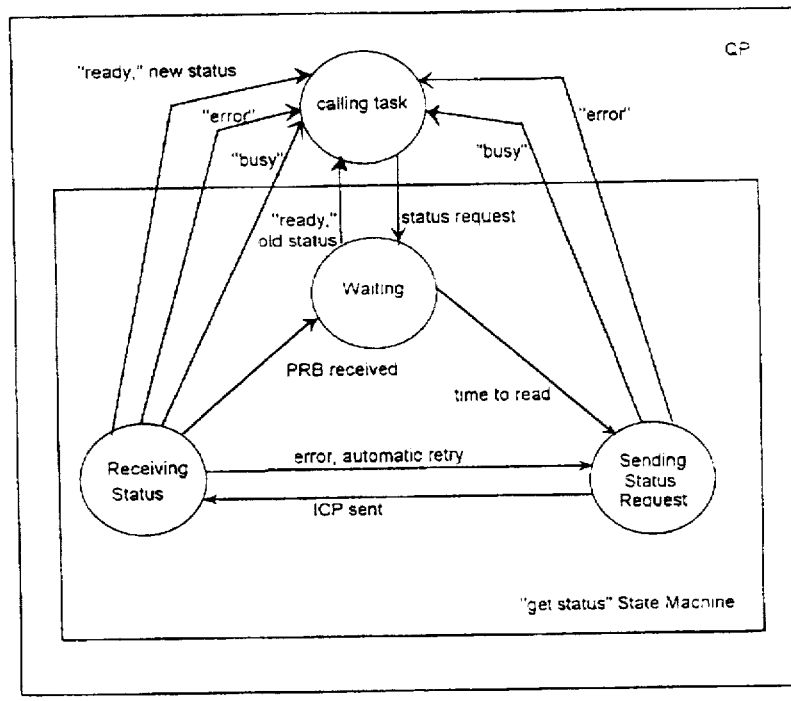

*Figure 9. Queue Processor "Get Status" Processing*

The QP has four possible exits from each status check: (1) to continue processing, because the status is OK ("get status" returns "ready"); (2) to wait for the user to correct a problem shown on the PSW ("get status" returns "ready"); (3) it must call the "get status" task again ("get status" returns "busy"); or (4) to abort ("get status" returns "error"). The user may need to become involved in the evaluation and resolution process; if so, he has an opportunity to provide input to the QP through a dialog window.

When the QP decides to abort, it can do so because of:

1. user decision

| Windows Printing System Design Specification | Queue Processor (QP) |

2. extremely long wait with either chronic errors reported, or with no status reported back
3. communications errors In situations (2) and (3) above, the QP aborts the last job in the queue, resets and closes the port, and enters the "Disconnected" state. The QP returns to the PM (spooled job) or the QPDRV (direct print job) with the "error" indication, which gives the PM the opportunity for the user to pause the queue or for the QPDRV to return to the Driver to wait for the user to cancel the job. When using the PM and the error has been fixed, the user can unpause the queue and the QP will resume where it left off, with at most one job, the "error-causing" job, being lost.

The QP is responsible for recognizing if any data was lost because of host, communications, or printer errors. The printer would recognize if it lost a complete block (and it would know this if the block number is invalid). Then, it would notify the host of a fatal error—such as "Invalid Job," or "Invalid Block Number"—which would cause the QP to inform the user so he may abort the job.

The table below summarizes the interactions between the "get status" task and its callers.

Windows Printing System Design Specification | Queue Processor (QP)

*Table 6. "Get Status" Processing*

| threshold (seconds) | time out (seconds) | reason for call | what caller does if "error:" | what caller does if "busy:" |
|---|---|---|---|---|
| 0 | 13 | Immediate read due to status change. | Sends message to "display PSW," returns "error." The "error" return is ignored. | Tries for 5 seconds before returning. "Busy" return is ignored. |
| 3 | 10 | Have initialized printer, waiting for it to be "Idle." | Aborts the last job, resets and closes port, puts QP into "Disconnected" state. If called by PM, changes return to "busy." Returns "busy" or "error." | Returns to caller (PM, QPDRV, or the Driver). |
| 14 | 5 | QP is in "Idle" state, printer may still be printing a previous job. | Will execute QP_CLOSE request. Otherwise, aborts last job, resets and closes port, puts QP into "Disconnected" state. If request is QP_BEGINJOB, QP_ENDJOB, QP_IDLE, returns "busy," otherwise "error." | Will execute QP_ENDJOB if abort flag is set. Otherwise returns to PM or QPDRV with "busy." |
| 14 | 10 | Sending pause or resume to printer. | Doesn't check, since purpose is to send the ICP. | Doesn't check, since purpose is to send the ICP. |
| 14 | 130 | QP is sending a job to the printer. | Will execute QP_CLOSE request. Otherwise, aborts last job, resets and closes port, puts QP into "Disconnected" state. If request is QP_BEGINJOB, QP_ENDJOB, QP_IDLE, returns "busy," otherwise "error." | Will execute QP_ENDJOB if abort flag is set. Otherwise returns to PM or QPDRV with "busy." |

Dialog boxes

The QP has many dialog boxes it displays, particularly when printing duplexed and/or collated jobs to a one-way printer. The tasks which use dialog boxes make calls directly to the Windows GDI, so there is no QP task to handle the messages.

The duplexer task notifies the user at the beginning and ending of the first side of a duplexed job in one-way mode using the GDI routine "DialogBoxParam." When the user has properly loaded the paper, he must respond "OK" on the dialog box.

The other duplexer/collator messages cause the QP to "pop up" a message box with the problem shown and a suggested solution, using a call to the GDI MessageBox routine. The user may respond "retry" or "cancel" or "OK."

Table 7 below shows the duplexer/collator Control tasks or DFD transforms communicate with the user via dialog or message boxes.

Windows Printing System Design Specification　　　　　　　　　　　　　　Queue Processor (QP)

There are four other "general" dialog boxes that may appear at any time in the QP processing: (1) printer is offline or not selected; (2) printer is out of paper or not connected; (3) printer is not responding; and (4) network error has occurred;

The *Jumbo Functional Specification* contains more information about the dialog boxes and the messages.

*Table 7. Tasks/Transforms That Use Dialog Boxes*

| | user's choices | save first pass (DFD) | read and resend spooled data (DFD and Control) | check duplex/collate (Control Flow) |
|---|---|---|---|---|
| Dup1WayStart | OK | X | | |
| Dup1WayFinish | OK | | X | |
| Not Enough Memory to Continue | none - fatal | X | X | X |
| There is not enough disk space to print "job name." Delete any unwanted files from your disk and then try printing the document again. | none - fatal | X Duplexed only | | |
| There is not enough disk space to print "job name." To print One Copy of the document, press OK. Otherwise, press Cancel, delete unwanted files from your disk and print again. | OK, cancel | X Collated only | | |

Display PSW Task

This task executes for the following reasons:

> WPSLJCOM has detected a change in the printer's status and posts a message to this task for it to perform an immediate call to "get status."

> A "kick page" has occurred on the printer and WPSLJCOM posts a message to this task.

> The "get status" task has found a change in the printer's status and sends a message to this task.

> The user has selected the option for automatic display of the PSW.

> The user has requested a display of the PSW.

> This task sends itself a message to display.

> Other tasks have a message to be displayed.

33

Windows Printing System Design Specification　　　　　　　　　Queue Processor (QP)

The user has selected the Delete, Pause, or Resume button on the PSW.

The user has paused or resumed the print queue using the PM Pause or Resume buttons.

The one second timer set by this task has expired. This timer allows the "display PSW" task to keep the PSW information current, irrespective of whether the window is full-sized or ionized.

The user can set the option for automatic display of the status window and can request a display of printer status any time the PM is active.

The "display PSW" task builds the display, describing and showing the problem area if applicable, and fills in the page count and printer status information.

Table 8 below shows which DFD transforms or Status Checking and Reporting tasks or Control flow tasks send messages to the "display PSW" task. The messages themselves are discussed under the Control Item "Messages to SW."

*Table 8. Tasks That Send Messages to "Display PSW"*

|               | determine action (Control Flow) | get status | gather and frame data (DFD) | display PSW |
|---------------|---------------------------------|------------|-----------------------------|-------------|
| CHANGE BUTTON | X                               |            |                             |             |
| DISPLAY       | X                               |            |                             |             |
| ERROR         | X                               | X          |                             | X           |
| FEEDER CHANGE |                                 | X          |                             |             |
| INFO UPDATE   | X                               |            | X                           | X           |
| JOB DONE      |                                 | X          |                             | X           |
| NEW JOB       | X                               | X          |                             | X           |
| PRINTED       |                                 | X          |                             |             |
| RESTORE       |                                 | X          |                             | X           |
| SENT          |                                 |            | X                           |             |
| STATUS        | X                               |            |                             |             |
| UPDATE        |                                 |            |                             | X           |
| WARNING       |                                 | X          |                             | X           |

Status Checking and Reporting Control Items

| Windows Printing System Design Specification | Queue Processor (QP) |
|---|---|

Dialog message

*Purpose*

The message identifies which dialog box to display.

*Types*

Each message is a character string. For those messages that are not self-explanatory, a brief description is included with the messages listed below:

"Dupl WayStart" - The QP has begun the printing of a duplexed job to a one-way printer.

"Dupl WayFinish" - The QP has completed the printing of the front side of a duplexed job to a one-way printer.

"Not Enough Memory to Continue"

"The printer on % is not responding. Check the printer and then press Retry."

"The printer on % is out of paper or not connected. Refresh the paper supply, or make sure the printer cable or netwrok connection is connected. Then press Retry."

"A general network error has occurred. Check the network connection and then try printing the document again."

"The printer on % is offline or not selected. Make sure the printer is online and selected, and press Retry."

"There is not enough disk space to print. Delete any unwanted files from your disk, and then try printing the document again."

"There is not enough disk space to print. To print One Copy of the document, press OK. Otherwise, press Cancel, delete unwanted files from your disk and print again."

ICP_CONFIG_STATUS, ICP_GO_ONLINE, ICP_OFFLINE_PAUSE

*Purpose*

The QP sends an ICP to have the printer immediately execute the command.

*Type*

The QP requests the printer's status by sending the ICP_CONFIG_STATUS.

The QP sends the ICP_GO_ONLINE when the user selects the Resume button on either the PM dialog box or the PSW.

The QP sends the ICP_OFFLINE_PAUSE when the user selects the Pause button on either the PM dialog box or the PSW.

The QP sends the ICP_PAUSE and ICP_RESUME to pause and resume the printer in response to the QP_QUEUE_PAUSE and QP_QUEUE_UNPAUSED requests from the PM or the user selecting the Pause and Resume buttons on the PSW.

Windows Printing System Design Specification  Queue Processor (QP)

See the *Resource Formats* document for the description of these ICPs.

Message to post

*Purpose*

This message from WPSLJCOM indicates there has been a printer status change or a "kick page" has occurred.

For the status change, the QP must now read the printer status.

*Type*

See the *Jumbo Communications DLL Design Specification* for more information.

Message to SW

*Purpose*

Various tasks within the QP send a message to the "display PSW" task for it to build and display the PSW. This message identifies the type of information to be included in the window, such as beginning or end of job, or a printer status change.

For a description of the actual printer status, see the PRB_QUICK_STATUS in the *Resource Formats* document.

*Types*

CHANGE BUTTON - This message indicates that the user has selected the Pause or Resume button on the PM dialog box. The respective buttons in the PSW will reflect the user's selection.

DISPLAY - The user has requested a display of the PSW.

ERROR - The QP has experienced a communications error which causes it to disconnect from the printer or the printer status has changed and at least one error bit is set.

FEEDER CHANGE - The printer's number of feeders has changed or any of the FEEDCFG structures have changed.

INFO UPDATE - The number of pages in the job has changed. This occurs when the QP processes the job information block from the QPDRV, the job was aborted, or the application changed the copy count before it sent the first page.

JOB DONE - The printer has finished the printing of the job.

NEW JOB - A new job has moved to the top of the QP's job queue.

PRINTED - The printer has incremented the number of pages printed.

RESTORE - The printer status has changed and there are no error or warning bits set.

SENT - The QP has sent the printer all the data for the page.

STATUS - The communications state has changed to Status Valid or Status Not available. If the state changes to Communications Error, the ERROR message is sent instead.

| Windows Printing System Design Specification | Queue Processor (QP) |
|---|---|

WARNING - The printer status has changed and at least one warning bit is on.

PagesSent

*Purpose*

The "gather and frame data" transform increments this item every time there is a Page Break spool block in the data stream. The QP uses PagesSent to determine when if the printer has finished printing all pages for the job so the QP can remove that job from its queue.

*Types*

This item is one of the fields in the JobInfo structure for the job.

PRB (Printer Response Block)

*Purpose*

This item reflects the last status received from the printer. The "get status" transform reads the printer status when the time between reads has expired and when WPSLJCOM detects a change in status. It stores the status in the JobInfo structure for use between reads of the status and to build the status display.

*Types*

This item is a copy of the PRB_QUICK_STATUS and is stored in the JobInfo as the item scLast. See the *Resource Formats* document for this response block.

Request for status

*Purpose*

The caller needs the printer status, which the "get status" task will read from the printer only if the time since it last got status exceeds the threshold set by the caller.

*Types*

The parameters are the pointer to the queue, the threshold time between status reads, and how long to wait for the printer to respond.

Status available code

*Purpose*

The "get status" task returns "ready," "busy," or "error."

"Ready" means the status is available.

"Busy" means the QP is in the process of reading the printer's status. Additional calls to "get status" must be made until "get status" returns "ready" or "error."

"Error" means that the QP could not complete the status read sequence. If the read completed but error bits were set in the status word, "get status" returns "ready" after informing the user of the error via the PSW.

*Types*

The response is an integer value.

TotalPages

*Purpose*

This item is the count of the total pages for a job. When spooling, the QP writes the total to a temporary file it created so it may read it back to put into the status display. The QP also uses this value to determine when it has printed the last page of a job.

*Types*

It is one of the variables in the JobInfo structure for the job.

User Response

*Purpose*

This item is the user's response to an error in the processing of a duplexed and/or collated job.

*Types*

This item is an integer value, indicating "cancel," "abort," or "resume."

The Status Window State Machine

The state machine for the SW has seven states. Figure 10 shows the states and the events that cause the SW to change states.

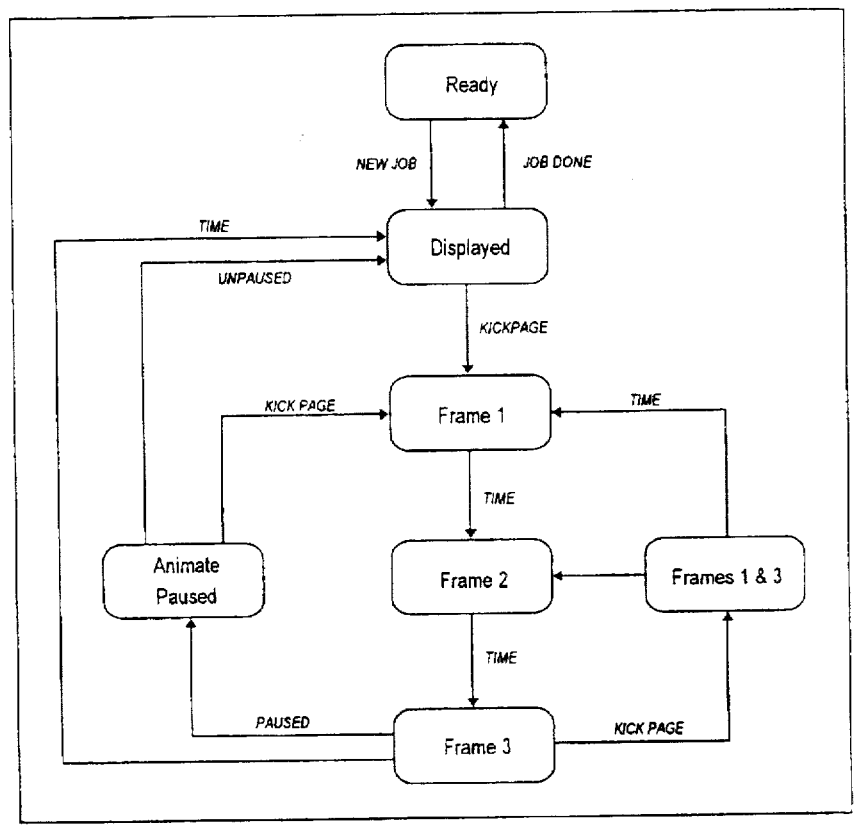

Figure 10. Status Window State Machine

When the QP is initialized, it creates the PSW but does not display it. The first message to "display PSW" puts the SW State Machine into the Ready state.

Each time "display PSW" determines that it is time to show the paper in a new position, it changes between the "Frame No. 1," "Frame No. 2," "Frame No. 3," "Frame No. 1 and 3," and "Displayed" state based upon the paper position and the "kick page" interrupt. In each of these states, it displays the job status and the status picture and/or progress bar, depending upon the user's selections, each time it updates the PSW.

"Display PSW" recomputes the estimated completion time when the printer resumes after a Pause, when the number of pages changes (such as a new page received in direct mode), and when the PSW is "restored" to its previous state following an error condition.

The *Jumbo Functional Specification* contains a complete description of the paper positions and the layout of the PSW.

| Windows Printing System Design Specification | Queue Processor (QP) |
|---|---|

Ready State

The QP is in the "Idle" state and there are no jobs in the print queue. The PSW shows the "Printer Ready" message and any printer status changes that have occurred since the QP opened the port, such as the user changing the paper size or opening the printer cover.

When the SW State Machine receives a NEWJOB message, it enters the "Displayed" state.

Displayed State

The PSW displays the bar and animation as selected by the user. It describes information about the job, such as the job identifier, estimated completion time, and any status changes since the last read of the printer status word.

When a "kick page" occurs, the SW State Machine goes into the "Frame No. 1" state.

Frame No. 1 State

The paper is at position 1 in the printer. When it moves beyond this position, the SW State Machine goes into the next state.

Frame No. 2 State

The paper has moved to position 2 in the printer. When it moves beyond this position, the SW State Machine goes into the next state.

Frame No. 3 State

The paper has moved to position 3 in the printer. The SW State Machine goes into the "Frames No. 1 and 3" or the "Frame No. 1" state depending upon where paper is in printer.

Frames No. 1 and 3 State

The first piece of paper is in position 3 and a second piece of paper has moved into position 1.

Animate Paused State

If the Pause button is on after the "Frame No. 3" state, the SW State Machine will go into the "Animate Paused" state. While in this state, it will pause the page count and let the estimated completion time continue to increase. It will leave this state if the SW receive another "kick page" event, in which case it re-estimates the completion time and proceed to the "Frame No. 1" state.

The other way to leave the "Animate Paused" state is to have the Resume button activate. In this case, the SW State Machine re-estimates the completion count, proceeds to the "Displayed" state, and waits for a NEWJOB, JOBDONE, or "kick page" event.

The user can pause his job by selecting the Pause button in the PSW directly, selecting the Pause button on the PM dialog box, or depressing the Online button on the printer. When he uses the Pause button on the PSW or the Online button, this task posts the PM_QUEUE_PAUSED message to the PM so it may update its display and stop sending data to the QP.

The user may resume his job by selecting the Resume button in the PSW directly, selecting the Resume button on the PM dialog box, or depressing the Online button on the printer. When he uses the Resume button on the PSW or the Online button, this task posts the PM_QUEUE_UNPAUSED message to the PM so it may update its display and resume sending data to the QP.

QPDRV Tasks

The QP consists of two functional areas, the QPDRV processing associated with calls from the Driver, and the main body of the QP, which consists of the QPAction, Framer, user interface, and duplex/collator functions.

The QPDRV module is necessary because current versions of the GDI do not support direct printing to devices which use QPs.

The four QPDRV functions can occur as shown in the following BNF equation:

```
Queue Processor Session ::= QPDRVOPEN
    - {QPDRVWRITEGATHER | QPDRVPAGE}*
    - QPDRVCLOSE
```

The QPDRV function receives all data and control information from the WPS Driver. If the PM is enabled, the QPDRV opens, writes, and closes the spool file(s). In direct mode, the QPDRV calls into the QP through the "determine action" transform. Table 9 below summarizes the sequence of the calls to the QPDR and its processing of those calls. Entries within the table outlined in double lines indicate optional pages and optional processing.

*Table 9. QPDRV Processing*

| Driver Call: | Type of data: | What QPDRV Does: | If spooling, QPDRV: | QPDRV calls QP in direct mode: |
|---|---|---|---|---|
| QPDrvOpen | QPInfo structure | creates QPInfo spool block | opens spool file<br><br>writes QPInfo spool block | QP_INIT, QP_BEGINJOB, QP_WRITE |
| QPDrvPage | optional header page | creates Page Break spool block with type = header page | writes spool block | QP_WRITE |
| QPDrvWriteGather | SP_BEGINJOB | creates spool block with type=Resource | writes spool block | QP_WRITE |
| QPDrvWriteGather (if direct, parallel port) | SP_FEED | creates spool block with type=Resource | writes spool block | QP_WRITE |
| QPDrvWriteGather as many calls as there are resource blocks on the page | resource block(s) for header page | creates spool block with type=Resource | writes spool block | QP_WRITE |
| QPDrvWriteGather | SP_PRINT | creates spool block with type=Resource | writes spool block | QP_WRITE |
| QPDrvPage | end of page | creates spool block of type = Page Break | writes spool block | QP_WRITE |
| QPDrvWriteGather | SP_ENDJOB | creates spool block with type=Resource | writes spool block | QP_WRITE |

Windows Printing System Design Specification | Queue Processor (QP)

| Driver Call: | Type of data: | What QPDRV Does: | If spooling, QPDRV: | QPDRV calls QP in direct mode: |
|---|---|---|---|---|
| QPDrvPage | start of job | Creates Page Break spool mark with type = start of job | Closes header file and opens main file if header exists. Writes spool block | QP_WRITE |
| QPDrvWriteGather | SP_BEGINJOB | creates spool block with type=Resource | writes spool block | QP_WRITE |
| QPDrvWriteGather (if direct, parallel port) | SP_FEED | creates spool block with type=Resource | writes spool block | QP_WRITE |
| QPDrvWriteGather as many calls as there are resource blocks on the page | resource blocks | creates spool block with type=Resource | writes spool block | QP_WRITE |
| QPDrvWriteGather | SP_PRINT | creates spool block with type=Resource | writes spool block | QP_WRITE |
| QPDrvPage | end of page | creates spool block of type = Page Break | Writes spool block | QP_WRITE |
| QPDrvWriteGather (if direct, parallel port) | SP_FEED | creates spool block with type=Resource | writes spool block | QP_WRITE |
| QPDrvWriteGather as many calls as there are resource blocks on the page | resource blocks | creates spool block with type=Resource | writes spool block | QP_WRITE |
| QPDrvWriteGather | SP_PRINT | creates spool block with type=Resource | writes spool block | QP_WRITE |
| QPDrvPage | end of page | creates spool block of type = Page Break | Writes spool block | QP_WRITE |
| QPDrvWriteGather and QPDrvPage calls continue for the entire job | resource blocks and ends of pages | creates spool blocks of type=Resource, and type=Page Break | Writes spool block | QP_WRITE |
| QPDrvWriteGather | SP_ENDJOB | creates spool block with type=Resource | writes spool block | QP_WRITE |

Windows Printing System Design Specification　　　　　　　　Queue Processor (QP)

| Driver Call: | Type of data: | What QPDRV Does: | If spooling, QPDRV : | QPDRV calls QP in direct mode : |
|---|---|---|---|---|
| QPDrvPage | optional trailer page | creates Page Break spool block with type = trailer page | writes spool block | QP_WRITE |
| QPDrvWriteGather | SP_BEGINJOB | creates spool block with type=Resource | writes spool block | QP_WRITE |
| QPDrvWriteGather (if direct, parallel port) | SP_FEED | creates spool block with type=Resource | writes spool block | QP_WRITE |
| QPDrvWriteGather as many calls as there are resource blocks on the page | resource block(s) for trailer page | creates spool block with type=Resource | writes spool block | QP_WRITE |
| QPDrvWriteGather | SP_PRINT | creates spool block with type=Resource | writes spool block | QP_WRITE |
| QPDrvPage | end of page | creates spool block of type = Page Break | writes spool block | QP_WRITE |
| QPDrvWriteGather | SP_ENDJOB | creates spool block with type=Resource | writes spool block | QP_WRITE |
| QPDrvClose | — | cleans up all processing for the job | Writes and closes temporary file with number of pages in the job<br><br>closes spool file | QP_ENDJOB, QP_CLOSE |

Figure 11 below shows the control flow within the QPDRV module.

44

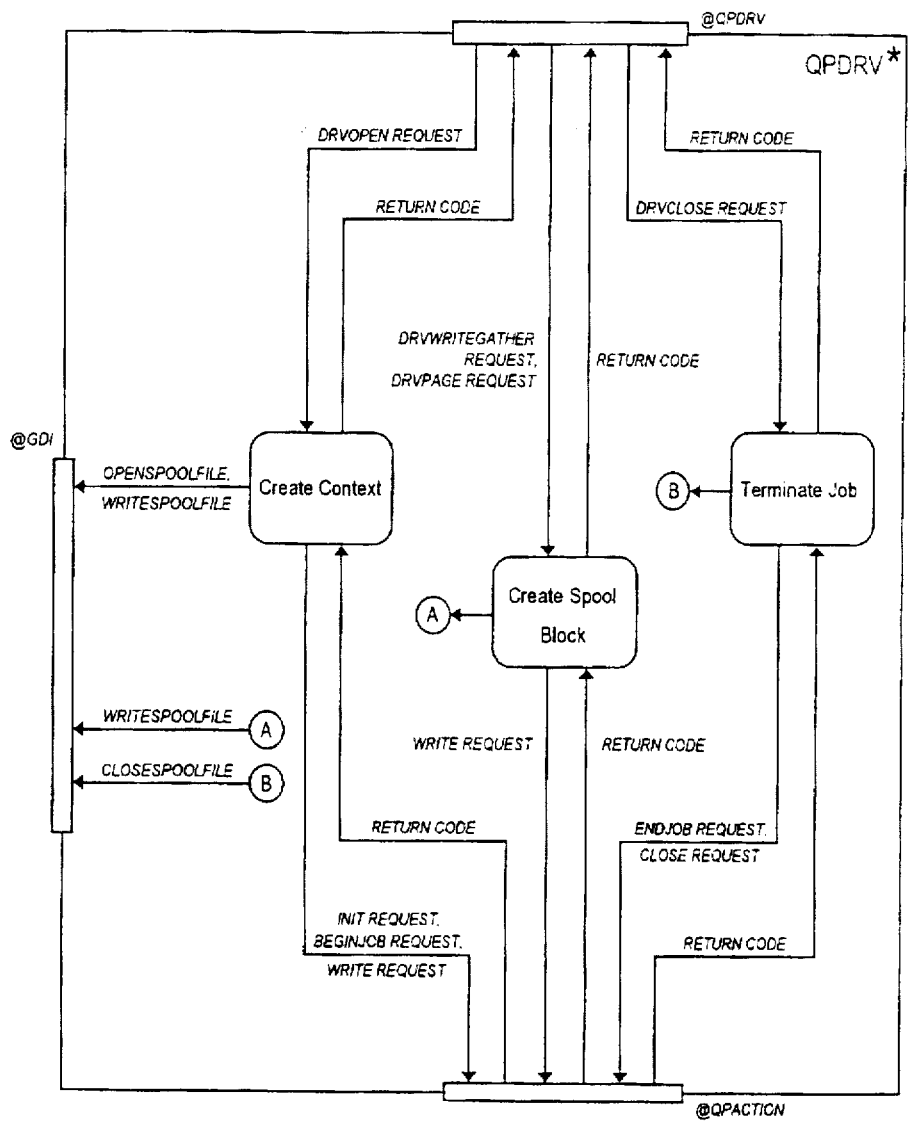
Figure 11. QPDRV Control Flow Diagram

Create context

This task processes the Driver's request to open the port for a Resource Based Printer Architecture (RBPA) job. If spooling is enabled, it opens a spool file for the job and writes the QPInfo data to the spool file, with an identifier corresponding to the name of the temporary file that will contain job information. In direct mode, it calls the QP with a QP_INIT request and then a QP_BEGINJOB request, sets the file name field to zero and sends the QPInfo data to the QPAction with a QP_WRITE request.

Terminate job

This task executes in response to the Driver's call to terminate this print job. In spooled mode, it closes the spool file, writes the job information to the temporary file that was created in the previous task, and closes that file. In direct mode, it calls the QP with a QP_ENDJOB and a QP_CLOSE.

Create spool block

This task creates the spool header information that QP needs to count pages, control processing of the job, and frame the despooled data. In direct mode, this task adds the same header information in case the job requires collating or duplexing and also to provide data to the framer in the same format as spooled data.

See the transform by the same name in the Data Flow section for more information.

QP Tasks

The main body of the QP executes in response to calls from the PM, the Driver, or the QPDRV. It will read the printer status if the time since the last read exceeds the rate at which to read. It always sets the Idle Rate field in the structure the caller provided to specify when to call the QP again if there are no more jobs in the queue. This communication between the QP and its caller allows the QP to complete its processing of QP_BEGINJOB and QP_ENDJOB commands without wasting CPU time on unnecessary calls.

The PM, the QPDRV, and the Driver use only one function to interact with the QP: The QPAction function. The behavior of this function depends on its "action" values and the QP state. It works much like a Windows message interface, with two generic parameters that vary in meaning depending on the action parameter.

Together, the QPAction parameters perform the various subfunctions needed by the PM, the QPDRV, or the Driver and the QP when they work together. This method of intermodule interaction was chosen because DLLs can be linked to applications two ways. First, the application can be told about the DLL at link time, so it can always load a particular DLL. In this case, Windows will automatically load both and link them together when the application loads. Second, because the RBPA products are installable, the application—at run time—will have to load the library explicitly, get the addresses of the entry points, and set up pointers to functions for all those entry points. This process is made easier by having just the one entry point for the QP. The QP's logic then becomes more easily extensible because the one function can handle newly defined messages.

The QPAction function always returns a success/failure indication. If the action failed, it also returns an error code that describes the reason for failure.

| Windows Printing System Design Specification | Queue Processor (QP) |
|---|---|

The PM interface to the QP: The values of the QPAction function can occur as shown in the following BNF equation:

Queue Processor Session ::= QP_INIT + {<active> | QP_QUERY_CLOSE | QP_DISPLAY | QP_IDLE}* + QP_CLOSE <active> ::= QP_BEGINJOB + {QP_WRITE | QP_DISPLAY | <paused>}* + QP_ENDJOB <paused> ::= QP_QUEUE_PAUSED + {QP_IDLE}* + QP_QUEUE_UNPAUSED The QPDRV interface to the QP: The values of the QPAction functions can occur as shown in the following BNF equation:

Queue Processor Session ::= QP_INIT + QP_BEGINJOB + {QP_WRITE}* + QP_ENDJOB + QP_CLOSE QPDRV also calls the QP through the QPAction function. The QPDrvOpen calls the QP with a QP_INIT and a QP_BEGINJOB. The QPDrvPage and QPDrvWriteGather functions each call the QP with a QP_WRITE. The QPDrvClose calls the QP with a QP_ENDJOB and a QP_CLOSE. Note that printing from the Driver (i.e., printing without the PM), does not allow for the equivalent of several pairs of BEGINJOB/ENDJOB. This is because the QPDRV will create and kill the QP for every job, and only needs one open/close pair (QPDrvOpen and QPDrvClose).

The Driver interface to the QP: The values of the QPAction functions can occur as shown in the following BNF equation:

Queue Processor Session ::= QP_INIT + {QP_IDLE}* + QP_CLOSE

The Driver calls the QP to get status if the user selects the Print Setup dialog. If the QP is not loaded for this port, the QP_INIT causes it to be loaded. The Driver calls QP_IDLE up to five times until the QP returns a "status valid" indication, at which time the Driver knows that the status has been read. If the status is not available after five calls to QP_IDLE, the QP returns a "busy" indication. The Driver closes the QP after it finishes with the QP_IDLE calls.

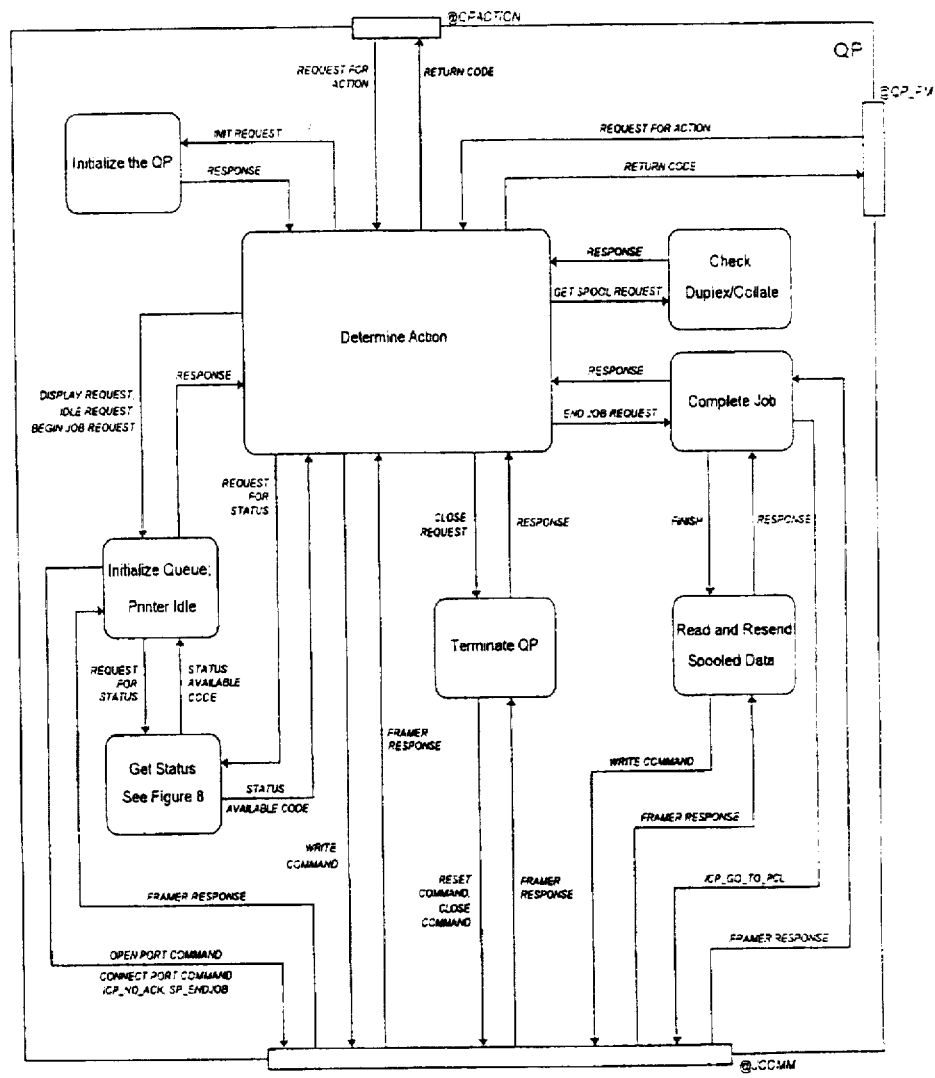
Figure 12. QP Control Flow
Determine action
This task determines which "function" to perform, based upon the QP state and the QPAction calling parameter.

QP_INIT

This function initializes the QP. It's called whenever the PM, the QPDRV, or Driver needs a queue processor. The caller passes two parameters: the interface version number, and the far pointer to the data structure, QPINITDATA. This is an opportunity for the QP to respond negatively, and disallow its loading—for example, because it's the wrong version, or the port will not satisfy its needs.

QP_BEGINJOB

This function is responsible for initializing the QP for this print job. If the QP state is "Disconnected" and the printer is bi-directional, the QP must open and connect the port, get the initial printer status, initialize the printer, and again get the printer status, with no errors in communicating with the printer or errors in the printer status word. The QP will return "failure" with an error code of "busy" to the caller as it is executing these printer commands. The PM or the QPDRV must continue to call the QP until it returns "success" on the QP_BEGINJOB If the printer is one-way, the QP immediately goes into the "Idle" state.

Successful processing of all of these communications with the printer will allow the QP to go to the "Idle" state. The QP will also enter the "Idle" state following the successful processing of the QP_ENDJOB from the immediately preceding spooled job When the QP is in the "Idle" state and it receives the QP_BEGINJOB request, it will add the new job to its queue, send the SP_START_JOB_GROUP command to the printer, set the state to "Sending", and return "success" to the caller.

QP_WRITE

This function accepts a pointer and count to the data, and writes the data to the specified port.

Errors are returned in uiErr of the header (QPHDR) part of QPWRITEDATA. The return parameter returns the number of bytes that were written. The QP might return to the PM or the QPDRV a null value in this field, thereby declaring that it is not able to accept data on this function call. The PM or the QPDRV must continue to call the QP until it accepts the write request and writes out all the data. Then, the caller will get more data for the QP to write.

QP_DISPLAY

This function is called when the user presses the button for printer status, or chooses "View. Printer Status" from the menu bar on the PM. When QP_DISPLAY is called, the QP will either display its window, or will activate the window if it's already displayed. Since the QP exists between QP_INIT and QP_CLOSE, the window will also exist (although it may be invisible or minimized to an icon). QP_DISPLAY can be called anytime between QP_INIT and QP_CLOSE, whether or not a job is in process.

QP_ENDJOB

This function declares that there is no more data for the job. The QP returns a boolean that says it either ended the job or did not end the job. The QP_ENDJOB will return "failure" with an error code of "busy" until it has completed the transmission of the last page of the job. The QP will then return "success" because it know that one of three things will have to happen: (1) a new QP_BEGINJOB if there's another job; (2) QP_IDLE calls, of which it can control the rate; or (3) a QP_CLOSE request, which will not succeed until all jobs have finished printing.

| Windows Printing System Design Specification | Queue Processor (QP) |
|---|---|

If the PM issues a QP_BEGINJOB, the QP will succeed, and the pipeline will remain full all the time. If the PM makes a QP_IDLE call, the QP will do work to finish the previous job. Or, the PM or the QPDRV can issue a QP_CLOSE, at which point the QP would fail until it finished processing the job.

QP_IDLE

QP_IDLE is only called when there are no active jobs in the queue or when the queue is paused (in this case, QP_IDLE is called repeatedly until the user responds). It's called after a QP_INIT when there are no jobs in the queue, after an QP_ENDJOB but before the next QP_BEGINJOB (between jobs), by the Driver between the QP_INIT and the QP_CLOSE, or during jobs when the pause button is pressed.

The QP_IDLE request from the PM provides the QP with the opportunity to get status, clean up job information after all pages have cleared the jam indicator, or complete the initialization of the port. This function is necessary because the QP can only execute when called by the PM, the Driver, or the QPDRV, although the QPDRV does not use this call.

The Driver uses the QP_IDLE call to get status when the QP was not loaded for this port.

QP_CLOSE

This function closes the queue and kills the QP. The QP_CLOSE fails if the QP is still working for some reason.

Initialize QP

This task executes in response to an QP_INIT request from the PM, the Driver, or the QPDRV. This task is the first one to execute when the QP is loaded, whether in spooled or direct mode. It checks for correct version, that the printer can be used on this port, and other errors that will prevent the QP from printing the job. It initializes the QP and creates the PSW, but does not display it.

If errors occur during this initialization, this tasks will report that error back to the caller by setting the return code to zero and setting the uiErr word with the error code. The calling routine will be responsible for notifying the user of the error.

Initialize queue; printer idle?

This task executes at the beginning of each print job when the QP is in the "Disconnected" state. It issues the port open and port connect commands by calling the FramerOpen function. It waits for the initial status that indicates the printer is ready to accept data. It will send an ICP to initialize the printer and may send an SPL to end the previous job. This task then calls the "get status" task each time it executes, waiting for the printer to be idle.

As was explained in the QP States section, the PM, the Driver, or the QPDRV will need to make several calls to the QPAction before the printer will become idle. This task sets the QP state as it makes the various calls to the printer, and returns "failure" with an error code of "busy" until such time as the printer is actually idle.

It will send the NEWJOB message to the "display PSW" task when it successfully completes the processing of a QP_BEGINJOB request.

Windows Printing System Design Specification | Queue Processor (QP)

If the QP encounters errors in its communication with the printer, it sends the ERROR message to the "display PSW" task.

Get status

See the description of this task in the Status Checking and Reporting Section.

Check collate/duplex

At the end of each of the (up to three) files in a spool file, the PM asks the QP whether it should delete the file. This task checks if the job has duplexed and/or collated copies. If not, it always returns permission to delete the file. It also always returns permission to delete the optional header file if it is present in the job.

For duplexed and/or collated jobs, it always asks the PM to save the spool file containing the pages of the job. It also requests the save of the optional trailer file for a collated job.

Complete job

When there is no more data for a print job, the caller (the PM or the QPDRV) requests the QP to terminate the job and release all buffers and queues it used for the job. The QP returns a "successful" indication once it has sent all pages for the job, even though there may still be some pages that have not passed the jam indicator. This allows the PM to begin sending the next job while this job finishes. Subsequent call to the QP with a QP_BEGINJOB, QP_IDLE, or QP_CLOSE will eventually result in the information for this job being released.

However, if duplexing or collating is in process, the remaining copies still need to be sent to the printer. The next task controls the processing of the other copies. This task returns a "failure" with the error code set to "busy" until all of the copies of this job have been sent to the printer.

At the end of a spooled job for a one-way printer or on a PC executing in standard mode, this task sends a GoToPCL mode ICP and waits a predetermined time after the transmission of the ICP before it will return "success." The printer blocks the communication channel and finishes printing all data it has received before it enters PCL mode.

Read and resend spooled data

This task: (1) reads the PM spool file or local file (if in direct mode); (2) inserts the optional duplex instruction page at the end of the job for those printers that require it in that location; (3) when duplexing, directs the skipping of pages and prints blank pages on the back sides of any optional pages; and (4) returns to "complete job" with a "ready" indication only when it has sent the last page of the last copy to the printer.

See the transform by the same name in the Data Flow section for the complete details.

Terminate QP

This task executes in response to the QP_CLOSE request. It closes the port, releases all the storage areas that the QP used, and kills itself.

If all pages for the last job have not cleared the jam indicator in the printer, this task will perform the termination only if the caller has set the "must close" flag.

Windows Printing System Design Specification　　　　　　　　Queue Processor (QP)

If it will not perform the QP_CLOSE at this time, it returns "failure" with an error code of "busy." The caller must then try again.

QPDRV, QP Control Items

Begin job request

*Purpose*

The caller requests the QP to allocate buffers, queues and other resources it needs to begin printing a new job.

*Types*

The call includes the handle for the job, the pointer to the QPBEGINDATA structure, and a return code. See the qppm.h source file for more details.

Close command

*Purpose*

The QP asks the Framer to command the WPSLJCOM to close the printer port.

*Types*

See the description of FramerClose in the QP *Framer Design Specification* and of the JPortClose in the *Jumbo Communications DLL Design Specification* for more details.

Close request

*Purpose*

The caller wants to end communications with the QP. The QPDRV has completed all of its processing of a job in direct mode, the PM has finished all of the jobs in its queues for this port, or the Driver has gotten the printer status.

*Types*

The calling parameters are described in the qppm.h source file.

Connect port command

*Purpose*

The QP has issued the open port command and now asks WPSLJCOM to complete the connection to that port.

*Types*

For more information, see the description of FramerOpen in the QP *Framer Design Specification* and of the JPortConnect in the *Jumbo Communications DLL Design Specification*.

DrvClose request

*Purpose*

This item contains the handle for the job being closed and the "must close" indication.

| Windows Printing System Design Specification | Queue Processor (QP) |
|---|---|

*Types*

See the qpdrv.h source file for more information.

DrvOpen request

*Purpose*

This item contains information required to initialize the QP (direct mode) or to write to the spool file (spooling enabled). It includes such information as the driver name, port name, printer name, job name, device data, and an error code that QPDrvOpen fills in.

*Types*

See the qpdrv.h source file for more information.

DrvPage request

*Purpose*

This item contains control information about the page just completed or the page which will follow. It indicates the end of a page of data, or identifies the start of an optional header or trailer page, or the beginning of the data for the job itself.

*Types*

See the qpdrv.h source file for more information concerning the request, and the qpsplmrk.h source file for a definition of types of pages.

DrvWrite request

*Purpose*

This item contains the handle for the job and the address and size of the data to be written.

*Types*

See the qpdrv.h source file for more information.

Endjob request

*Purpose*

The PM or the the QPDRV has sent the last page of the job and the QP may release all of the job-specific structures.

*Types*

The parameters for this call are defined in the qppm.h source file.

Finish

*Purpose*

The QP has printed the first copy of a duplexed or collated job and must now finish the rest.

*Types*

The caller passes the pointer to the queue.

Framer response

*Purpose*

This item reflects the result of a call to one of the Framer functions. A "success" response indicates that the Framer performed the function with no errors. All other responses contain an error code.

*Types*

See the *Framer Design Specification* for more information.

Get spool request

*Purpose*

At the end of each file in a spooled job, the PM asks whether it should delete the file.

*Types*

See the qppm.h source file for information concerning the parameters.

ICP_ABORT_JOB_GROUP, ICP_GO_TO_PCL, ICP_NO_ACK

*Purpose*

The QP sends the various ICPs to cause the printer to immediately perform the command.

*Types*

The QP sends the ICP_ABORT_JOB_GROUP when it aborts one or more jobs due to communications errors or the caller sets the abort flag in the QP_ENDJOB request.

The ICP_GO_TO_PCL is used to put the printer in PCL mode at the end of each job when the PC is executing in standard mode.

The QP sends the ICP_NO_ACK during printer initialization to instruct the printer to not pulse the nACK line.

See the *Resource Formats* document for a description of these commands.

Idle request

*Purpose*

When the PM has no data to send and wants to keep the port open, it makes calls to the QP at the rate the QP specifies. This allows the QP to complete job initialization, to get printer status, and finish sending of any data in the framer.

The Driver sends a QP_IDLE request when it needs to get the printer status.

*Types*

The parameters for this call are described in the qppm.h source file.

Init request

*Purpose*

The PM is opening the first spool file on its queue, the Driver needs the printer status, or the QPDRV has a job to be printed in direct mode. The request includes the interface version identifier, the QPINITDATA structure, and the return parameter.

*Types*

See the source file qppm.h for the details of the call.

Open port command

*Purpose*

The QP requests that the Framer command the WPSLJCOM to open the specified port.

*Types*

For more information, see the description of FramerOpen in the QP *Framer Design Specification* and of the JPortOpen in the *Jumbo Communications DLL Design Specification*.

Request for action

*Purpose*

The caller specifies to the QP the action it wants performed.

*Types*

See the qppm.h source file for a description of the possible actions and their parameters.

Response

*Purpose*

Each function called by QPAction, except the "check duplex/collate" task, returns a status of "ready," "busy," "error," or "paused" and sets the error word to indicate additional information about responses that are not "ready." The "check duplex/collate" task returns an indication of "true" or "false".

The "paused" error indicates that a collated job has encountered a disk full situation or other problems and will print just one copy.

*Types*

The response is an integer value except for the boolean true/false return code.

Return

*Purpose*

Every call to the QPDRV and the QP returns with "success" or "failure" and fills in the error status word in the caller's structure if there was an error.

*Types*

| Windows Printing System Design Specification | Queue Processor (QP) |
|---|---|

See the return codes and error status words defined in the qpdrv.h and qppi.h source files for more information.

SP_EndJob

*Purpose*

The QP sends the SP_ENDJOB if the initial printer status had the "busy" bit set. The QP uses this SPL when initializing the printer to insure that no data is left from a previous job.

*Types*

See the *Resource Formats* document for a definition of this SPL.

Write command

*Purpose*

The QP asks the Framer to send data to WPSLJCOM, through the port, using JPortWriteScattered.

*Types*

For more information, see the description of FramerFrameAndSend in the QP *Framer Design Specification* and of the JPortWriteScattered in the *Jumbo Communications DLL Design Specification*.

Write request

*Purpose*

This item is the QP_WRITE call for action. It contains the address of the struct containing information about the data.

*Type*

See the qppm.h source file for the parameters and the the QPWRITEDATA structure.

Structure

The QP structure chart has been decomposed into six separate charts, shown in Figures 12 through 17. Some low level modules appear on more than one structure chart. Other "functional groupings" are defined on one structure and are used on other charts. The charts on which they are used contain the reference to the figure on which they are defined.

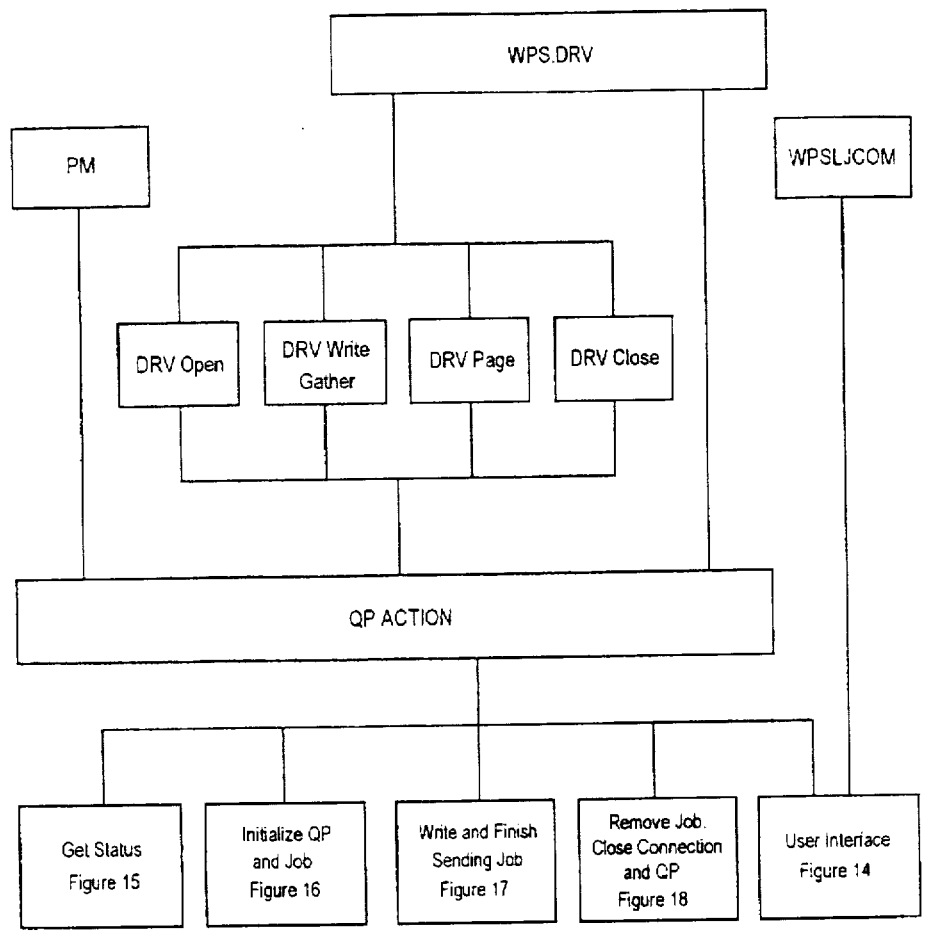
Figure 13. QP Structure Chart

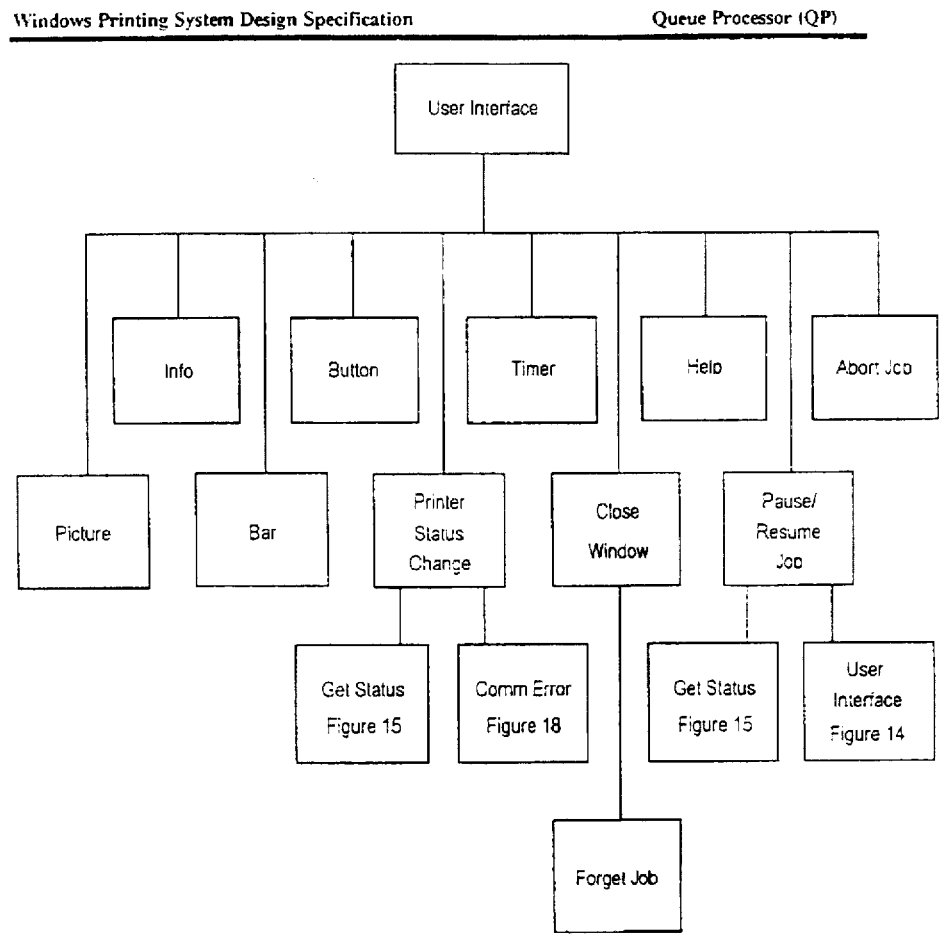
Figure 14. User Interface Structure Chart

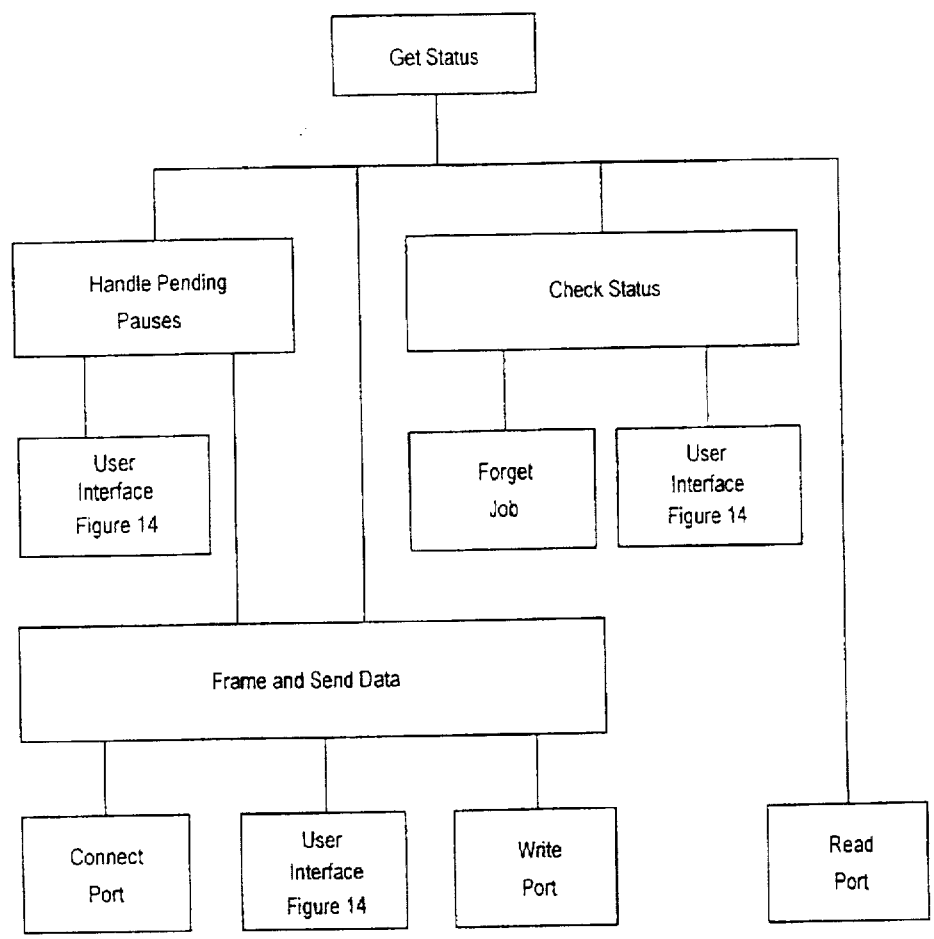
Figure 15. Get Status Structure Chart

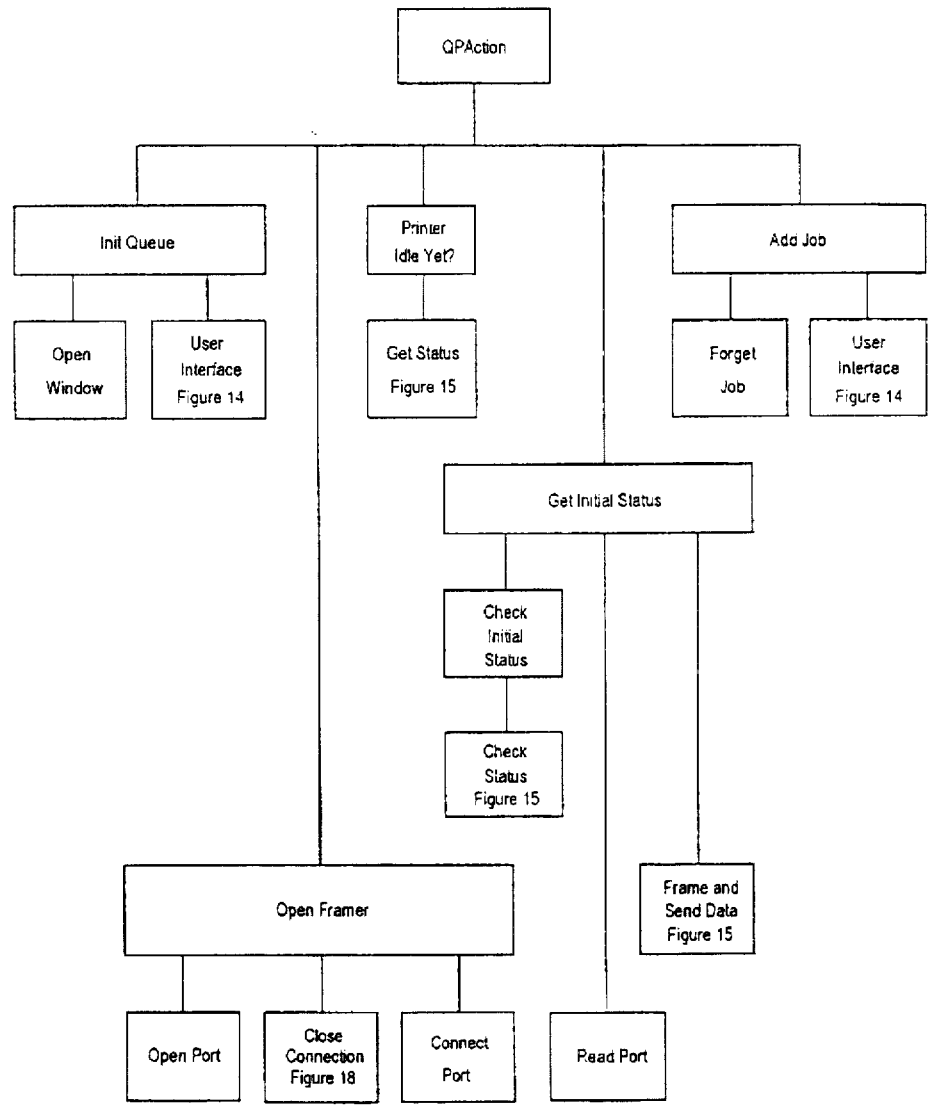
Figure 16. Initialize QP and Job Structure Chart

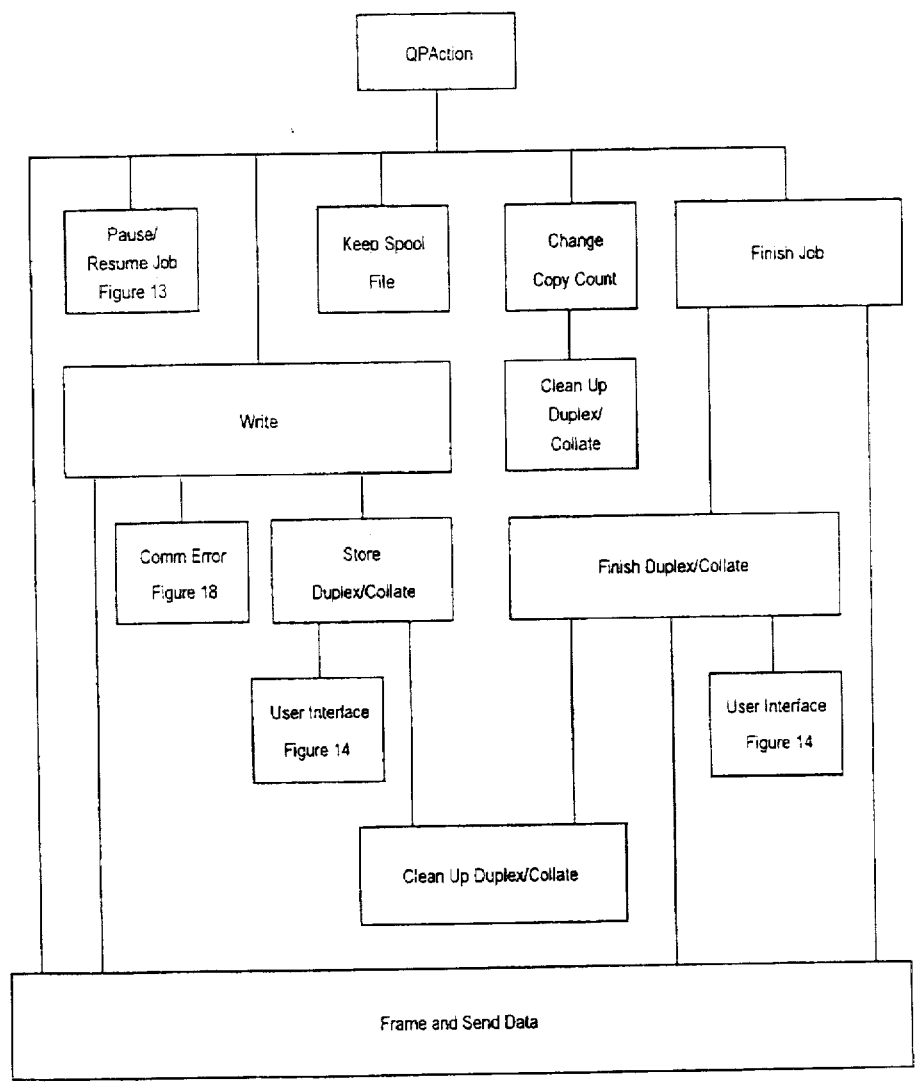
Figure 17. Write and Finish Sending Job Structure Chart

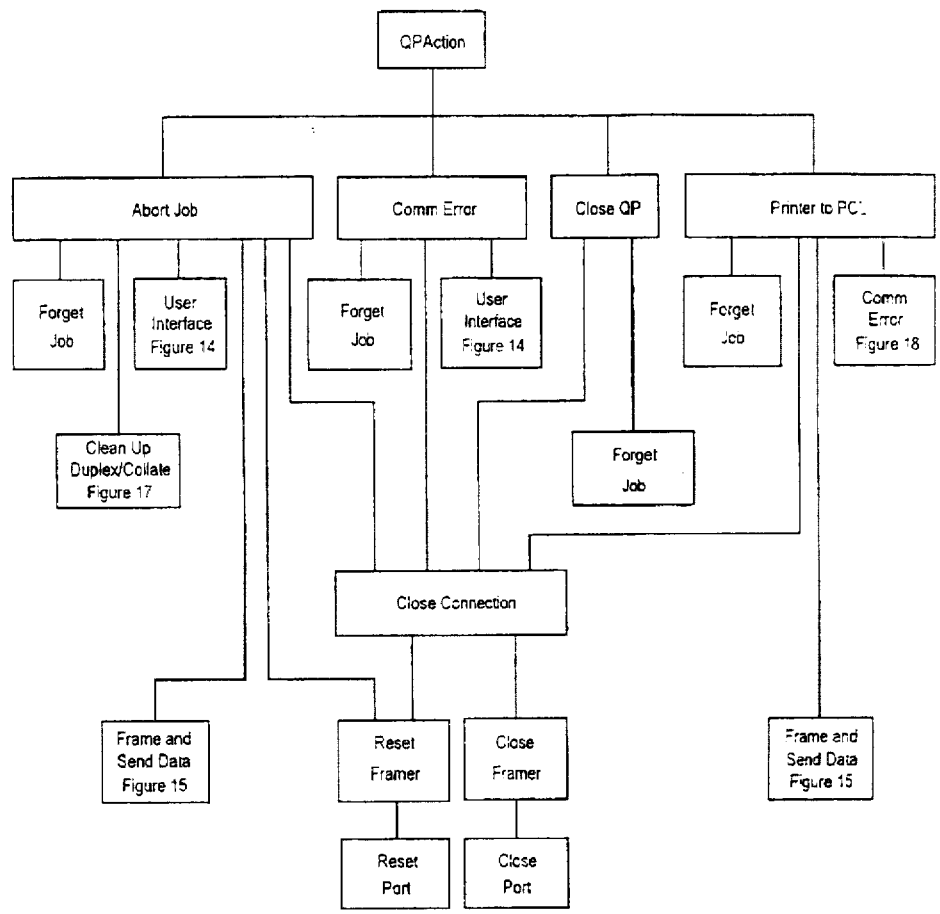

Figure 18. Remove Job, Close Connection and QP Structure Chart

The module names do not necessarily have a one-to-one correspondence with either data or control tasks. Table 10 below attempts to show this correspondence.

The following names are not modules but are merely used in the figures for ease of understanding: Initialize QP and Job; Write and Finish Sending Job; and Remove Job, Close Connection and QP. These names are not included in Table 10.

Windows Printing System Design Specification   Queue Processor (QP)

*Table 10. Module Cross References*

| Function | Unit Name | DFD Transform(s) | Status Checking and Reporting | Control Task(s) |
|---|---|---|---|---|
| DrvOpen | QPDrvOpen | — | -- | create context |
| DrvClose | QPDrvClose | — | -- | terminate job |
| DrvPage | QPDrvPage | create spool block | -- | create spool block |
| DrvWrite | QPDrvWrite | create spool block | -- | create spool block |
| QP Action | QPAction | — | -- | determine action |
| User Interface | QPStatProc | -- | Display PSW | — |
| Picture | QPPictureProc | — | Display PSW | — |
| Info | QPInfoProc | -- | Display PSW | — |
| Bar | QPBarProc | -- | Display PSW | -- |
| Button | QPButtonProc | — | Display PSW | -- |
| Printer Status Change | QPPrinterStatusChange | — | Display PSW | -- |
| Timer | TimerProc | -- | Display PSW | -- |
| CloseWindow | QPWindowClosed | -- | -- | -- |
| Forget Job | QPForgetFirstJob, QPForgetAllJobs, QPForgetFirstButNotLastJob | -- | -- | -- |
| Help | FilterFunc | -- | -- | -- |
| Pause/Resume Job | QPPauseJob QPResumeJob | -- | Display PSW | -- |
| Abort Job | QPAbortFirstJob, QPAbortLastJob | -- | -- | -- |
| Get Status | QPGetQuickStatus | -- | get status | -- |
| Handle Pending Pauses | QPHandlePendingPauses | -- | Get status | |
| Frame and Send Data | FramerFrameAndSend | gather and frame data | -- | — |
| Connect Port | JPortConnect | — | -- | — |
| Write Port | J Port Write | — | | — |
| Read Port | J Port Read | -- | | -- |
| Check Status | QPCheckStatus | — | get status | — |
| INIT Queue | QPInit | — | -- | initialize the QP |
| Open Window | QPOpenStatWindow | -- | -- | — |
| Open Framer | FramerOpen | -- | -- | initialize queue, printer idle? |
| Open Port | JPortOpen | -- | -- | — |
| Get INIT Status | QPGetInitStatus | — | -- | get status |
| Check Init Status | QPCheckInitStatus | -- | get status | -- |
| Printer Idle Yet? | QPAction | -- | -- | initialize queue, printer idle? |
| Add Job | QPAddJob | -- | | — |
| Change Copy Count | QpChangeCopyCount | — | -- | -- |
| Clean up Duplex/Collate | StoreCancel | -- | -- | — |
| Write | QPAction | save first pass | -- | — |
| Comm Error | BiDiCommError | -- | -- | -- |
| Store Duplex/Collated | uiStoreWrite | save first pass | -- | |

Windows Printing System Design Specification | Queue Processor (QP)

| Keep Spool File | bQPKeepSpoolFile | -- | -- | check collate/duplex |
|---|---|---|---|---|
| Finish Job | QPAction | -- | -- | complete job |
| Finish Duplex/Collated | uiStoreEndJob | read and resend spooled data | -- | read and resend spooled data |
| Close Connection | QPAction | -- | -- | -- |
| Reset Framer | FramerReset | -- | -- | close port |
| Reset Port | JPortReset | -- | -- | -- |
| Close Framer | FramerClose | -- | -- | close port |
| Close Port | JPortClose | -- | -- | -- |
| Close QP | QPCloseDown | -- | -- | determine action |
| Printer to PCL | QPAction | -- | -- | determine action |

Functions

Several functions are generally contained within one source file. Table 11 shows where to look for a particular function. It lists the contents of only those source files that have at least one function appearing in the structure chart.

*Table 11. Source File Contents*

| function | source file | purpose |
|---|---|---|
| bDuplexChangeSides | duplexer.c | send duplex instruction page to the framer and pause printer |
| bQPKeepSpoolFile | collator.c | returns true if the QP wants the PM to retain the spool file |
| bQueueFrame | framer.c | set up next complete frame as the one to send |
| bWriteDupInstruct | duplexer.c | send duplex instruction page to the framer |
| cbFillPacket | framer.c | copy bytes from raw data buffer into packet buffer |
| cbFrameBytes | framer.c | create new packet buffer |
| cbFrameData | framer.c | controls parsing of raw data |
| ConnectType | qpdrv.c | determines if job is spooled or direct |
| DiskFree | collator.c | process dialog for out of disk space error |
| DoQPWrite | qpdrv.c | sends data to the QP |
| FilterFunc | qpdlg2.c | hook function to process F1 |
| Framer Close | framer.c | Call JPortClose to terminate the connection |
| FramerFrameAndSend | framer.c | frame and send data stream to printer |
| FramerFrameAndSendScattered | framer.c | frame and send scattered data stream to printer |
| FramerOpen | framer.c | initialize framer for this printer, open and connect the port |
| FramerReset | framer.c | call JPortReset to reset the port |
| FramerSendRaw | framer.c | |
| GetDupInstructSize | duplexer.c | get size of resource for this page |
| JQPAbortFirstJob | qp2.c | perform abnormal termination of first job in the queue |
| JQPAbortLastJob | qp2.c | perform abnormal termination of last job in the queue |
| JQPAddJob | qp2.c | add a new job to the port structure |
| JQPBidiCommError | qp3.c | resets and closes the port and deletes the jobs |
| JQPChangeCopyCount | qp3.c | recomputes page information based upon copy count |
| JQPCheckInitStatus | qp2.c | Checks status from GetInitStatus against expected |

Windows Printing System Design Specification — Queue Processor (QP)

| Function | File | Description |
|---|---|---|
| JQPCheckStatus | qp2.c | Checks status from GetQuickStatus against expected |
| JQPCloseDown | qp2.c | closes the QP for this queue |
| JQPFinishJob | qp2.c | calls uiStoreEndJob for duplexed/collated jobs. Does end of job processing when the job finishes. |
| JQPForgetAllJob | qp3.c | deletes all jobs in the JOBINFO array |
| JQPForgetFirstButNotLastJob | qp3.c | deletes the first job in the JOBINFO array unless it is only one |
| JQPForgetFirstJob | qp3.c | deletes the first job in the JOBINFO array |
| JQPGetINIandAppName | qp3.c | figure out path |
| JQPGetInitStatus | qp2.c | send initial status request and read response |
| JQPGetNextJob | qp3.c | find next open spot in the JOBINFO array |
| JQPGetQuickStatus | qp2.c | Perform "get status" processing |
| JQPHandleCOMMNotify | qp3.c | handles WM_COMMNOTIFY message from COMM DRV |
| JQPHandlePendingPauses | qp3.c | sends ICP_PAUSE or ICP_RESUME to the printer |
| JQPInit | qp2.c | initializes the QP |
| JQPJobInfo | qp3.c | read the job info temporary file |
| JQPPageFlag | qp3.c | update number of pages in currently sending job |
| JQPPauseJob | qp3.c | handles Pause from PM, PSW, or printer |
| JQPPrinterModelFromName | qp3.c | looks for printer in list of printers |
| JQPPrinterStatusChange | qp3.c | process posting of printer status change message to PSW |
| JQPPrinterTo1Way | qp2.c | sends the ICP_GO_TO_PCL |
| JQPReadConfigFile | qp3.c | fill in device configuration information of the Q structure |
| JQPResumeJob | qp3.c | handles Resume from PM, PSW, or printer |
| JQPSendAbortJobICPToPrinter | qp2.c | tells printer to abort the job specified |
| JQPSendEndJob | qp2.c | sends the SP EndJob to the printer |
| JQPSendPrinterInit | qp2.c | sends printer initialize command |
| JQPStartJob | qp2.c | sends SP_START_JOB_GROUP |
| JQPUpdateStatusValid | qp3.c | update old state based upon status and comm error |
| JQPWindowClosed | qp3.c | deletes a job |
| lpbyBuildModeCmd | framer.c | build mode command |
| lpStoreBufferAlloc | collator.c | allocates buffer for file I/O |
| lpStoreListAdd | collator.c | adds file structure for collated and/or duplexed jobs to list |
| MakeDupPrintingPicture | duplexer.c | draw duplex printer picture |
| NewTimerProc | qpdlg2.c | timer callback function |
| NewTimerProc2 | qpdlg2.c | check for messages for the window |
| QPAction | qpstate.c | determines what to do with the input to the QP |
| QPBarProc | qpdlg2.c | manage bar window display |
| QPButtonProc | qpdlg2.c | manage play, pause, stop button window |
| QPDrvChangeCopyCount | qpdrv.c | copy count information |
| QPDrvClose | qpdrv.c | terminates the job from the driver |
| QPDrvEndGetStatus | qpdrv.c | closes a config-status session between the QP and the driver |
| QPDrvGetStatus | qpdrv.c | sends QP_IDLE until printer is not busy |
| QPDrvOpen | qpdrv.c | first call to the QP from the driver |
| QPDrvPage | qpdrv.c | page control information from the driver |

Windows Printing System Design Specification　　　　Queue Processor (QP)

| QPDrvStartGetStatus | qpdrv.c | open a status getting session with the QP |
|---|---|---|
| QPDrvWrite | qpdrv.c | get a resource block from the driver |
| QPDrvWriteGather | qpdrv.c | get a scattered resource block from the driver |
| QPEndStatus | drvstat.c | Terminate status getting session |
| QPGetLPQ | qp3.c | converts PQ to LPQ |
| QPGetNextJob2 | collator.c | find next open space in job array |
| QPGetPortConfig | drvstat.c | allow WPS Install to see if WPS printer queue is open |
| QPGetStatus | drvstat.c | Driver request to get printer status |
| QPInfoProc | qpdlg2.c | manage information window display |
| QPOpenStatWnd | qpdlg.c | create status window |
| QPPictureProc | qpdlg2.c | manage picture window display |
| QPStartStatus | drvstat.c | Driver opens a status getting sessions with the QP |
| QPStatProc | qpdlg.c | manage the status window |
| SpoolableDevice | qpstate.c | boolean function that determines if device is spoolable |
| StoreBufferFree | collator.c | frees above buffer |
| StoreCancel | collator.c | delete and clean up from duplexed/collated job |
| StoreListFree | collator.c | deletes job, header page, or trailer page file |
| TimerProc | qpdlg2.c | call timer callback function |
| uiDiskOutage | collator.c | process disk write error |
| uiSendSPL | collator.c | sends SPs for duplexing |
| uiStoreEndJob | collator.c | read and send data from file for additional copies needed when duplexing and/or collating |
| uiStoreWrite | collator.c | save job for collating and/or duplexing when in direct mode |
| uiStoreWriteInit | collator.c | initializes file into which to save first pass for job or optional trailer page for collating and/or duplexing |
| uiWriteToFramer | collator.c | sends data to the framer |
| wSendFrame | framer.c | transform frame to scatter table, add headers and Create Fonts and call JPortWrite |

DrvOpen, DrvClose, DrvWrite, DrvPage

These DrvOpen and DrvClose functions have been described in sufficient detail in the QPDRV Tasks section as "create context" and "terminate job." The DrvWrite and DrvPage functions are fully described as "create spool block" in the Data Flow section.

QPAction

The Driver, the QPDRV, and the PM each "call" into the QP via the QPAction function, and the QP itself makes many decisions at the QPAction switch point. From those decisions, it will call other QP routines. Table 12 contains a summary of the calls to QPAction.

Table 12. QPAction Calls

| Function | Action | Structure | Purpose |
|---|---|---|---|
| QPAction | | QP_HDR (for all actions) | interface routine to the QP from the PM and QPDRV |
| | QP_INIT | QPINITDATA | initialize the QP |
| | QP_BEGINJOB | QPBEGINDATA | create queue for a new job |
| | QP_WRITE | QPWRITEDATA | write a resource to the printer |
| | QP_DISPLAY | QPDISPLAYDATA | display the PSW |
| | QP_ENDJOB | QPENDJOBDATA | terminate the current job |
| | QP_IDLE | QPIDLEDATA | provides CPU time to the QP to do work |
| | QP_CLOSE | QPCLOSEDATA | terminate the QP |
| | QP_GETSPOOL | SUBSTORE | PM needs to know if it should delete spool file |
| | QP_QUERY_CLOSE | QUERYCLOSEDATA | is QP in a state where PM can close it? |
| | QP_QUEUE_PAUSED | QPPAUSEDATA | the user has selected the Pause button on the PM dialog box |
| | QP_QUEUE_UNPAUSED | QPUNPAUSEDATA | the user has selected the Resume button on the PM dialog box |

User Interface

This module processes all messages that the QP receives via the SendMessage function in the GDI.

Picture

This function manages the display of information and bitmaps in the status picture area of the PSW.

Info

This function manages the display of text in the Job Information area of the PSW.

Bar

This function manages the display of text and graphics in the progress bar area of the PSW.

Button

This function manages the play, pause, and stop button window on the PSW.

Printer Status Change

This function receives and processes the status change message from the printer.

Timer

These functions handle the timer callback function.

Close Window

This function resets the job queue if no jobs are active.

Forget Job

This function removes the current job from the Job Info structure (described in Internal QP Data Structures). Other functions within the QP call it when the job has been aborted or the printer has finished printing all the pages for the job, as determined by "check status."

There are three variations of this function, ForgetFirstJob, ForgetFirstButNotLastJob, and ForgetAllJobs. The caller determines the appropriate one.

Help

This function processes the Help menu item.

Pause/Resume Job

This function processes a Pause or Resume request received from the PSW, the PM, or the use of the Online button on the printer.

Abort Job

The QP will set the abort flag if it detects fatal printer errors, such as a communications error. The PM also sets this flag if the user decides to abort the job. Both of these reasons for the abort use the AbortLastJob function.

If a collated or duplexed job is the current job, this function calls Clean Up Duplex/Collate to terminate that processing.

This function performs all the clean up for this job.

Get Status

The QP checks if it should get the printer status every time it is called. It will issue the configuration status ICP only if the time since the last status read exceeds the threshhold the QP has set.

Handle Pending Pauses

This function sends the ICP_PAUSE and the ICP_RESUME commands to the printer.

Frame and Send Data

This function gathers and frames the data before sending it to the printer. It sends a complete frame to J Port Write. See the QP *Framer Design Specification* for more details.

Windows Printing System Design Specification                         Queue Processor (QP)

Connect Port

This begins the process of establishing the connection. For more information, see the *Jumbo Communications DLL Design Specification*.

Write Port

This function sends data to the printer. See the *Jumbo Communications DLL Design Specification* for more information.

J Port Read

This function reads the status from the printer. See the *Jumbo Communications DLL Design Specification* for more information.

NOTE: The buffer into which the data is read must be three or four bytes more than the actual read size or an "error 6, receive buffer too small" will occur. Four extra bytes will work.

Check Status

This function compares the previous status to the one just read from the printer. It will send a message to the "User Interface" if there is a change in status.

INIT Queue

The QP initializes its queue.

Open Window

This function sets up the PSW for the specific printer.

Open Framer

Whenever the QP is in a "Disconnected" state, and the QPAction is QP_DISPLAY, QP_IDLE, or QP_BEGINJOB, the QP attempts to open and connect to the printer by calling the Framer Open routine.

See the QP *Framer Design Specification* for more information.

Open Port

This module opens the specified port. For more information, see the *Jumbo Communications DLL Design Specification*.

Get Init Status

The QP is in the state of "getting init status" following the a successful call to Framer Open. This function sends an ICP_CONFIG_STATUS and reads the response. The QP remains in the "getting init status" state until it reads the PRB_CONFIG_STATUS and there are no error bits set in that response. This function executes within the QPAction module when the action is QP_DISPLAY, QP_BEGINJOB, QP_IDLE, or QP_ENDJOB.

Windows Printing System Design Specification | Queue Processor (QP)

Check Init Status

This function initializes values and compares the printer's expected configuration status against the actual status. If there is a discrepancy in the status, this function sends a message to "User Interface."

Printer Idle Yet?

Once the printer is ready for data, the QP initializes it and reads the printer status. The QP remains in the "waiting for printer idle" state until the QP reads the PRB. This task executes within the QPAction module when the action is QP_DISPLAY, QP_BEGINJOB, QP_IDLE, or QP_ENDJOB.

Add Job

This function executes at the beginning of each job. It allocates job-specific structures.

Change Copy Count

This function processes the Copy Count spool block.

Clean Up Duplex/Collate

This function releases buffers and deletes files used for a duplexed and/or collated job irrespective of whether the job completed without errors or there was an abnormal or abort termination.

Write

This function accepts a pointer and count for the data. It calls "Store Duplex/Collated" for jobs using either of these functions. It then sends the data to Framer Frame & Send.

Comm Error

This function handles the clean up for a communications error with the printer.

Store Duplexed/Collated

This function saves spool blocks to disk in direct mode for duplexed and/or collated jobs.

This function is called once at the beginning of a duplexed and/or collated job to determine if the job is a spooled job and has already been saved to disk. For a duplexed file, it sends the SPL to skip even pages.

If the data must be saved, it creates a file in which to write the job, allocates a structure to keep track of the file, sets the flag to indicate it must be called again, and returns.

Subsequent calls to this task result in an open file, append of the spool block to the file, and a close file.

For collated copies, this task also writes the optional trailer page to disk so it may be printed after the last copy of the last page. The QP processing for the job automatically prints the header page once at the beginning of the job, and it also correctly prints the the optional trailer page at the end of the job in duplexed jobs.

For information on the processing of disk errors, see the description of the "save first pass" transform in the Data Flow section.

Keep Spool File

This function is responsible for retaining the PM spool file for duplexed and collated jobs. It gets called by the PM at the end of every file and will return the retain indication in two cases: (1) collating and/or duplexing and this is the job file; and (2) this is the trailer file and the job is collated but not duplexed.

Finish Job

This function executes when the caller has made a QP_ENDJOB request, and the caller has not set the abort flag. It will return "failure" with error code of "busy" if the job requires duplexing and/or collating until the job finishes. Otherwise, it will return "success" so the caller may start the next job.

Finish Duplexed/Collated

This function inserts SPL instructions to the printer for duplexed jobs. It also reads the spool file or local file (direct mode) and writes the data to the printer. It returns "failure" with an error code of "busy" while it is sending the data.

Close Connection

This function performs all the QP clean up for a job if the connection fails and when the PM, the Driver, or the QPDRV is finished with the port. It will only call Framer Reset in the event of a communications error or if Framer Close indicates it had an error.

Reset Framer

This function gets called whenever the QP needs to terminate any framing in progress and reset the port. This occurs during error processing to clean the job out of the framer and printer, and during the close processing if the FramerClose call returns an error.

See the QP *Framer Design Specification* for more details.

Reset Port

This function resets the port. See the *Jumbo Communications DLL Design Specification* for more information.

Close Framer

This frees the port so other applications can used it and frees up internal buffers. See the QP *Framer Design Specification* for more details.

Close Port

This WPSLJCOM function frees the port. See the *Jumbo Communications DLL Design Specification* for more information.

Close QP

This function executes in response to a QP_CLOSE request when all the jobs in the QP have finished printing. The QPAction will not call this function if any job is still in the QP job queue unless the caller has set the MustClose flag. The caller must continue to send a QP_CLOSE request until all of the jobs complete.

Printer to PCL

This function sends the ICP_GO_TO_PCL command to the printer.

Sockets

@QP_PM

Two criteria were used to define this interface. Because of the nature of the Windows 3.x PM in non-pre-empting multi-tasking mode, the QP must always return quickly to the PM so that the PM can yield to other applications. This requirement means that even WPSLJCOM, downstream from the QP, would be subject to some host-side time-outs—conflicting, of course, with the goal of maximizing transmissions to the printer via large block transfers. (These time-outs would be in addition to printer-caused time-outs due to such events as the Canon engine performing a self-instigated reset at any arbitrary time, even during transmissions.)

Also, the QP and PM are very loosely coupled. For example, the PM may call the QP, and be ready to start a job and to start sending data. But the QP may take a lot of time to connect to the printer and to receive back the printer status. Then the QP will return and will either tell the PM (1) that the original request did not succeed (and then the PM will have to call back), or (2) that the request succeeded and that the first of the data was taken by the QP (so that the PM will have to remember where to resume when it sends the next data to the QP). In summary, the PM needs to stay ahead of the QP somewhat.

PM Data Structures

These structures are all defined in the source file qppm.h.

QPHDR

All the QP data structures use this common header, which repeats for each structure because its contents can either change while the PM is running, or are needed by each structure. For example, the handle to the PM's main window changes sometimes while the PM is running. When the QP is loaded, QP_INIT is executed before the window is created—so the first time, the hwndPM handle is null. Any subsequent calls pass this handle parameter so that the valid handle value can be passed into the QP.

The uiErr parameter is the standard way to return an error message from the function. Successful calls return a null value. Otherwise, errors can be (1) a general and usually fatal port error, (2) the port is busy (keep trying), or (3) the port has paused (possibly by the user taking the printer off line). A paused port will cause a paused queue, which will be shown as activated pause buttons in appropriate windows. (And, when the user removes the pause, all the windows will be updated to reflect the change.)

The user can change uiPriority—the background priority at which the spooler is running—at any time during the job.

The idle rate determines how often the QP wants to be called, in milliseconds. This rate is subject to the overriding rule that the PM will call the QP as often as it needs to if it has data to transfer; but, when it finishes, the QP itself might still be processing and cannot be killed until it finishes. The idle parameter is also used when the queue is paused to allow the QP to check status.

QPINITDATA

This structure points to three important data items: lpszDriver, lpszPort, and lpszPrinter. These are the names of the driver (e.g., JUMBO), port (e.g., LPT2:), and printer (e.g., JUMBO for LaserJet II). These items are passed in so that the QP can decide if it should be loaded. QP_INIT is called once for every queue that the driver wants to load. This means you can have one QP serving multiple queues, and it can be called multiple times with QP_INIT using different driver/port/printer combinations. (In PM, the printer name and the port name together define the queue; multiple printers on the same port would use different queues.)

QPINITDATA contains the handle (hwndPM) for the window that will identify the job. A null value means that the INIT failed; in this case, uiErr will contain the code for what the error is:

1. QP_INITERR_WRONGVERSION: non-matching version of PM/QP interface
2. QP_INITERR_DRVNOTSUPPORTED: QP does not support printer driver/port combination
3. QP_INITERR_INITFAILED: General initialization failure
4. QP_INITERR_PORTNOTSUPPORTED: QP does not support the port or its redirection
5. QP_INITERR_NOMEM: Out of memory

QPBEGINDATA

When the PM gets a new job that it wants to send to the QP, it passes the data held "in common," along with the job's name (lpszJobName) from the application. This name is the same name used by an application in displays to the user.

QPWRITEDATA

This structure contains the second handle (jJob) for the print job within the queue.

QPDISPLAYDATA

This structure is used for displaying data to the user.

Windows Printing System Design Specification　　　　　　　　Queue Processor (QP)

QPIDLEDATA

This structure is used by the QP_IDLE function.

QPENDJOBDATA

This structure is used when the PM has sent the last data for the job that the QP is working on. The hJob handle returned is the same handle used by QP_BEGINJOB. If the job is to be aborted. bAbort will be set to 1.

QPCLOSEDATA

This structure contains the boolean. bMustClose. If it's set to TRUE. the QP will not be allowed to return a failure. The QP_CLOSE function is paired with the QP_INIT function. The QP may work with several jobs within a single QP_INIT/QP_CLOSE function pair.

@QP_DRV

The driver uses these calls for both direct and spooled printing. In direct mode. these functions control the printing of the entire document. In spooled mode. these functions create the spool blocks which the QPDRV writes to the spool file. The PM then controls the sending of that job to the printer via its calls. described in the @QP_PM socket.

The table in the Tasks section of the Control Flow shows the sequencing of these calls and summarizes the processing.

The Driver will call into the QP through the QPDRV function. with a uiPriority of -1 (meaning an infinite priority). Only the Driver will have this priority.

For details on this interface. see the *Driver Design Specification* and the appropriate Testing Interface ("Data Dictionary") document.

Driver Data Structures

These structures are the same as the Print Manager's. These will include scatter blocks when the WriteScatter function is added back in to the Print Manager (as of this writing. the WriteScatter function was pulled out. but it will be added back in).

@JCOMM

For details on this interface. see the *Jumbo Communications DLL Design Specification*. WriteSpool in the Windows Device Driver Kit (currently for printing to files or networks). or DOS File I/O (future implementation for printing to files or networks).

To print to a network or to a file. the user must select a network printer or provide a file name. The Driver calls the QP to do the framing. and the QP will call the WriteSpool functions against either a file or a network connection. (The exception: users can specify the spooling of net jobs through the Print Manager when the network is expected to behave extremely slowly. This is done by turning off "Print Net Direct." This results in double spooling: once locally. and once on the network; however. if the network is extremely slow. the user's return to application time may be enhanced by using this option.)

Windows Printing System Design Specification | Queue Processor (QP)

JCOMM Data Structures

For more information on JCOMM data structures, see the Jumbo Communications DLL document.

@GDI

This interface is the standard Windows API. See the Windows Device Driver Kit for more details.

Framer Functions

The Framer functions are described in detail in the *Framer Design Specification*.

NOTES

This section includes information that should be removed from this document because it belongs elsewhere. It will remain here until I decide where to put it.

QP_INIT

If the PM wants to report printer status constantly, even outside of jobs, then it could choose at QP_INIT time to open a port and start a conversation with a printer—and keep the port open all the time. But, if that happens, allowing multiple printers on the same port is no longer feasible—because, with a port kept open, no other process can talk to that port. This is an issue with switch boxes, hardware that Windows doesn't support anyway, and with multiple-emulation printers: PostScript and Jumbo and PCL, for example. We can solve this if the QP supports a whole printer, i.e., if the QP is printer-specific and is not emulation-specific.

So, if Hewlett-Packard manufactures several different printers, it will write one QP and several drivers that support those printers (each printer model on any port will have a separate driver). But, at the PM level, the same QP will be associated with each of those differing queues. That QP would be INITed three times: once for each of those queues. Of course, a smart QP would know that each queue would be on the same port, and therefore talking to the same printer. It would keep track of this information on a port-by-port basis. If it was printing through one queue and got a request to print on another queue attached to the same printer and port combination, it would refuse because it was busy. In that case—because it would continue to keep track of the port's status—it would continue printing through the first queue until it was finished, and then it would be able to print through the other queue.

Because of these separate queues, Windows considers that printing happens through separate logical printers. In other words, multiple emulations are allowed. Ideally, the Windows GDI would hide this from the application, and the application should be able to do anything the GDI can do. Unfortunately, this is not the case. For example, Windows currently provides no path or gradient fill commands through the GDI. Win-32 may solve this, because it may contain all the functionality that applications should need in its GDI. If so, it can implement that functionality for every device, either on the host or on the device. If this proves workable, then the concept of multiple emulation may disappear. But for now, multiple queues connected to specific printer/port combinations are used; each differing by which driver (PostScript, PCL, or Jumbo) is used. Basically, our current use of the QPs don't really do anything to the queues; they act on jobs. In a way, they are misnamed, because they are actuallly more printer-specific than the printer drivers. Queue Processors would be better termed Printer Drivers, and Printer Drivers should be called Emulation Drivers or Printer Personality Drivers. But we're stuck with our terminology for now.

QP_BEGINJOB

So, if QP_BEGINJOB is called repeatedly, it will usually succeed, but only eventually---usually not the first time. When it succeeds, it will return another handle to identify the job. An additional handle is needed because the host can theoretically have more than one job open on a queue. This would then allow for host-based error recovery, which Jumbo does not currently provide. Now, only one job can be open on a queue at a time. The sequence of functions now is always Init, Beginjob, Write, End (or Abortjob), then Beginjob again; a Beginjob before an End is not allowed. In the future, if we implement host-based error recovery, the QP will be able to choose to not close a job when so requested, but instead to place a "hold" on it. That way, the spool file won't be deleted until it's last page clears the printer, and---in the meantime---the QP will be able to start on the next job in the queue. This will help maintain engine speed, and hence job throughput, without compromising error recovery capabilities. To accomplish this, we would need to be able to keep multiple jobs open. But currently, the QP returns a "busy" status whenever the PM wants to start a new job.

QP_ENDJOB

Right now, successful QP_ENDJOBs cause the PM to kill the spool file. Page error recovery is made enabled because the QP could still be holding on to data. Or, better (and for future consideration), we would have more than a boolean return (not just yes or no). The QP could return a conditional yes, instead. This would inform the PM that it will close the spool file, but that it doesn't want to kill the spoolfile. Today, while we have no host-based error recovery, for efficiency we still want to keep the pipeline as full as we can. So, if the QP has sent all the data to the printer at the time of QP_ENDJOB, but that data has not cleared the printer yet, the QP can't close the queue yet. It may have to display the dialog box showing the output tray, for example. In this case, the QP can still wait for the page to hit the output tray *and* start receiving more data from the PM.

QP_IDLE

This function gives the QP a chance to run, even though the PM has no current need for it. It can be called instead of QP_WRITE---whether or not there is data to write---if a QP_WRITE should not be issued for some reason. It's called as often as the uIdleRate requires, and that rate varies from queue to queue.

The PM provides CPU cycles to the QP when calling it. The PM is the main way that the QP comes into existence. (It can also be called by the Driver on the @QPDRV interface or to get printer status, or by its window receiving messages dispatched to it through the Windows message-posting interface---e.g., this could happen from WPSLJCOM.) But the QP is not an application---not an EXE file. It's a DLL. Its library functions, when called, cause it to be activated. It only runs when it gets called. It gets called by the PM primarily according to the idle rate, which the QP can change on any returned function call as it returns to the PM.

If the PM quits, the QP will quit, too. If the user is printing direct---without the PM---then the QP quits when the Driver is done. (In the next version of Windows, PM will always run, reducing some of these potentials for problems.)

We claim:

1. A method in a computer system for providing an up-to-date display of a printer state of a printer attached to the computer system, the computer system having a display screen, a communications driver, and an executing printer management program, the method comprising the computer-implemented steps of:

under control of the printer management program,
displaying a printer status window on the display screen;
displaying an indication of the printer state in the printer status window; and
sending a request to the communications driver for updated information on the printer state;

under control of the communications driver,
receiving the request for updated information on the printer state;
in response to the received request, sending a request to the printer to determine a current printer state using a bi-directional communication protocol;
using the bi-directional communication protocol, receiving data from the printer regarding the current printer state; and
sending an updated printer state to the printer management program based upon the received data; and under control of the queue processor]printer management program,
receiving the updated printer state; and
displaying an indication of the updated printer state in the printer status window.

2. The method of claim 1 wherein the indication of the updated printer state displayed in the printer status window indicates whether further use of the printer requires user intervention.

3. The method of claim 1 wherein the printer state indicates a present configuration of paper feed trays attached to the printer and wherein the indication of the updated printer state displayed in the printer status window indicates that a selected paper size is currently available in one of the paper feed trays.

4. The method of claim 1 wherein the indication of the updated printer state displayed in the printer status window includes a graphical representation of the printer in conjunction with a graphical representation of the updated printer state.

5. The method of claim 4 wherein the graphical representation illustrates a paper jam location.

6. A method in a computer system for providing a display of a printer state of a printer attached to the computer system, the computer system having a display screen and an executing printer status program, the method comprising the computer-implemented steps of:

under control of the printer status program,
displaying on the display screen an initial printer state; and
sending to the attached printer a request for current status;

under control of the attached printer,
receiving the request for current status; and
in response to the received request, sending data to the printer status program, the data including information regarding a current printer state; and under control of the printer status program,
receiving the data sent by the attached printer;
determining an updated printer state based upon the received data; and
displaying the updated printer state on the display screen.

7. The method of claim 6 wherein the updated printer state is a user intervention not required state.

8. The method of claim 7 wherein the user intervention not required state is one of the states of Normal, Toner Low, Low Printer Memory and Printer Changed.

9. The method of claim 6 wherein the updated printer state is a user intervention required state.

10. The method of claim 9 wherein the user intervention required state is one of the states of Cover Open, Paper Out, Wrong Paper Loaded, Paper Jam, Manual Feed, Manual Duplex, Communications Error, and Engine Error.

11. The method of claim 6 wherein the updated printer state animates flow of a piece of paper through the printer.

12. The method of claim 6 wherein the updated printer state includes sound effects.

13. The method of claim 6 wherein the step of sending to the attached printer the request for current status is performed after first receiving an indication from the attached printer that the current printer state has changed.

14. A method in a computer system for providing a display of a printer state of a printer attached to the computer system, the computer system having a display screen and an executing printer status program, the method comprising the computer-implemented steps of:

under control of the printer status program,
displaying a printer status window on the display screen with an initial printer state;
sending to the attached printer a request for current status;

under control of the attached printer,
receiving the request for current status; and
in response to the received request, sending data to the printer status program, the data including information regarding a current printer state; and under control of the printer status program,
receiving the data sent by the attached printer; and
displaying the printer status window on the display screen with a modified printer state based upon the received data.

15. The method of claim 14 wherein the indication of the modified printer state displayed in the printer status window indicates that further use of the printer requires user intervention.

16. The method of claim 14 wherein the indication of the modified printer state displayed in the printer status windows indicates information not requiring user intervention.

17. A method in a computer system for providing a display of a printer state of a printer attached to the computer system, the computer system having a display screen and an executing printer management program, the method comprising the computer-implemented steps of:

under control of the printer management program,
displaying on the display screen an initial printer state;
sending to the attached printer a request for current status;

under control of the attached printer,
receiving the request for current status; and
in response to the received request, sending data to the printer management program, the data including information regarding a current printer state and a location of a paper passing through the printer; and under control of the printer management program,
receiving the data sent by the attached printer;
determining an updated printer state based upon the received data; and displaying the updated printer state on the display screen including a graphical representation of an approximation of the location of the paper passing through the printer.

18. The method of claim 17 wherein the graphical representation of the location of the paper passing through the printer is approximately performed in real time.

19. The method of claim 17 wherein the graphical representation indicates a location of a paper jam.

20. A computer readable memory device containing instructions for controlling a computer processor in a computer system to display a printer state of a printer attached to the computer system, the computer system having a display screen and a printer status program by performing the steps of:
under control of the printer status program,
displaying on the display screen an initial printer state;
sending to the attached printer a request for current status;
under control of the attached printer,
receiving the request for current status; and
in response to the received request sending data to the printer status program, the data including information regarding a current printer state; and
under control of the printer status program,
receiving the data sent by the attached printer;
determining an updated printer state based upon the received data; and
displaying the updated printer state on the display screen.

21. The computer readable memory device of claim 20 wherein the updated printer state is a user intervention not required state.

22. The computer readable memory device of claim 21 wherein the user intervention not required state is one of the states of Normal, Toner Low, Low Printer Memory, and Printer Changed.

23. The computer readable memory device of claim 20 wherein the updated printer state is a user intervention required state.

24. The computer readable memory device of claim 23 wherein the user intervention required state is one of the states of Cover Open, Paper Out, Wrong Paper Loaded, Paper Jam, Manual Feed, Manual Duplex, Communications Error, and Engine Error.

25. The computer readable memory device of claim 20 wherein the updated printer state animates flow of a piece of paper through the printer.

26. The computer readable memory device of claim 20 wherein the updated printer state includes sound effects.

27. The computer readable memory device of claim 20 wherein the step of sending to the attached printer the request for current status is performed after first receiving an indication from the attached printer that the current printer state has changed.

28. A system comprising:
a communications medium that supports bi-directional data flow;
a printer that, in response to a request for updated printer state information, sends data with the updated printer state information using the communications medium;
a computer system having a display screen and being attached to the printer using the communications medium; and
a print management program executing on the computer system for displaying current status of the attached printer by sending a request to the attached printer for updated printer state information and, upon receiving the updated printer state information from the attached printer, displaying the current status of the attached printer on the display screen.

29. The system of claim 28 wherein the displayed current status of the attached printer indicates that further use of the attached printer requires user intervention.

30. A system comprising:
a printing means that, in response to a received request from a requester, sends data to the requester that includes status information;
a computer means having a display means;
a bi-directional communication means for attaching the printing means to the computer means such that data can flow from the printing means to the computer means and vice versa; and
means for displaying a current state of the printing means attached to the computer system means that
displays a status window on the display means with an initial state;
sends to the attached printing means a request for current status;
receives the data sent by the attached printing means using the bi-directional communication means, the data including status information; and
displays an indication of the current state of the printing means in the status window based upon the received data.

31. The system of claim 30 wherein the indication of the current state of the printing means indicates a user intervention required state.

32. The system of claim 31 wherein the user intervention required state is one of the states of Cover Open, Paper Out, Wrong Paper Loaded, Paper Jam, Manual Feed, Manual Duplex, Communications Error, and Engine Error.

33. The system of claim 30 wherein the indication of the current state of the printing means indicates a user intervention not required state.

34. The system of claim 33 wherein the user intervention not required state is one of the states of Normal, Toner Low, Low Printer Memory, and Printer Changed.

35. The system of claim 30 wherein the indication of the current state of the printing means animates flow of a piece of paper through the printing means.

36. The system of claim 30 wherein the indication of the current state of the printing means includes sound effects.

37. The system of claim 30 wherein the display means sends to the attached printing means the request for current status after first receiving an indication from the attached printing means that the status information has changed.

38. A method in a computer system for remotely controlling attributes of an attached printer with updated feedback, the printer having a plurality of paper sources, the computer system having a display scream, the method comprising the computer-implemented steps of:
displaying on the display screen a graphical representation of a current state of the attached printer, the current state including a representation of a paper size contained in each of the plurality of paper sources of the attached printer;
selecting a paper source from the displayed graphical representation;
after selecting the paper source,
determining a current paper size by sending a request to the attached printer for updated information on the paper size contained in the selected paper source; and displaying the determined current paper size, such that a user is able to remotely control accurate selection of paper source and paper size; and sending a request to the attached printer to use the selected paper source.

39. The method of claim 38 wherein the attached printer sends information to the computer system if the paper size contained in a paper source is changed, such that the changed information is accurately reflected in the displayed graphical representation.

40. A method in a computer system for remotely controlling an attached printer, the computer system having a display screen, the method comprising the computer-implemented steps of:

under control of the computer system, displaying on the display screen a graphical representation of a current state of the attached printer, the current state including a plurality of selectable printer attributes of the attached printer, each printer attribute controlling a corresponding aspect of the attached printer;

selecting one of the printer attributes from the displayed graphical representation and setting a value of the selected attribute; and sending a request to the attached printer to modify the aspect of the printer corresponding to the value of selected printer attribute; and under control of the attached printer, receiving the request; and modifying the corresponding aspect of the printer based upon the received request.

41. The method of claim 40 wherein the selected printer attribute determines whether the attached printer is on-line or off-line and wherein, when the selected printer attribute is set to off-line, the step of modifying the corresponding aspect of the printer actually causes the printer to be set to an off-line state.

42. The method of claim 40 wherein the step of selecting one of the printer attributes is performed by selected an appropriate portion of a graphical representation of the attached printer.

* * * * *

UNITED STATES PATENT AND TRADEMARK OFFICE
CERTIFICATE OF CORRECTION

PATENT NO. : 5,706,411
DATED : January 6, 1998
INVENTOR(S) : McCormick et al.

It is certified that error appears in the above-identified patent and that said Letters Patent is hereby corrected as shown below:

In column 4, line 10, after "can" insert therefor -- be --.

In column 4, line 55, after "printer" delete "have" and substitute therefor --has --.

In column 4, line 64, after "as" delete "an" and substitute therefor -- a --.

In column 5, line 48, after "pause button" delete "(52)" and substitute therefor -- (53) --. After "resume button" delete "(53)" and substitute therefor -- (52) --.

In column 7, line 26, after "action" delete "require" and substitute therefor -- required --.

In column 7, line 38, after "of" insert -- the --.

In column 7, line 47, after "through" delete "11E" and substitute therefor -- 11C --.

In column 8, line 1, after "page" delete "exists" and substitute therefor -- exits --.

In column 8, line 29, delete "communication" and substitute therefor -- communications --.

In column 9, line 41, after "module" delete "transition" and substitute therefor -- transitions --.

In column 9, line 42, after "states" delete "base" and substitute therefor -- based --.

In column 441, line 27, claim 1, after "queue" delete "processor]printer" and substitute therefor -- processor printer --.

UNITED STATES PATENT AND TRADEMARK OFFICE
CERTIFICATE OF CORRECTION

PATENT NO. : 5,706,411
DATED : January 6, 1998
INVENTOR(S) : McCormick et al.

It is certified that error appears in the above-identified patent and that said Letters Patent is hereby corrected as shown below:

In column 443, claim 20, line 22, after "request" insert -- , --.

In column 444, claim 38, line 55, after "display" delete "scream" and substitute -- screen --.

Signed and Sealed this

Fifteenth Day of December, 1998

Attest:

BRUCE LEHMAN

Attesting Officer

Commissioner of Patents and Trademarks